(12) United States Patent  (10) Patent No.: US 7,947,321 B2
Brophy et al.  (45) Date of Patent: May 24, 2011

(54) MODIFICATION OF PARTICLE MORPHOLOGY TO IMPROVE PRODUCT FUNCTIONALITY

(76) Inventors: James S. Brophy, Independence, MN (US); Linda Brophy, Independence, MN (US)

(*) Notice: Subject to any disclaimer, the term of this patent is extended or adjusted under 35 U.S.C. 154(b) by 863 days.

(21) Appl. No.: 11/813,066

(22) PCT Filed: Jul. 20, 2006

(86) PCT No.: PCT/US2006/028392
§ 371 (c)(1),
(2), (4) Date: Jun. 28, 2007

(87) PCT Pub. No.: WO2007/012069
PCT Pub. Date: Jan. 25, 2007

(65) Prior Publication Data
US 2008/0317913 A1  Dec. 25, 2008

Related U.S. Application Data

(60) Provisional application No. 60/701,213, filed on Jul. 20, 2005.

(51) Int. Cl.
*A23C 9/123* (2006.01)
(52) U.S. Cl. .................. 426/583; 426/238; 426/519
(58) Field of Classification Search .................. 426/238, 426/580–588, 519
See application file for complete search history.

(56) References Cited

U.S. PATENT DOCUMENTS

| | | | |
|---|---|---|---|
| 2,918,380 A * | 12/1959 | Wearmouth | 426/238 |
| 3,294,063 A * | 12/1966 | Brodrick | 426/2 |
| 3,614,069 A | 10/1971 | Murry | |
| 3,941,890 A | 3/1976 | Drachenberg et al. | |
| 4,244,983 A | 1/1981 | Baker | |
| 4,302,112 A * | 11/1981 | Steenstrup | 366/114 |
| 4,324,804 A | 4/1982 | Davis | |
| 4,341,801 A | 7/1982 | Weissman | |
| 4,379,175 A | 4/1983 | Baker | |
| 4,390,560 A | 6/1983 | Koide et al. | |
| 4,397,878 A | 8/1983 | Koide et al. | |
| 4,434,184 A * | 2/1984 | Kharrazi | 426/40 |
| 4,534,982 A | 8/1985 | Yoshida et al. | |
| 4,724,152 A | 2/1988 | Baker et al. | |
| 4,732,769 A | 3/1988 | Sozzi et al. | |
| 4,801,455 A | 1/1989 | List et al. | |
| 4,873,094 A | 10/1989 | Pischke et al. | |
| 5,026,564 A * | 6/1991 | Hayden | 426/237 |
| 5,064,660 A | 11/1991 | Silver | |
| 5,409,726 A | 4/1995 | Stanley et al. | |

(Continued)

FOREIGN PATENT DOCUMENTS
CA  2111802  6/1994
(Continued)

OTHER PUBLICATIONS

Food Production daily.com "Ultrasound project to manipulate dairy processing", printout from www.foodproductiondaily.com/news/news-ng.asp?n=61122-ultrasound-project-to, Novis Industrial & Science News, Jul. 7, 2005.

(Continued)

*Primary Examiner* — Drew Becker
(74) *Attorney, Agent, or Firm* — Cook Alex Ltd.

(57) ABSTRACT

A method for improving the functional and organoleptic properties of a product is described. The method involves modifying the particles within the product to meet certain particle morphology parameters.

9 Claims, 97 Drawing Sheets

U.S. PATENT DOCUMENTS

| | | | |
|---|---|---|---|
| 5,527,556 | A | 6/1996 | Frippiat et al. |
| 5,563,491 | A | 10/1996 | Tseng |
| 5,656,320 | A | 8/1997 | Cheng et al. |
| 5,882,704 | A | 3/1999 | Yamaguchi et al. |
| 5,993,806 | A | 11/1999 | Galle |
| 6,093,424 | A | 7/2000 | Han et al. |
| 6,406,736 | B1 | 6/2002 | Han |
| 6,485,775 | B1 | 11/2002 | Camin et al. |
| 6,495,599 | B2 | 12/2002 | Auestad et al. |
| 6,497,913 | B1 | 12/2002 | Gray et al. |
| 6,630,185 | B2 | 10/2003 | Arends et al. |
| 6,861,080 | B2 | 3/2005 | Kent et al. |
| 2002/0004527 | A1 | 1/2002 | Auestad et al. |
| 2002/0012719 | A1 | 1/2002 | Nadland |
| 2002/0045660 | A1 | 4/2002 | O'Connor et al. |
| 2003/0104587 | A1 | 6/2003 | Verser et al. |
| 2003/0190363 | A1 | 10/2003 | O'Connor et al. |
| 2003/0207001 | A1 | 11/2003 | Skene et al. |
| 2003/0219510 | A1* | 11/2003 | Kent et al. ............ 426/34 |
| 2005/0008739 | A1* | 1/2005 | Talukdar et al. .......... 426/238 |
| 2005/0031499 | A1 | 2/2005 | Meier |
| 2005/0037110 | A1 | 2/2005 | Windhab et al. |
| 2005/0276883 | A1* | 12/2005 | Jeffrey et al. ............ 426/106 |
| 2005/0277563 | A1 | 12/2005 | Ferguson et al. |
| 2006/0110503 | A1 | 5/2006 | Bates et al. |
| 2008/0206410 | A1* | 8/2008 | Efstathiou et al. .......... 426/238 |

FOREIGN PATENT DOCUMENTS

| | | |
|---|---|---|
| EP | 0 589 303 A1 | 3/1994 |
| EP | 0 602 577 A1 | 6/1994 |
| EP | 1 142 482 A1 | 10/2001 |
| EP | 1 201 134 A2 | 5/2002 |
| EP | 1 364 583 A2 | 11/2003 |
| WO | WO 93/22930 | 11/1993 |
| WO | WO 94/21129 | 9/1994 |
| WO | WO 94/21130 | 9/1994 |
| WO | WO 97/01961 | 1/1997 |
| WO | WO 00/01246 | 1/2000 |
| WO | WO 01/74171 A1 | 10/2001 |
| WO | WO 01/78530 A2 | 10/2001 |
| WO | WO 03/070012 A1 | 8/2003 |
| WO | WO 2005/016023 A1 | 2/2005 |
| WO | WO 2007/084969 A3 | 7/2007 |

OTHER PUBLICATIONS

Food Production daily.com.europe, "CP Kelco uncovers secrets of mouthfeel", printout from www.foodproductiondaily.com/news/printNewsBis.asp?id=68946, Decision News Media, SAS, Jul. 6, 2006.

Dana Maiolino National Starch and Chemical Company, Bridgewater, NJ, "Functional Starches Improve Mouthfeel in Liquid Products", printout from www.foodinnovation.com/pdfs/mouthfeel.pdf—Jan. 3, 2005.

Microfluidics, "Food Patent References", printout from www.microfluidicscorp.com/industry/patent/prfood.htm, dated Nov. 29, 2004.

Nutra ingredients.com.europe, "Scientists to probe food's nanostructure to optimise ingredients", printout from www.nutraingredients.com/news/printNewsBis.asp?id=68940, Decision News Media, SAS, Jul. 6, 2006.

Particle Measurements, "The Powder Workbench 32 Particle Size and Shape Analyzer", printout from http//particlemeasurements.com/downloads/Brochure-pdf, pre 2005.

Pharmaceutical technology.com, "Telsonic Ultrasonics Telsonic-Ultrasound Process Technology", printout from www.pharmaceutical-technology.com/contractors/process_automation/telsonic/ Feb. 7, 2005.

TNO TPD, "Measuring Viscosity with Ultrasound", printout from www.tpd.tno.nl/smartsite114.html, Feb. 7, 2005.

Mason, T.J. et al., "The uses of ultrasound in food technology", Ultrasonics: Sonochemistry, Nov. 1996, vol. 3, No. 3 pp. S253-S260.

McClements, D.J. et al., "Lipid-based emulsions and emulsifiers", Food Lipids: chemistry, nutrition and biotechnology, pp. 55-88, Marcel Dekker, NY (1998).

McClements, D.J. et al., "Lipid-based emulsions and emulsifiers", Food lipids: chemistry; nutrition and biotechnology, 2nd edition, pp. 63-101, Marcel Kekker, NY, (2002).

Michalski, M., et al., "Appearance of submicronic particles in the milk fat globule size distribution upon mechanical treatments", Lait, Mar.-Apr. 2002, vol. 82, No. 2, pp. 193-208.

Microfluidics, "A New Way to Pasteurize: Microfluidizer Processing", Food Case History 303, (1998).

Praulins, D., "Ultrasonic homogenisers", Food Technology in New Zealand, 1980, vol. 15, No. 5, pp. 9 and 11.

Schmidt, H.W., "Investigation of the ultrasonic homogenisation of milk samples", Lebensmittel-Industrie, 1985, vol. 32, No. 4, pp. 173-174 with English translation.

Suslick, K..S., et al., "Applications of Ultrasound to Materials Chemistry", Annual Review of Material Science, 1999, vol. 29, pp. 295-326.

Thomaz, A., et al., "Effects of human milk homogenization on fat absorption in very low birth weight infants", Nutrition Research, Apr. 1999, vol. 19, No. 4, pp. 483-492.

Vercet A. et al., "Rheological properties of yoghurt made with milk submitted to manothermosonication", Journal of Agricultural and Food Chemistry Oct. 9, 2002, vol. 50, No. 21, pp. 6165-6171.

Villamiel, M. et al., "Influence of high-intensity ultrasound and heat treatment in continuous flow on fat, proteins, and native enzymes of milk", Journal of Agricultural and Food Chemistry 2000, vol. 48, No. 2, pp. 472-478.

Wu, H., et al., "Effects of ultrasound on milk homogenization and fermentation with yogurt starter", Innovative Food Science and Emerging Technologies, Sep. 2000, vol. 1, No. 3, pp. 211-218.

Luerkens, D.W., "Theory and Application of Morphological Analysis: Fine Particles and Surfaces", CRC Press, Boca Raton, Florida, 1991.

Lemay, A., et al., "Influence of Microfluidization of Milk on Cheddar Cheese Composition, Color, Texture, and Yield", Journal of Dairy Science, Oct. 1994, vol. 77, pp. 2870-2879.

* cited by examiner

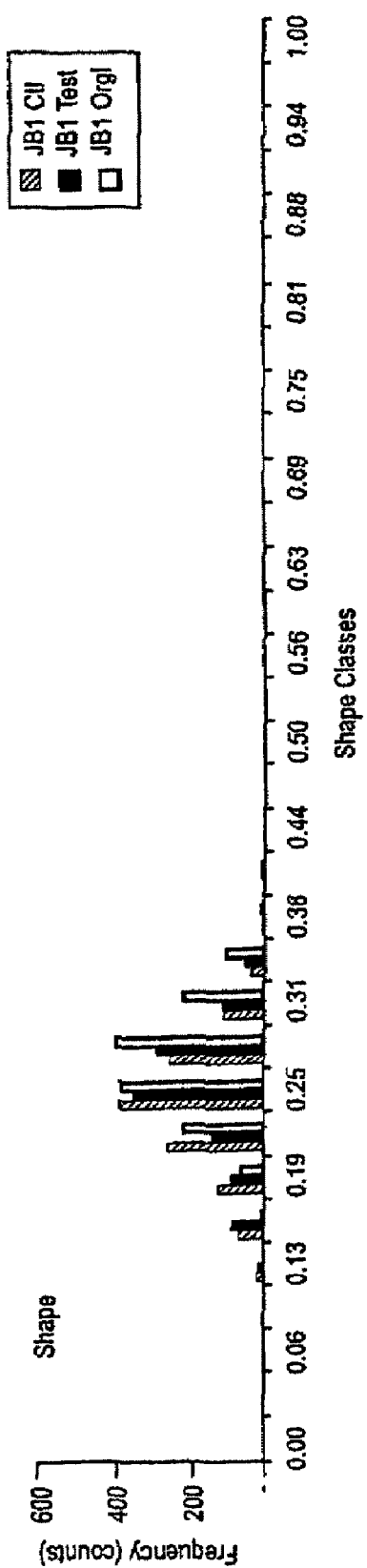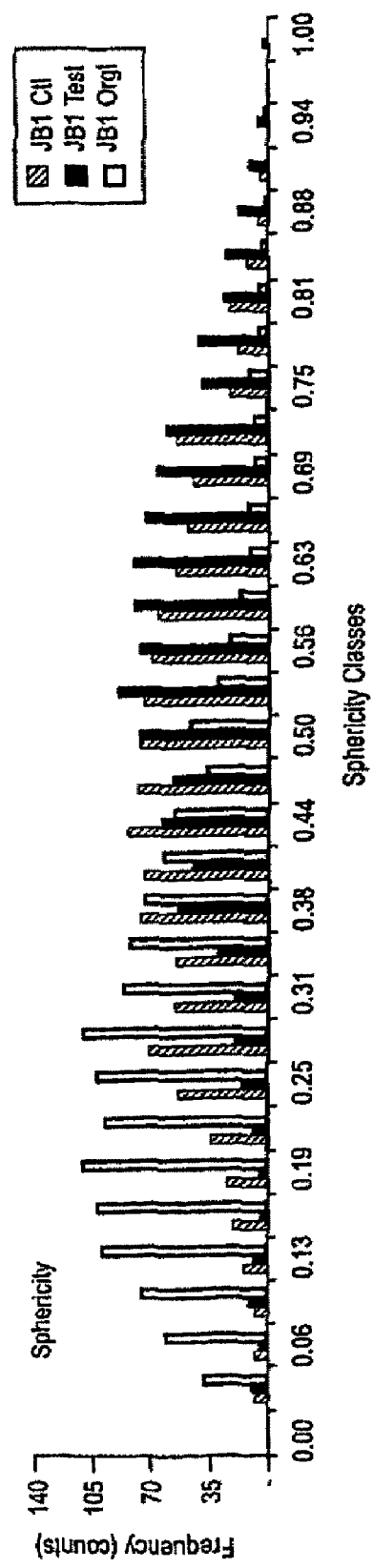

PFT One
% Confidence*

99.00

Chi2 Evaluation answers the question "Are the two samples different at the given %Confidence?"

| Feature | ESD | A/R | Shape | Sphericity |
|---|---|---|---|---|
| Chi2 Value**** | | | | |
| Chi2 Evaluation | 53.49 | 53.49 | 53.49 | 53.49 |
| JB1 Ctl vs JB1 Test | 118.22 | 116.27 | 44.96 | 183.63 |
| JB1 Ctl vs JB1 Orgl | 279.36 | 140.69 | 201.01 | 610.17 |
| JB1 Test vs JB1 Orgl | 110.25 | 362.09 | 172.61 | 1,036.87 |
| Chi2 Evaluation | | | | |
| JB1 Ctl vs JB1 Test | Yes | Yes | No | Yes |
| JB1 Ctl vs JB1 Orgl | Yes | Yes | Yes | Yes |
| JB1 Test vs JB1 Orgl | Yes | Yes | Yes | Yes |
| Means | 1.53/1.12/0.93 | 0.64/0.70/0.57 | 0.23/0.24/0.25 | 0.46/0.54/0.28 |
| Standard Deviations | 1.14/0.80/0.71 | 0.17/0.15/0.19 | 0.04/0.05/0.04 | 0.18/0.18/0.17 |
| Number Particles | 1243/1127/1388 | | | |

Degrees of Freedom: 32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

FIG. 2e

*** *Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".*

**** *Chi2 Value is the calculated minimum threshold for significance, based on the number of classes and confidence level.*

| PFT Two | | | | | | |
|---|---|---|---|---|---|---|
| % Confidence*** | 99.00 | | | | | |
| Feature | | ESD | A/R | Shape | Sphericity | |
| Chi2 Value**** | | 53.49 | 53.49 | 53.49 | 53.49 | |
| Chi2 Evaluation | | | | | | |
| JB2 Ctl vs JB2 Test | | 143.48 | 447.78 | 347.07 | 931.15 | |
| JB2 Ctl vs JB2 Orgl | | 698.14 | 55.12 | 354.37 | 240.41 | |
| JB2 Test vs JB2 Orgl | | 730.41 | 380.79 | 764.34 | 728.79 | |
| Chi2 Evaluation | | | | | | |
| JB2 Ctl vs JB2 Test | | Yes | Yes | Yes | Yes | |
| JB2 Ctl vs JB2 Orgl | | Yes | Yes | Yes | Yes | |
| JB2 Test vs JB2 Orgl | | Yes | Yes | Yes | Yes | |
| Means | | 1.53/1.12/0.93 | 0.64/0.70/0.57 | 0.23/0.24/0.25 | 0.46/0.54/0.28 | Degrees of Freedom |
| Standard Deviations | | 1.14/0.60/0.71 | 0.17/0.15/0.19 | 0.04/0.05/0.04 | 0.18/0.18/0.17 | 32 |
| Number Particles | | 1243/1127/1388 | | | | |

Chi2 Evaluation answers the question "Are the two samples different at the given %Confidence?"

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

FIG. 3e

PFT JB2 Test
% Confidence*

| Feature | ESD | A/R | Shape | Sphericity |
|---|---|---|---|---|
| Chi2 Value**** | 53.49 | 53.49 | 53.49 | 53.49 |
| Chi2 Evaluation | | | | |
| 99.00 JB2 Test vs JB1 Orgl | 384.89 | 640.26 | 364.64 | 1,126.56 |
| JB2 Test vs JB1 Ctl | 160.23 | 334.38 | 181.73 | 500.79 |
| JB1 Orgl vs JB1 Ctl | 279.36 | 140.69 | 201.01 | 610.17 |
| Chi2 Evaluation | | | | |
| JB2 Test vs JB1 Orgl | Yes | Yes | Yes | Yes |
| JB2 Test vs JB1 Ctl | Yes | Yes | Yes | Yes |
| JB1 Orgl vs JB1 Ctl | Yes | Yes | Yes | Yes |
| Means | 1.05/0.93/1.53 | 0.75/0.57/0.64 | 0.23/0.25/0.23 | 0.59/0.28/0.46 |
| Standard Deviations | 0.59/0.71/1.14 | 0.16/0.19/0.17 | 0.04/0.04/0.04 | 0.24/0.17/0.18 |
| Number Particles | 1363/1388/1243 | | | |

Chi2 Evaluation answers the question "Are the two samples different at the given %Confidence?"

| Degrees of Freedom | 32 |
|---|---|
| Confidence | Chi2 |
| 99.90 | 62.49 |
| 99.50 | 56.33 |
| 99.00 | 53.49 |
| 97.50 | 49.48 |
| 95.00 | 46.19 |

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

FIG. 4e

PFT JB1 Original
% Confidence**

| Feature | ESD | A/R | Shape | Sphericity |
|---|---|---|---|---|
| Chi2 Value**** | | | | |
| 99.00 | 53.49 | 53.49 | 53.49 | 53.49 |
| Chi2 Evaluation | | | | |
| JB1 Orgl vs JB2 Test | 211.15 | 640.07 | 364.64 | 1,126.56 |
| JB1 Orgl vs JB2 Orgl | 373.88 | 82.55 | 142.81 | 147.86 |
| JB2 Test vs JB2 Orgl | 716.16 | 380.79 | 764.34 | 728.79 |
| Chi2 Evaluation | | | | |
| JB1 Orgl vs JB2 Test | Yes | Yes | Yes | Yes |
| JB1 Orgl vs JB2 Orgl | Yes | Yes | Yes | Yes |
| JB2 Test vs JB2 Orgl | Yes | Yes | Yes | Yes |
| Means | 1.21/1.05/0.54 | 0.57/0.75/0.63 | 0.25/0.23/0.27 | 0.28/0.59/0.33 |
| Standard Deviations | 0.83/0.59/0.30 | 0.19/0.16/0.19 | 0.04/0.04/0.03 | 0.17/0.24/0.22 |
| Number Particles | 1280/1363/1339 | | | |

Degrees of Freedom: 32

| Confidence | Chi2 |
|---|---|
| 99.90 | 62.49 |
| 98.50 | 56.33 |
| 99.00 | 53.49 |
| 97.50 | 49.48 |
| 95.00 | 46.19 |

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

FIG. 5e

| PFT JB1 Test % Confidence*** | Feature | ESD | A/R | Shape | Sphericity |
|---|---|---|---|---|---|
| | Chi2 Value**** | 53.49 | 53.49 | 53.49 | 53.49 |
| 99.00 | Chi2 Evaluation JB1 Test vs JB2 Test | 160.92 | 236.50 | 309.65 | 300.05 |
| | Chi2 Evaluation JB1 Test vs JB2 Test | Yes | Yes | Yes | Yes |
| | Means | 1.12/1.05 | 0.70/0.75 | 0.25/0.23 | 0.54/0.59 |
| | Standard Deviations | 0.80/0.59 | 0.15/0.16 | 0.05/0.04 | 0.18/0.24 |
| | Number Particles | 1127/1363 | | | |

Chi2 Evaluation answers the question "Are the two samples different at the given %Confidence?"

| Degrees of Freedom | 32 |
|---|---|
| Confidence | Chi2 |
| 99.90 | 62.49 |
| 99.50 | 56.33 |
| 99.00 | 53.49 |
| 97.50 | 49.48 |
| 95.00 | 46.19 |

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

FIG. 6e

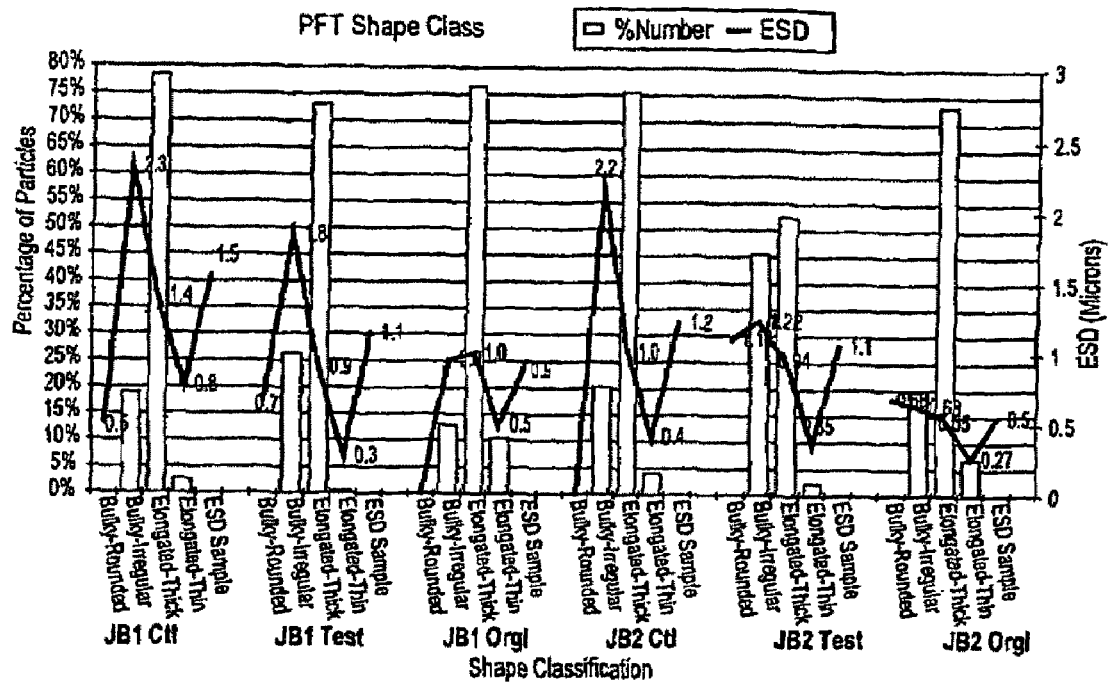

| Sample | Type | Sphericity | AR | Npls | ESD | %Number |
|---|---|---|---|---|---|---|
| Sample 1 | Bulky-Rounded | 0.98 | 0.84 | 2 | 0.5 | 0% |
| Sample 1 | Bulky-Irregular | 0.54 | 0.88 | 235 | 2.3 | 19% |
| Sample 1 | Elongated-Thick | 0.44 | 0.60 | 973 | 1.4 | 78% |
| Sample 1 | Elongated-Thin | 0.23 | 0.27 | 33 | 0.8 | 3% |
| | ESD Sample | | | 1,243 | 1.5 | |
| Sample 2 | Bulky-Rounded | 1.01 | 0.93 | 1 | 0.7 | 0% |
| Sample 2 | Bulky-Irregular | 0.63 | 0.90 | 297 | 1.8 | 26% |
| Sample 2 | Elongated-Thick | 0.51 | 0.63 | 823 | 0.9 | 73% |
| Sample 2 | Elongated-Thin | 0.26 | 0.25 | 6 | 0.3 | 1% |
| | ESD Sample | | | 1,127 | 1.1 | |
| Sample 3 | Bulky-Rounded | - | - | - | - | 0% |
| Sample 3 | Bulky-Irregular | 0.32 | 0.89 | 180 | 0.9 | 13% |
| Sample 3 | Elongated-Thick | 0.28 | 0.56 | 1,063 | 1.0 | 77% |
| Sample 3 | Elongated-Thin | 0.16 | 0.25 | 145 | 0.5 | 10% |
| | ESD Sample | | | 1,388 | 0.9 | |
| Sample 4 | Bulky-Rounded | - | - | - | - | 0% |
| Sample 4 | Bulky-Irregular | 0.38 | 0.89 | 259 | 2.2 | 20% |
| Sample 4 | Elongated-Thick | 0.35 | 0.57 | 967 | 1.0 | 76% |
| Sample 4 | Elongated-Thin | 0.27 | 0.26 | 54 | 0.4 | 4% |
| | ESD Sample | | | 1,280 | 1.2 | |
| Sample 5 | Bulky-Rounded | 0.96 | 0.88 | 1 | 1.10 | 0% |
| Sample 5 | Bulky-Irregular | 0.70 | 0.88 | 617 | 1.22 | 45% |
| Sample 5 | Elongated-Thick | 0.52 | 0.66 | 716 | 0.94 | 53% |
| Sample 5 | Elongated-Thin | 0.20 | 0.26 | 29 | 0.35 | 2% |
| | ESD Sample | | | 1,363 | 1.1 | |
| Sample 6 | Bulky-Rounded | 0.96 | 0.85 | 1 | 0.68 | 0% |
| Sample 6 | Bulky-Irregular | 0.44 | 0.90 | 266 | 0.63 | 20% |
| Sample 6 | Elongated-Thick | 0.31 | 0.59 | 979 | 0.55 | 73% |
| Sample 6 | Elongated-Thin | 0.18 | 0.26 | 93 | 0.27 | 7% |
| | ESD Sample | | | 1,339 | 0.5 | |

FIG. 7

PFT Summary Statistics

| Sample ID | Count | Sample Name | ESD AVG | ESD STDEV | AR AVG | AR STDEV | Shape AVG | Shape STDEV | Sphericity AVG | Sphericity STDEV |
|---|---|---|---|---|---|---|---|---|---|---|
| 1 | 1255 | 1_% Milk Control | 0.71 | 0.44 | 0.66 | 0.19 | 0.26 | 0.04 | 0.35 | 0.19 |
| 2 | 1236 | 1_% Milk 40 F 5 Sec | 2.70 | 2.08 | 0.71 | 0.18 | 0.20 | 0.06 | 0.37 | 0.19 |
| 3 | 1452 | 1_% Milk 140 F 5 Sec | 1.44 | 1.12 | 0.69 | 0.17 | 0.23 | 0.04 | 0.37 | 0.17 |
| 4 | 1264 | 2_% Milk 40 F 5 Sec | 2.96 | 2.52 | 0.71 | 0.19 | 0.20 | 0.06 | 0.40 | 0.21 |
| 5 | 1536 | 2_%Milk 140 F 5 Sec | 1.25 | 1.14 | 0.57 | 0.18 | 0.24 | 0.05 | 0.33 | 0.17 |
| 6 | 1152 | Whole Milk Raw Control | 2.23 | 1.63 | 0.70 | 0.17 | 0.21 | 0.05 | 0.40 | 0.17 |
| 7 | 1218 | Whole Milk 40 F 5 Sec | 1.71 | 1.10 | 0.72 | 0.15 | 0.21 | 0.05 | 0.42 | 0.16 |
| 8 | 1222 | Whole Milk 40 F 10 Sec | 1.49 | 1.41 | 0.69 | 0.18 | 0.23 | 0.04 | 0.32 | 0.16 |
| 9 | 1226 | Whole Milk 40 F 15 Sec | 1.88 | 1.39 | 0.72 | 0.15 | 0.21 | 0.05 | 0.44 | 0.16 |
| 10 | 1309 | Whole Milk 140 F 5 Sec | 1.41 | 1.19 | 0.66 | 0.18 | 0.24 | 0.04 | 0.34 | 0.17 |
| 11 | 1542 | Whole Milk 140 F 10 Sec | 1.32 | 1.10 | 0.69 | 0.18 | 0.23 | 0.05 | 0.32 | 0.16 |
| 12 | 1302 | Whole Milk 140 F 15 Sec | 1.27 | 1.01 | 0.69 | 0.18 | 0.23 | 0.05 | 0.31 | 0.17 |
| 21 | 1459 | Whole (Red) | 0.69 | 0.43 | 0.68 | 0.16 | 0.25 | 0.03 | 0.40 | 0.19 |
| 22 | 1605 | Two (Blue) | 0.67 | 0.42 | 0.69 | 0.17 | 0.25 | 0.04 | 0.34 | 0.20 |
| 13 | 1205 | SoyBase Raw Control | 0.68 | 0.50 | 0.60 | 0.18 | 0.27 | 0.04 | 0.40 | 0.20 |
| 14 | 1464 | SoyBase 40 F 5 Sec | 0.63 | 0.41 | 0.58 | 0.18 | 0.27 | 0.04 | 0.37 | 0.20 |
| 15 | 1378 | SoyBase 40 F 10 Sec | 0.70 | 0.49 | 0.61 | 0.18 | 0.26 | 0.04 | 0.39 | 0.20 |
| 16 | 2015 | SoyBase 40 F 15 Sec | 0.68 | 0.51 | 0.60 | 0.18 | 0.26 | 0.04 | 0.36 | 0.20 |
| 17 | 1431 | SoyBase 140 F 5 Sec | 0.72 | 0.52 | 0.60 | 0.17 | 0.26 | 0.03 | 0.37 | 0.19 |
| 18 | 1362 | SoyBase 140 F 10 Sec | 0.78 | 0.55 | 0.61 | 0.17 | 0.25 | 0.04 | 0.38 | 0.18 |
| 19 | 1527 | SoyBase 140 F 15 Sec | 0.74 | 0.47 | 0.61 | 0.17 | 0.25 | 0.03 | 0.37 | 0.19 |
| 20 | 1434 | Organic SoyBase (Blue Cnt) | 0.92 | 0.70 | 0.64 | 0.17 | 0.25 | 0.04 | 0.36 | 0.18 |

| Sample ID | CountOfParticle ID | Sample Name | Area_AVG | Area_STDEV | ESD_AVG | ESD_STDEV | CW Avg | CESt Dev | Feret_H_AVG | Feret_H_STDEV | Feret_V_AVG | Feret_V_STDEV | MINDia_AVG |
|---|---|---|---|---|---|---|---|---|---|---|---|---|---|
| 1 | 1255 | 1_% Milk Control | 0.55 | 0.65 | 0.71 | 0.44 | 1.38 | 0.42 | 0.80 | 0.448953591 | 1.190753594 | 0.56 | 0.33 |
| 2 | 1236 | 1_% Milk 140 F 5 Sec | 9.11 | 15.01 | 2.70 | 2.08 | 7.45 | 3.64 | 2.78 | 2.055955377 | 3.73009527 | 2.53 | 1.51 |
| 3 | 1452 | 1_% Milk 140 F 5 Sec | 2.60 | 6.30 | 1.44 | 1.12 | 6.09 | 3.53 | 1.50 | 1.168229871 | 2.187445884 | 1.69 | 0.60 |
| 4 | 1764 | 2_% Milk 40 F 5 Sec | 11.87 | 30.78 | 2.96 | 2.32 | 14.29 | 11.00 | 3.03 | 2.490020846 | 4.063341185 | 3.18 | 1.63 |
| 5 | 1536 | 2_% Milk 40 F 5 Sec | 7.25 | 4.80 | 1.25 | 1.14 | 4.53 | 1.76 | 1.26 | 1.136861585 | 2.104869167 | 1.49 | 0.81 |
| 6 | 1152 | Whole Milk Raw Control | 6.01 | 8.56 | 2.23 | 1.63 | 5.28 | 2.17 | 2.25 | 1.608726846 | 3.075592992 | 2.04 | 1.08 |
| 7 | 1218 | Whole Milk 40 F 5 sec | 3.25 | 4.25 | 1.71 | 1.10 | 3.66 | 1.36 | 1.72 | 1.065134816 | 2.391811363 | 1.52 | 0.82 |
| 8 | 1222 | Whole Milk 40 F 10 sec | 3.31 | 17.81 | 1.49 | 1.41 | 16.73 | 9.59 | 1.60 | 1.316420183 | 2.292156405 | 1.93 | 0.63 |
| 9 | 1226 | Whole Milk 40 F 15 sec | 4.29 | 6.57 | 1.88 | 1.39 | 4.70 | 1.71 | 1.87 | 1.361740059 | 2.574678936 | 1.84 | 0.97 |
| 10 | 1309 | Whole Milk 140 F 5 sec | 2.67 | 5.83 | 1.41 | 1.19 | 5.29 | 2.89 | 1.49 | 1.227797762 | 2.211636729 | 1.79 | 0.54 |
| 11 | 1542 | Whole Milk 140 F 10 sec | 2.32 | 6.26 | 1.32 | 1.10 | 6.66 | 5.26 | 1.44 | 1.104028533 | 2.040130352 | 1.57 | 0.58 |
| 12 | 1302 | Whole Milk 140 F 15 sec | 2.07 | 3.63 | 1.27 | 1.01 | 3.78 | 2.06 | 1.40 | 1.090735529 | 1.966930748 | 1.37 | 0.57 |
| 13 | 1205 | SoyBase Raw Control | 0.56 | 1.00 | 0.68 | 0.50 | 1.88 | 0.88 | 0.71 | 0.572901916 | 1.154922397 | 0.66 | 0.33 |
| 14 | 1464 | SoyBase 40 F 5 sec | 0.44 | 0.69 | 0.63 | 0.41 | 1.61 | 0.81 | 0.67 | 0.411184991 | 1.198902519 | 0.62 | 0.30 |
| 15 | 1378 | SoyBase 40 F 10 sec | 0.57 | 0.98 | 0.70 | 0.49 | 1.95 | 0.96 | 0.74 | 0.504464334 | 1.200307251 | 0.69 | 0.33 |
| 16 | 2015 | SoyBase 40 F 15 sec | 0.67 | 1.10 | 0.68 | 0.51 | 2.19 | 1.16 | 0.75 | 0.536955086 | 1.219152152 | 0.72 | 0.32 |
| 17 | 1431 | SoyBase 140 F 5 sec | 0.63 | 1.52 | 0.72 | 0.52 | 2.97 | 1.84 | 0.77 | 0.549746283 | 1.280202201 | 0.65 | 0.34 |
| 18 | 1362 | SoyBase 140 F 10 sec | 0.71 | 1.29 | 0.78 | 0.55 | 2.29 | 1.06 | 0.82 | 0.570842154 | 1.328466976 | 0.69 | 0.37 |
| 19 | 1527 | SoyBase 140 F 15 sec | 0.61 | 1.09 | 0.74 | 0.47 | 2.17 | 1.33 | 0.80 | 0.504761707 | 1.314818654 | 0.68 | 0.35 |
| 20 | 1434 | Organic Soybase (Blue Cxt) | 1.05 | 1.92 | 0.92 | 0.70 | 2.76 | 1.23 | 0.99 | 0.693291732 | 1.537186089 | 1.00 | 0.42 |
| 21 | 1459 | Whole (Red) | 0.52 | 0.94 | 0.59 | 0.43 | 2.02 | 1.13 | 0.77 | 0.417646534 | 1.124926306 | 0.49 | 0.38 |
| 22 | 1605 | Two (Blue) | 0.49 | 0.86 | 0.67 | 0.42 | 1.93 | 1.16 | 0.79 | 0.412529096 | 1.136319125 | 0.49 | 0.36 |

1M140F5_1MCtl
% Confidence* 99.00**

| Feature | ESD | A/R | Shape | Sphericity |
|---|---|---|---|---|
| Chi2 Value**** | 53.49 | 53.49 | 53.49 | 53.49 |
| 1M140F5_1MCtl | 485.52 | 58.08 | 276.16 | 97.42 |
| Chi2 Evaluation S1vsS2 | Yes | Yes | Yes | Yes |
| Means | 1.44/0.70 | 0.69/0.68 | 0.23/0.25 | 0.37/0.40 |
| Standard Deviations | 1.12/0.43 | 0.17/0.16 | 0.04/0.03 | 0.17/0.19 |
| Number Particles | 1452/1459 | | | |

Chi2 Evaluation answers the question "Are the two samples different at the given %Confidence?"

| Degrees of Freedom | 32 |
|---|---|
| Confidence | Chi2 |
| 99.90 | 62.49 |
| 99.50 | 56.33 |
| 99.00 | 53.49 |
| 97.50 | 49.48 |
| 95.00 | 46.19 |

FIG. 11e

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

1M40F5_1M140F5
% Confidence*

99.00

| Feature | ESD | A/R | Shape | Sphericity |
|---|---|---|---|---|
| Chi2 Value**** | 53.49 | 53.49 | 53.49 | 53.49 |
| 1M40F5_1M140F5 | 477.34 | 112.79 | 398.00 | 62.52 |
| Chi2 Evaluation S1vsS2 | Yes | Yes | Yes | Yes |
| Means | 2.70/1.44 | 0.71/0.69 | 0.20/0.23 | 0.37/0.37 |
| Standard Deviations | 2.08/1.12 | 0.18/0.17 | 0.06/0.04 | 0.19/0.17 |
| Number Particles | 1238/1452 | | | |

Chi2 Evaluation answers the question "Are the two samples different at the given %Confidence?"

Degrees of Freedom  32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

FIG. 12e

2M140F5_2MCtl
% Confidence*   99.00

| Feature | ESD | A/R | Shape | Sphericity |
|---|---|---|---|---|
| Chi2 Value**** | 53.49 | 53.49 | 53.49 | 53.49 |
| 2M140F5_2MCtl | 442.48 | 422.99 | 151.44 | 87.25 |
| Chi2 Evaluation S1vsS2 | Yes | Yes | Yes | Yes |
| Means | 1.2/0.67 | 0.57/0.69 | 0.24/0.25 | 0.33/0.35 |
| Standard Deviations | 1.14/0.42 | 0.18/0.17 | 0.05/0.04 | 0.17/0.20 |
| Number Particles | 1536/1605 | | | |

Chi2 Evaluation answers the question "Are the two samples different at the given %Confidence?"

Degrees of Freedom    32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

****Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".*

*****Chi2 Value is the calculated minimum threshold for significance, based on the number of classes and confidence level.*

FIG. 13e

2M40F5_2M140F5
% Confidence**** 99.00

| Feature | ESD | A/R | Shape | Sphericity |
|---|---|---|---|---|
| Chi2 Value**** | 53.49 | 53.49 | 53.49 | 53.49 |
| 2M40F5_2M140F5 | 608.56 | 515.10 | 343.35 | 270.29 |
| Chi2 Evaluation S1vsS2 | Yes | Yes | Yes | Yes |
| Means | 2.96/1.25 | 0.71/0.57 | 0.20/0.24 | 0.40/0.33 |
| Standard Deviations | 2.52/1.14 | 0.19/0.18 | 0.06/0.05 | 0.21/0.17 |
| Number Particles | 1264/1536 | | | |

Chi2 Evaluation answers the question "Are the two samples different at the given %Confidence?"

Degrees of Freedom
32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

\*\*\**Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".*

\*\*\*\**Chi2 Value is the calculated minimum threshold for significance, based on the number of classes and confidence level.*

FIG. 14e

| WM140F5_WMCtl_WMRaw | | | | | |
|---|---|---|---|---|---|
| % Confidence*** | | | | | |
| | Feature | ESD | A/R | Shape | Sphericity |
| | Chi2 Value**** | 53.49 | 53.49 | 53.49 | 53.49 |
| 99.00 | Chi2 Evaluation | | | | |
| | WM140F5_WMCtl | 567.38 | 75.88 | 176.95 | 185.19 |
| | WM140F5_WMRaw | 222.22 | 82.75 | 90.85 | 117.64 |
| | WMCtl_WMRaw | 1,050.07 | 126.94 | 127.74 | 74.54 |
| | Chi2 Evaluation | | | | |
| | WM140F5_WMCtl | Yes | Yes | Yes | Yes |
| | WM140F5_WMRaw | Yes | Yes | Yes | Yes |
| | WMCtl_WMRaw | Yes | Yes | Yes | Yes |
| | Means | 1.41/0.69/2.235 | 0.65/0.67/0.69 | 0.24/0.25/.24 | 0.34/0.40/0.40 |
| | Standard Deviations | 1309/1459/1152 | 0.17/0.15/0.17 | 0.04/0.03/0.05 | 0.17/0.19/0.17 |
| | Number Particles | 1309/1459/1152 | | | |

Chi2 Evaluation answers the question "Are the two samples different at the given %Confidence?"

Degrees of Freedom: 32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

FIG. 15e

*** *Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".*

**** Chi2 Value is the calculated minimum threshold for significance, based on the number of classes and confidence level.

Whole Milk
% Confidence* 99.00**

| Feature | ESD | A/R | Shape | Sphericity |
|---|---|---|---|---|
| Chi2 Value**** | 53.49 | 53.49 | 53.49 | 53.49 |
| 40F 5 vs 140F 5 | 87.18 | 160.36 | 237.14 | 203.77 |
| Chi2 Evaluation S1vsS2 | Yes | Yes | Yes | Yes |
| Means | 1.71/1.41 | 0.71/0.65 | 0.21/0.24 | 0.42/0.34 |
| Standard Deviations | 1.10/1.18 | 0.15/0.17 | 0.05/0.04 | 0.16/0.17 |
| Number Particles | 1218/1309 | | | |

Degrees of Freedom 32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

Chi2 Evaluation answers the question "Are the two samples different at the given %Confidence?"

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

FIG. 16e

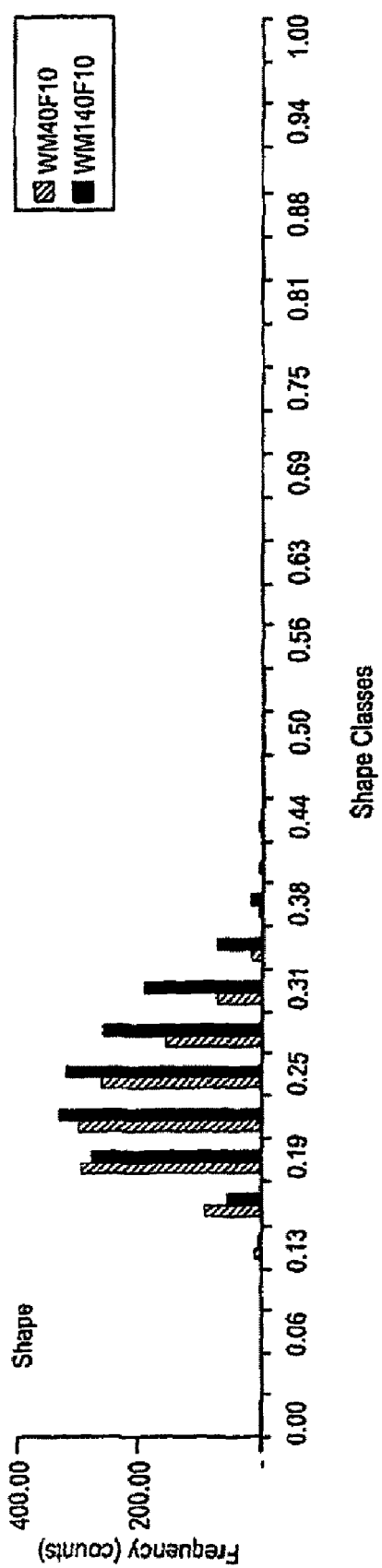
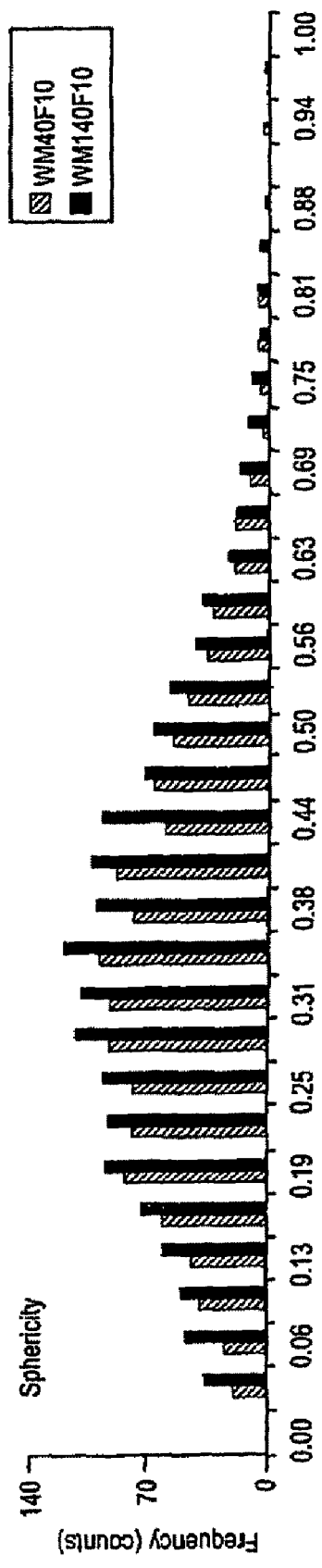

WM40F10 vs WM140F10
**% Confidence\*\*\***

99.00

| Feature | ESD | A/R | Shape | Sphericity |
|---|---|---|---|---|
| Chi2 Value**** | 53.49 | 53.49 | 53.49 | 53.49 |
| WM40F10 vs WM140F10 | 51.53 | 25.57 | 112.97 | 27.00 |
| Chi2 Evaluation S1vsS2 | No | No | Yes | No |
| Means | 1.49/1.32 | 0.69/0.69 | 0.21/0.23 | 0.32/0.32 |
| Standard Deviations | 1.41/1.10 | 0.17/0.18 | 0.05/0.05 | 0.16/0.16 |
| Number Particles | 1222/1542 | | | |

Degrees of Freedom  32

| Confidence | Chi2 |
|---|---|
| 99.90 | 62.49 |
| 99.50 | 56.33 |
| 99.00 | 53.49 |
| 97.50 | 48.48 |
| 95.00 | 46.19 |

Chi2 Evaluation answers the question "Are the two samples different at the given %Confidence?"

\*\*\**Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".*

\*\*\*\*Chi2 Value is the calculated minimum threshold for significance, based on the number of classes and confidence level.

FIG. 17e

| WM40F15_WM140F15 | Feature | ESD | A/R | Shape | Sphericity |
|---|---|---|---|---|---|
| % Confidence**** 99.00 | Chi2 Value**** | 53.49 | 53.49 | 53.49 | 53.49 |
| | WM40F15_WM140F15 | 147.07 | 103.97 | 147.28 | 46.39 |
| | Chi2 Evaluation S1vsS2 | Yes | Yes | Yes | No |
| | Means | 1.86/1.27 | 0.72/0.69 | 0.21g/0.23 | 0.44/0.31 |
| | Standard Deviations | 1.39/1.01 | 0.15/0.19 | 0.05/0.05 | 0.18/0.17 |
| | Number Particles | 1226/1302 | | | |

Chi2 Evaluation answers the question "Are the two samples different at the given %Confidence?"

Degrees of Freedom 32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

FIG. 18e

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

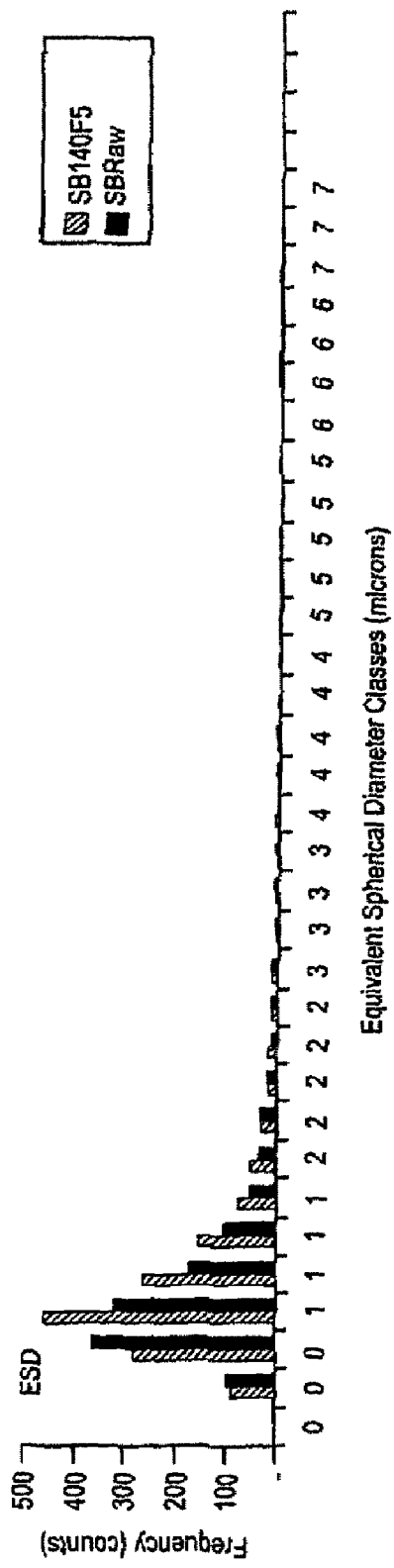
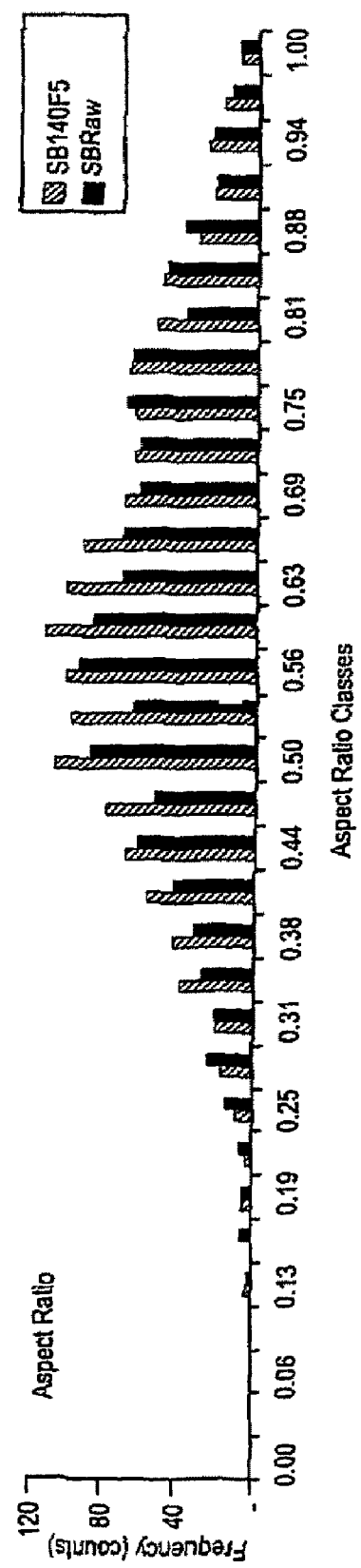
FIG. 19a
FIG. 19b

SB140F5_SBRaw

| Feature | ESD | A/R | Shape | Sphericity |
|---|---|---|---|---|
| Chi2 Value**** | 53.49 | 53.49 | 53.49 | 53.49 |
| SB140F5_SBRaw | 68.73 | 29.41 | 109.24 | 54.07 |
| Chi2 Evaluation S1vsS2 | Yes | No | Yes | Yes |
| Means | 0.72/0.68 | 0.60/0.60 | 0.26/0.27 | 0.37/0.40 |
| Standard Deviations | 0.52/0.50 | 0.17/0.18 | 0.03/0.04 | 0.19/0.20 |
| Number Particles | 1431/1205 | | | |

% Confidence*** 99.00

Chi2 Evaluation answers the question "Are the two samples different at the given %Confidence?"

Degrees of Freedom  32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

*** *Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".*

**** *Chi2 Value is the calculated minimum threshold for significance, based on the number of classes and confidence level.*

FIG. 19e

SB140F5_SBOrgCtl

| Feature | ESD | A/R | Shape | Sphericity |
|---|---|---|---|---|
| Chi2 Value**** | 53.49 | 53.49 | 53.49 | 53.49 |
| | 108.97 | 75.23 | 110.83 | 54.08 |
| SB140F5_SBOrgCtl Chi2 Evaluation S1vsS2 | Yes | Yes | Yes | Yes |
| Means | 0.72/0.92 | 0.60/0.61 | 0.26/0.25 | 0.37/0.36 |
| Standard Deviations | 0.52/0.70 | 0.17/0.17 | 0.3/0.04 | 0.19/0.18 |
| Number Particles | 1431/1434 | | | |

% Confidence*** 99.00

Chi2 Evaluation answers the question "Are the two samples different at the given %Confidence?"

Degrees of Freedom 32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

| Feature | ESD | A/R | Shape | Sphericity |
|---|---|---|---|---|
| Chi2 Value**** | 53.49 | 53.49 | 53.49 | 53.49 |
| % Confidence*** 99.00 | 74.21 | 38.51 | 80.93 | 44.04 |
| SB40F5_SB140F5 | | | | |
| Chi2 Evaluation S1vsS2 | Yes | No | Yes | No |
| Means | 0.63/0.72 | 0.58/0.60 | 0.27/0.26 | 0.37/0.37 |
| Standard Deviations | 0.41/0.52 | 0.18/0.17 | 0.04/0.03 | 0.20/0.19 |
| Number Particles | 1464/1431 | | | |

Chi2 Evaluation answers the question "Are the two samples different at the given %Confidence?"

Degrees of Freedom 32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

FIG. 21e

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

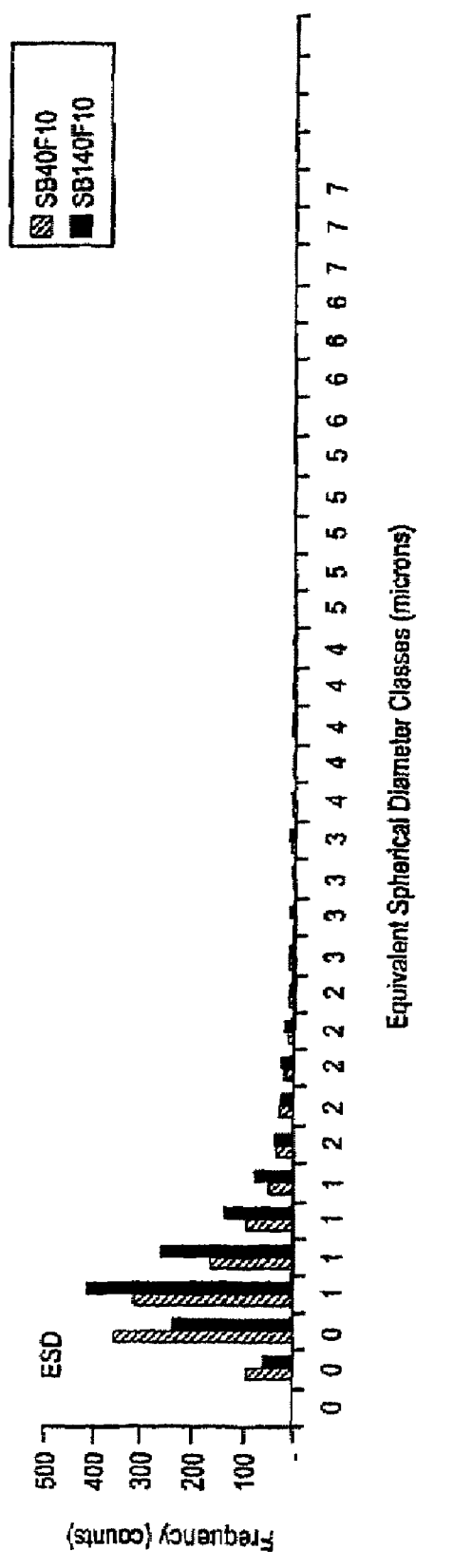

SB40F10_SB140F10

| Feature | ESD | A/R | Shape | Sphericity |
|---|---|---|---|---|
| Chi2 Value**** | 53.49 | 53.49 | 53.49 | 53.49 |
| % Confidence*** | 99.00 | | | |
| SB40F10_SB140F10 | 88.30 | 50.63 | 95.12 | 52.72 |
| Chi2 Evaluation S1vsS2 | Yes | No | Yes | No |
| Means | 0.70/0.78 | 0.62/0.61 | 0.26/0.25 | 0.39/0.38 |
| Standard Deviations | 0.49/0.55 | 0.18/0.17 | 0.04/0.04 | 0.20/0.19 |
| Number Particles | 1378/1362 | | | |

Chi2 Evaluation answers the question "Are the two samples different at the given %Confidence?"

Degrees of Freedom    32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

***Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

****Chi2 Value is the calculated minimum threshold for significance, based on the number of classes and confidence level.

FIG. 22e

SB40F15_SB140F15
% Confidence*** 99.00

| Feature | ESD | A/R | Shape | Sphericity |
|---|---|---|---|---|
| Chi2 Value***** | 53.49 | 53.49 | 53.49 | 53.49 |
| | 116.67 | 34.72 | 95.87 | 33.52 |
| SB40F15_SB140F15 Chi2 Evaluation S1vsS2 | Yes | No | Yes | No |
| Means | 0.69/0.74 | 0.60/0.61 | 0.26/0.26 | 0.36/0.37 |
| Standard Deviations | 0.51/0.48 | 0.18/0.18 | 0.04/0.03 | 0.20/0.19 |
| Number Particles | 2015/1527 | | | |

Chi2 Evaluation answers the question "Are the two samples different at the given %Confidence?"

Degrees of Freedom   32

| Confidence | Chi2 |
|---|---|
| 99.90 | 62.49 |
| 99.50 | 56.33 |
| 99.00 | 53.49 |
| 97.50 | 49.48 |
| 95.00 | 46.19 |

FIG. 23e

*****Generally accepted terminology regarding sample differences state that sample differences significant at the 99% confidence interval are termed "highly significant". Sample differences significant at the 95% confidence interval but not at the 99% confidence interval are termed "probably significant". Sample differences significant at the 95% or below are termed "not significant".

******Chi2 Value is the calculated minimum threshold for significance, based on the number of classes and confidence level.

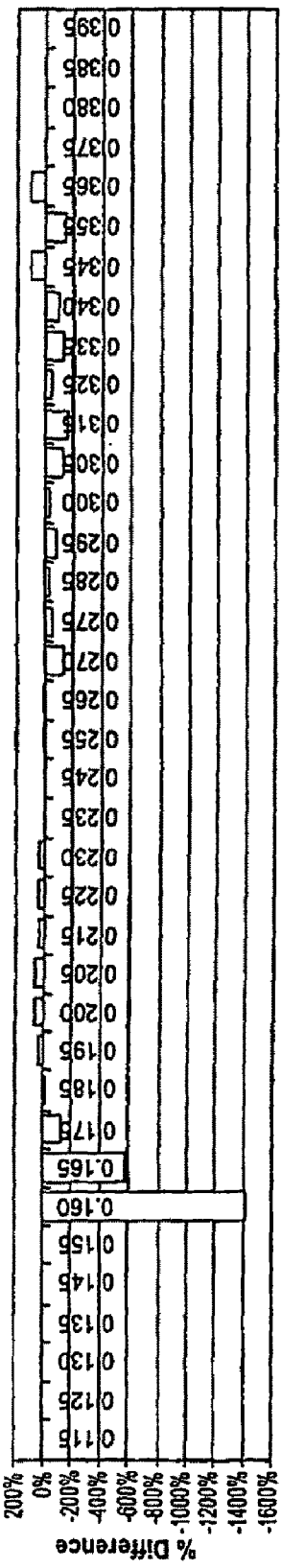

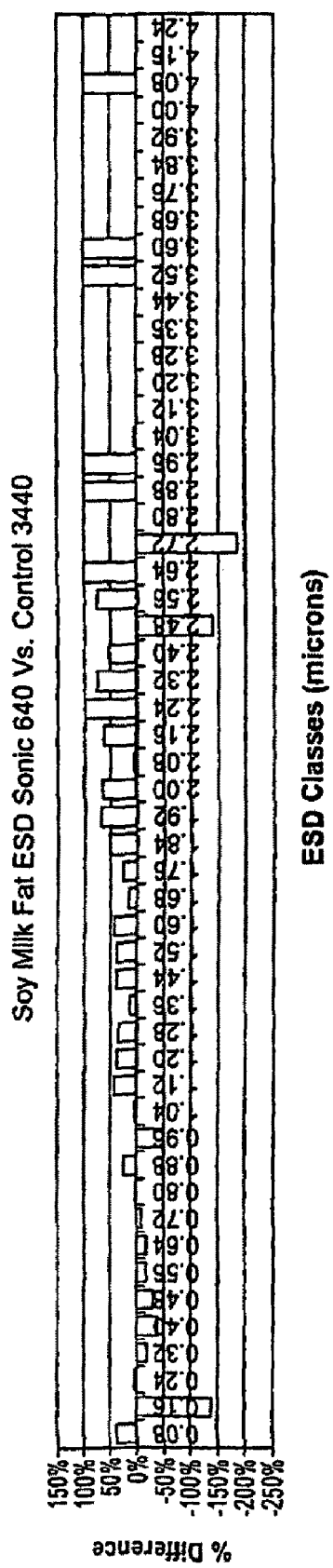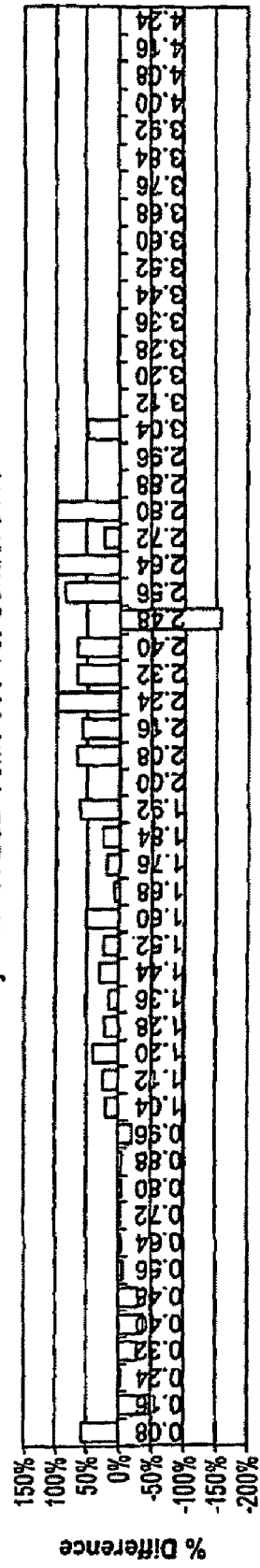
FIG. 32b
FIG 32c

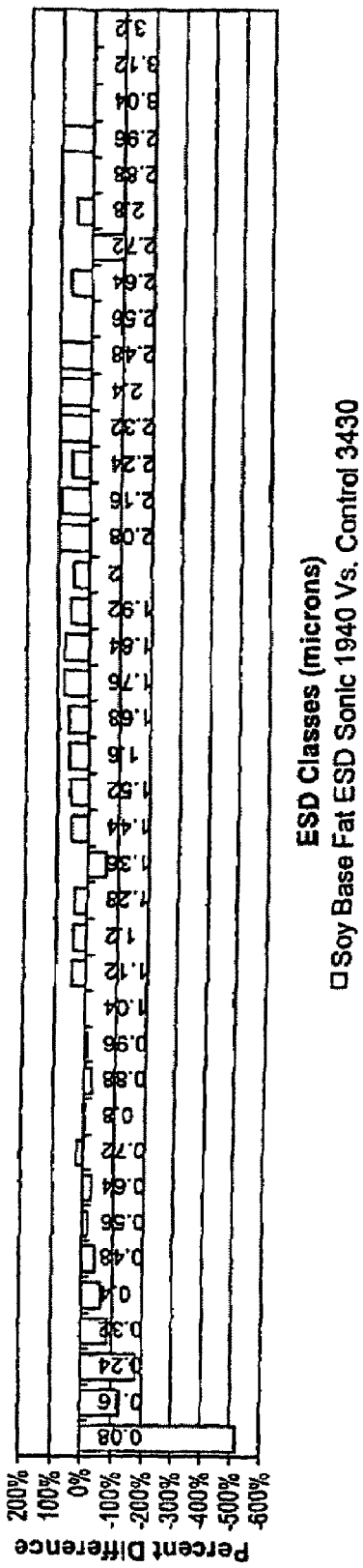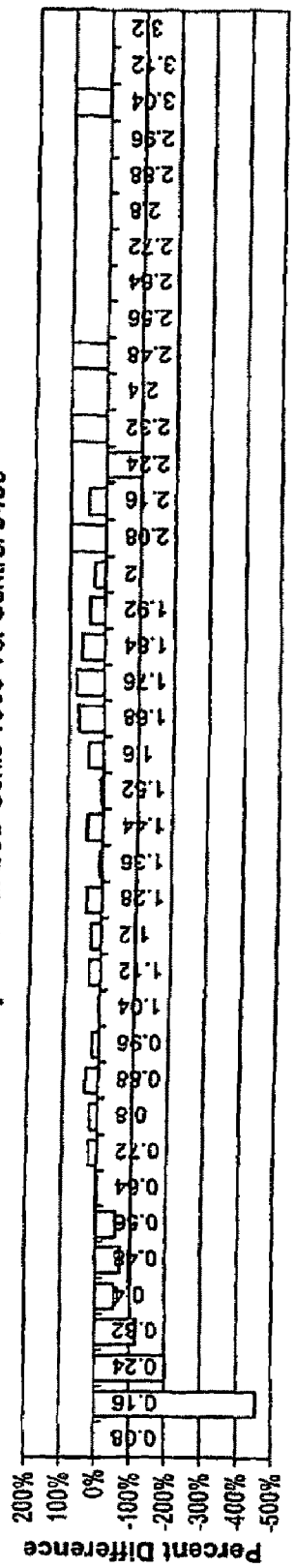
FIG. 41a
FIG. 41b

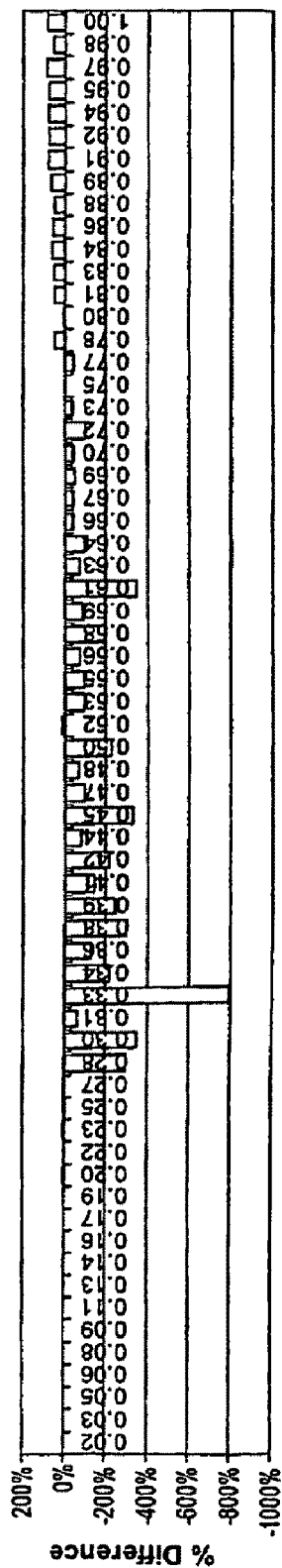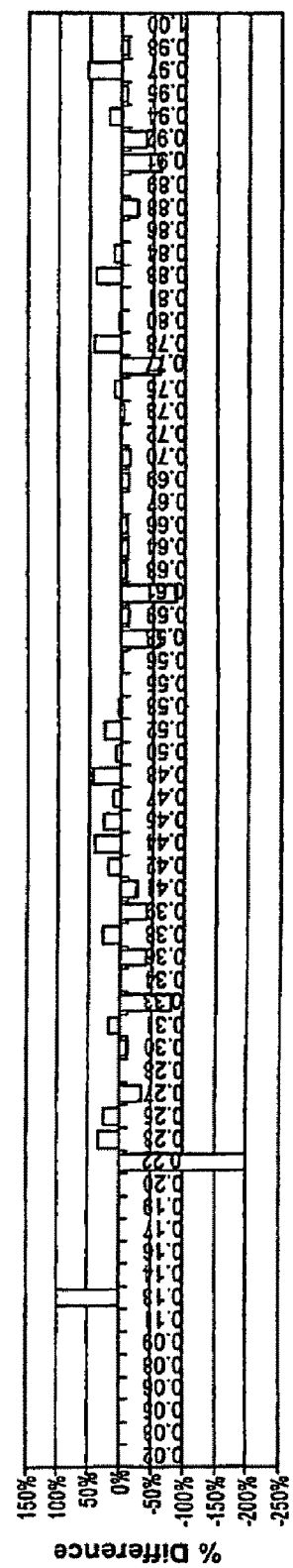
FIG. 47a
FIG. 47b

MODIFICATION OF PARTICLE MORPHOLOGY TO IMPROVE PRODUCT FUNCTIONALITY

RELATED APPLICATIONS

This application claims the benefit of the filing date and contents of U.S. Provisional Patent Application No. 60/701,213, filed on Jul. 20, 2005.

The present invention is directed to a method for modifying particle morphology in a controlled manner to alter and improve the functional attributes of a product.

BACKGROUND OF THE INVENTION

Commercial food manufacturers strive to consistently deliver high quality, nutritious food products that can be manufactured in an efficient manner, and that have an acceptable shelf life in the retail market. Today's food industry has the benefits of many years of research on various food ingredients and food processing techniques that enable the commercial food manufacturer to achieve these goals. However, as consumer demands change and increase, the food manufacturer is faced with new challenges in food technology, and particularly in food processing techniques.

Many commercial food products on the market involve some sort of emulsion, suspension, or other technology in which a heterogeneous combination of ingredients is used to provide the necessary and desirable functional product attributes. As used herein, the term "functional attributes" or "functional properties" shall be defined as the physical properties of the product, including, but not limited to, the product viscosity, rheological properties of the product, particle size and product stability. These functional properties affect the organoleptic properties of the product, including, but not limited to, the flavor, aroma, mouthfeel and texture of the product as perceived by a consumer.

Emulsions have a continuous phase into which at least one dispersed phase is suspended. Food products that are based on emulsions include, but are not limited to, dairy products, such as cheese, ice cream and yogurt, non-dairy products such as non-dairy beverages, salad dressings, frostings, and the like.

Emulsions are typically formed in food products by the introduction of shear forces to generate the dispersed phase within the continuous phase. Homogenizers, high shear mixers, high pressure pumps, and similar equipment have been developed to create emulsions in commercial scale food processing.

The prevalence of emulsions and other heterogeneous ingredient combinations in food products has led to a vast array of emulsifier and stabilizer ingredients that are commercially available to stabilize the emulsions in order to enhance the functional and organoleptic properties and the shelf life of the food product. Emulsifiers and stabilizers are typically surfactants having both a hydrophilic, polar structure and a lipophilic, non-polar structure at the molecular level. Emulsifiers and stabilizers function by creating a stable interface between the continuous and dispersed phases of the emulsion, thereby allowing the dispersed phase to remain dispersed in the continuous phase without significant separation of the phases.

Although the use of emulsifiers and stabilizers has greatly benefited food manufacturers, there is a growing consumer preference for reducing or eliminating emulsifiers and stabilizers in food products, while maintaining or improving the functional properties of the food product. This poses a new challenge for the commercial food manufacturer.

U.S. Pat. No. 6,861,080 describes a process for making a cream cheese product that does not contain conventional emulsifiers. This patent describes a process in which the average particle size of the fat component is reduced as compared to a conventional product in order to achieve the desired firmness and textural qualities.

Other methods for processing emulsions or other similar combinations with little or no emulsifying agents include treating the raw materials with ultrasound energy. U.S. Patent Application Publication Number 2005/0008739 describes treating a low-viscosity fluid with ultrasound energy to inactivate microorganisms in the liquid and to reduce the size of fat globules in the liquid.

SUMMARY OF THE INVENTION

The present invention is directed to a method for improving the functional properties of a product containing particles. The method involves processing the particles to modify a morphological property of the particles. Any processing method that can controllably manipulate particle morphology may be used. Examples of morphological properties that may be modified through this method include sphericity, equivalent spherical diameter, shape, aspect ratio, and combinations thereof.

The present invention is also directed to a product in which the particles have been processed to modify a morphological property. Examples of products that could be made according to this method include food products, chemical and industrial products, pharmaceuticals, and cosmetics. In one preferred embodiment, the product is a dairy product. In another preferred embodiment, the product is a soy product.

DESCRIPTION OF THE DRAWINGS

FIGS. 2a-e illustrate the results of a size and shape analysis of the milkfat globules of the following low-fat soft-serve ice cream pre-mixes: an untreated pre-mix, a pre-mix homogenized using a conventional homogenizer, and a pre-mix treated with ultrasound. FIG. 2a is a bar graph of frequency versus equivalent spherical diameter class; FIG. 2b is a bar graph of frequency versus aspect ratio class; FIG. 2c is a bar graph of frequency versus shape class; and FIG. 2d is a bar graph of frequency versus sphericity class.

FIGS. 3a-e illustrate the results of a size and shape analysis of the milkfat globules of the following low-fat soft-serve ice cream pre-mixes, which contain about half of the amount of stabilizer as the pre-mixes analyzed in FIG. 2: an untreated pre-mix, a pre-mix homogenized using a conventional homogenizer, and a pre-mix treated with ultrasound. FIG. 3a is a bar graph of frequency versus equivalent spherical diameter class; FIG. 3b is a bar graph of frequency versus aspect ratio class; FIG. 3c is a bar graph of frequency versus shape class; and FIG. 3d is a bar graph of frequency versus sphericity class.

FIGS. 4a-e illustrate the results of a size and shape analysis of the milkfat globules of the following low-fat soft-serve ice cream pre-mixes: an untreated pre-mix; a pre-mix homogenized using a conventional homogenizer; and a pre-mix, treated with ultrasound, which contains about half of the amount of stabilizer as the other two pre-mixes. FIG. 4a is a bar graph of frequency versus equivalent spherical diameter class; FIG. 4b is a bar graph of frequency versus aspect ratio class; FIG. 4c is a bar graph of frequency versus shape class; and FIG. 4d is a bar graph of frequency versus sphericity class.

FIGS. 5a-e illustrate the results of a size and shape analysis of the milkfat globules of the following low-fat soft-serve ice cream pre-mixes: a first pre-mix, homogenized using a conventional homogenizer; a second pre-mix, homogenized using a conventional homogenizer, which contains about half of the amount of stabilizer as the first pre-mix; and a pre-mix, treated with ultrasound, which also contains about half of the amount of stabilizer as the first pre-mix. FIG. 5a is a bar graph of frequency versus equivalent spherical diameter class; FIG. 5b is a bar graph of frequency versus aspect ratio class; FIG. 5c is a bar graph of frequency versus shape class; and FIG. 5d is a bar graph of frequency versus sphericity class.

FIGS. 6a-e illustrate the results of a size and shape analysis of the milkfat globules of the following low-fat soft-serve ice cream pre-mixes: a first pre-mix, treated with ultrasound; and a second pre-mix, treated with ultrasound, which contains about half of the amount of stabilizer as the first pre-mix. FIG. 6a is a bar graph of frequency versus equivalent spherical diameter class; FIG. 6b is a bar graph of frequency versus aspect ratio class; FIG. 6c is a bar graph of frequency versus shape class; and FIG. 6d is a bar graph of frequency versus sphericity class.

FIG. 7 is a bar graph of percentage of particles versus shape classification, overlaid with a plot of equivalent spherical diameter versus shape classification, for the milkfat globules of the ice cream pre-mixes analyzed in FIGS. 2-6.

FIG. 9 is a table summarizing the shape parameters of the fat globules of various milk samples, after treatment with ultrasound energy at various temperatures and ultrasound treatment times.

FIG. 10 is a table summarizing the size parameters of the fat globules of various milk samples, after treatment with ultrasound energy at various temperatures and ultrasound treatment times.

FIGS. 11a-e illustrate the results of a size and shape analysis of the milkfat globules of 1% milk treated using a standard homogenization process, and of the milkfat globules of 1% milk treated with ultrasound for 5 seconds at 140° F. FIG. 11a is a bar graph of frequency versus equivalent spherical diameter class; FIG. 11b is a bar graph of frequency versus aspect ratio class; FIG. 11c is a bar graph of frequency versus shape class; and FIG. 11d is a bar graph of frequency versus sphericity class.

FIGS. 12a-e illustrate the results of a size and shape analysis of the milkfat globules of 1% milk treated with ultrasound for 5 seconds at 40° F., and of the milkfat globules of 1% milk treated with ultrasound for 5 seconds at 140° F. FIG. 12a is a bar graph of frequency versus equivalent spherical diameter class; FIG. 12b is a bar graph of frequency versus aspect ratio class; FIG. 12c is a bar graph of frequency versus shape class; and FIG. 12d is a bar graph of frequency versus sphericity class.

FIGS. 13a-e illustrate the results of a size and shape analysis of the milkfat globules of 2% milk treated using a standard homogenization process, and of the milkfat globules of 2% milk treated with ultrasound for 5 seconds at 140° F. FIG. 13a is a bar graph of frequency versus equivalent spherical diameter class; FIG. 13b is a bar graph of frequency versus aspect ratio class; FIG. 13c is a bar graph of frequency versus shape class; and FIG. 13d is a bar graph of frequency versus sphericity class.

FIGS. 14a-e illustrate the results of a size and shape analysis of the milkfat globules of 2% milk treated with ultrasound for 5 seconds at 40° F., and of the milkfat globules of 2% milk treated with ultrasound for 5 seconds at 140° F. FIG. 14a is a bar graph of frequency versus equivalent spherical diameter class; FIG. 14b is a bar graph of frequency versus aspect ratio class; FIG. 14c is a bar graph of frequency versus shape class; and FIG. 14d is a bar graph of frequency versus sphericity class.

FIGS. 15a-e illustrate the results of a size and shape analysis of the milkfat globules of untreated whole milk, the milkfat globules of whole milk treated using a standard homogenization process, and of the milkfat globules of whole milk treated with ultrasound for 5 seconds at 140° F. FIG. 15a is a bar graph of frequency versus equivalent spherical diameter class; FIG. 15b is a bar graph of frequency versus aspect ratio class; FIG. 15c is a bar graph of frequency versus shape class; and FIG. 15d is a bar graph of frequency versus sphericity class.

FIGS. 16a-e illustrate the results of a size and shape analysis of the milkfat globules of whole milk treated with ultrasound for 5 seconds at 40° F., and of the milkfat globules of whole milk treated with ultrasound for 5 seconds at 140° F. FIG. 16a is a bar graph of frequency versus equivalent spherical diameter class; FIG. 16b is a bar graph of frequency versus aspect ratio class; FIG. 16c is a bar graph of frequency versus shape class; and FIG. 16d is a bar graph of frequency versus sphericity class.

FIGS. 17a-e illustrate the results of a size and shape analysis of the milkfat globules of whole milk treated with ultrasound for 10 seconds at 40° F., and of the milkfat globules of whole milk treated with ultrasound for 10 seconds at 140° F. FIG. 17a is a bar graph of frequency versus equivalent spherical diameter class; FIG. 17b is a bar graph of frequency versus aspect ratio class; FIG. 17c is a bar graph of frequency versus shape class; and FIG. 17d is a bar graph of frequency versus sphericity class.

FIGS. 18a-e illustrate the results of a size and shape analysis of the milkfat globules of whole milk treated with ultrasound for 15 seconds at 40° F., and of the milkfat globules of whole milk treated with ultrasound for 15 seconds at 140° F. FIG. 18a is a bar graph of frequency versus equivalent spherical diameter class; FIG. 18b is a bar graph of frequency versus aspect ratio class; FIG. 18c is a bar graph of frequency versus shape class; and FIG. 18d is a bar graph of frequency versus sphericity class.

FIGS. 19a-e illustrate the results of a size and shape analysis of the fat globules in untreated soy milk base, and of the fat globules in soy milk base treated with ultrasound for 5 seconds at 140° F. FIG. 19a is a bar graph of frequency versus equivalent spherical diameter class; FIG. 19b is a bar graph of frequency versus aspect ratio class; FIG. 19c is a bar graph of frequency versus shape class; and FIG. 19d is a bar graph of frequency versus sphericity class.

FIGS. 20a-e illustrate the results of a size and shape analysis of the fat globules in soy milk base treated using a conventional homogenization system, and of the fat globules in soy milk base treated with ultrasound for 5 seconds at 140° F. FIG. 20a is a bar graph of frequency versus equivalent spherical diameter class; FIG. 20b is a bar graph of frequency versus aspect ratio class; FIG. 20c is a bar graph of frequency versus shape class; and FIG. 20d is a bar graph of frequency versus sphericity class.

FIGS. 21a-e illustrate the results of a size and shape analysis of the fat globules in soy milk base treated with ultrasound for 5 seconds at 40° F., and of the fat globules in soy milk base treated with ultrasound for 5 seconds at 140° F. FIG. 21a is a bar graph of frequency versus equivalent spherical diameter class; FIG. 21b is a bar graph of frequency versus aspect ratio class; FIG. 21c is a bar graph of frequency versus shape class; and FIG. 21d is a bar graph of frequency versus sphericity class.

FIGS. 22a-e illustrate the results of a size and shape analysis of the fat globules in soy milk base treated with ultrasound for 10 seconds at 40° F., and of the fat globules in soy milk base treated with ultrasound for 10 seconds at 140° F. FIG. 22a is a bar graph of frequency versus equivalent spherical diameter class; FIG. 22b is a bar graph of frequency versus aspect ratio class; FIG. 22c is a bar graph of frequency versus shape class; and FIG. 22d is a bar graph of frequency versus sphericity class.

FIGS. 23a-e illustrate the results of a size and shape analysis of the fat globules in soy milk base treated with ultrasound for 15 seconds at 40° F., and of the fat globules in soy milk base treated with ultrasound for 15 seconds at 140° F. FIG. 23a is a bar graph of frequency versus equivalent spherical diameter class; FIG. 23b is a bar graph of frequency versus aspect ratio class; FIG. 23c is a bar graph of frequency versus shape class; and FIG. 23d is a bar graph of frequency versus sphericity class.

FIG. 24 is a set of bar graphs of frequency versus equivalent spherical diameter class of the fat component of a yogurt beverage, compared to the fat component of a control yogurt beverage.

FIG. 25 is a set of bar graphs of the percent difference in equivalent spherical diameter between the fat component of a yogurt beverage and the fat component of a control yogurt beverage, versus equivalent spherical diameter class.

FIG. 26 is a set of bar graphs of frequency versus sphericity class of the fat component of a yogurt beverage, compared to the fat component of a control yogurt beverage.

FIG. 27 is a set of bar graphs of the percent difference in sphericity between the fat component of a yogurt beverage and the fat component of a control yogurt beverage, versus sphericity class.

FIG. 28 is a set of bar graphs of frequency versus shape class of the fat component of a yogurt beverage, compared to the fat component of a control yogurt beverage.

FIG. 29 is a set of bar graphs of the percent difference in shape between the fat component of a yogurt beverage and the fat component of a control yogurt beverage, versus shape class. FIG. 29a presents the data for a yogurt beverage treated with ultrasound at 60° F., in a continuous system at 107 watts with no back pressure. FIG. 29b presents the data for a yogurt beverage treated with ultrasound at 60° F., in a continuous system at 61 watts with no back pressure.

FIG. 30 is a set of bar graphs of frequency versus aspect ratio class of the fat component of a yogurt beverage, compared to the fat component of a control yogurt beverage.

FIG. 31 is a set of bar graphs of the percent difference in aspect ratio between the fat component of a yogurt beverage and the fat component of a control yogurt beverage, versus aspect ratio class.

FIG. 32 is a set of bar graphs of the percent difference in equivalent spherical diameter between the fat component of a soy milk beverage and the fat component of a control soy milk beverage, versus equivalent spherical diameter class. FIG. 32b presents the data for a soy milk beverage treated with ultrasound, with an ultrasound device set at 80% amplitude, applying 275 watts of power at an intensity of 31 watts/cm$^2$. FIG. 32c presents the data for a soy milk beverage treated with ultrasound, with an ultrasound device set at 100% amplitude, applying 315 watts of power at an intensity of 35 watts/cm$^2$.

FIG. 33 is a set of bar graphs of frequency versus equivalent spherical diameter class of the fat component of a soy milk beverage, compared to the fat component of a control soy milk beverage.

FIG. 34 is a set of bar graphs of the percent difference in sphericity between the fat component of a soy milk beverage and the fat component of a control soy milk beverage, versus sphericity class.

FIG. 35 is a set of bar graphs of frequency versus sphericity class of the fat component of a soy milk beverage, compared to the fat component of a control soy milk beverage.

FIG. 36 is a set of bar graphs of the percent difference in shape between the fat component of a soy milk beverage and the fat component of a control soy milk beverage, versus shape class.

FIG. 37 is a set of bar graphs of frequency versus shape class of the fat component of a soy milk beverage, compared to the fat component of a control soy milk beverage.

FIG. 38 is a set of bar graphs of the percent difference in aspect ratio between a fat component of a soy milk beverage and a fat component of a control soy milk beverage, versus aspect ratio class.

FIG. 39 is a set of bar graphs of frequency versus aspect ratio class of the fat component of a soy milk beverage, compared to the fat component of a control soy milk beverage.

FIG. 40 is a set of bar graphs of frequency versus equivalent spherical diameter class of the fat component of a soy base product, compared to the fat component of a control soy base product.

FIG. 41 is a set of bar graphs of the percent difference in equivalent spherical diameter between the fat component of a soy base product and the fat component of a control soy base product, versus equivalent spherical diameter class. FIG. 41a presents the data for a soy base product treated with ultrasound, with an ultrasound device set at 80% amplitude, applying 255 watts of power at an intensity of 28 watts/cm$^2$. FIG. 41b presents the data for a soy base product treated with ultrasound, with an ultrasound device set at 100% amplitude, applying 318 watts of power at an intensity of 35 watts/cm$^2$.

FIG. 42 is a set of bar graphs of frequency versus sphericity class of the fat component of a soy base product, compared to the fat component of a control soy base product.

FIG. 43 is a set of bar graphs of the percent difference in sphericity between the fat component of a soy base product and the fat component of a control soy base product, versus sphericity class.

FIG. 44 is a set of bar graphs of frequency versus shape class of the fat component of a soy base product, compared to the fat component of a control soy base product.

FIG. 45 is a set of bar graphs of the percent difference in shape between the fat component of a soy base product and the fat component of a control soy base product, versus shape class.

FIG. 46 is a set of bar graphs of frequency versus aspect ratio class of the fat component of a soy base product, compared to the fat component of a control soy base product.

FIG. 47 is a set of bar graphs of the percent difference in aspect ratio between the fat component of a soy base product and the fat component of a control soy base product, versus aspect ratio class. FIG. 47a presents the data for a soy base product treated with ultrasound, with an ultrasound device set at 80% amplitude, applying 255 watts of power at an intensity of 28 watts/cm$^2$. FIG. 47b presents the data for a soy base product treated with ultrasound, with an ultrasound device set at 100% amplitude, applying 318 watts of power at an intensity of 35 watts/cm$^2$.

DESCRIPTION OF THE INVENTION

Figure 1:
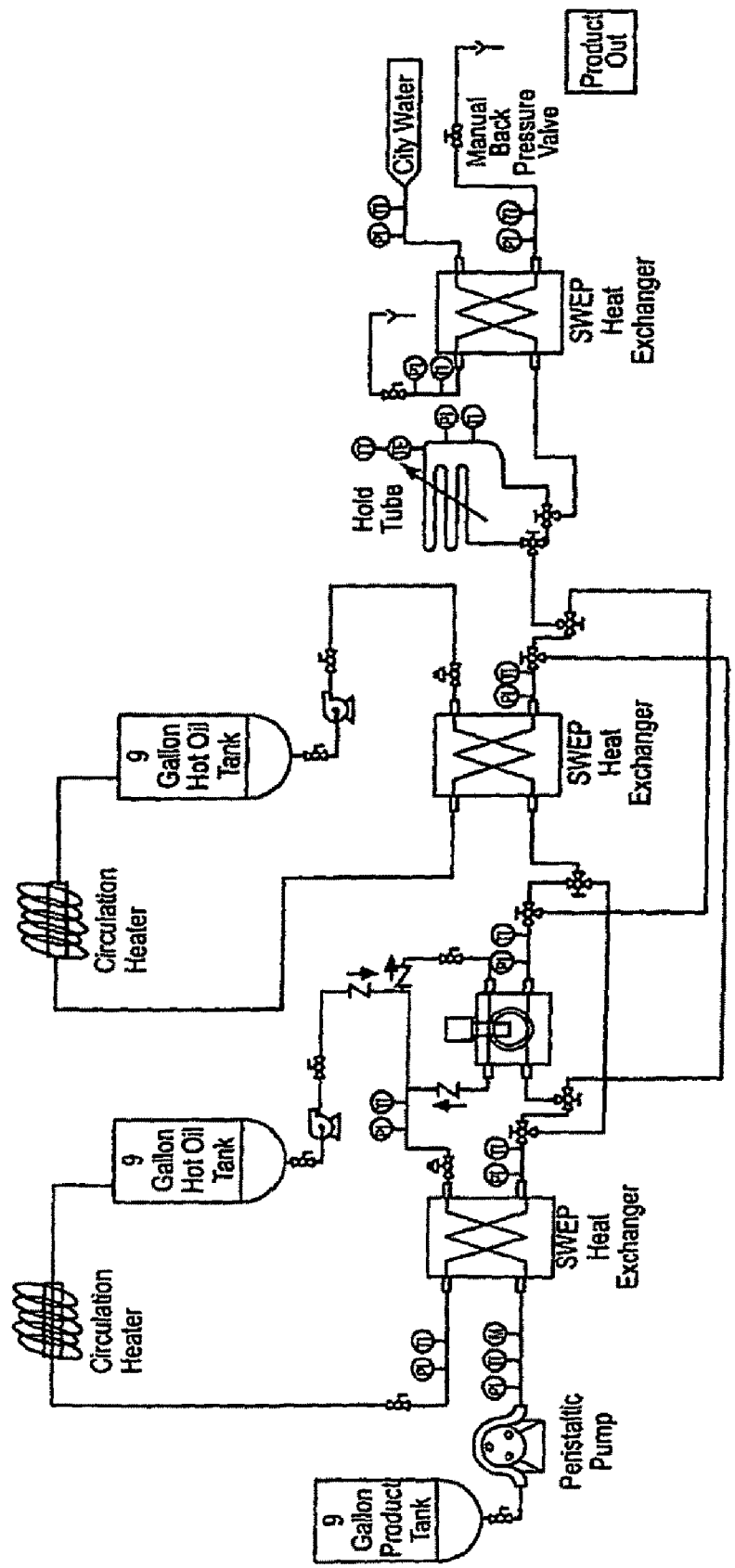
FIG. 1 is a flow diagram of a continuous processing system which can be used to treat products with ultrasound.
Figure 2A:
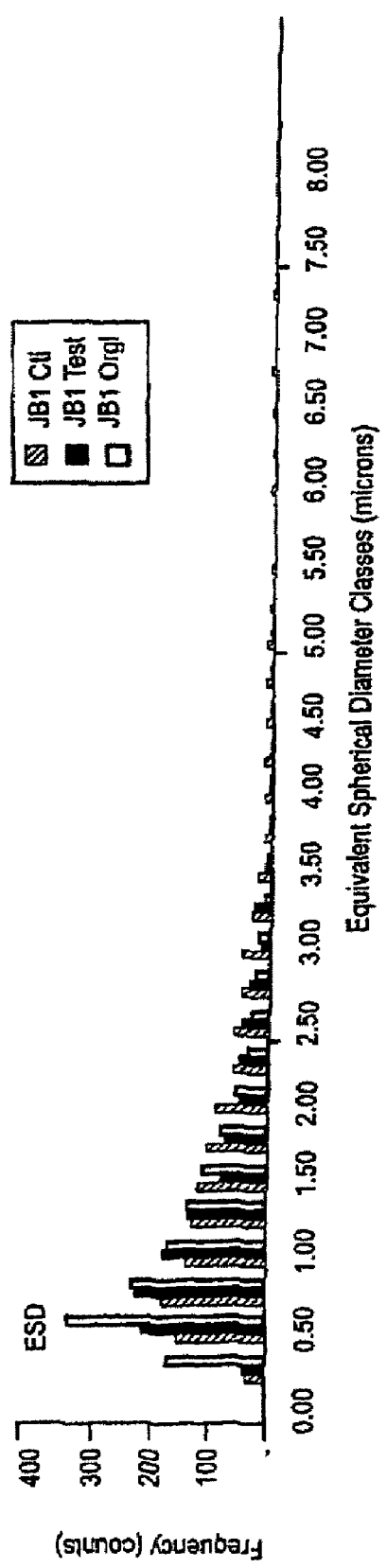
Figure 2B:
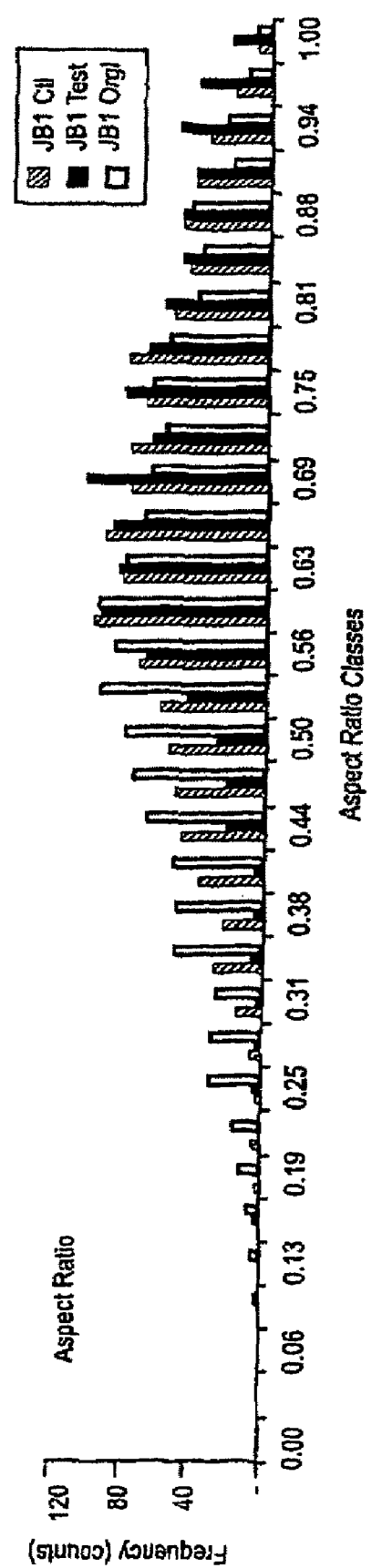

The present invention is directed to the unexpected discovery that numerous parameters of particle morphology can be manipulated to obtain desirable functional properties. For example, for fat-containing products, it has been found that the equivalent spherical diameter distribution (as opposed to a reduction in the particle size) and the sphericity distribution of the fat particles can be manipulated to achieve desired physical and organoleptic properties in the product. It has been observed that for a given type of particle, for each parameter of that particle's morphology, there is a preferred range of values, and if the distribution of particles within that preferred range is fairly uniform rather than random, a product having superior functional and organoleptic properties will result.

As used herein, the term "particle morphology parameters" shall refer to the sphericity, equivalent spherical diameter, shape and aspect ratio of the particle. These terms are further defined below.

As used herein, "sphericity" is defined as $4\pi$ times the ratio of the particle projected area to the square of the particle perimeter. The sphericity of a circle is 1.0. In accordance with some embodiments of the present invention, it is desirable to have a mean sphericity as close to 1.0 as possible.

As used herein, "equivalent spherical diameter" ("ESD") is defined as the diameter of a sphere having the same volume as the particle.

As used herein, "shape" is defined as the pattern of all the points on the boundary of a particle. The morphological shape term is the size normalized variance of the radial distribution of the particle profile and represents the amount of deviation between the radii of a particle profile and the radii of a circle. The shape of a circle is zero since the radius of a circle at any angle $\theta$ is a constant. The circle is the reference point from which all shapes are measured.

As used herein, "aspect ratio" is defined as the ratio of the particle diameter located perpendicular to the maximum diameter (i.e., the Aspect Diameter) to the maximum diameter.

Other parameters affecting particle morphology can be used in accordance with the present invention to improve the functional properties of a product. These parameters include shape classification, analysis of variance (ANOVA), and grand radial plot representation. As used herein, these terms will be defined as follows:

Shape classification: This analysis combines features of sphericity and aspect ratio to place particles in various shape classes. For purposes of the present invention, the shape classes are: a) bulky-rounded, b) bulky-irregular, c) elongated-thick and d) elongated-thin.

Analysis of Variance (ANOVA): This analysis uses t-testing methods to show over 99% confidence level differences between samples on specified features. In the present invention, the specified features include equivalent spherical diameter, aspect ratio, shape and sphericity.

Grand Radial Plot: This analysis provides a graphical representation of the particle size and shape data for a given sample.

The method of the present invention includes determining the optimal ranges for the above-defined parameters of a type of particle's morphology, and processing the product containing such particles in such a way as to manipulate the particles' morphology to increase and make more uniform the distribution of particles within those optimal ranges.

A histogram may be obtained by splitting a range of data into equal-sized "bins" or "classes." The number of points from the data set that fall into each bin are then counted. Bins can be defined arbitrarily, or with the use of some systematic rule. This type of analysis is available from Particle Characterization Measurements, Inc. of Iowa City, Iowa.

In accordance with the present invention, there is at least about a 1% increase to about a 100% increase in the percentage of particles at each "bin" or "class" falling within the recited range compared to a control product that has not been subjected to a particle morphology modifying process. Preferably, the number of particles is between about 5% to about 75% greater than the control in each bin within the range, more preferably between about 10% and about 60% greater, and particularly preferably between about 20% to about 50% greater than the control product.

It will be appreciated by those of skill in the art that many products have particles that fall within the ranges described above, as well as particles that fall outside the ranges described above. The present invention is directed to statistically significantly increasing the number of particles that fall within the recited ranges, and making the particle distribution within each range more uniform, thereby reducing the number of particles that fall outside of the ranges, to improve the functional and organoleptic properties of the product.

As will be demonstrated in some of the Examples below, conventionally prepared products typically have a very random distribution of particles across the various particle morphology parameters, and often have spikes or significant increases in the percentage of particles outside either end of the ranges described above. The present invention is directed to reducing or eliminating these "end region spikes" and providing instead a more uniform distribution of particles within the recited ranges.

Modification of Fat Particle Morphology

Processing particles to achieve the desired morphological characteristics can be achieved using any processing method that can controllably manipulate particle morphology. One preferred processing method includes treating the product with ultrasound energy. Other processing methods include homogenization, high shear treatment, cavitation, impingement treatment, and the like.

The dispersed phase in many food and beverage products is typically a fat or fat-containing phase. It is believed that the use of ultrasonic energy as a means for manipulating the particle morphology in accordance with the present invention allows the fat-based dispersed phase to be more perceptible to the consumer due to the morphological changes, such as increased sphericity and more uniform particle equivalent spherical diameter distribution, induced in the fat particles. As a result, a smaller quantity of fat or fat-containing ingredients needs to be added to a food product to achieve the organoleptic properties of a full-fat product made using conventional homogenization techniques.

While not intending to be bound by theory, it is believed that ultrasonic energy can be used to treat a fat-containing starting material to generate a dispersed phase having fat particles with greater sphericity and smaller, more uniform particle equivalent spherical diameter distribution than regular or standard emulsification methods. The increased sphericity is believed to provide a greater surface area to the dispersed phase. The smaller particle equivalent spherical diameter distribution results in greater uniformity among the dispersed particles. These factors combined enable the added stabilizers to function more effectively. As a result, a smaller amount of emulsifiers or stabilizers needs to be added to a food product to achieve the same functionality as in a food product prepared using a conventional homogenizer and conventional levels of emulsifiers or stabilizers.

In one embodiment, the particle equivalent spherical diameter distribution range was reduced by about 30%.

In one embodiment, the mean sphericity of the dispersed particles in a product treated using the ultrasound process of the present invention was at least about 40% greater than the mean sphericity of the dispersed particles in a conventionally homogenized product.

The method of present invention can be used to construct a fat globule in a way that results in functional and organoleptic properties similar to that obtained by using, for example, twice the level of emulsifiers or stabilizers to make a conventional ice cream. This effect can be applied to all dairy products in which the fat is used as a tool to manipulate functional and organoleptic properties of the product.

In one embodiment of the present invention, a food product can be made containing one-half of the stabilizers and one-half of the fat to achieve the same level of stability and the same shelf life and organoleptic properties as a conventional full-fat, fully stabilized product. It has been unexpectedly discovered that even products having a very low level of fat can benefit from the modification of particle morphology in accordance with the present invention.

It is believed that the manipulation of particle morphology enables more efficient use of food ingredients overall. Other ingredients that may be similarly affected by the use of ultrasonic homogenization include, but are not limited to, proteins, fibers, flavor components and carbohydrates, including sweeteners.

To achieve the desired sphericity and reduction in particle size distribution, along with the other size and shape parameters, using ultrasound as the processing means, it has been discovered that ultrasonic energy must be applied at a certain amplitude and pressure for a certain period of time depending on the type of product being processed. Generally, the amplitude can range from 0-100%, preferably from about 20-80%, and more preferably from about 50-70%. The ultrasound can be applied for 0-1 cycles, preferably 1 cycle. The typical frequency of the ultrasound apparatus is between about 18 kHz to 24 kHz. The total energy input to the sample to reach the desired emulsification is generally between about 30 watts to 200 watts, more preferably 90-130 watts. It will be understood by those of skill in the art that the energy input is dependent on the amplitude of the ultrasound system being used, and the solids content and other aspects of the product being treated. In one embodiment involving ice cream premixes, for example, it is preferred that the ultrasonic energy having an amplitude of 70% applied for a period of less than about 60 seconds, preferably about 30 seconds, to achieve the desired particle size distribution and sphericity, as well as the other size and shape parameters defined above. In one embodiment of a continuous system in accordance with the present invention, the ultrasound treatment can be applied for as little as 1 second at a flow rate of about 0.25 gallons/minute to achieve the desired results.

The ultrasound device used in Examples 1, 2, 4, 5, and 6 below was a Hielscher model UPC1000, 1000 Watts, 24 kHz frequency, amplitude adjustable from 20-100%, (Sonotrode BS20d34, BS20d22, Booster BO-1.5, BO-1.2), available from Hielscher USA Inc., Ringwood, N.J. The ultrasound device used in Example 3 was a UPC400, 400 Watts, 24 kHz frequency, amplitude adjustable 20-100%, pulse adjustable 0-100% (Sonotrode H7, H22, H22D), available from Hielscher USA Inc., Ringwood, N.J.

The ultrasonic energy can be applied to the product at any stage during processing at which the product is in a flowable state. For example, the product can be treated with ultrasonic energy immediately upon entering the processing system, before or after being heated or pasteurized, before or after being mixed with other ingredients, or before or after being packaged, or a combination thereof. In one embodiment, the product is preferably treated with ultrasound energy before or after a heating/pasteurization step.

Although the examples described herein involve food or beverage products, the present invention can be used for any type of product, including, but not limited to, the following products:

Milk products (fresh, organic, and pasteurized): skim milk, 1% milk, 2% milk, whole milk, flavored milk (such as chocolate, vanilla, strawberry, and the like), UF filtered milk, low carbohydrate dairy beverages, cream, half & half, soft serve ice cream, ice cream, ice milk, ice cream mix, shake mix, gelato, ice cream novelties, mellorine, artificially sweetened dairy products, Italian ice, sorbet, frozen yogurt, yogurt imitations, kefir, sour cream, egg nog, creamers, non-dairy creamers, buttermilk, yogurt, yogurt-based beverages, custard, yogurt premix, cheese, processed cheese, cheese toppings, American cheese, cream cheese, spreadable cheese, string cheese, cheese blends, whipping cream, cottage cheese, butter, margarine, whey, milk and cream based liqueurs, milk concentrates, milk proteins, condensed milk, sweetened condensed milk, enriched/fortified products, fermented products, dairy desserts, whey protein concentrate, casein, lactic acid, and powdered versions of the foregoing, Soy: soy base, soymilk, soy yogurt, soy ice cream, soy butter, soymilk spreads, soymilk blends, flavored soymilk, soymilk beverages, soymilk desserts, soy beverages, soy protein, tofu, tempeh, and powdered versions of the foregoing, Beverage/Juices: sports drinks, isotonics, energy drinks, protein drinks, flavored water, juice (fruit, vegetable, or other), fruit pulps and concentrates, juice blends, juice/milk blends, juice/soy blends, juice/milk/soy blends, juice/grain blends, diet shakes, diet drinks, nutritional drinks, ice tea, tea drinks, tea, fluid meal replacement drinks, geriatric drinks, nutrient-enhanced New-Age drinks, reduced calorie drinks, reduced carbohydrate drinks, tomato juice, chai teas, iced cappuccinos, beer, lite beer, dark beer, ales, lagers, specialty beers, wine (red, white, dessert, fortified, rose, fruit, champagne, sparkling), alcohol drink mixes (chocolate, Irish cream, amaretto, coffee, and the like), liquors, beverage emulsion, protein fortified juices and juice beverages, juice flavored beverages, nutraceuticals, Vitamin and Mineral Enriched Drinks, Herbal Drinks, Wellness Drinks, Carbonated Soft Drinks and functional soft drinks, concentrates, and powdered versions of the foregoing, Fats/Oils/Shortenings: saturated, monosaturated, monounsaturated, polysaturated, polyunsaturated, transfat, animal fat, animal oil, vegetable fat, vegetable oil, fruit skin oil, vegetable skin oil, essences, margarine, spreads, butter, butter spreads, butter blends, fat substitutes, and powdered versions of the foregoing, Sauces/soups/spreads: tomato condiments, tomato paste concentrate, tomato sauce, ketchup, mayonnaise, mustard, salad dressing, gravy, peanut butter, spreads, nut paste, barbeque sauce, steak sauce, soy sauce, picante sauce, taco sauce, creamy soup, broth-based soup, honey, sauces, vinegar, balsamico, olive oil, and powdered versions of the foregoing, Confectionery: chocolate, cocoa, cocoa butter, cocoa paste, chocolate coatings &syrups, chocolate candy, chocolate bars, chocolate liquor, sweetened & unsweetened chocolate, ice cream toppings & coatings, sugar free chocolate, gum, sugarless gum, sugarless non chocolate, food color, caramel, non chocolate candy, frostings, sugar slurries, sugar syrup, natural and artificial sugars, and powdered versions of the foregoing, Sweeteners: corn syrup, dextrose, high fructose corn syrup, maltose, sugar, sucrose, caramel, and powdered versions of the foregoing, Fibers/Grains/Pulp/Solids: wheat, oat, barley, rice, malt, sorghum, corn, millet, rye, triticale, durum, quinoa, amaranth, pulp (fruit and vegetable), and powdered versions of the foregoing, Miscellaneous: pudding, cake batter, batter mixes, pie fillings (fruit or cream-based), custard, syrups, starter cultures, flavorings, fragrances, baby food, infant formula (dairy, rice and soy based), baby milk, eggs, vitamins and minerals, citric acid, citrates, citrus juice, citrus products, flavor emulsions, gelatin, amino acids, starch, gypsum, emulsifiers, stabilizers, isoflavones, flavors/flavorings, yeast, pectin, cloud emulsions, functional ingredients, reduced fat products, and powdered versions of the foregoing, Cosmetic/Healthcare: body lotion, body wash, hand lotion, hand wash, hand cream, antibacterial products, shampoo, conditioner, cosmetics, baby products, bar soaps and detergents, liquid soap, bath products, A/P gels, deodorants and antiperspirants, depilatories, eye make-up preparations, eye ointments, face make-up preparations, feminine hygiene products, fragrance and perfume preparations, creams, hair bleach, hair dye, hair color, hair care products, hair straightener and permanents, lipstick, lip balm, lip gloss, make-up pencils, nail care, oral care products, shaving products, skin care products, suntan and sunscreen preparations, tanning lotion, waves, micro emulsions, amino emulsions, cationic emulsions, creams and lotions, ointments, skin care lotions, aloe vera, liposomes, moisturizers, anti-age creams, anti-wrinkle creams, collagen, cerebrosides, aloe, surfactants, mascara, nail polish, nail polish remover, surfactant blends, perfumes, toothpaste, liposome emulsions, and powdered versions of the foregoing, Chemical/Industrial Products: paint, paint pigment, paint dispersions, specialty paints and coatings, ink, ink pigment, ink dispersions, pigment dispersions, color pastes, colorants, polishes, photographic emulsions, grease, fuel oil, fumed silica dispersions, detergents, waxes, wax emulsions, wax filler dispersions, adhesives, lubricants, kaolin, colloidal suspensions, mineral dispersion, mineral oil emulsions, carbon black dispersions, dyestuffs with solvents, paraffin emulsions, antioxidants, resins, corrosion inhibitors, lanolin, latex, latex emulsions, silicones, starches, lubrication oil, emulsions, clay dispersions, coatings, dye dispersions, resin/rosins, colorants, gel coats, insecticides, pesticides, ceramics, soap, wood preservation, solvents, polymers, rubber solutions, rubber latex, paper coatings, betonies in oil, bentonite clay, bitumen base, cellulose land derivatives, anti-foam emulsions, weatherproofing, silicone emulsions, textile emulsions, asphalt emulsions, can coatings, shoe polish, and powdered versions of the foregoing, Pharmaceutical: drugs, antacids, ointments, creams, tablet coatings, intravenous emulsions, drug emulsions, dye dispersions, antibiotics, antioxidants, burn creams, liposomes, nutrition supplements, syrups, veterinary preps, vitamins and minerals, proteins, API (active pharmaceutical ingredients), viruses, and powdered versions of the foregoing, and Biological Cells: algae, enzymes, human and/or animal blood cells, microbial cells (bacterial, yeast, mold), and powdered versions of the foregoing.

EXAMPLE 1

A low-fat ice cream pre-mix containing about 4% milkfat and stabilizer was treated with ultrasound energy in the continuous system shown in FIG. 1 (flow diagram). The flow rate was about 0.25 gallons/minute. The pre-mix was treated with ultrasound at a frequency of 24 kHz for 1 second. The treated pre-mix (JB1Test) was then evaluated for sphericity and the other size and shape parameters of the milkfat globules, and was compared to a control pre-mix having the same formula, which was homogenized using a conventional homogenizer (JB1 Orgl.)

FIGS. 2a-2d show the results of the size and shape analysis of the milkfat globules. JB1 Ctl represents an untreated pre-mix sample. In this example, all of the measured parameters demonstrated a difference between the samples at the 99% confidence level. The mean sphericity of the control sample was about 0.28, while that of the sample treated with ultrasound was about 0.54, almost double that of the control. This represents about a 48% increase in mean sphericity in the samples treated with ultrasound energy rather than thorough a conventional, shear-based homogenizer.

EXAMPLE 2

The same pre-mix as described in Example 1 was used, but with about half the amount of stabilizer added (JB2Test). JB2Orgl was the same pre-mix as in Example 1, but contained half the amount of stabilizer. The test pre-mix samples (JB2Test) were run through the system shown in FIG. 1, while the control samples (JB2Orgl) were processed using a conventional shear-based homogenizer.

Figure 3A:
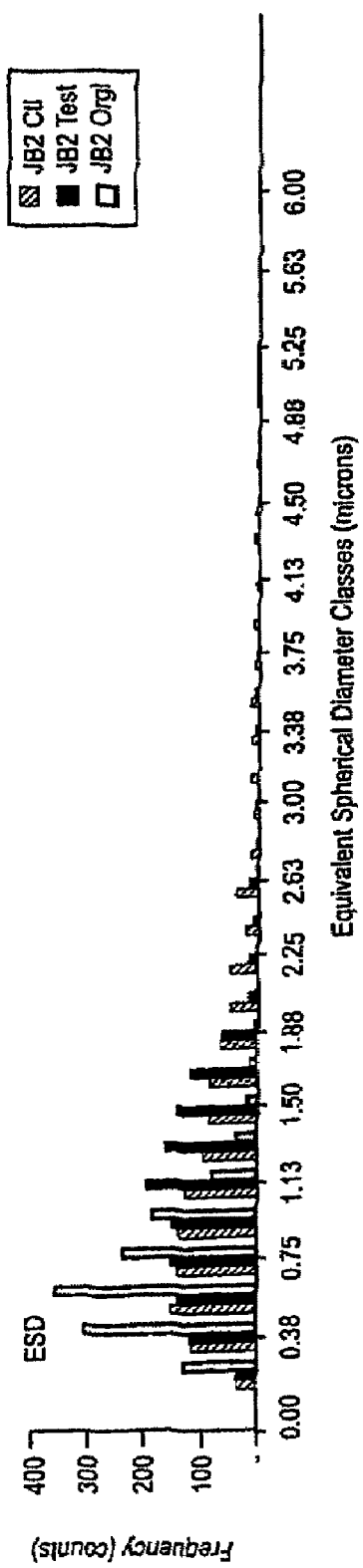
Figure 3B:
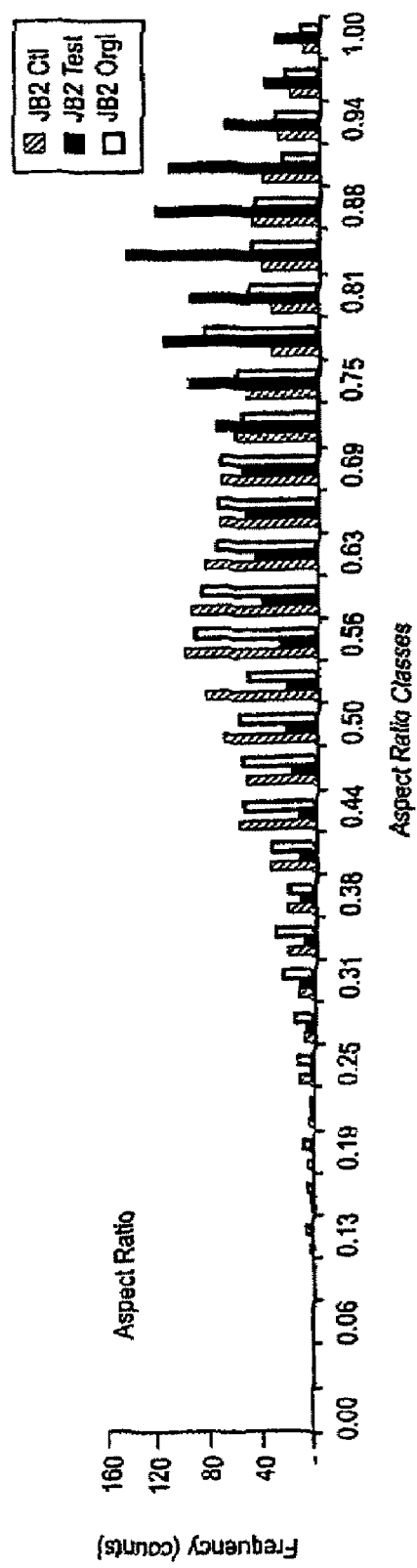
Figure 3C:
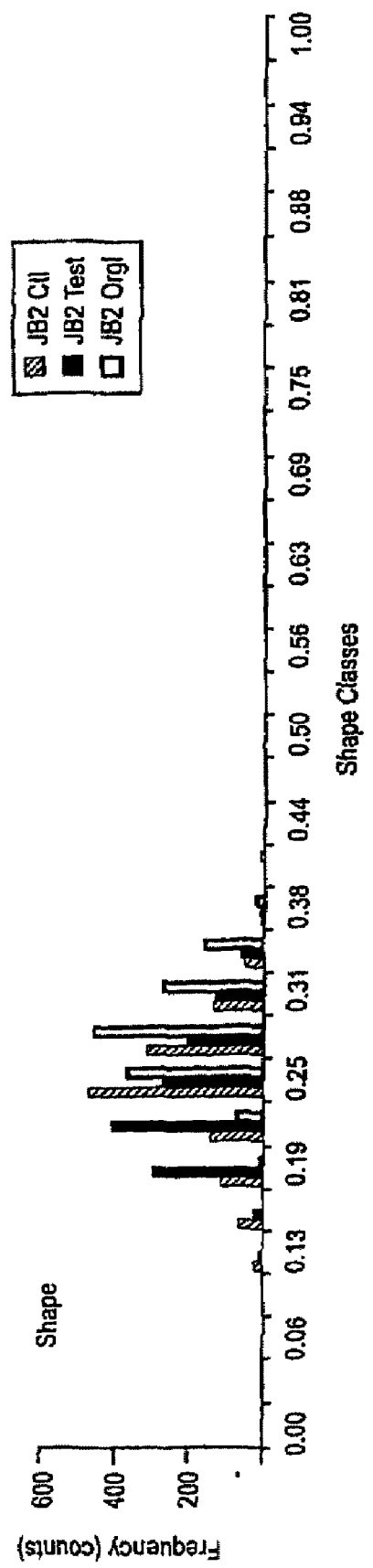
Figure 3D:
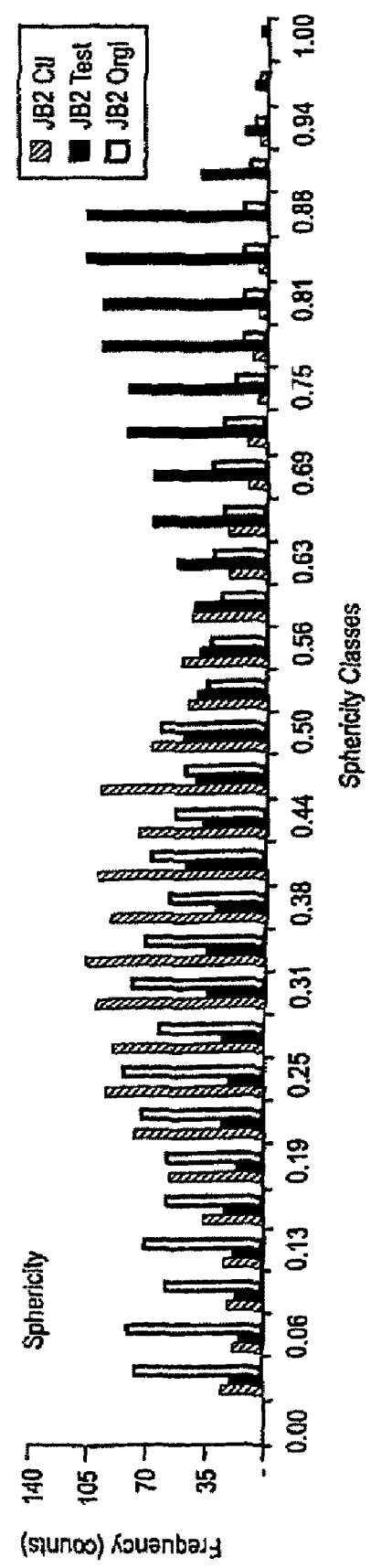
Figure 4A:
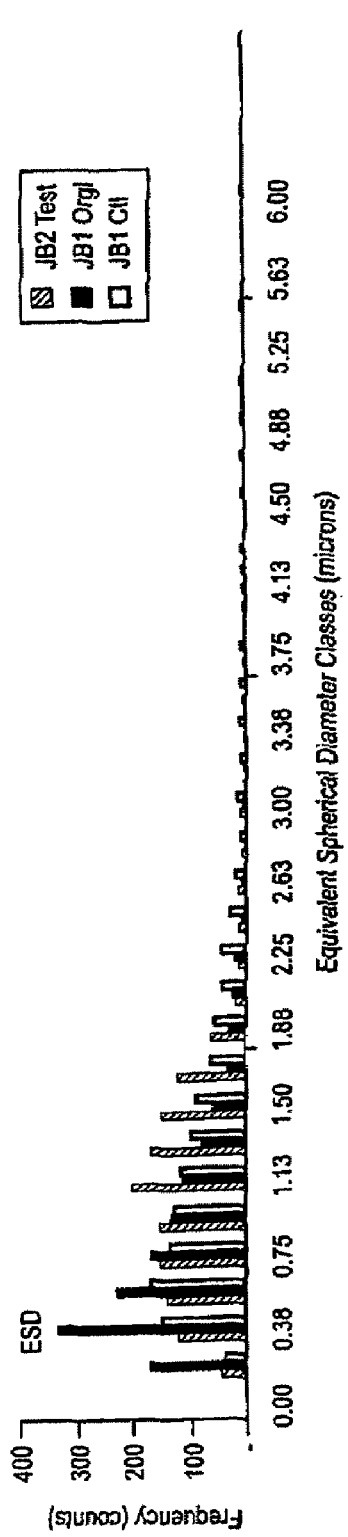
Figure 4B:
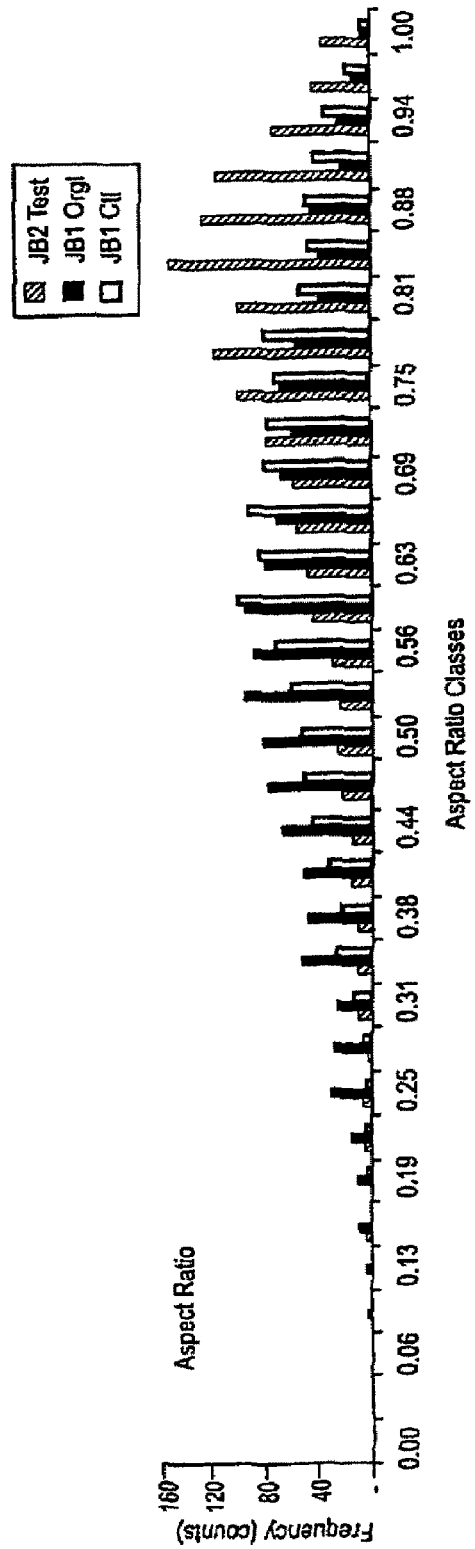
Figure 4C:
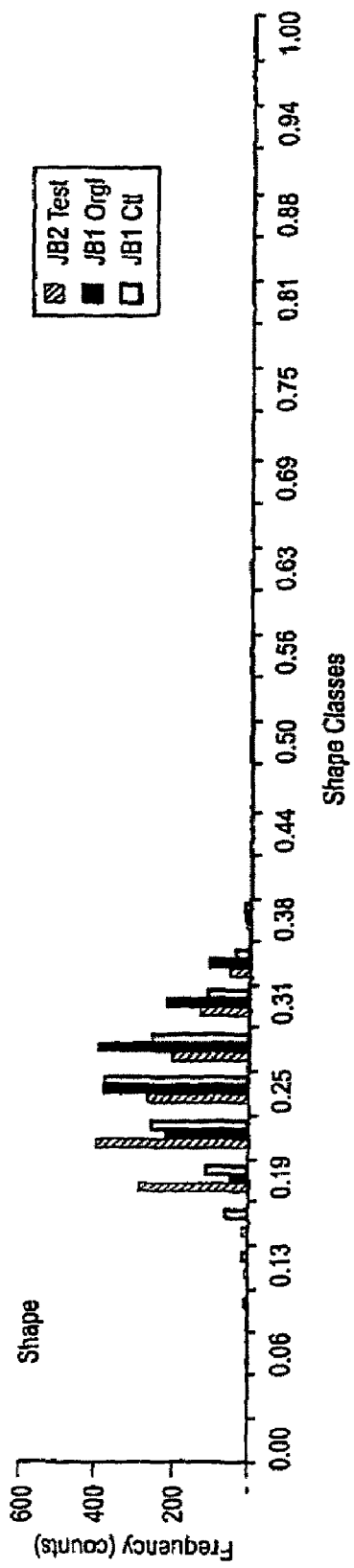
Figure 4D:
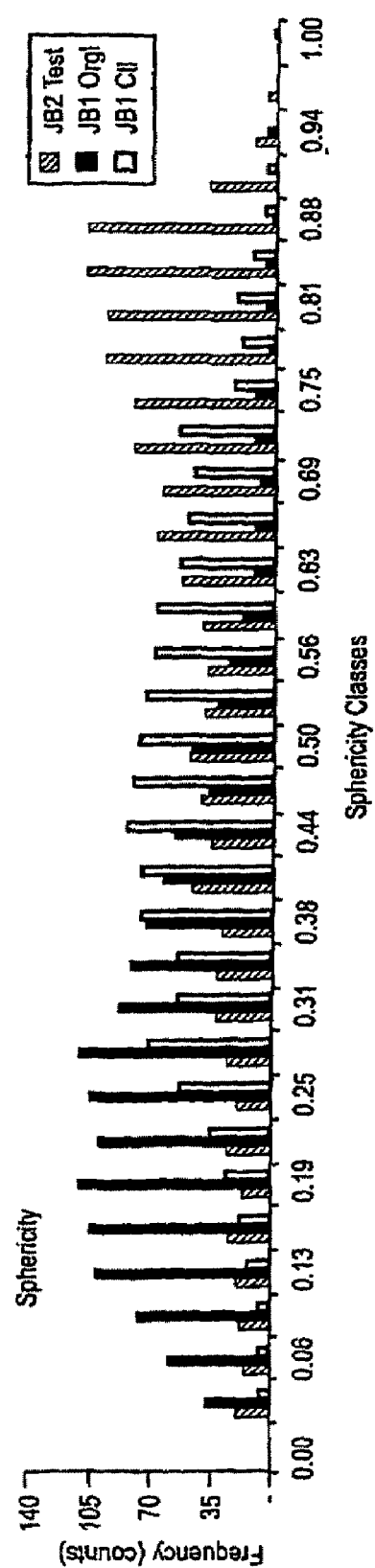
Figure 5A:
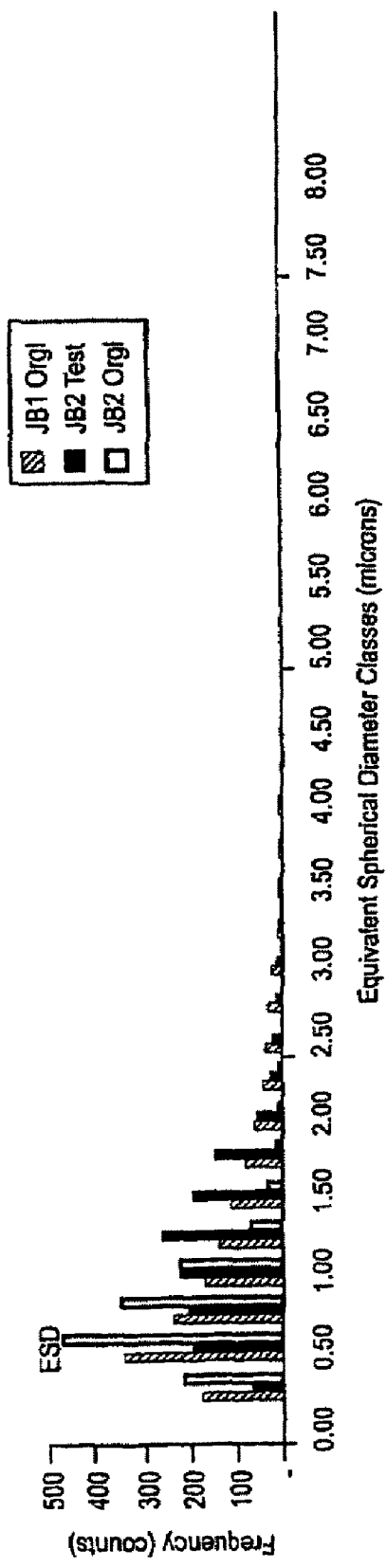
Figure 5B:
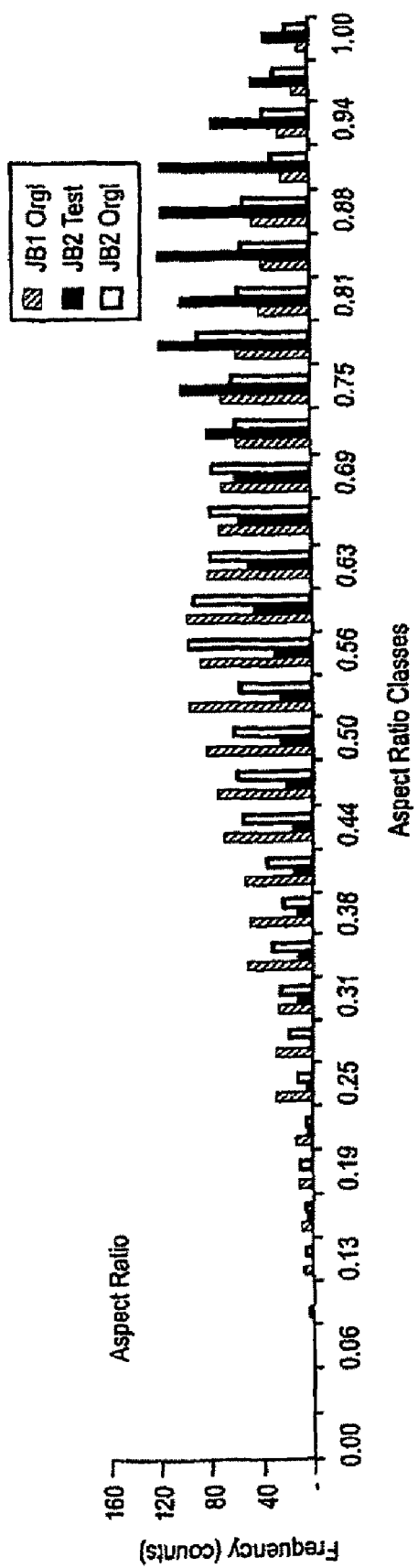
Figure 5C:
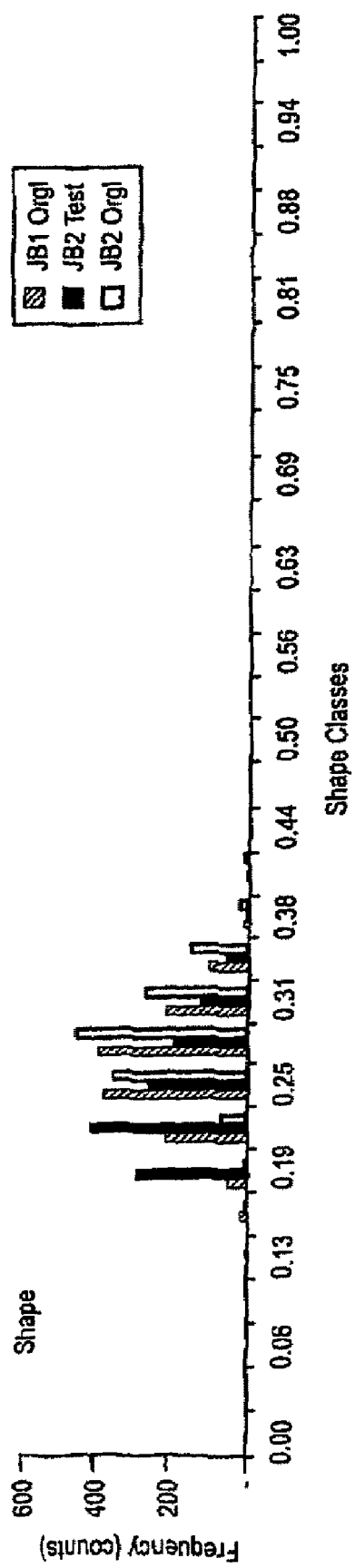
Figure 5D:
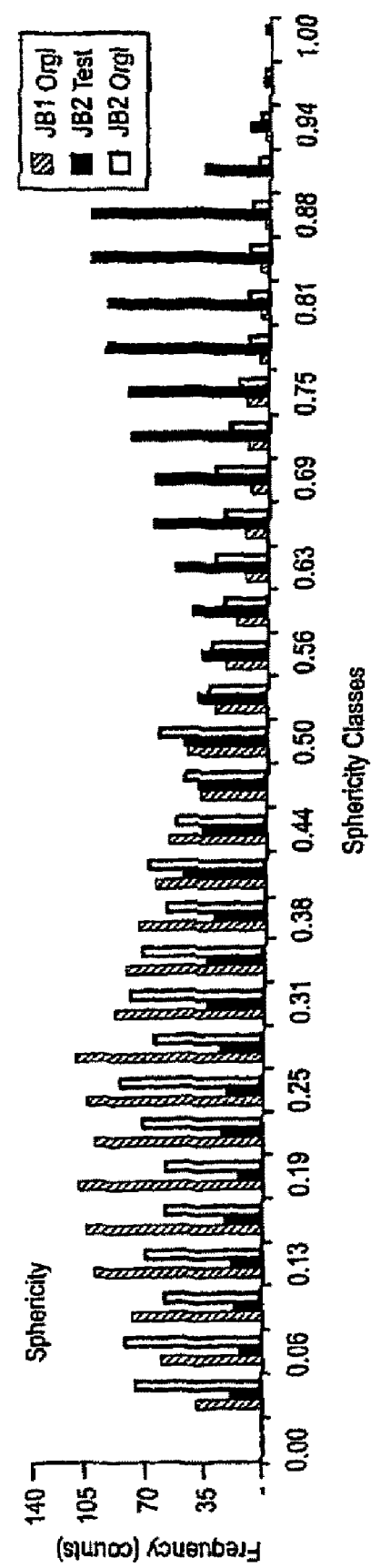
Figure 6A:
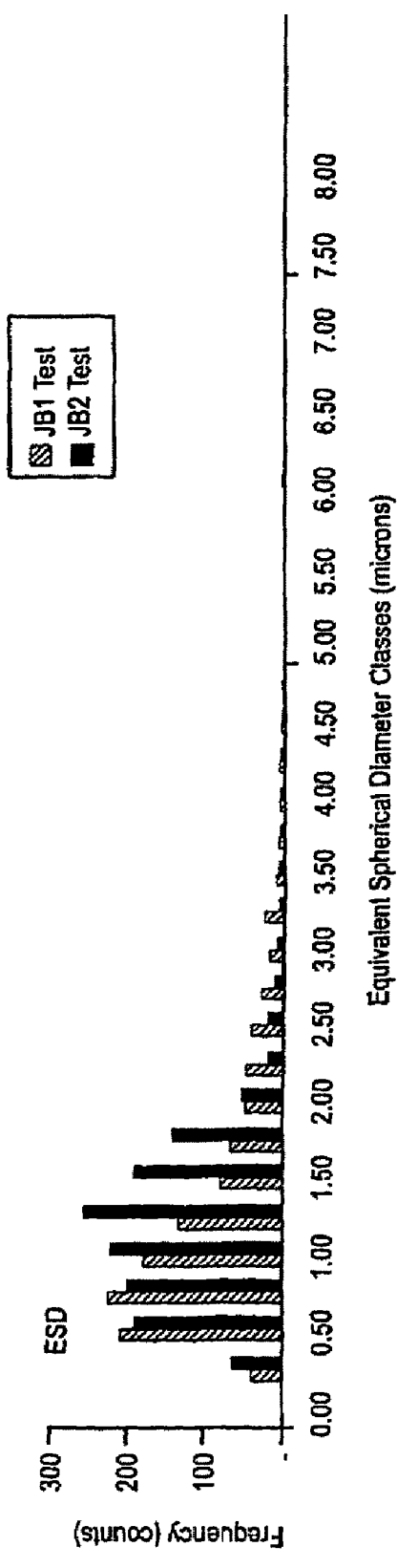
Figure 6B:
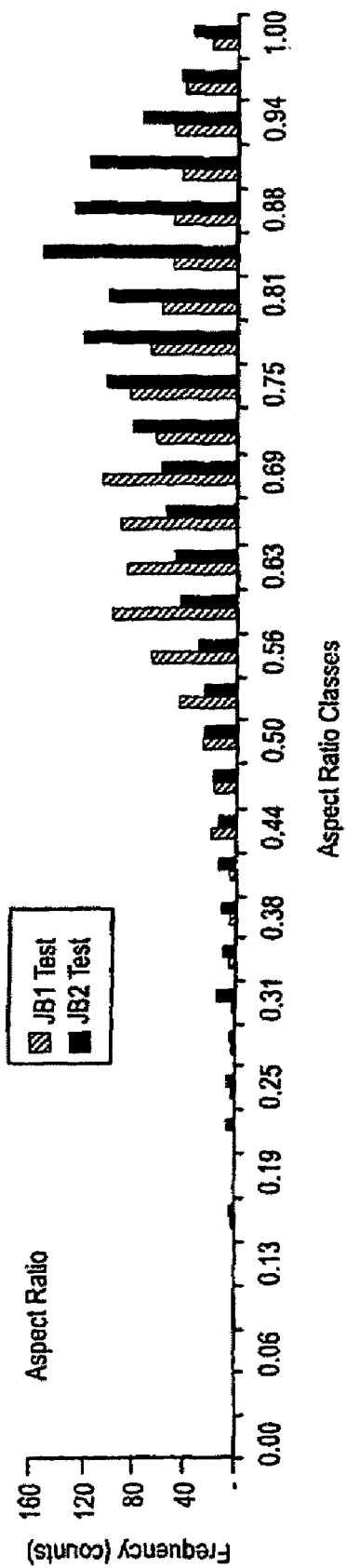
Figure 6C:
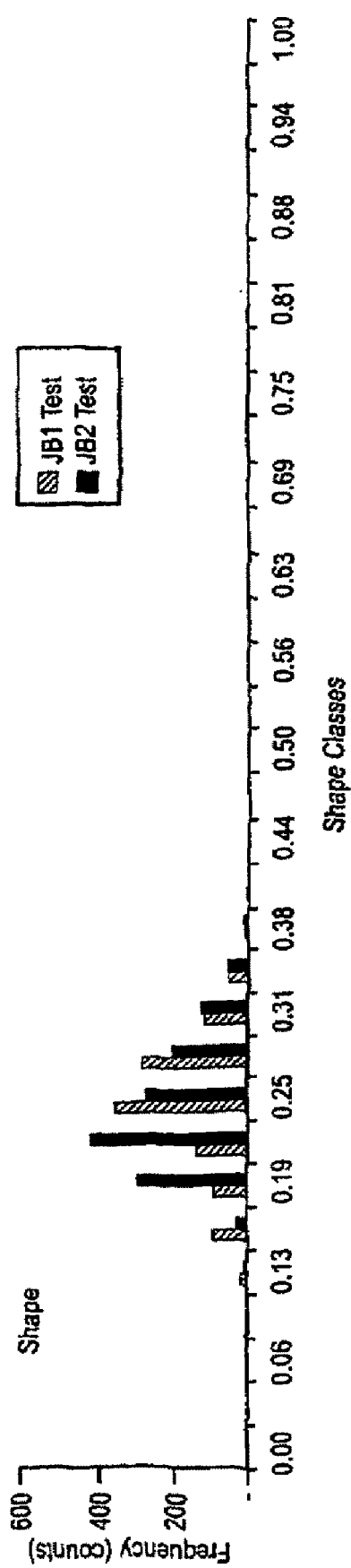
Figure 6D:
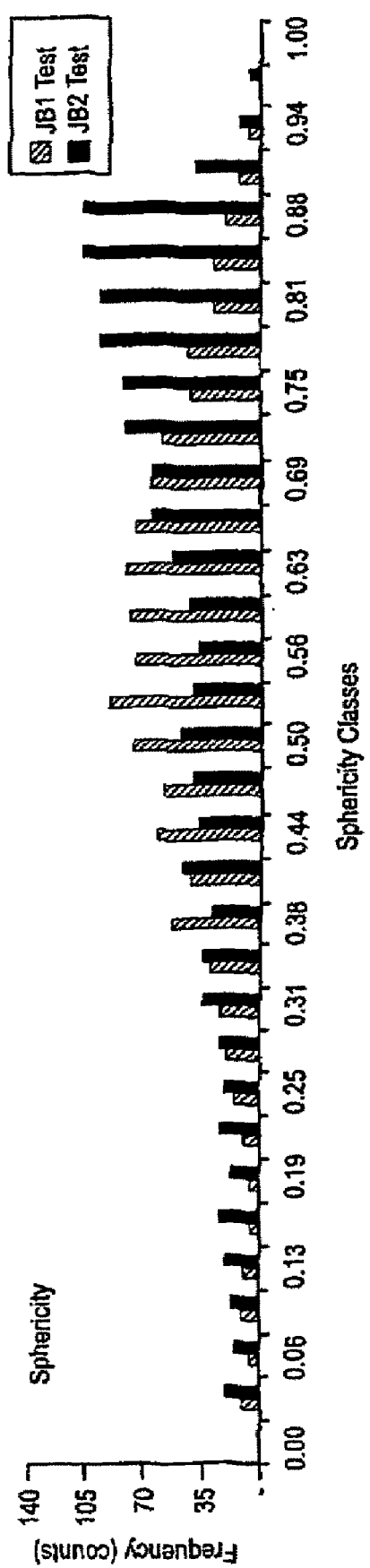

FIGS. 3a-3d show the results of the size and shape analysis of the milkfat globules. JB2 Ctl represents an unprocessed, raw pre-mix sample. In this example, all of the measured parameters demonstrated a difference between the samples at the 99% confidence level. In this example, the mean sphericity of JB2Orgl, as shown in FIG. 3d, was about 0.28, while the ultrasound-treated pre-mix had a mean sphericity of about 0.54, or almost twice the level of sphericity. This represents about a 48% increase in mean sphericity in the ultrasound-treated sample as compared to the control, JB2Orgl.

FIGS. 4a-4d compare the size and shape analyses of the milkfat globules of the JB2 Test sample, the JB1Orgl sample, and the JB1Ctl sample. The mean sphericity of the JB2Test sample was about 0.59, while that of the JB1Orgl sample was 0.28, demonstrating about a 52.5% increase in sphericity while using half the amount of stabilizer in the JB2Test sample.

FIGS. 5a-5d compare the size and shape analyses of the milkfat globules of the JB2Test sample, the JB1Orgl sample, and the JB2Orgl sample. The mean sphericity of the JB2Test sample was about 0.59, while that of the JB1Orgl sample was 0.28, representing an increase of about 52.5% in sphericity in the JB2Test sample processed with ultrasound energy and containing about 50% less stabilizer than the JB1Orgl. The mean sphericity of JB2Orgl was about 0.33, representing about a 44% increase in mean sphericity of the ultrasound-treated samples as compared to the JB2Test samples.

FIGS. 6a-6d show the comparison of the size and shape parameters of the milkfat globules of the JB1Test sample and the JB2Test sample containing about half the amount of stabilizer as the JB1Test sample. The mean sphericity of the milkfat globules of the two samples is very similar, with the JB2Test samples showing a greater sphericity while using less stabilizer than the JB1Test samples. As discussed herein, it is believed that an increase in sphericity due to ultrasound treatment permits the use of lower levels of stabilizer to achieve the same functional and organoleptic benefits of a control (non-ultrasound treated) product containing higher levels of stabilizer.

FIG. 7 shows the shape class distribution of the samples evaluated in Examples 1 and 2.

Figure 8:
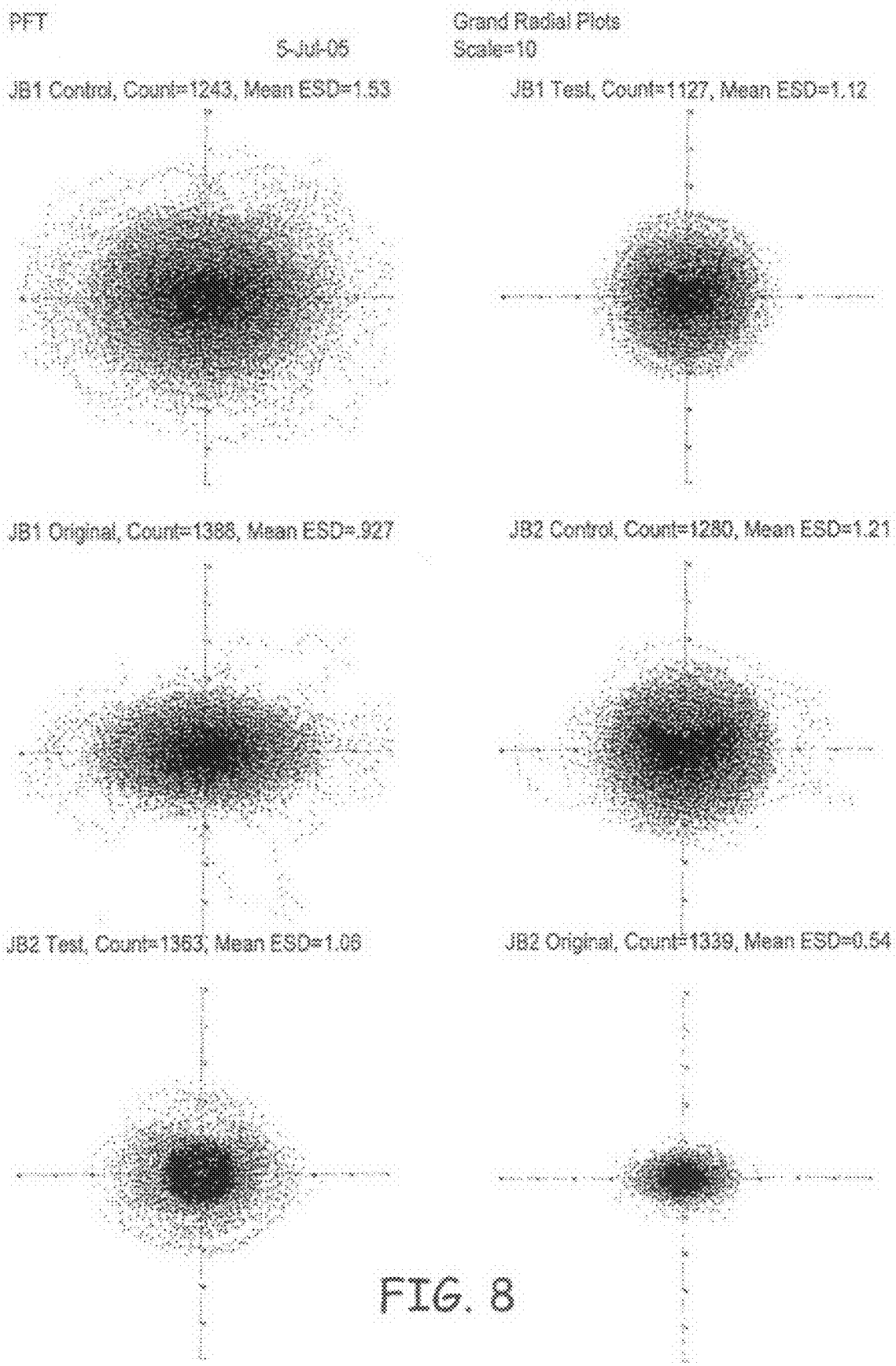
FIG. 8 shows the grand radial plots of the milkfat globules of the ice cream pre-mixes analyzed in FIGS. 2-6.
Figure 11A:
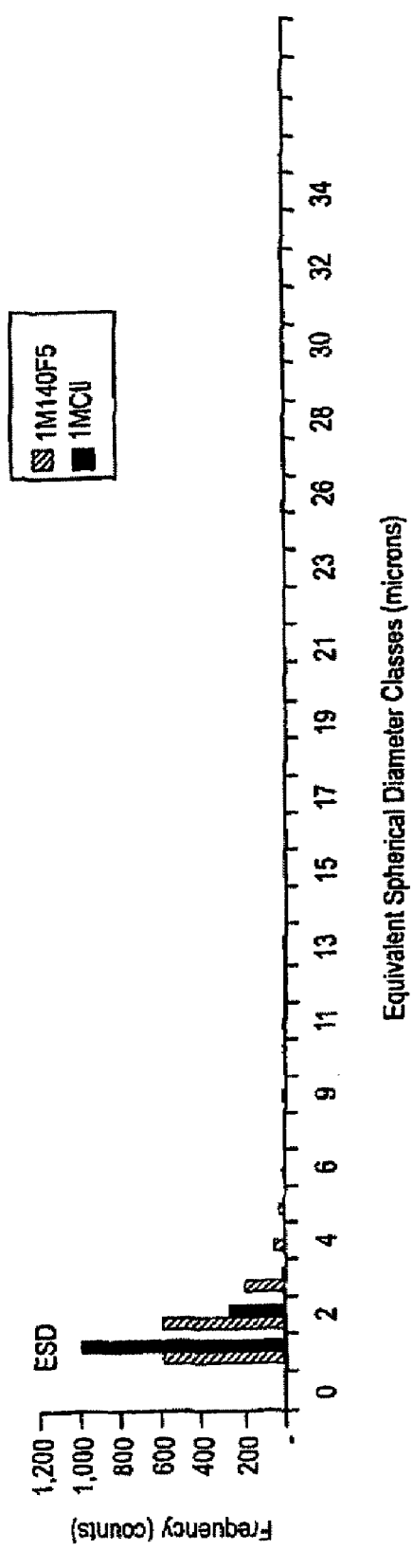
Figure 11B:
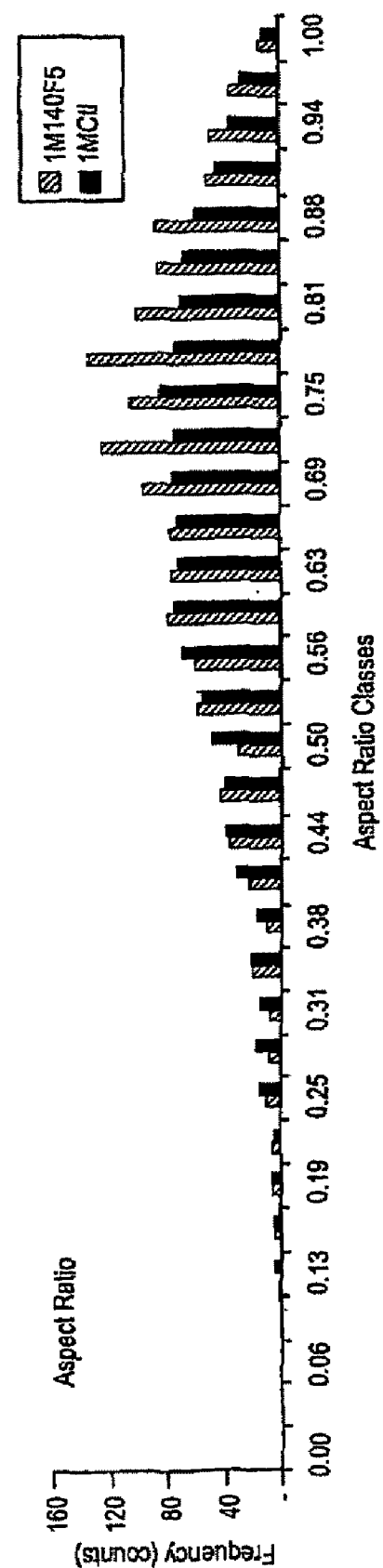
Figure 11C:
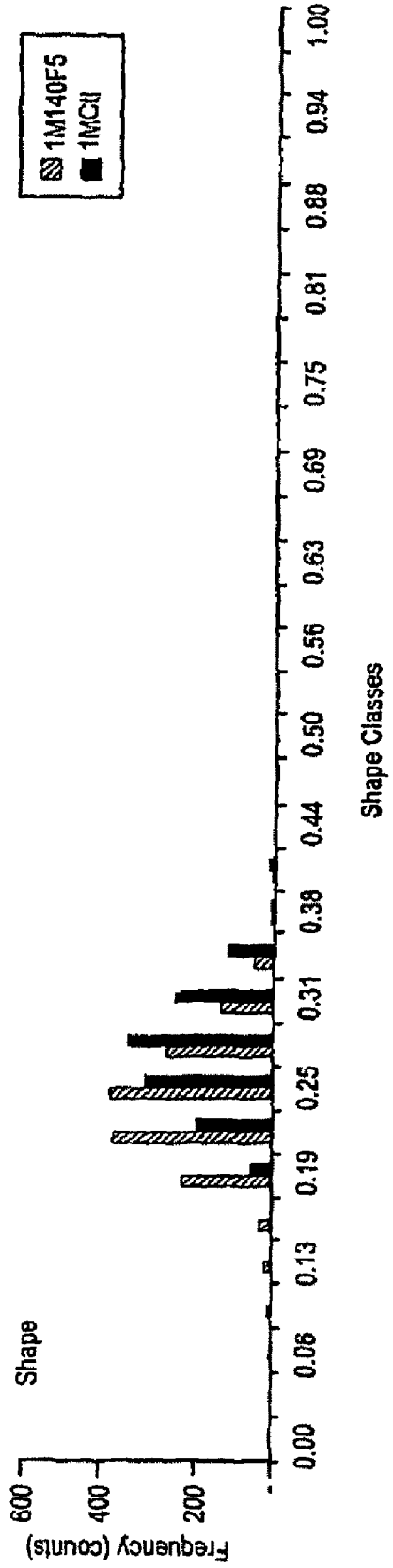
Figure 11D:
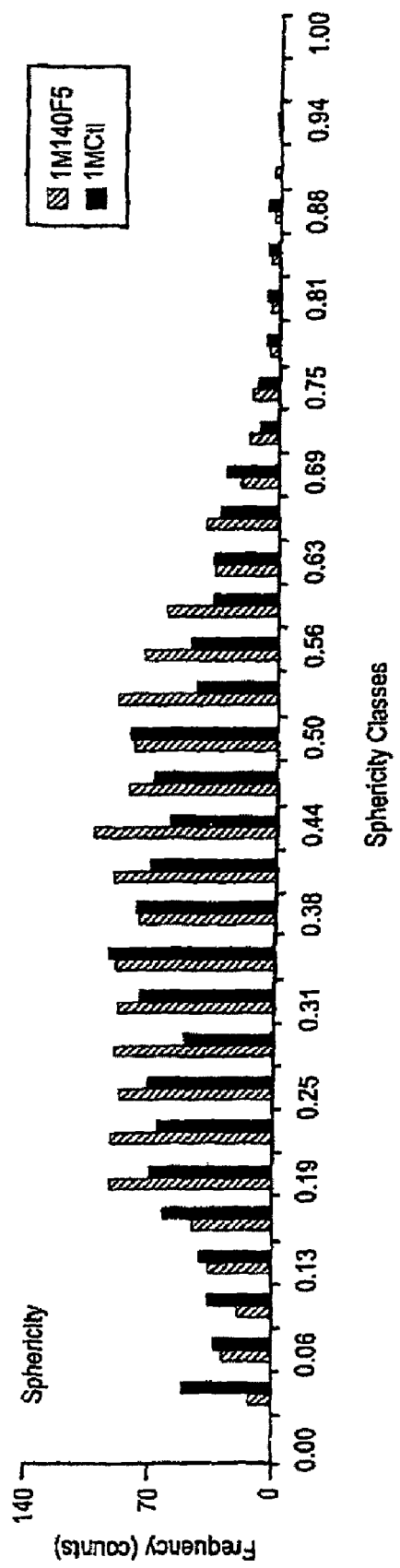
Figure 12A:
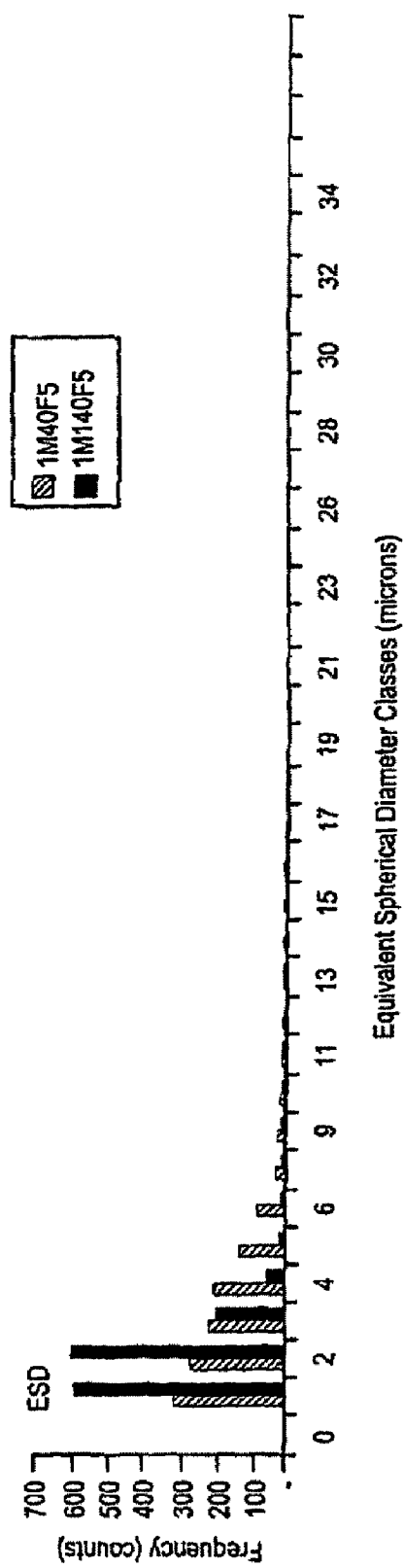
Figure 12B:
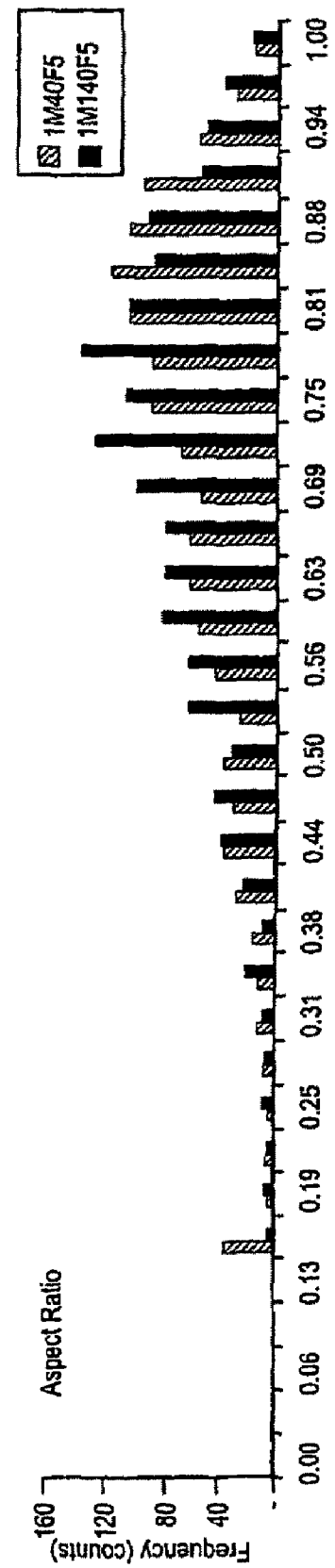
Figure 12C:
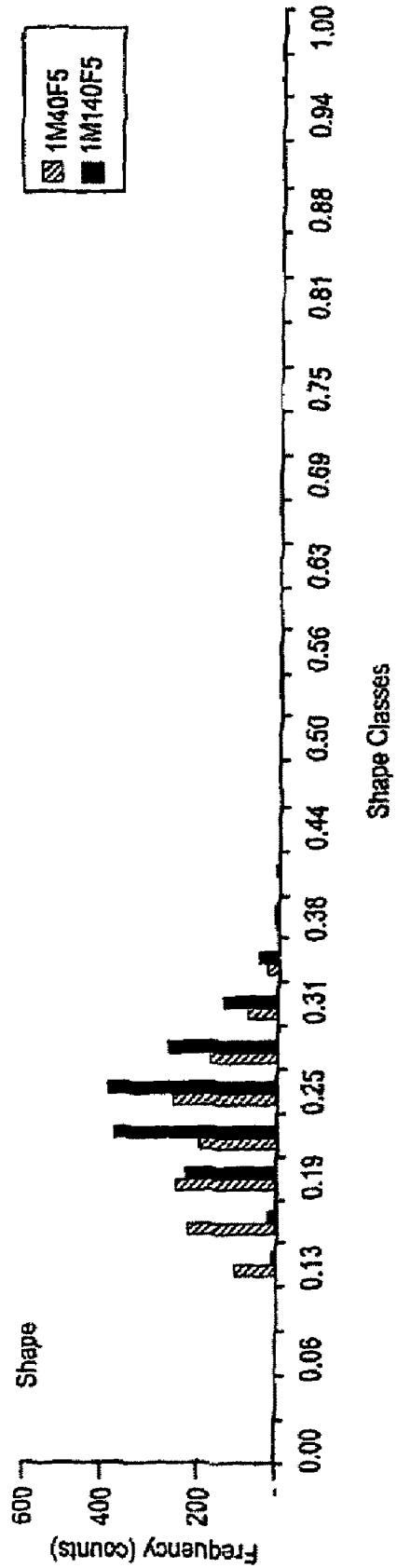
Figure 12D:
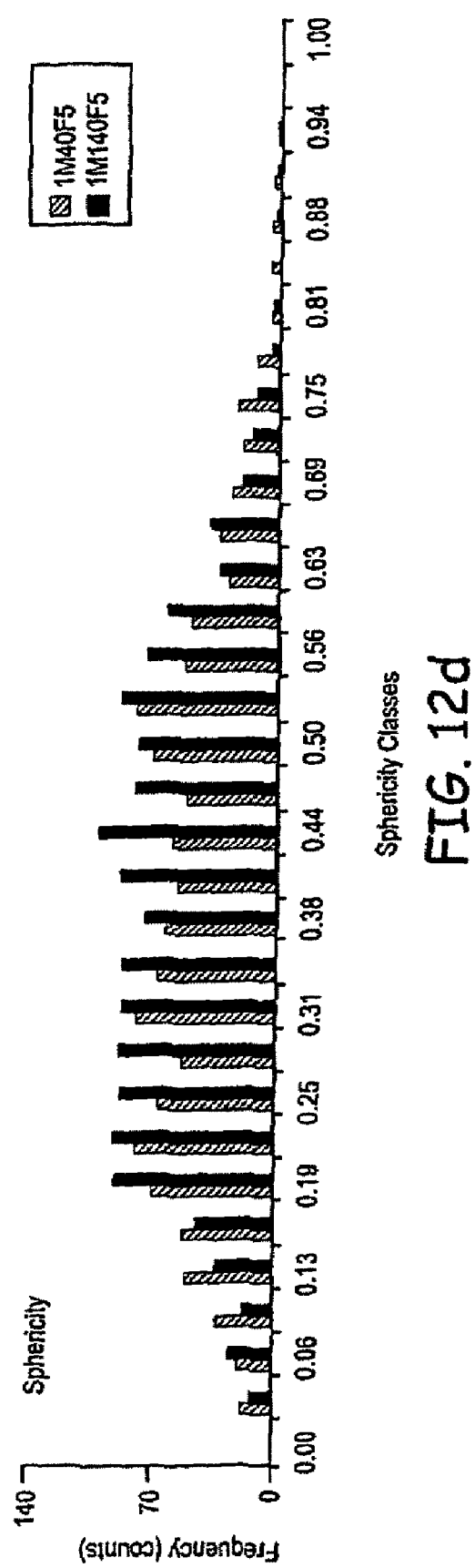
Figures 13A, 13B:
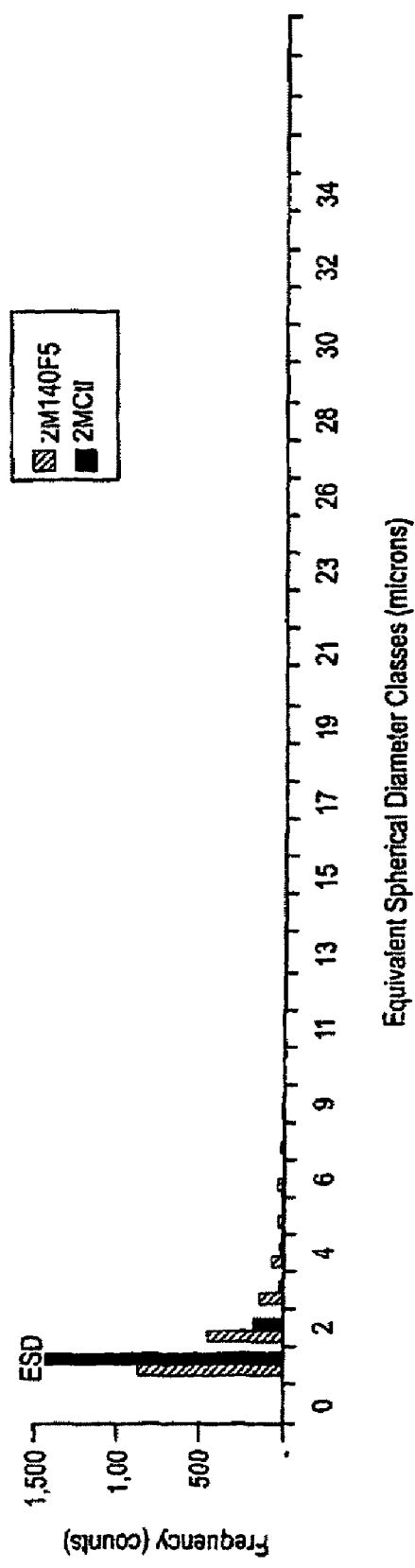
Figure 13C:
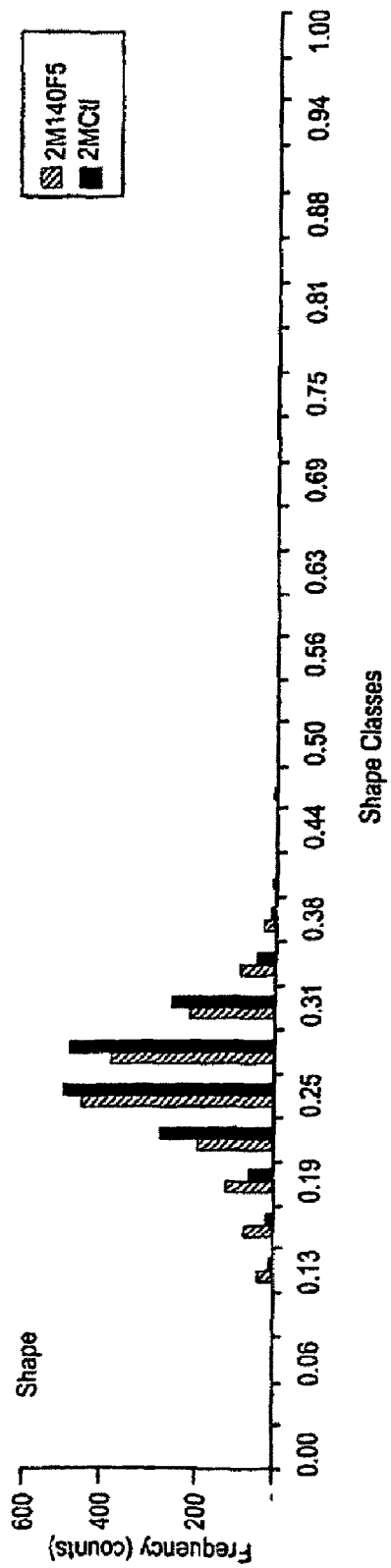
Figure 13D:
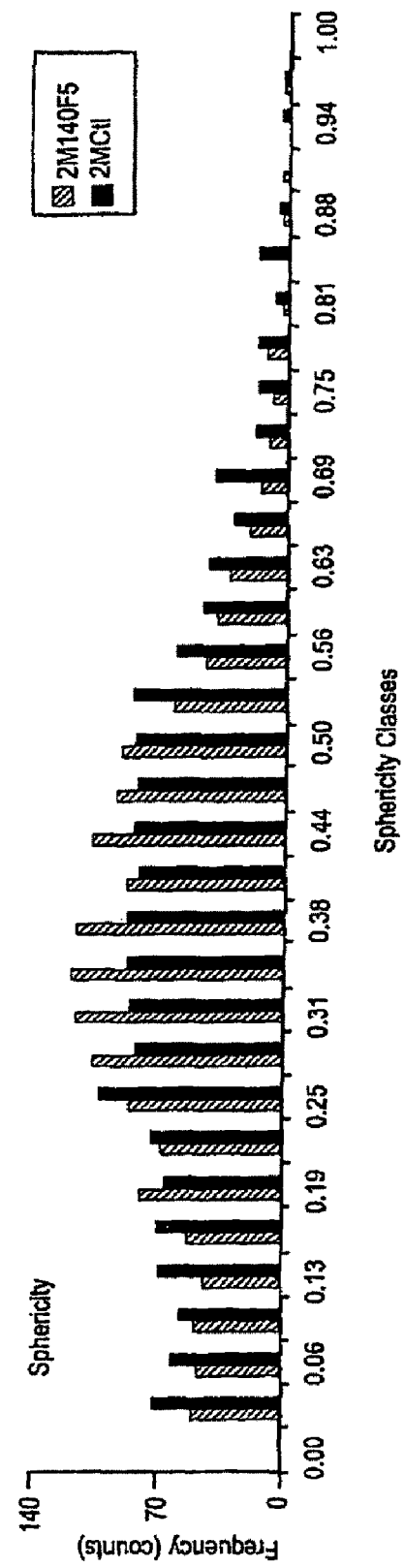
Figure 14A:
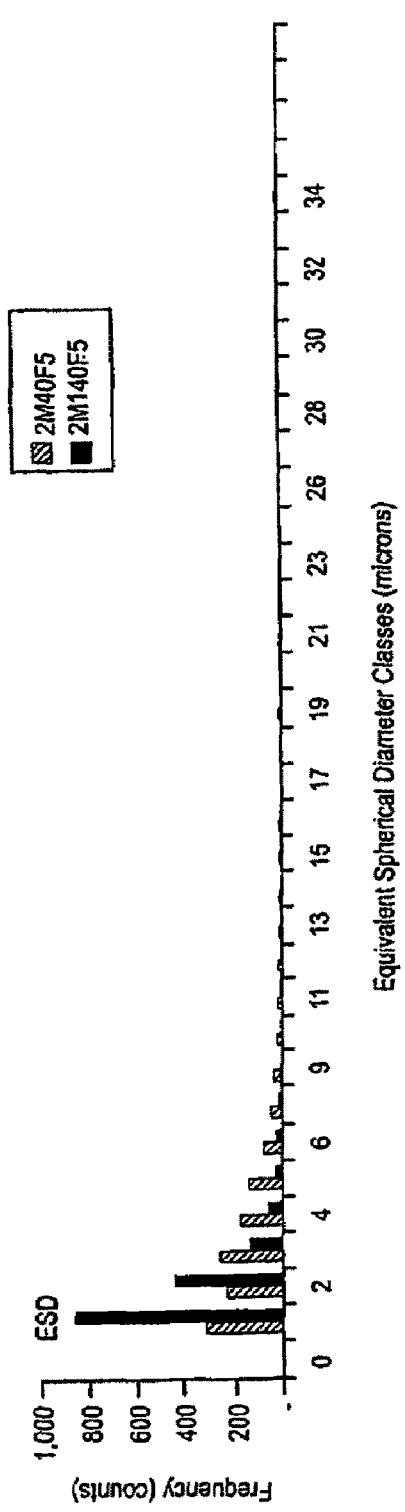
Figure 14B:
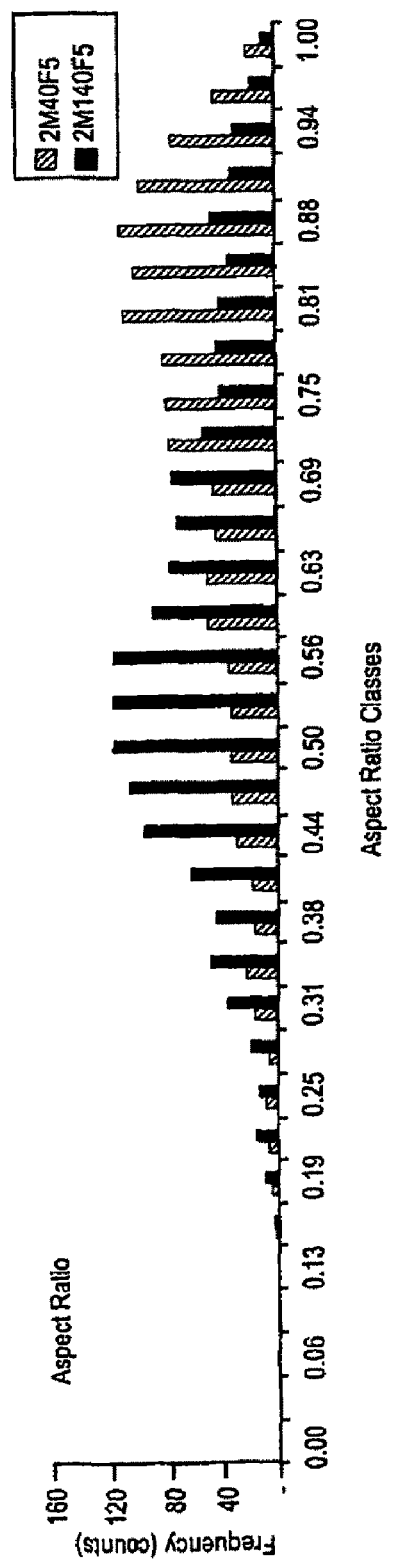
Figure 14C:
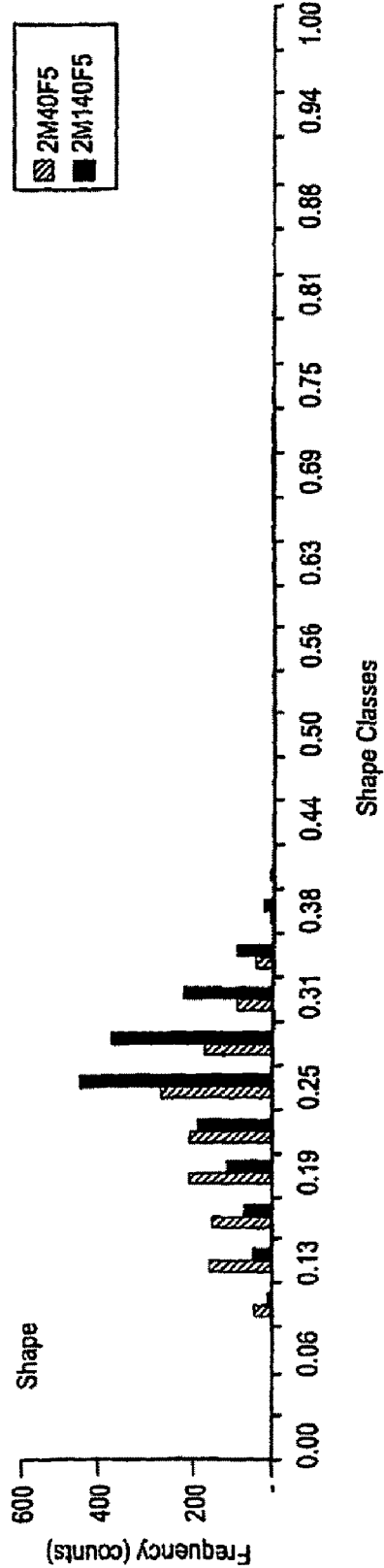
Figure 14D:
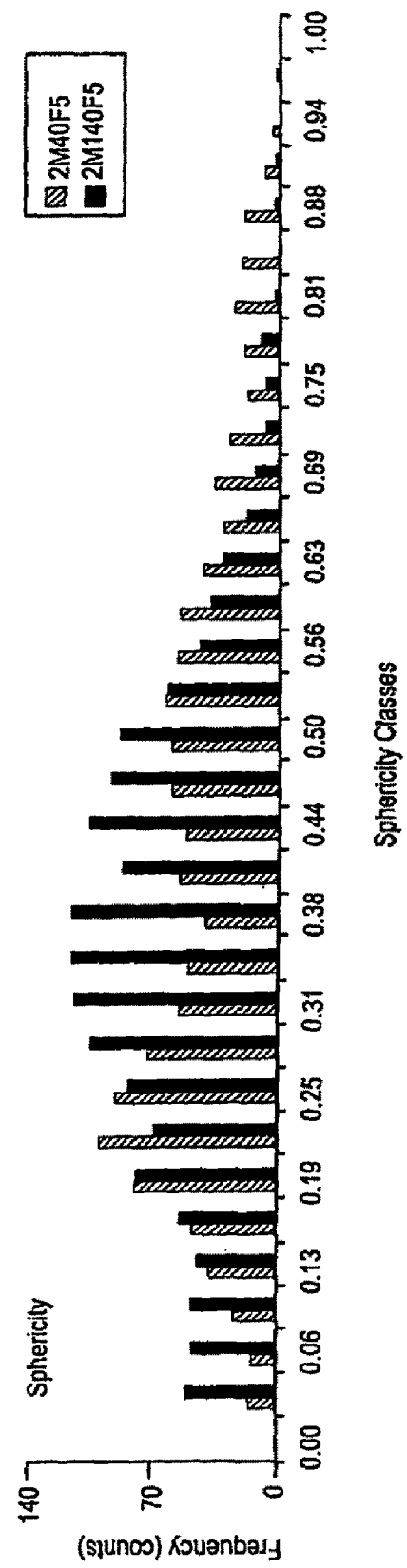
Figure 15A:
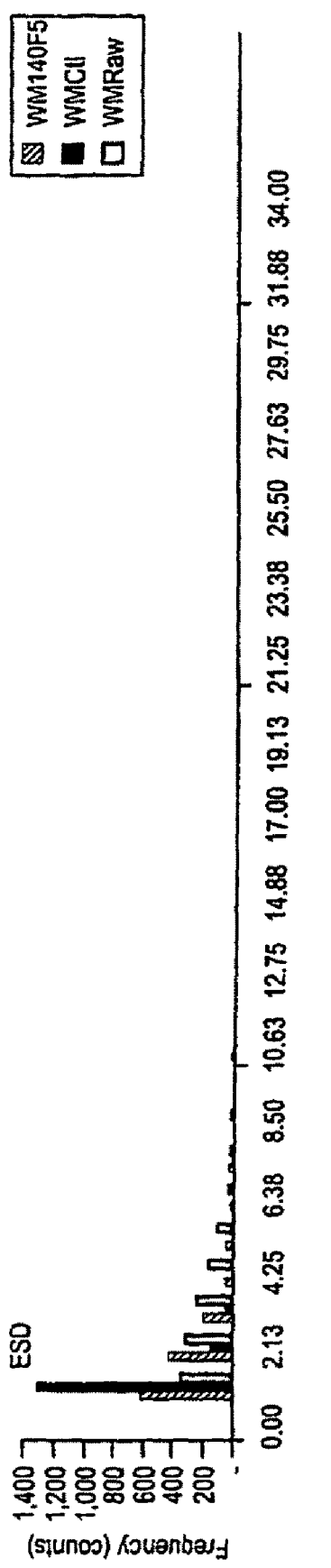
Figure 15B:
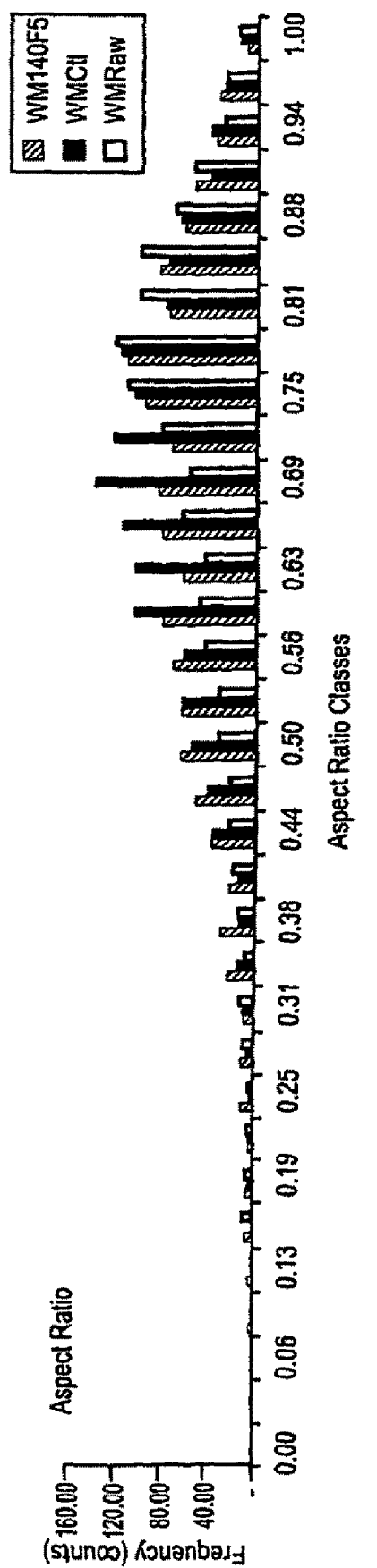
Figure 15C:
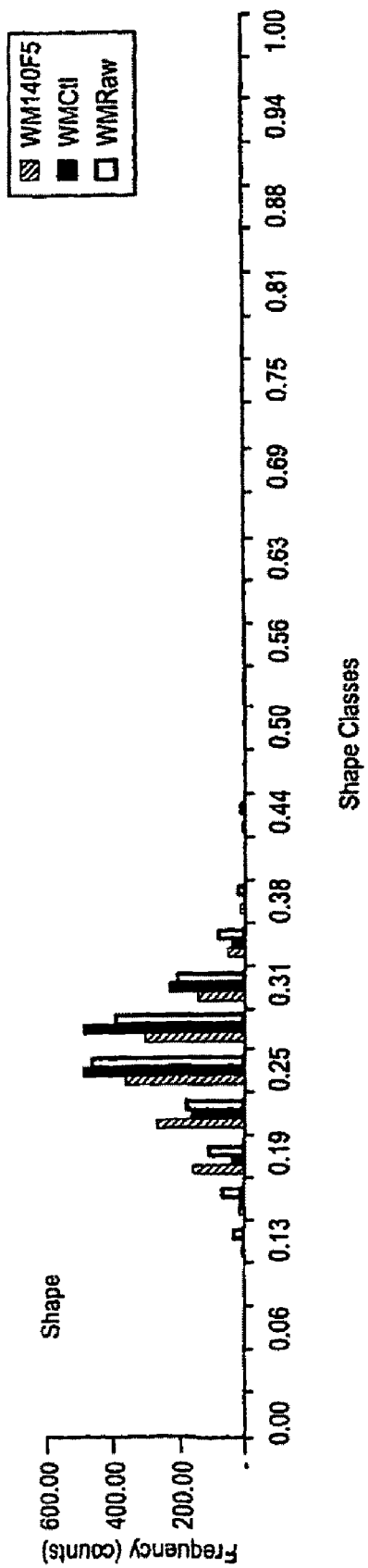
Figure 15D:
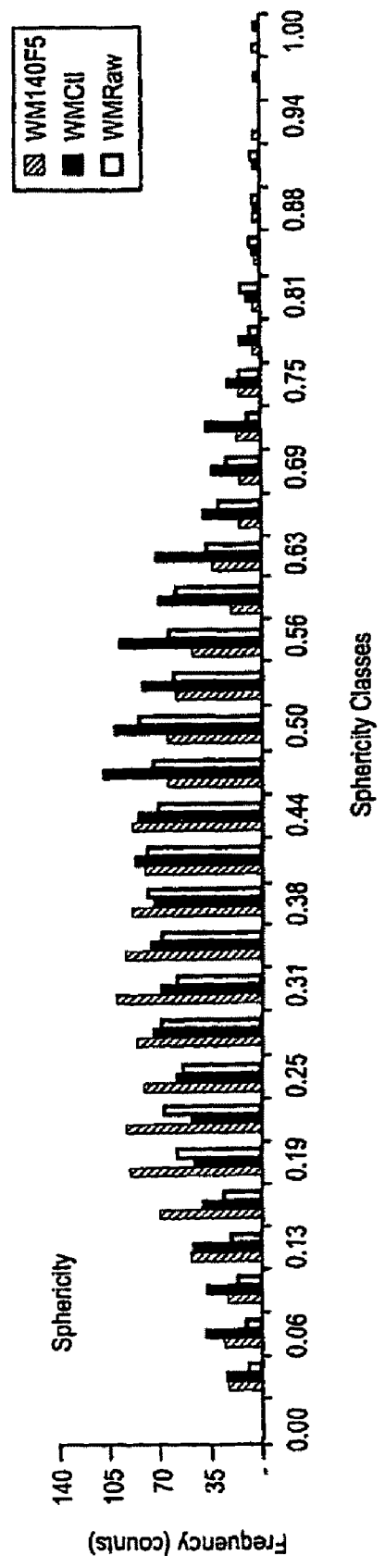
Figure 16A:
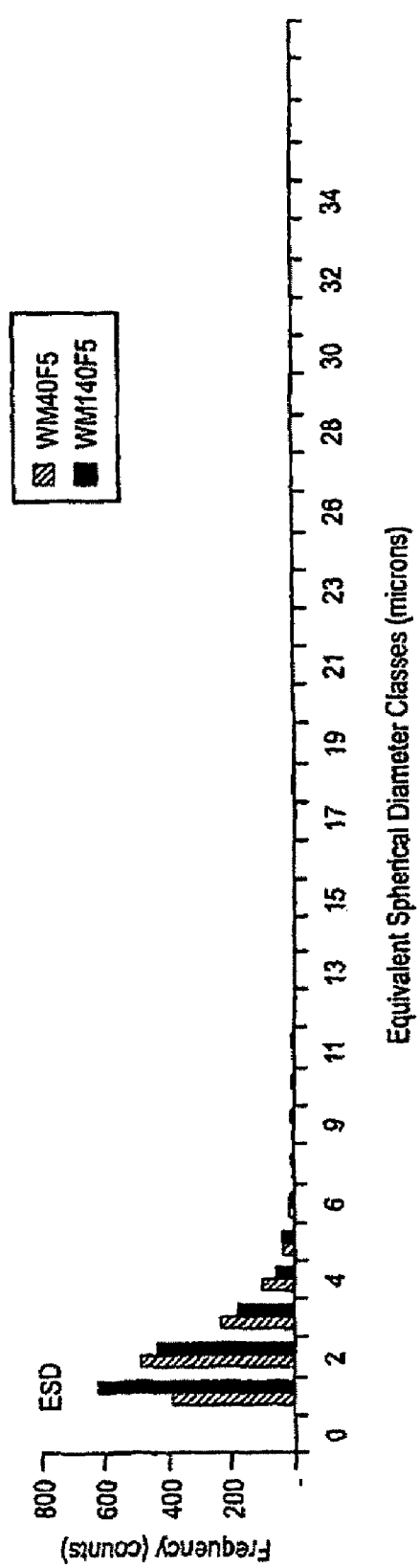
Figure 16B:
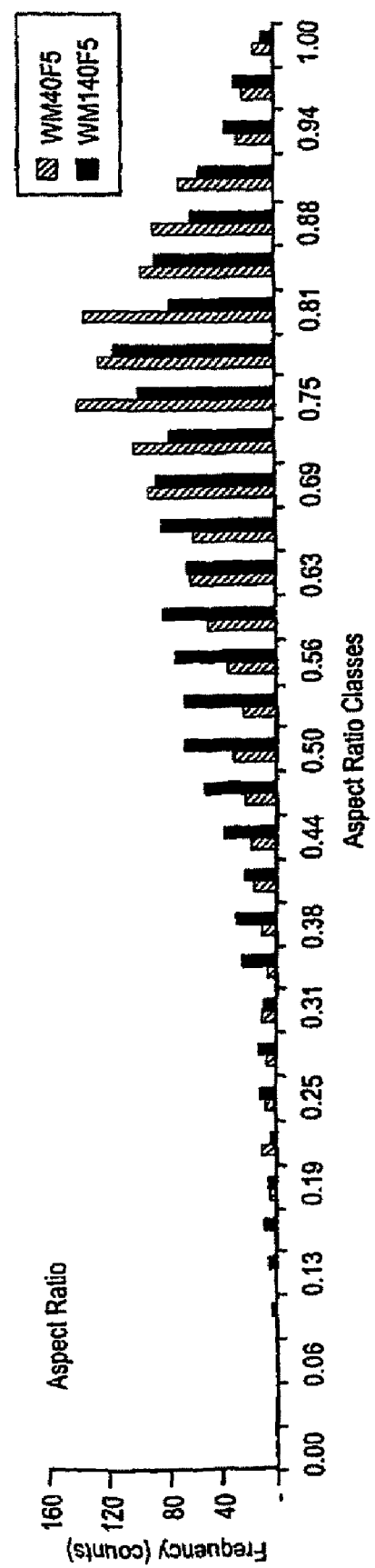
Figure 16C:
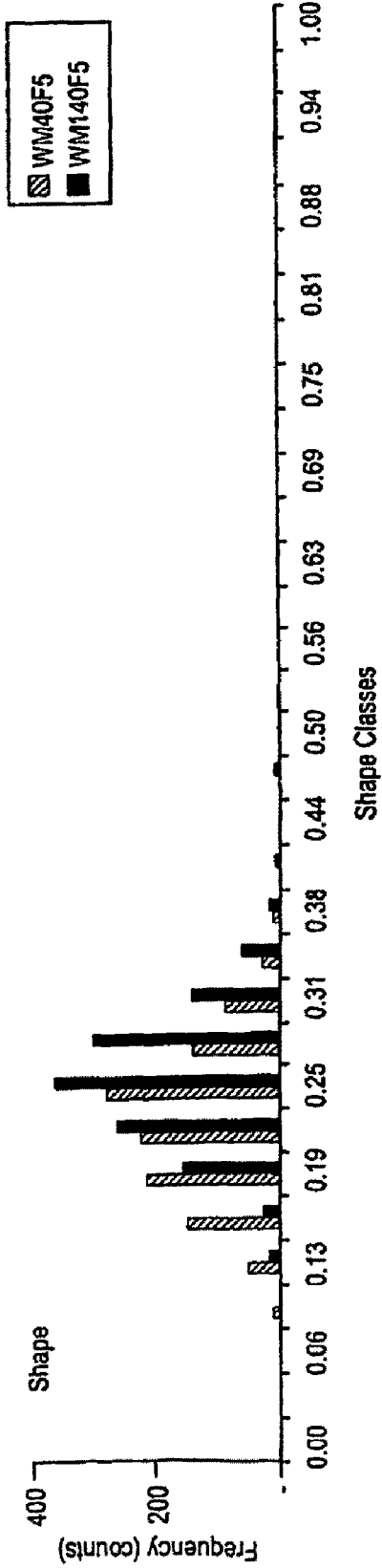
Figure 16D:
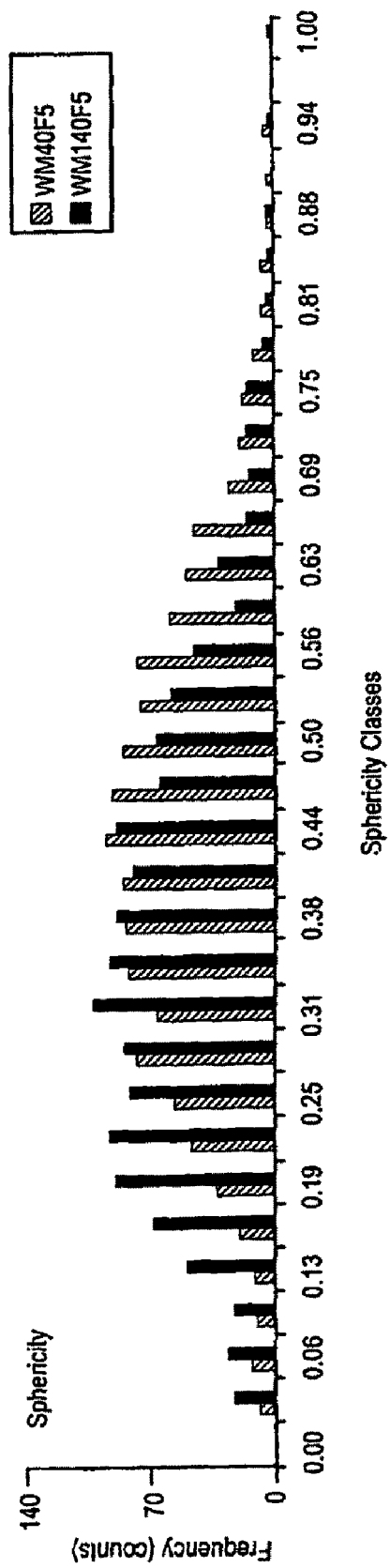
Figure 17A:
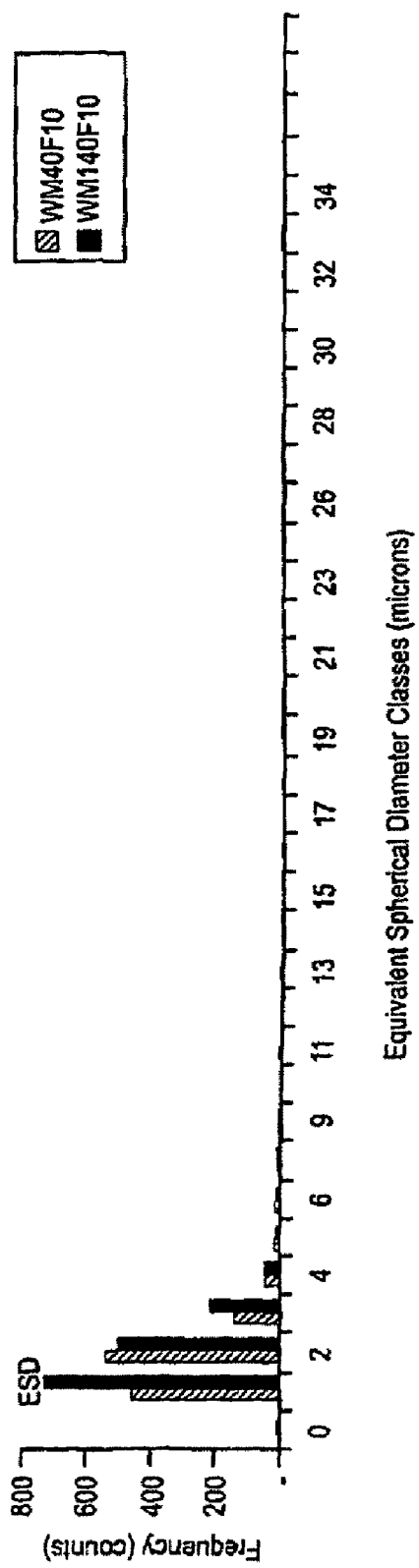
Figure 17B:
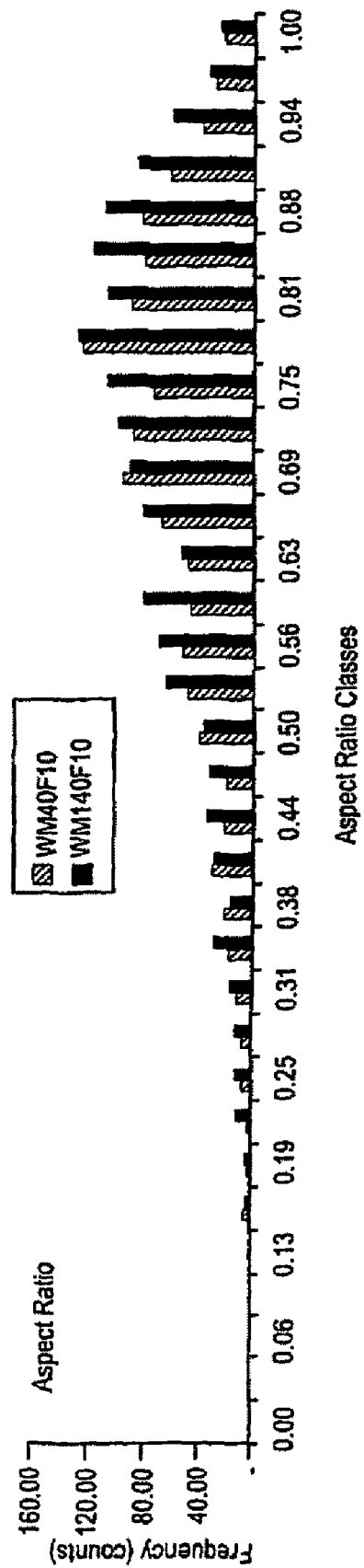
Figure 18A:
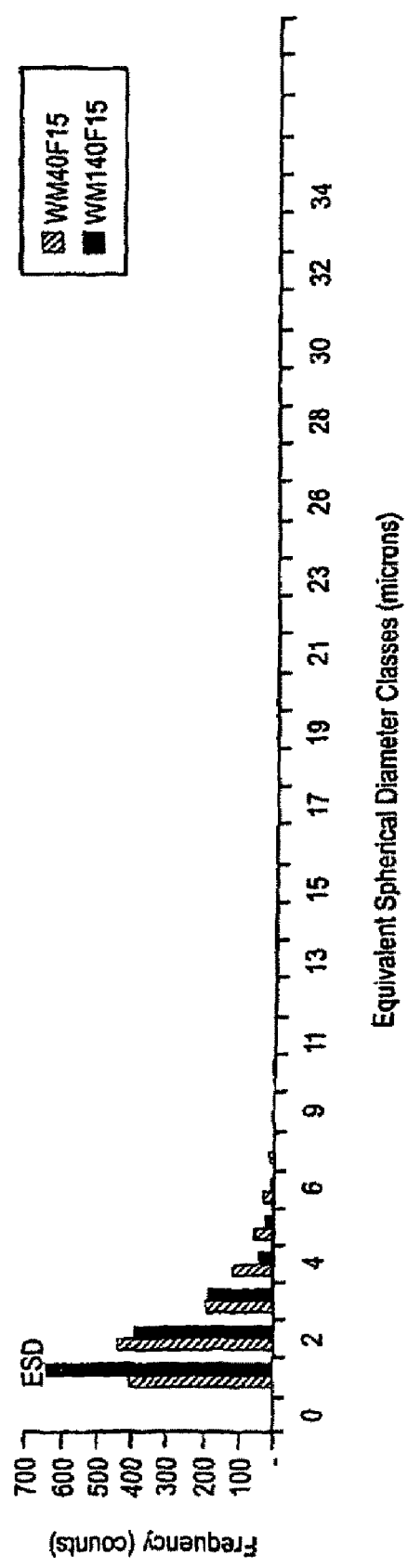
Figure 18B:
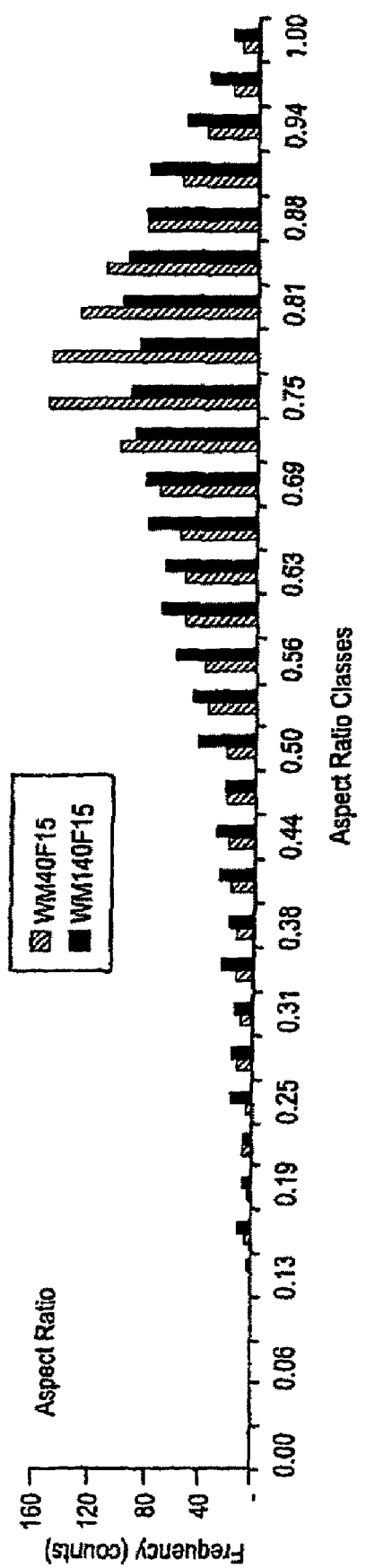
Figure 18C:
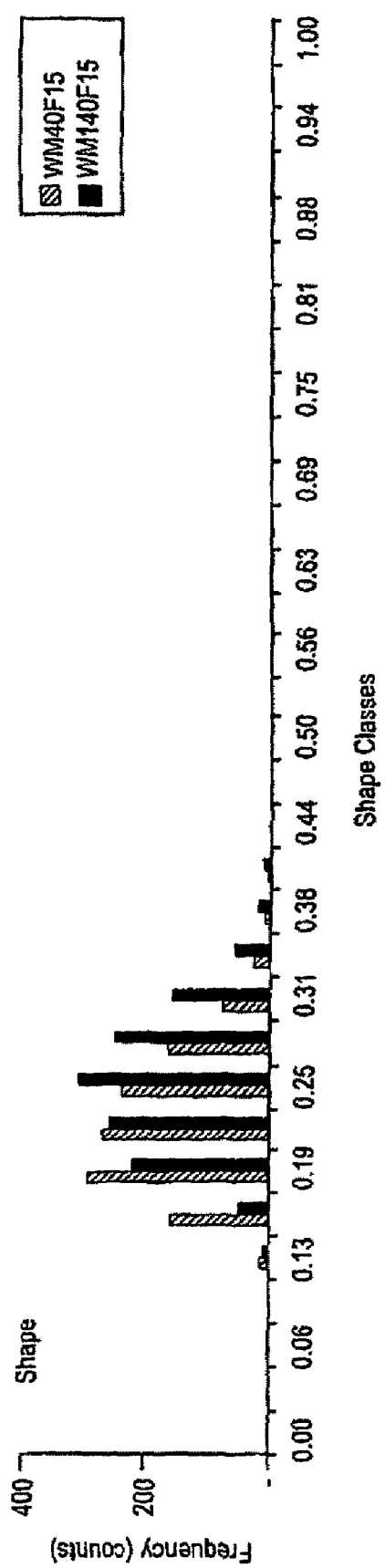
Figure 18D:
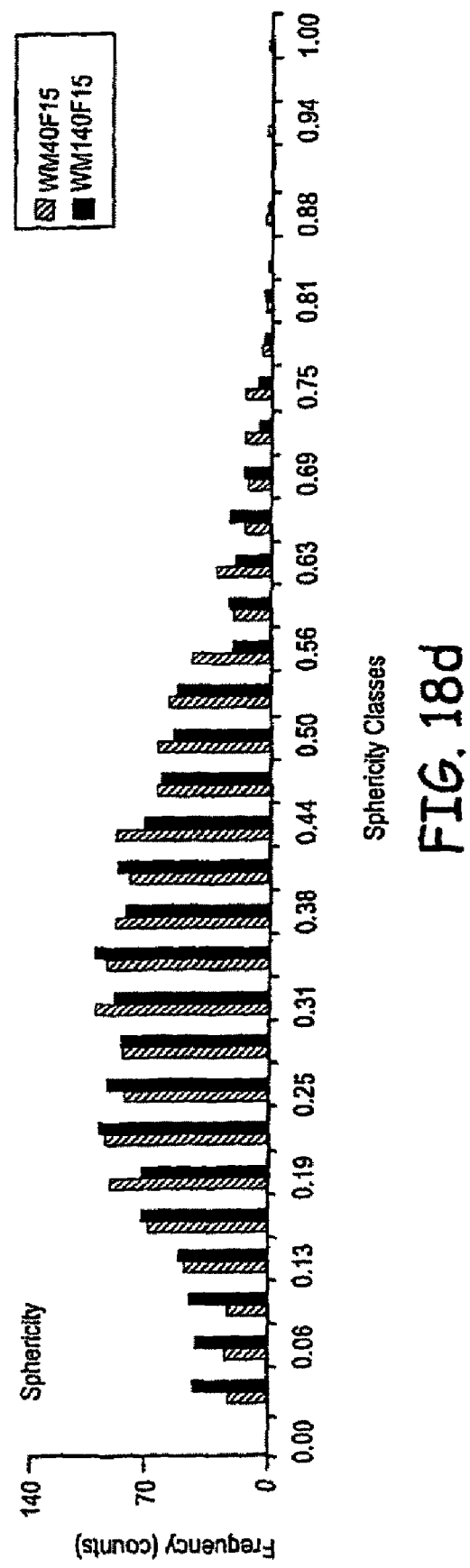
Figure 19C:
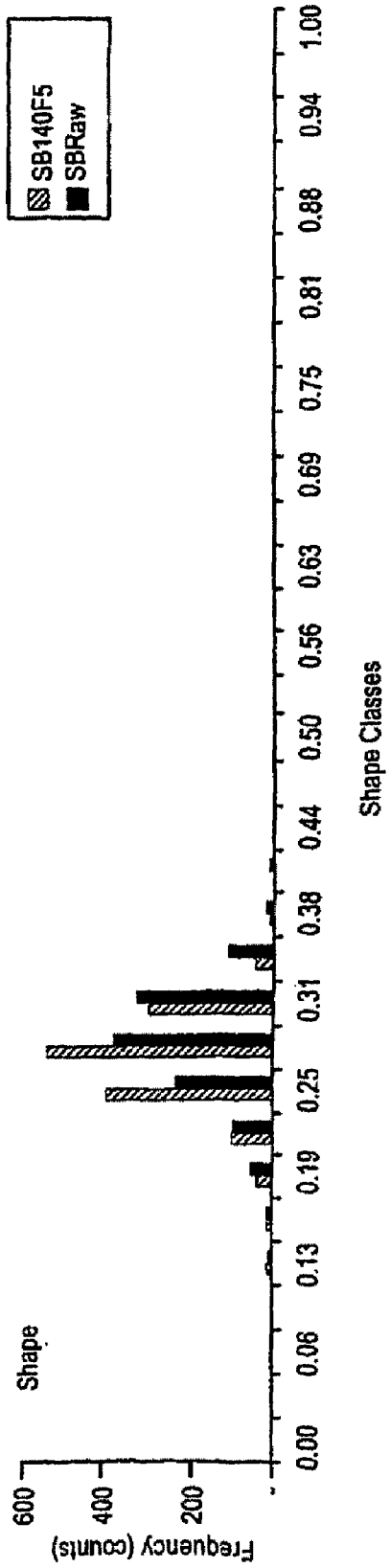
Figure 19D:
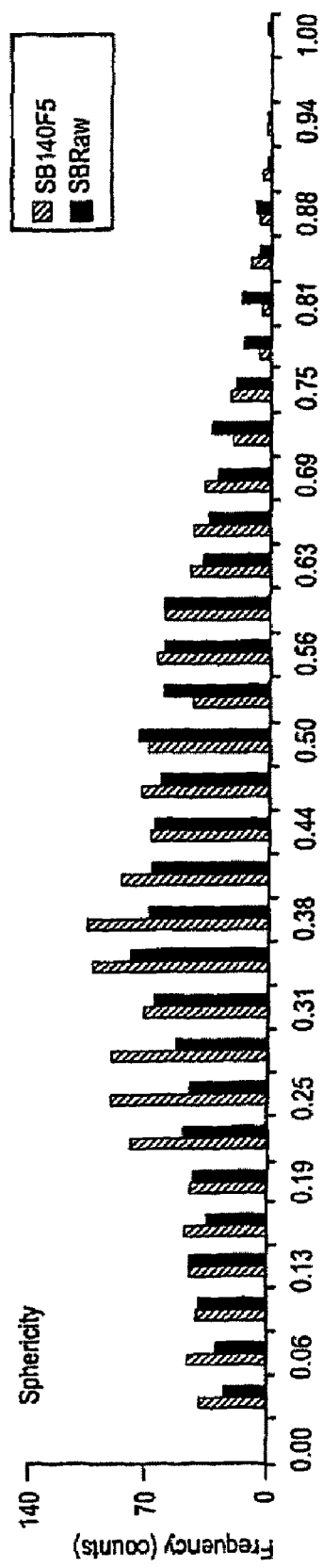
Figure 20A:
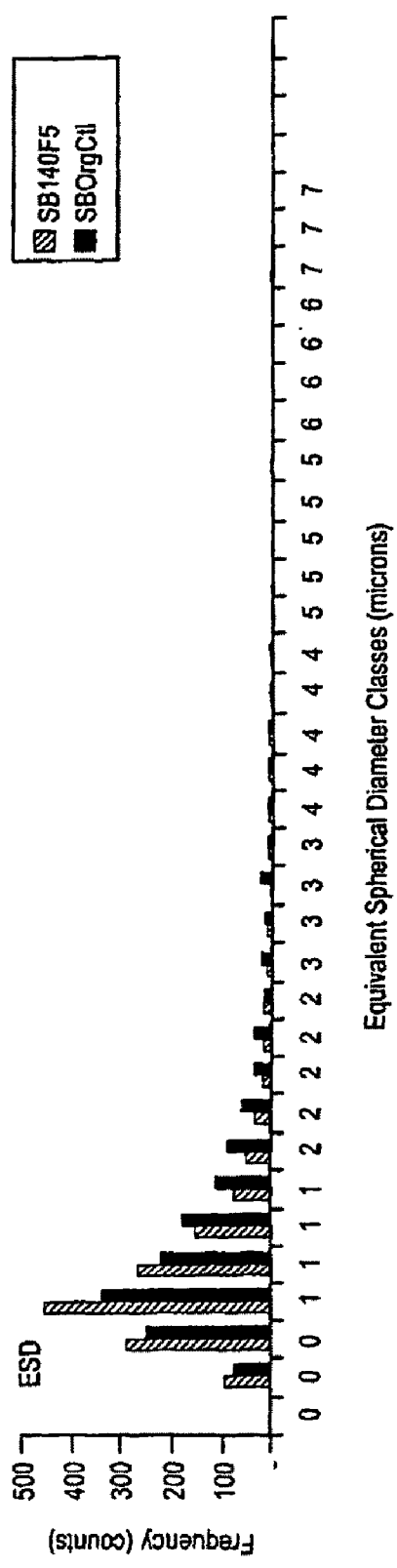
Figure 20B:
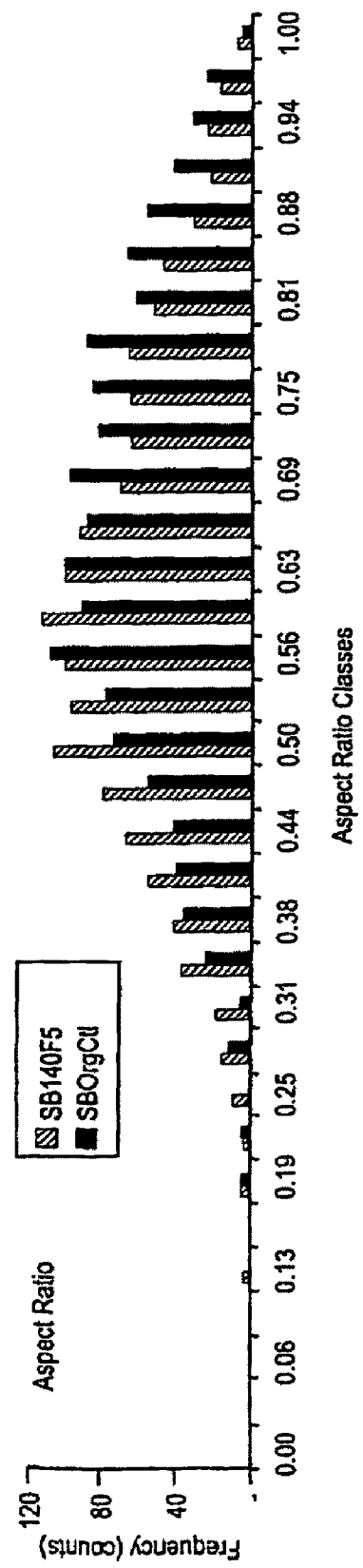
Figure 20C:
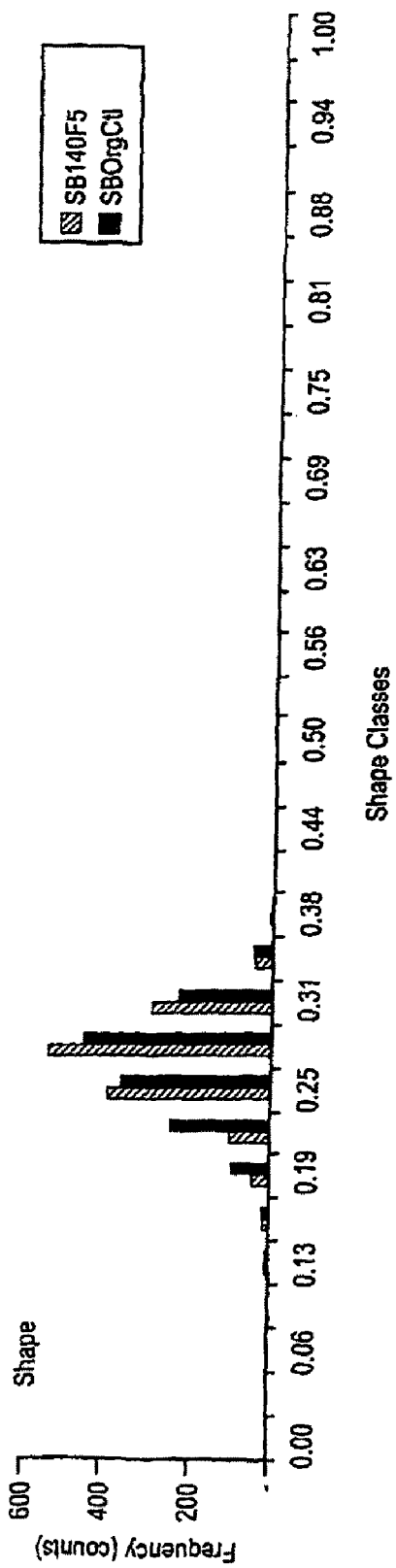
Figure 20D:
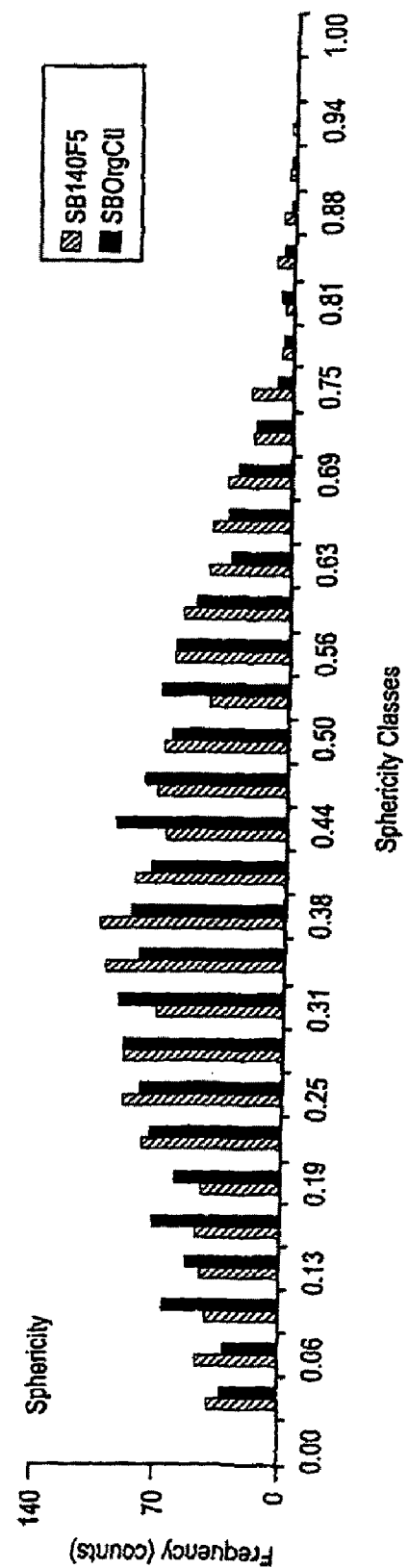
Figure 21A:
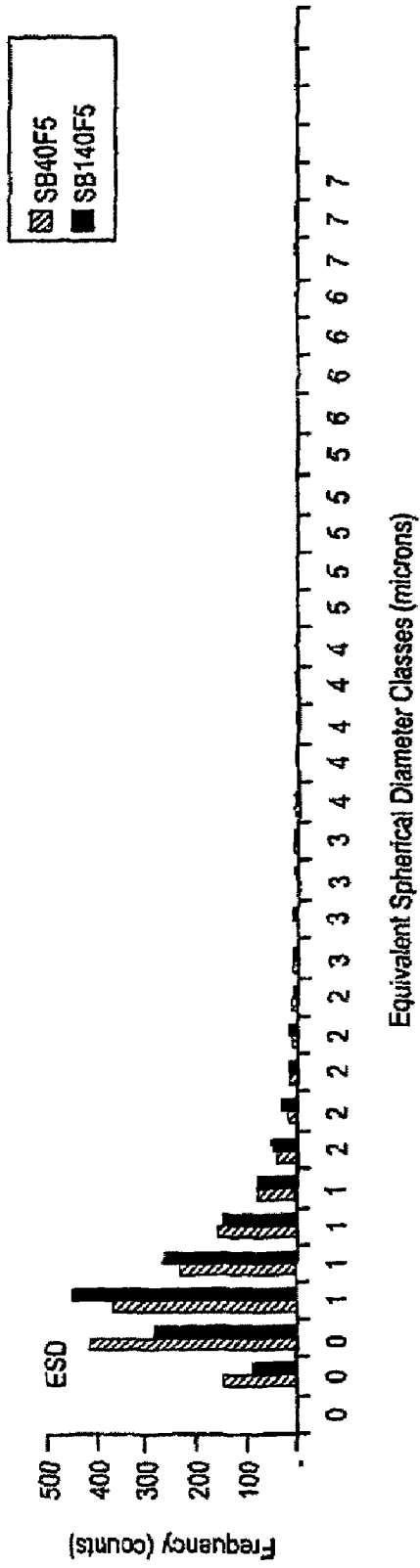
Figure 21B:
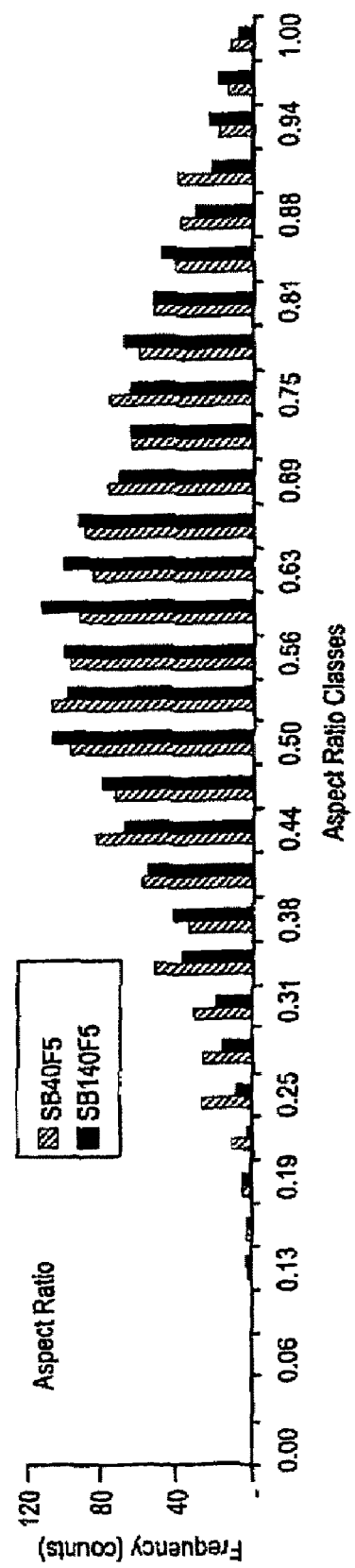
Figure 21C:
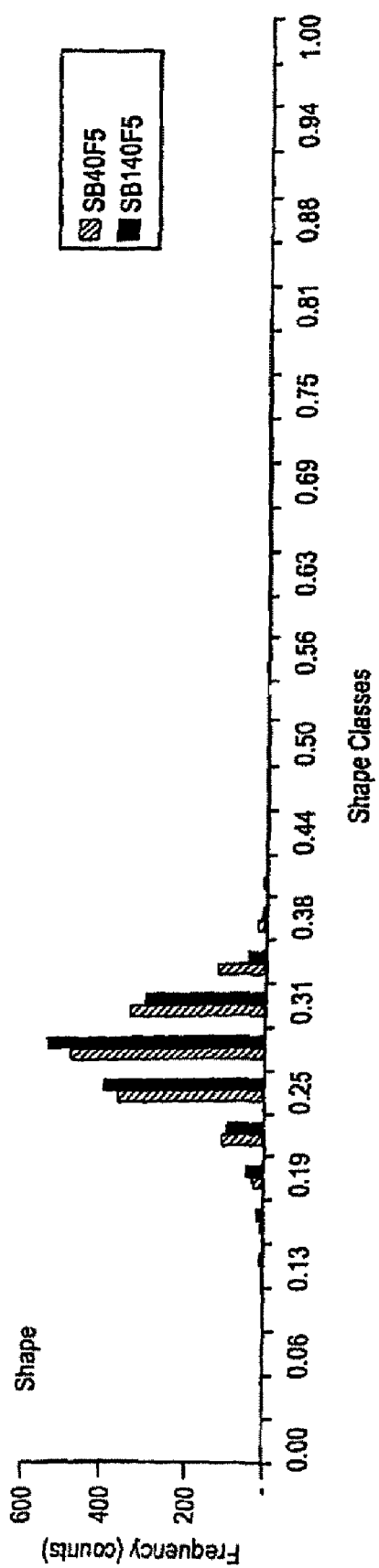
Figure 21D:
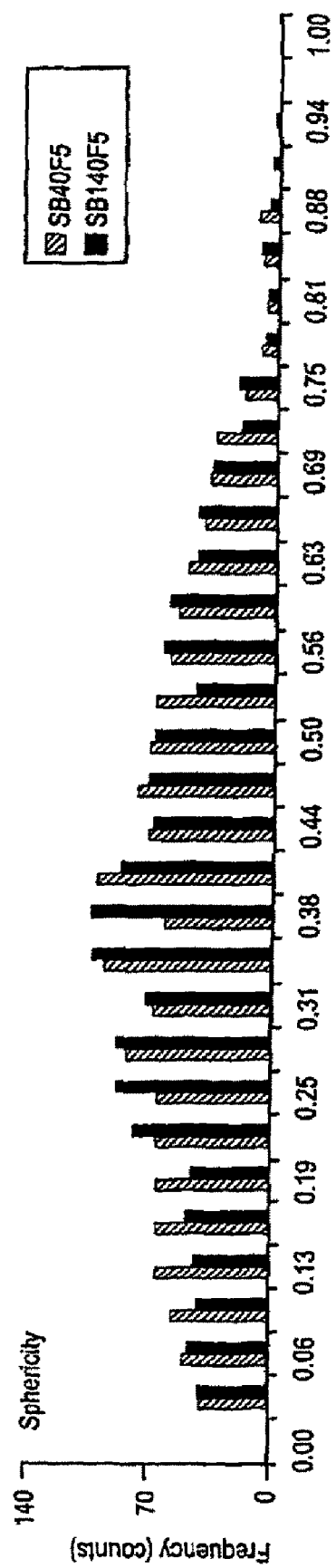
Figure 22C:
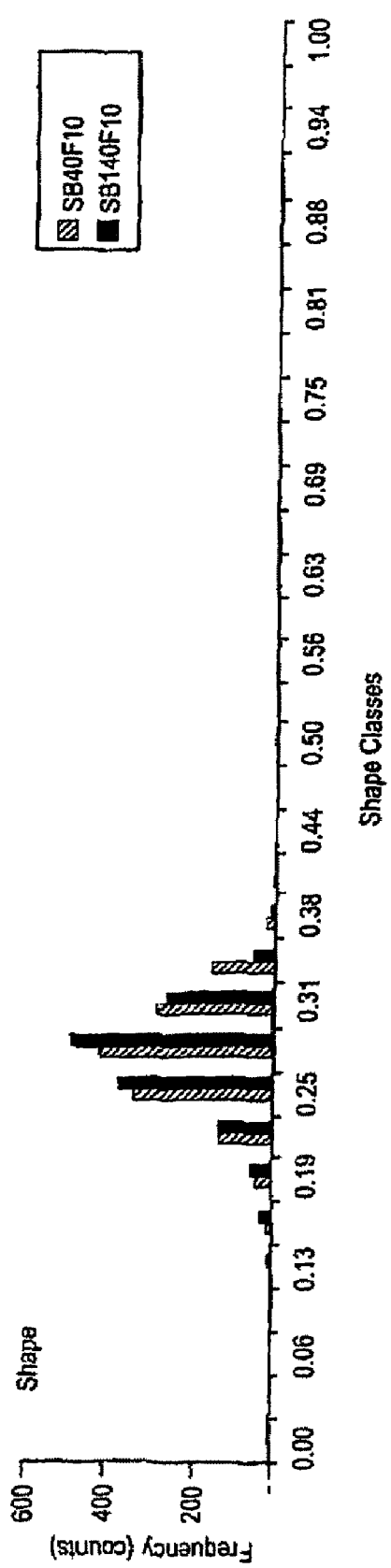
Figure 22D:
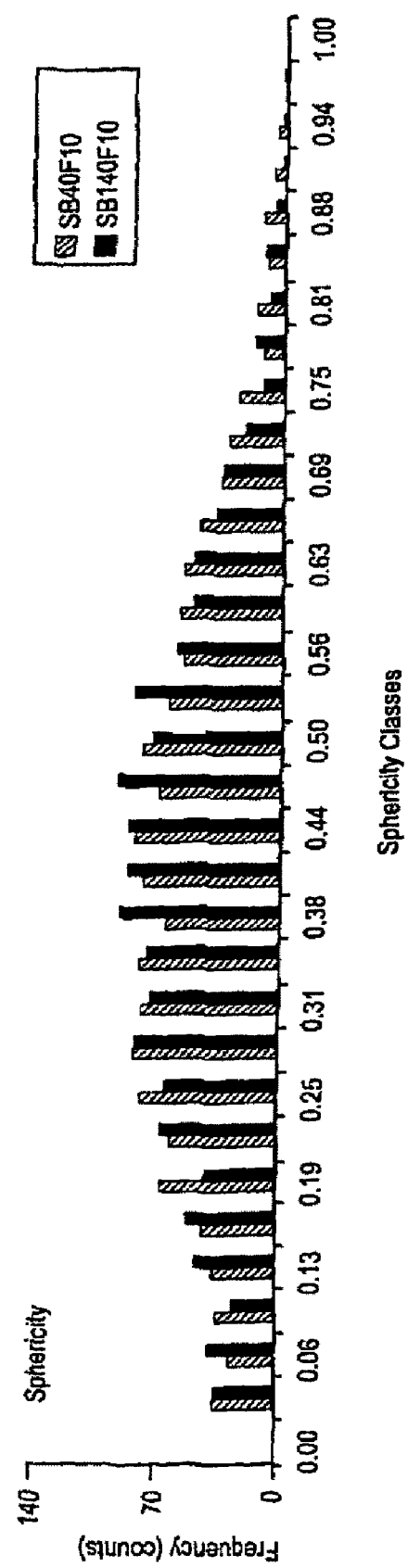
Figure 23A:
Figure 23B:
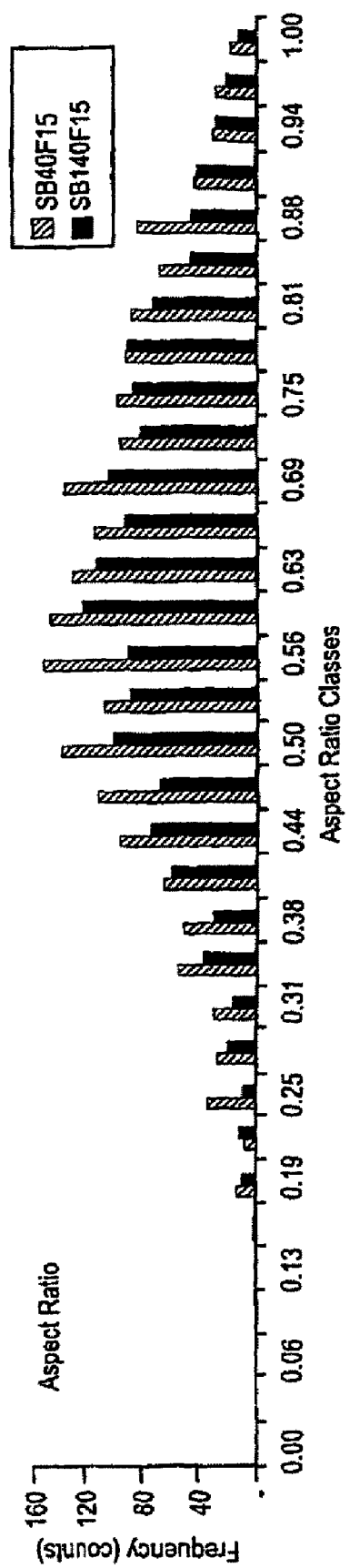
Figure 23C:
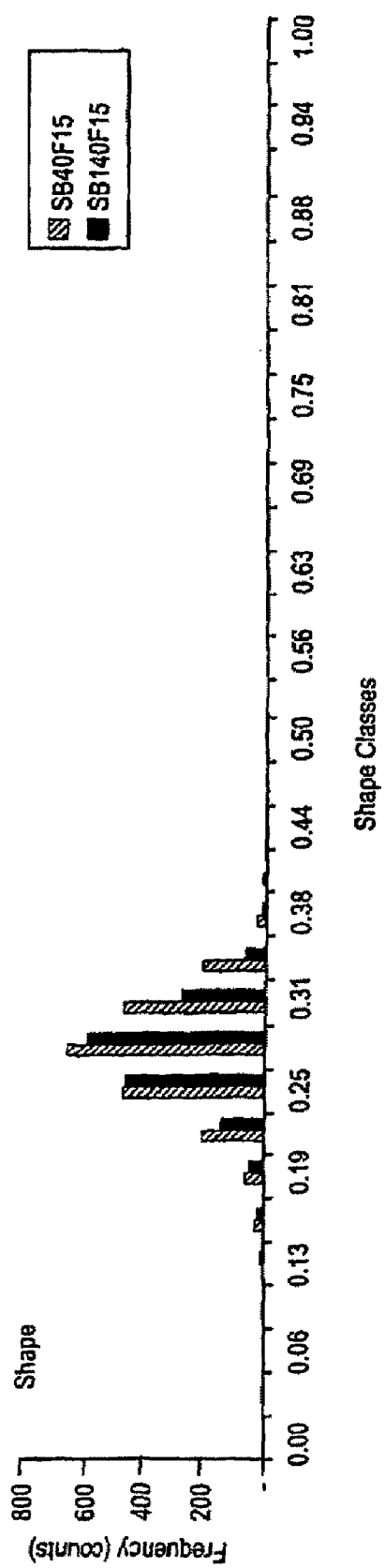
Figure 23D:
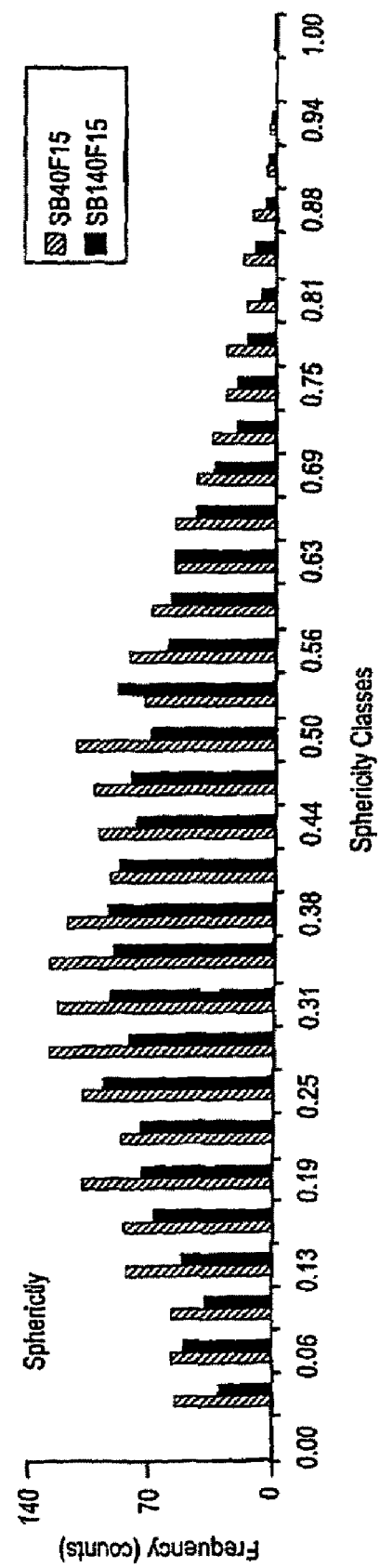

FIG. 8 shows the grand radial plots of the samples evaluated in Examples 1 and 2.

EXAMPLE 3

Milk samples were evaluated for size and shape parameters of the milkfat globules after treatment with ultrasound energy at various temperatures and ultrasound treatment times. The test samples were treated with ultrasound at a frequency of 24 kHz. The control samples were treated using a standard batch homogenization process. The products evaluated included whole milk, 2% milk, 1% milk, and soy milk. The results are shown in FIG. 9, which is a table summarizing the shape analysis, and FIG. 10, which is a table showing the size analysis.

The data from Example 3 are graphically represented in FIGS. 11-20, as follows:

FIGS. 11a-d compare size and shape parameters for milkfat globules in 1% milk treated with ultrasound for 5 seconds at 140° F. (Sample "1M140F5"), to milkfat globules in the 1% milk control sample (Sample "1MCtl").

FIGS. 12a-d compare the size and shape parameters of milkfat globules in 1% milk treated with ultrasound for 5 seconds at 40° F. (Sample "1M40F5"), to milkfat globules in 1% milk treated with ultrasound for 5 seconds at 140° F. (Sample "1M140F5").

FIGS. 13a-d compare the size and shape parameters of milkfat globules in 2% milk treated with ultrasound for 5 seconds at 140° F. (Sample "2M140F5"), to milkfat globules in the 2% milk control sample (Sample "2MCtl").

FIGS. 14a-d compare the size and shape parameters of milkfat globules in 2% milk treated with ultrasound for 5 seconds at 40° F. (Sample "2M40F5"), to milkfat globules in 2% milk treated with ultrasound for 5 seconds at 140° F. (Sample "2M140F5").

FIGS. 15a-d compare the size and shape parameters of milkfat globules in whole milk treated with ultrasound for 5 seconds at 140° F. (Sample "WM140F5"), to milkfat globules in the whole milk control sample (Sample "WMCtl"), and the untreated whole milk sample (Sample "WMRaw").

FIGS. 16a-d compare the size and shape parameters of milkfat globules in whole milk treated with ultrasound for 5 seconds at 40° F. (Sample "WM40F5"), to milkfat globules in whole milk treated with ultrasound for 5 seconds at 140° F. (Sample "WM140F5").

FIGS. 17a-d compare the size and shape parameters of milkfat globules in whole milk treated with ultrasound for 10 seconds at 40° F. (Sample "WM40F10"), to milkfat globules in whole milk treated with ultrasound for 10 seconds at 140° F. (Sample "WM140F10").

FIGS. 18a-d compare the size and shape parameters of milkfat globules in whole milk treated with ultrasound for 15 seconds at 40° F. (Sample "WM40F15"), to milkfat globules in whole milk treated with ultrasound for 15 seconds at 140° F. (Sample "WM140F15").

FIGS. 19a-d compare the size and shape parameters of fat globules in soy milk base treated with ultrasound for 5 seconds at 140° F. (Sample "SB140F5"), to fat globules in untreated soy milk base (Sample "SBRaw").

FIGS. 20a-d compare the size and shape parameters of fat globules in soy milk base treated with ultrasound for 5 seconds at 140° F. (Sample "SB140F5"), to fat globules in soy milk base treated using a conventional homogenization system (Sample "SBOrgCtl").

FIGS. 21a-d compare the size and shape parameters of fat globules in soy milk base treated with ultrasound for 5 seconds at 40° F. (Sample "SB40F5"), to fat globules in soy milk base treated with ultrasound for 5 seconds at 140° F. (Sample "SB140F5").

FIGS. 22a-d compare the size and shape parameters of fat globules in soy milk base treated with ultrasound for 10 seconds at 40° F. (Sample "SB40F10"), to fat globules in soy milk base treated with ultrasound for 10 seconds at 140° F. (Sample "SB140F10").

FIGS. 23a-d compare the size and shape parameters of fat globules in soy milk base treated with ultrasound for 15 seconds at 40° F. (Sample "SB40F15"), to fat globules in soy milk base treated with ultrasound for 15 seconds at 140° F. (Sample "SB140F15").

As can be seen from the foregoing, the various samples show differences from the non-ultrasound treated samples at the 99% confidence level. These differences are consistent between time and temperature variables, and between 2%, 1% and whole milk. It is believed that these differences will remain consistent across various products and various fat levels. The following is a description of the techniques used to generate and analyze the data.

Images of samples of dairy and soy products were obtained using several different optical techniques. Either a phase-contrast technique was used or a modified dark field technique augmented by reverse video with threshold was used to image the majority of the samples having submicron components. The maximum optical system resolution with this particular technique and hardware components was approximately 0.15-0.2 microns. For samples having average particle sizes greater than 2.0 microns sample images were obtained using a brightfield technique with threshold. The data were analyzed using the Powder WorkBench 32™ Particle Size and Shape Analyzer, available from Particle Characterization Measurements, Inc., Iowa City, Iowa.

Chi_Square Test: The basic idea behind the chi-square goodness of fit test is to divide the range of the data into a number of intervals. Then the number of points that fall into each interval is compared to expected number of points for that interval if the data in fact come from the hypothesized distribution. More formally, the chi-square goodness of fit test statistic can be defined as follows.

| | |
|---|---|
| $H_0$: | The data follow the specified distribution. |
| $H_a$: | The data do not follow the specified distribution. |
| Test Statistic: | For the chi-square goodness of fit, the data is divided into k bins and the test statistic is defined as $$\chi^2 = \sum_{i=1}^{k} (O_i - E_i)^2 / E_i$$ where $O_i$ is the observed frequency for bin i and $E_i$ is the expected frequency for bin i. The expected frequency is calculated by $E_i = F(Y_u) - F(Y_l)$ where F is the cumulative distribution function for the distribution being tested, $Y_u$ is the upper limit for class i, and $Y_l$ is the lower limit for class i. |
| Significance Level: $\alpha$ | |
| Critical Region: | The test statistic follows, approximately, a chi-square distribution with (k − c) degrees of freedom where k is the number of non-empty cells and c = the number of parameters. The hypothesis that the distribution is from the specified distribution is rejected if $\chi^2 > \chi^2_{(1-\alpha,k-c)}$ where $\chi^2_{(1-\alpha,k-c)}$ is the chi-square percent point function with k − c degrees of freedom and a significance level of $\alpha$. |

The primary advantage of the chi square goodness of fit test is that it is quite general. It can be applied for any distribution, either discrete or continuous, for which the cumulative distribution function can be computed.

In the analysis of the milk and soy samples k−c=32 (# of bins) and the significance level $\alpha$=99% (i.e. confidence level) resulting in a critical Chi-square values of ~53.49 etc as shown in the Figures.

EXAMPLE 4

Using the techniques described above, a number of yogurt-based beverages were evaluated and treated in accordance with the present invention. The particle morphology of the fat component of these beverages was evaluated and modified to improve the functional and organoleptic properties of the beverages. Yogurt-based beverages made in accordance with the present invention had an improved creaminess and a better mouthfeel than products made with conventional methods.

The resulting yogurt beverages were evaluated for particle morphology parameters as described above. The data are summarized in the tables below and the percent differences at each interval between the control and the products made in accordance with the present invention are graphically represented in FIGS. 24 a-c to 31 a-c. As can been seen from this data, products made in accordance with the present invention have a significant increase in particles within the specified ranges for each morphological parameter, and the distribution of particles within the ranges is more uniform than the overall particle distribution of the control product.

In the tables below and the corresponding figures, 5001 refers to the control yogurt beverage product which was processed using conventional homogenization methods. The fat content of the yogurt beverage was 1.5%. Samples 5004, 5005 and 5006 were the same yogurt beverage but processed under different conditions to optimize particle morphology and resulting functional and organoleptic characteristics. Sample 5004 was treated at about 60° F. with ultrasound energy in a continuous system as described previously, having a sonic area of about 9 cm², at 61 watts and at an intensity of 7.33 watts/cm² and at 50% amplitude, at a flow rate of 0.25 gallons per minute, under a system pressure of about 21 pounds/in² (psi) with no back pressure. Sample 5005 was treated similar to Sample 5004, but with 107 watts of ultrasound energy at 80% amplitude, with an intensity of 11.78 watts/cm², at a flow rate of 0.27 gallons per minute, under a system pressure of about 22 psi with no back pressure. Sample 5006 was treated similar to Sample 5005, but with 170 watts of ultrasound energy at 100% amplitude, and an intensity of 14.22 watts/cm². As used herein, "percent difference" was calculated by determining the percent of particles in each class based on the total particles of the test sample, then subtracting from that the percent of particles in the same class for the control product, then dividing by the test sample percent value and multiplying by 100:

[(Test percent−control percent)/test percent]× 100=Percent Difference

TABLE 1

| Yogurt Beverage Fat Equivalent Spherical Diameter Analysis ||||||||
|---|---|---|---|---|---|---|---|
| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
| 0.00 | 0 | 0 | 0 | 0 | 0.00 | | | |
| 0.08 | 3 | 6 | 2 | 3 | 0.08 | 47% | −64% | −21% |
| 0.16 | 10 | 7 | 2 | 5 | 0.16 | −52% | −446% | −142% |
| 0.24 | 15 | 20 | 4 | 15 | 0.24 | 20% | −309% | −21% |
| 0.32 | 27 | 20 | 15 | 23 | 0.32 | −44% | −96% | −42% |
| 0.40 | 42 | 28 | 22 | 35 | 0.40 | −60% | −108% | −45% |
| 0.48 | 89 | 57 | 38 | 72 | 0.48 | −67% | −156% | −49% |
| 0.56 | 98 | 64 | 68 | 100 | 0.56 | −63% | −57% | −18% |

TABLE 1-continued

Yogurt Beverage Fat Equivalent Spherical Diameter Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 0.64 | 98 | 49 | 71 | 102 | 0.64 | −113% | −51% | −16% |
| 0.72 | 72 | 64 | 58 | 73 | 0.72 | −20% | −35% | −19% |
| 0.80 | 47 | 42 | 76 | 83 | 0.80 | −19% | 33% | 32% |
| 0.88 | 56 | 59 | 86 | 80 | 0.88 | −1% | 29% | 15% |
| 0.96 | 50 | 51 | 70 | 71 | 0.96 | −5% | 22% | 15% |
| 1.04 | 47 | 43 | 77 | 65 | 1.04 | −17% | 33% | 13% |
| 1.12 | 49 | 49 | 73 | 54 | 1.12 | −7% | 27% | −10% |
| 1.20 | 44 | 43 | 65 | 53 | 1.20 | −9% | 26% | 0% |
| 1.28 | 36 | 44 | 61 | 66 | 1.28 | 13% | 36% | 34% |
| 1.36 | 38 | 38 | 81 | 58 | 1.36 | −7% | 49% | 21% |
| 1.44 | 38 | 49 | 72 | 60 | 1.44 | 17% | 42% | 24% |
| 1.52 | 23 | 33 | 48 | 40 | 1.52 | 26% | 48% | 31% |
| 1.60 | 22 | 46 | 56 | 39 | 1.60 | 49% | 57% | 32% |
| 1.68 | 26 | 51 | 38 | 37 | 1.68 | 46% | 25% | 15% |
| 1.76 | 24 | 39 | 30 | 31 | 1.76 | 34% | 13% | 6% |
| 1.84 | 23 | 22 | 24 | 34 | 1.84 | −12% | −5% | 18% |
| 1.92 | 26 | 38 | 13 | 22 | 1.92 | 27% | −118% | −43% |
| 2.00 | 16 | 32 | 4 | 24 | 2.00 | 47% | −337% | 19% |
| 2.08 | 10 | 24 | 6 | 14 | 2.08 | 56% | −82% | 14% |
| 2.16 | 12 | 26 | 5 | 14 | 2.16 | 51% | −162% | −4% |
| 2.24 | 6 | 23 | 4 | 7 | 2.24 | 72% | −64% | −4% |
| 2.32 | 9 | 16 | 5 | 7 | 2.32 | 40% | −96% | −55% |
| 2.40 | 4 | 15 | 0 | 7 | 2.40 | 72% | 0% | 31% |
| 2.48 | 4 | 10 | 1 | 3 | 2.48 | 57% | −337% | −61% |
| 2.56 | 3 | 10 | 3 | 4 | 2.56 | 68% | −9% | 9% |
| 2.64 | 4 | 5 | 4 | 2 | 2.64 | 15% | −9% | −142% |
| 2.72 | 3 | 6 | 0 | 3 | 2.72 | 47% | 0% | −21% |
| 2.80 | 1 | 9 | 0 | 0 | 2.80 | 88% | 0% | 0% |
| 2.88 | 3 | 2 | 0 | 1 | 2.88 | −60% | 0% | −262% |
| 2.96 | 1 | 6 | 0 | 1 | 2.96 | 82% | 0% | −21% |
| 3.04 | 0 | 3 | 0 | 0 | 3.04 | 100% | 0% | 0% |
| 3.12 | 2 | 0 | 0 | 0 | 3.12 | 0% | 0% | 0% |
| 3.20 | 0 | 1 | 0 | 0 | 3.20 | 100% | 0% | 0% |
| 3.28 | 0 | 3 | 0 | 0 | 3.28 | 100% | 0% | 0% |
| 3.36 | 1 | 0 | 0 | 0 | 3.36 | 0% | 0% | 0% |
| 3.44 | 0 | 0 | 0 | 0 | 3.44 | 0% | 0% | 0% |
| 3.52 | 0 | 0 | 0 | 0 | 3.52 | 0% | 0% | 0% |
| 3.60 | 0 | 1 | 0 | 0 | 3.60 | 100% | 0% | 0% |
| 3.68 | 1 | 0 | 0 | 0 | 3.68 | 0% | 0% | 0% |
| 3.76 | 0 | 1 | 0 | 0 | 3.76 | 100% | 0% | 0% |
| 3.84 | 0 | 0 | 0 | 0 | 3.84 | 0% | 0% | 0% |
| 3.92 | 0 | 0 | 0 | 0 | 3.92 | 0% | 0% | 0% |
| 4.00 | 0 | 0 | 0 | 0 | 4.00 | 0% | 0% | 0% |
| 4.08 | 0 | 0 | 0 | 0 | 4.08 | 0% | 0% | 0% |
| 4.16 | 0 | 0 | 0 | 0 | 4.16 | 0% | 0% | 0% |
| 4.24 | 0 | 0 | 0 | 0 | 4.24 | 0% | 0% | 0% |
| 4.32 | 0 | 1 | 0 | 0 | 4.32 | 100% | 0% | 0% |
| 4.40 | 0 | 0 | 0 | 0 | 4.40 | 0% | 0% | 0% |
| 4.48 | 0 | 0 | 0 | 0 | 4.48 | 0% | 0% | 0% |
| 4.56 | 0 | 0 | 0 | 0 | 4.56 | | | |
| 4.64 | 0 | 0 | 0 | 0 | 4.64 | | | |
| 4.72 | 0 | 0 | 0 | 0 | 4.72 | | | |
| 4.80 | 0 | 0 | 0 | 0 | 4.80 | | | |
| 4.88 | 0 | 0 | 0 | 0 | 4.88 | | | |
| 4.96 | 0 | 0 | 0 | 0 | 4.96 | | | |
| 5.04 | 0 | 0 | 0 | 0 | 5.04 | | | |
| 5.12 | 0 | 0 | 0 | 0 | 5.12 | | | |
| 5.20 | 0 | 0 | 0 | 0 | 5.20 | | | |
| 5.28 | 0 | 0 | 0 | 0 | 5.28 | | | |
| 5.36 | 0 | 0 | 0 | 0 | 5.36 | | | |
| 5.44 | 0 | 0 | 0 | 0 | 5.44 | | | |
| 5.52 | 0 | 0 | 0 | 0 | 5.52 | | | |
| 5.60 | 0 | 0 | 0 | 0 | 5.60 | | | |
| 5.68 | 0 | 0 | 0 | 0 | 5.68 | | | |
| 5.76 | 0 | 0 | 0 | 0 | 5.76 | | | |
| 5.84 | 0 | 0 | 0 | 0 | 5.84 | | | |
| 5.92 | 0 | 0 | 0 | 0 | 5.92 | | | |
| 6.00 | 0 | 0 | 0 | 0 | 6.00 | | | |
| 6.08 | 0 | 0 | 0 | 0 | 6.08 | | | |
| 6.16 | 0 | 0 | 0 | 0 | 6.16 | | | |
| 6.24 | 0 | 0 | 0 | 0 | 6.24 | | | |
| 6.32 | 0 | 0 | 0 | 0 | 6.32 | | | |
| 6.40 | 0 | 0 | 0 | 0 | 6.40 | | | |

TABLE 1-continued

Yogurt Beverage Fat Equivalent Spherical Diameter Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 6.48 | 0 | 0 | 0 | 0 | 6.48 | | | |
| 6.56 | 0 | 0 | 0 | 0 | 6.56 | | | |
| 6.64 | 0 | 0 | 0 | 0 | 6.64 | | | |
| 6.72 | 0 | 0 | 0 | 0 | 6.72 | | | |
| 6.80 | 0 | 0 | 0 | 0 | 6.80 | | | |
| 6.88 | 0 | 0 | 0 | 0 | 6.88 | | | |
| 6.96 | 0 | 0 | 0 | 0 | 6.96 | | | |
| 7.04 | 0 | 0 | 0 | 0 | 7.04 | | | |
| 7.12 | 0 | 0 | 0 | 0 | 7.12 | | | |
| 7.20 | 0 | 0 | 0 | 0 | 7.20 | | | |
| 7.28 | 0 | 0 | 0 | 0 | 7.28 | | | |
| 7.36 | 0 | 0 | 0 | 0 | 7.36 | | | |
| 7.44 | 0 | 0 | 0 | 0 | 7.44 | | | |
| 7.52 | 0 | 0 | 0 | 0 | 7.52 | | | |
| 7.60 | 0 | 0 | 0 | 0 | 7.60 | | | |
| 7.68 | 0 | 0 | 0 | 0 | 7.68 | | | |
| 7.76 | 0 | 0 | 0 | 0 | 7.76 | | | |
| 7.84 | 0 | 0 | 0 | 0 | 7.84 | | | |
| 7.92 | 0 | 0 | 0 | 0 | 7.92 | | | |
| 8.00 | 0 | 0 | 0 | 0 | 8.00 | | | |
| | 1083 | 1156 | 1182 | 1308 | | | | |

TABLE 2

Yogurt Beverage Fat Sphericity Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 0.00 | 0 | 0 | 0 | 0 | 0.00 | | | |
| 0.02 | 5 | 8 | 3 | 3 | 0.02 | 33% | −81% | −101% |
| 0.03 | 4 | 4 | 2 | 6 | 0.03 | −7% | −117% | 20% |
| 0.05 | 3 | 2 | 0 | 1 | 0.05 | −60% | 0% | −262% |
| 0.06 | 6 | 11 | 0 | 0 | 0.06 | 42% | 0% | 0% |
| 0.08 | 6 | 4 | 1 | 1 | 0.08 | −60% | −552% | −623% |
| 0.09 | 6 | 5 | 2 | 9 | 0.09 | −28% | −226% | 20% |
| 0.11 | 2 | 8 | 2 | 3 | 0.11 | 73% | −9% | 20% |
| 0.13 | 2 | 9 | 3 | 2 | 0.13 | 76% | 28% | −21% |
| 0.14 | 5 | 12 | 2 | 8 | 0.14 | 56% | −172% | 25% |
| 0.16 | 9 | 11 | 3 | 5 | 0.16 | 13% | −226% | −117% |
| 0.17 | 6 | 8 | 2 | 14 | 0.17 | 20% | −226% | 48% |
| 0.19 | 8 | 12 | 2 | 10 | 0.19 | 29% | −335% | 4% |
| 0.20 | 10 | 16 | 2 | 9 | 0.20 | 33% | −443% | −34% |
| 0.22 | 2 | 10 | 2 | 6 | 0.22 | 79% | −9% | 60% |
| 0.23 | 8 | 9 | 1 | 7 | 0.23 | 5% | −769% | −38% |
| 0.25 | 9 | 7 | 5 | 7 | 0.25 | −37% | −96% | −55% |
| 0.27 | 8 | 16 | 8 | 13 | 0.27 | 47% | −9% | 26% |
| 0.28 | 11 | 10 | 11 | 7 | 0.28 | −17% | −9% | −89% |
| 0.30 | 9 | 17 | 5 | 16 | 0.30 | 44% | −96% | 32% |
| 0.31 | 18 | 12 | 4 | 24 | 0.31 | −60% | −389% | 10% |
| 0.33 | 17 | 22 | 12 | 25 | 0.33 | 18% | −54% | 18% |
| 0.34 | 17 | 13 | 6 | 12 | 0.34 | −39% | −208% | −71% |
| 0.36 | 13 | 19 | 8 | 15 | 0.36 | 27% | −77% | −4% |
| 0.38 | 11 | 17 | 14 | 20 | 0.38 | 31% | 15% | 34% |
| 0.39 | 11 | 21 | 15 | 14 | 0.39 | 44% | 20% | 5% |
| 0.41 | 8 | 11 | 9 | 17 | 0.41 | 23% | 3% | 43% |
| 0.42 | 9 | 18 | 14 | 20 | 0.42 | 47% | 30% | 46% |
| 0.44 | 12 | 20 | 14 | 21 | 0.44 | 36% | 7% | 31% |
| 0.45 | 15 | 21 | 15 | 14 | 0.45 | 24% | −9% | −29% |
| 0.47 | 11 | 29 | 8 | 26 | 0.47 | 60% | −49% | 49% |
| 0.48 | 12 | 32 | 17 | 25 | 0.48 | 60% | 23% | 42% |
| 0.50 | 22 | 26 | 14 | 25 | 0.50 | 10% | −71% | −6% |
| 0.52 | 14 | 29 | 19 | 22 | 0.52 | 49% | 20% | 23% |
| 0.53 | 13 | 29 | 10 | 20 | 0.53 | 52% | −41% | 22% |
| 0.55 | 13 | 29 | 14 | 20 | 0.55 | 52% | −1% | 22% |
| 0.56 | 21 | 33 | 6 | 21 | 0.56 | 32% | −280% | −21% |
| 0.58 | 19 | 36 | 12 | 25 | 0.58 | 44% | −72% | 8% |

TABLE 2-continued

Yogurt Beverage Fat Sphericity Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 0.59 | 17 | 34 | 13 | 32 | 0.59 | 47% | −42% | 36% |
| 0.61 | 14 | 49 | 12 | 28 | 0.61 | 70% | −27% | 40% |
| 0.63 | 29 | 50 | 18 | 29 | 0.63 | 38% | −75% | −21% |
| 0.64 | 14 | 36 | 19 | 27 | 0.64 | 59% | 20% | 37% |
| 0.66 | 25 | 38 | 24 | 34 | 0.66 | 30% | −13% | 11% |
| 0.67 | 20 | 36 | 38 | 43 | 0.67 | 41% | 43% | 44% |
| 0.69 | 31 | 26 | 35 | 45 | 0.69 | −27% | 4% | 17% |
| 0.70 | 23 | 39 | 39 | 47 | 0.70 | 37% | 36% | 41% |
| 0.72 | 33 | 34 | 51 | 46 | 0.72 | −3% | 30% | 14% |
| 0.73 | 43 | 46 | 48 | 44 | 0.73 | 0% | 3% | −18% |
| 0.75 | 38 | 27 | 63 | 45 | 0.75 | −50% | 34% | −2% |
| 0.77 | 34 | 24 | 52 | 50 | 0.77 | −51% | 29% | 18% |
| 0.78 | 44 | 28 | 54 | 48 | 0.78 | −67% | 11% | −11% |
| 0.80 | 34 | 24 | 65 | 41 | 0.80 | −51% | 43% | 0% |
| 0.81 | 45 | 20 | 59 | 44 | 0.81 | −140% | 17% | −23% |
| 0.83 | 45 | 7 | 55 | 48 | 0.83 | −585% | 11% | −13% |
| 0.84 | 33 | 15 | 51 | 48 | 0.84 | −134% | 30% | 17% |
| 0.86 | 48 | 8 | 53 | 36 | 0.86 | −539% | 2% | −61% |
| 0.88 | 49 | 7 | 54 | 35 | 0.88 | −646% | 1% | −69% |
| 0.89 | 32 | 3 | 32 | 20 | 0.89 | −1036% | −9% | −93% |
| 0.91 | 28 | 4 | 36 | 11 | 0.91 | −646% | 15% | −207% |
| 0.92 | 15 | 4 | 24 | 9 | 0.92 | −300% | 32% | −101% |
| 0.94 | 8 | 0 | 8 | 1 | 0.94 | 0% | −9% | −864% |
| 0.95 | 4 | 0 | 3 | 1 | 0.95 | 0% | −45% | −382% |
| 0.97 | 2 | 0 | 4 | 1 | 0.97 | 0% | 46% | −141% |
| 0.98 | 2 | 0 | 1 | 1 | 0.98 | 0% | −117% | −141% |
| 1.00 | 0 | 1 | 1 | 1 | 1.00 | 100% | 100% | 100% |
|  | 1085 | 1156 | 1179 | 1308 |  |  |  |  |

TABLE 3

Yogurt Beverage Fat Shape Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 0.000 | 0 | 0 | 0 | 0 | 0.000 |  |  |  |
| 0.005 | 0 | 0 | 0 | 0 | 0.005 | 0% | 0% | 0% |
| 0.015 | 0 | 0 | 0 | 0 | 0.015 | 0% | 0% | 0% |
| 0.020 | 0 | 0 | 0 | 0 | 0.020 | 0% | 0% | 0% |
| 0.025 | 0 | 0 | 0 | 0 | 0.025 | 0% | 0% | 0% |
| 0.035 | 0 | 0 | 0 | 0 | 0.035 | 0% | 0% | 0% |
| 0.045 | 0 | 0 | 0 | 0 | 0.045 | 0% | 0% | 0% |
| 0.050 | 0 | 0 | 0 | 0 | 0.050 | 0% | 0% | 0% |
| 0.055 | 0 | 0 | 0 | 0 | 0.055 | 0% | 0% | 0% |
| 0.065 | 0 | 0 | 0 | 0 | 0.065 | 0% | 0% | 0% |
| 0.075 | 0 | 0 | 0 | 0 | 0.075 | 0% | 0% | 0% |
| 0.085 | 0 | 0 | 0 | 0 | 0.085 | 0% | 0% | 0% |
| 0.090 | 0 | 0 | 0 | 0 | 0.090 | 0% | 0% | 0% |
| 0.095 | 0 | 0 | 0 | 0 | 0.095 | 0% | 0% | 0% |
| 0.105 | 0 | 0 | 0 | 0 | 0.105 | 0% | 0% | 0% |
| 0.115 | 0 | 0 | 0 | 0 | 0.115 | 0% | 0% | 0% |
| 0.125 | 1 | 1 | 0 | 0 | 0.125 | −7% | 0% | 0% |
| 0.130 | 2 | 0 | 0 | 0 | 0.130 | 0% | 0% | 0% |
| 0.135 | 1 | 5 | 0 | 0 | 0.135 | 79% | 0% | 0% |
| 0.145 | 1 | 8 | 0 | 0 | 0.145 | 87% | 0% | 0% |
| 0.155 | 8 | 28 | 0 | 2 | 0.155 | 70% | 0% | −382% |
| 0.160 | 14 | 41 | 1 | 5 | 0.160 | 64% | −1425% | −238% |
| 0.165 | 31 | 52 | 5 | 12 | 0.165 | 36% | −575% | −211% |
| 0.175 | 44 | 72 | 21 | 34 | 0.175 | 35% | −128% | −56% |
| 0.185 | 49 | 69 | 50 | 43 | 0.185 | 24% | −7% | −37% |
| 0.195 | 49 | 71 | 81 | 54 | 0.195 | 26% | 34% | −9% |
| 0.200 | 40 | 76 | 95 | 81 | 0.200 | 44% | 54% | 40% |
| 0.205 | 42 | 68 | 102 | 77 | 0.205 | 34% | 55% | 34% |
| 0.215 | 56 | 72 | 95 | 76 | 0.215 | 17% | 36% | 11% |
| 0.225 | 48 | 52 | 87 | 71 | 0.225 | 2% | 40% | 18% |
| 0.230 | 51 | 58 | 79 | 87 | 0.230 | 6% | 30% | 29% |

TABLE 3-continued

Yogurt Beverage Fat Shape Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 0.235 | 67 | 39 | 75 | 96 | 0.235 | −83% | 3% | 16% |
| 0.245 | 54 | 56 | 58 | 80 | 0.245 | −3% | −1% | 19% |
| 0.255 | 63 | 64 | 79 | 105 | 0.255 | −5% | 13% | 28% |
| 0.265 | 56 | 57 | 67 | 97 | 0.265 | −5% | 9% | 30% |
| 0.270 | 63 | 46 | 33 | 63 | 0.270 | −46% | −108% | −21% |
| 0.275 | 81 | 42 | 61 | 71 | 0.275 | −105% | −45% | −38% |
| 0.285 | 57 | 29 | 53 | 52 | 0.285 | −109% | −17% | −32% |
| 0.295 | 45 | 45 | 31 | 54 | 0.295 | −7% | −58% | 0% |
| 0.300 | 31 | 25 | 32 | 44 | 0.300 | −32% | −6% | 15% |
| 0.305 | 49 | 18 | 25 | 34 | 0.305 | −190% | −114% | −74% |
| 0.315 | 36 | 18 | 16 | 26 | 0.315 | −113% | −145% | −67% |
| 0.325 | 23 | 20 | 19 | 21 | 0.325 | −23% | −32% | −32% |
| 0.335 | 8 | 8 | 4 | 9 | 0.335 | −7% | −118% | −7% |
| 0.340 | 10 | 7 | 6 | 4 | 0.340 | −52% | −82% | −201% |
| 0.345 | 0 | 5 | 5 | 3 | 0.345 | 100% | 100% | 100% |
| 0.355 | 2 | 3 | 1 | 2 | 0.355 | 29% | −118% | −21% |
| 0.365 | 0 | 0 | 1 | 4 | 0.365 | 0% | 100% | 100% |
| 0.375 | 1 | 0 | 0 | 1 | 0.375 | 0% | 0% | −21% |
| 0.380 | 1 | 0 | 0 | 0 | 0.380 | 0% | 0% | 0% |
| 0.385 | 1 | 1 | 0 | 0 | 0.385 | −7% | 0% | 0% |
| 0.395 | 0 | 0 | 0 | 0 | 0.395 | 0% | 0% | 0% |
| 0.405 | 0 | 0 | 0 | 0 | 0.405 | 0% | 0% | 0% |
| 0.410 | 0 | 0 | 0 | 0 | 0.410 | 0% | 0% | 0% |
| 0.415 | 0 | 0 | 0 | 0 | 0.415 | 0% | 0% | 0% |
| 0.425 | 0 | 0 | 0 | 0 | 0.425 | 0% | 0% | 0% |
| 0.435 | 0 | 0 | 0 | 0 | 0.435 | 0% | 0% | 0% |
| 0.445 | 0 | 0 | 0 | 0 | 0.445 | 0% | 0% | 0% |
| 0.450 | 0 | 0 | 0 | 0 | 0.450 | 0% | 0% | 0% |
| 0.455 | 0 | 0 | 0 | 0 | 0.455 | 0% | 0% | 0% |
| 0.465 | 0 | 0 | 0 | 0 | 0.465 | 0% | 0% | 0% |
| 0.475 | 0 | 0 | 0 | 0 | 0.475 | 0% | 0% | 0% |
| 0.480 | 0 | 0 | 0 | 0 | 0.480 | 0% | 0% | 0% |
| 0.485 | 0 | 0 | 0 | 0 | 0.485 | 0% | 0% | 0% |
| 0.495 | 0 | 0 | 0 | 0 | 0.495 | 0% | 0% | 0% |
|  | 1085 | 1156 | 1182 | 1308 |  | 0% | 0% | 0% |

TABLE 4

Yogurt Beverage Fat Aspect Ratio Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 0.00 | 0 | 0 | 0 | 0 | 0.00 |  |  |  |
| 0.02 | 1 | 0 | 0 | 0 | 0.02 | 0% | 0% | 0% |
| 0.03 | 0 | 0 | 0 | 0 | 0.03 | 0% | 0% | 0% |
| 0.05 | 0 | 0 | 0 | 0 | 0.05 | 0% | 0% | 0% |
| 0.06 | 0 | 0 | 0 | 0 | 0.06 | 0% | 0% | 0% |
| 0.08 | 0 | 0 | 0 | 0 | 0.08 | 0% | 0% | 0% |
| 0.09 | 0 | 0 | 0 | 0 | 0.09 | 0% | 0% | 0% |
| 0.11 | 0 | 1 | 0 | 0 | 0.11 | 100% | 0% | 0% |
| 0.13 | 0 | 0 | 0 | 0 | 0.13 | 0% | 0% | 0% |
| 0.14 | 0 | 0 | 0 | 0 | 0.14 | 0% | 0% | 0% |
| 0.16 | 1 | 0 | 0 | 0 | 0.16 | 0% | 0% | 0% |
| 0.17 | 0 | 0 | 0 | 0 | 0.17 | 0% | 0% | 0% |
| 0.19 | 0 | 0 | 0 | 1 | 0.19 | 0% | 0% | 100% |
| 0.20 | 0 | 1 | 0 | 1 | 0.20 | 100% | 0% | 100% |
| 0.22 | 0 | 0 | 0 | 0 | 0.22 | 0% | 0% | 0% |
| 0.23 | 4 | 2 | 1 | 1 | 0.23 | −114% | −331% | −388% |
| 0.25 | 0 | 1 | 1 | 1 | 0.25 | 100% | 100% | 100% |
| 0.27 | 4 | 1 | 1 | 2 | 0.27 | −327% | −331% | −144% |
| 0.28 | 2 | 0 | 1 | 2 | 0.28 | 0% | −116% | −22% |
| 0.30 | 3 | 3 | 3 | 6 | 0.30 | −7% | −8% | 39% |
| 0.31 | 6 | 1 | 1 | 7 | 0.31 | −541% | −547% | −5% |
| 0.33 | 2 | 2 | 3 | 6 | 0.33 | −7% | 28% | 59% |
| 0.34 | 10 | 5 | 4 | 4 | 0.34 | −114% | −170% | −205% |
| 0.36 | 0 | 3 | 3 | 1 | 0.36 | 100% | 100% | 100% |

TABLE 4-continued

Yogurt Beverage Fat Aspect Ratio Analysis

| Class | 5001 Control Count | 5004 61/0 bp Count | 5005 107/0 bp Count | 5006 170/0 bp Count | Class | 5004 vs. 5001 Percent Difference | 5005 vs. 5001 Percent Difference | 5006 vs. 5001 Percent Difference |
|---|---|---|---|---|---|---|---|---|
| 0.38 | 5 | 4 | 2 | 8 | 0.38 | −33% | −170% | 24% |
| 0.39 | 2 | 2 | 6 | 7 | 0.39 | −7% | 64% | 65% |
| 0.41 | 3 | 4 | 6 | 10 | 0.41 | 20% | 46% | 63% |
| 0.42 | 11 | 7 | 9 | 16 | 0.42 | −68% | −32% | 16% |
| 0.44 | 12 | 8 | 14 | 19 | 0.44 | −60% | 8% | 23% |
| 0.45 | 10 | 8 | 9 | 16 | 0.45 | −33% | −20% | 24% |
| 0.47 | 9 | 9 | 19 | 16 | 0.47 | −7% | 49% | 31% |
| 0.48 | 18 | 11 | 12 | 19 | 0.48 | −75% | −62% | −16% |
| 0.50 | 10 | 7 | 11 | 29 | 0.50 | −53% | 2% | 58% |
| 0.52 | 21 | 15 | 15 | 30 | 0.52 | −49% | −51% | 15% |
| 0.53 | 11 | 10 | 15 | 26 | 0.53 | −17% | 21% | 48% |
| 0.55 | 24 | 22 | 15 | 44 | 0.55 | −16% | −73% | 33% |
| 0.56 | 13 | 12 | 8 | 29 | 0.56 | −16% | −75% | 45% |
| 0.58 | 29 | 21 | 16 | 25 | 0.58 | −47% | −95% | −42% |
| 0.59 | 23 | 21 | 15 | 28 | 0.59 | −17% | −65% | 0% |
| 0.61 | 12 | 19 | 16 | 19 | 0.61 | 33% | 19% | 23% |
| 0.63 | 12 | 20 | 13 | 27 | 0.63 | 36% | 0% | 46% |
| 0.64 | 10 | 12 | 15 | 25 | 0.64 | 11% | 28% | 51% |
| 0.66 | 25 | 23 | 23 | 52 | 0.66 | −16% | −17% | 41% |
| 0.67 | 19 | 22 | 20 | 47 | 0.67 | 8% | −2% | 51% |
| 0.69 | 22 | 25 | 28 | 34 | 0.69 | 6% | 15% | 21% |
| 0.70 | 21 | 22 | 24 | 32 | 0.70 | −2% | 6% | 20% |
| 0.72 | 26 | 19 | 36 | 33 | 0.72 | −46% | 22% | 4% |
| 0.73 | 29 | 30 | 27 | 33 | 0.73 | −3% | −16% | −7% |
| 0.75 | 36 | 41 | 38 | 44 | 0.75 | 6% | −2% | 0% |
| 0.77 | 32 | 32 | 33 | 31 | 0.77 | −7% | −5% | −26% |
| 0.78 | 45 | 59 | 54 | 60 | 0.78 | 19% | 10% | 8% |
| 0.80 | 23 | 37 | 39 | 39 | 0.80 | 34% | 36% | 28% |
| 0.81 | 32 | 42 | 48 | 53 | 0.81 | 19% | 28% | 26% |
| 0.83 | 48 | 43 | 60 | 39 | 0.83 | −19% | 14% | −50% |
| 0.84 | 52 | 46 | 54 | 42 | 0.84 | −21% | −4% | −51% |
| 0.86 | 64 | 66 | 74 | 61 | 0.86 | −4% | 7% | −28% |
| 0.88 | 36 | 65 | 51 | 54 | 0.88 | 41% | 24% | 19% |
| 0.89 | 42 | 52 | 50 | 43 | 0.89 | 14% | 9% | −19% |
| 0.91 | 41 | 48 | 49 | 36 | 0.91 | 9% | 10% | −39% |
| 0.92 | 32 | 47 | 28 | 26 | 0.92 | 27% | −23% | −50% |
| 0.94 | 40 | 41 | 53 | 28 | 0.94 | −4% | 19% | −74% |
| 0.95 | 33 | 38 | 37 | 15 | 0.95 | 7% | 4% | −168% |
| 0.97 | 36 | 34 | 36 | 20 | 0.97 | −13% | −8% | −120% |
| 0.98 | 25 | 28 | 21 | 21 | 0.98 | 5% | −28% | −45% |
| 1.00 | 22 | 28 | 14 | 12 | 1.00 | 16% | −69% | −124% |
|  | 1049 | 1120 | 1131 | 1280 |  |  |  |  |

Figure 24A:
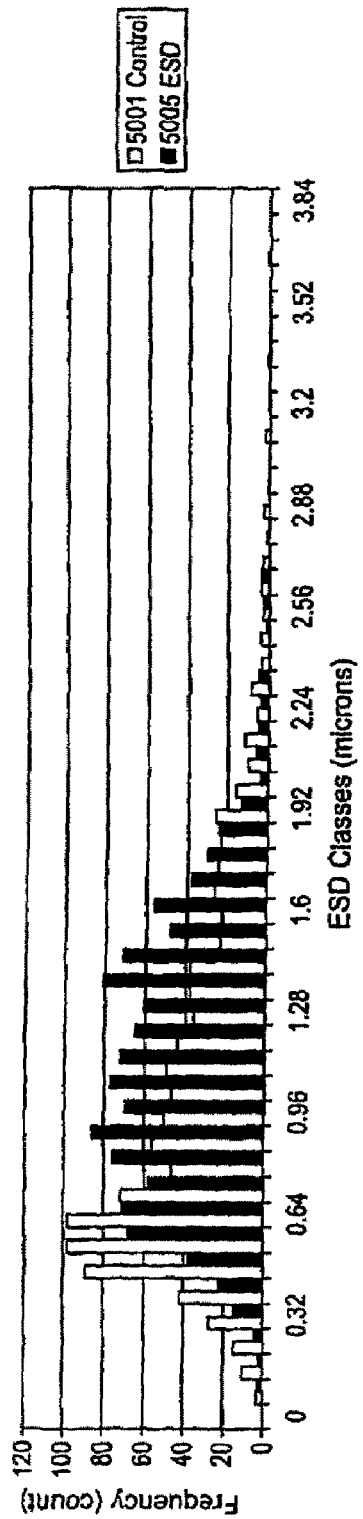
FIG. 24a presents the data for a yogurt beverage treated with ultrasound at 60° F., in a continuous system at 107 watts with no back pressure.
Figure 24B:
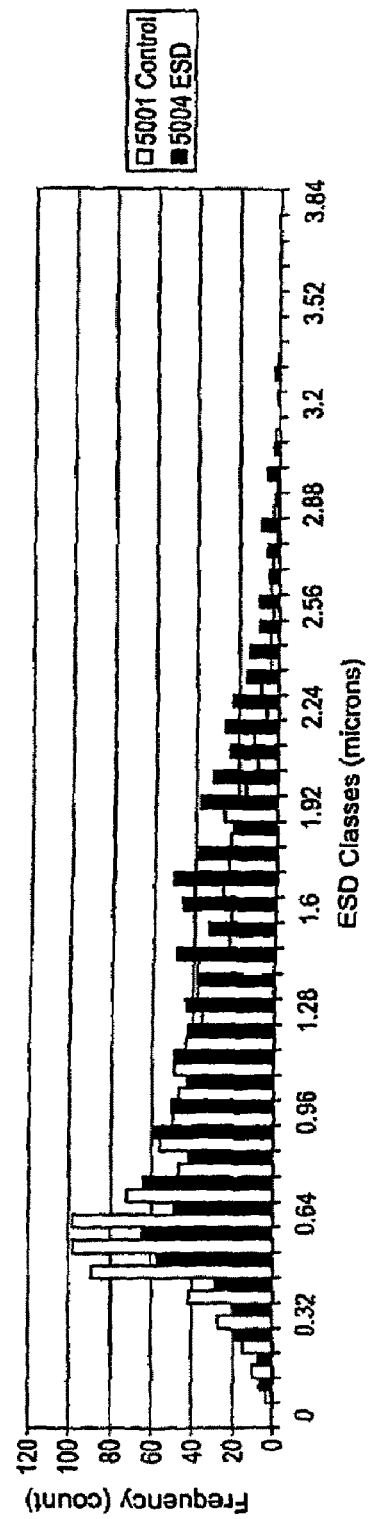
FIG. 24b presents the data for a yogurt beverage treated with ultrasound at 60° F., in a continuous system at 61 watts with no back pressure.
Figure 24C:
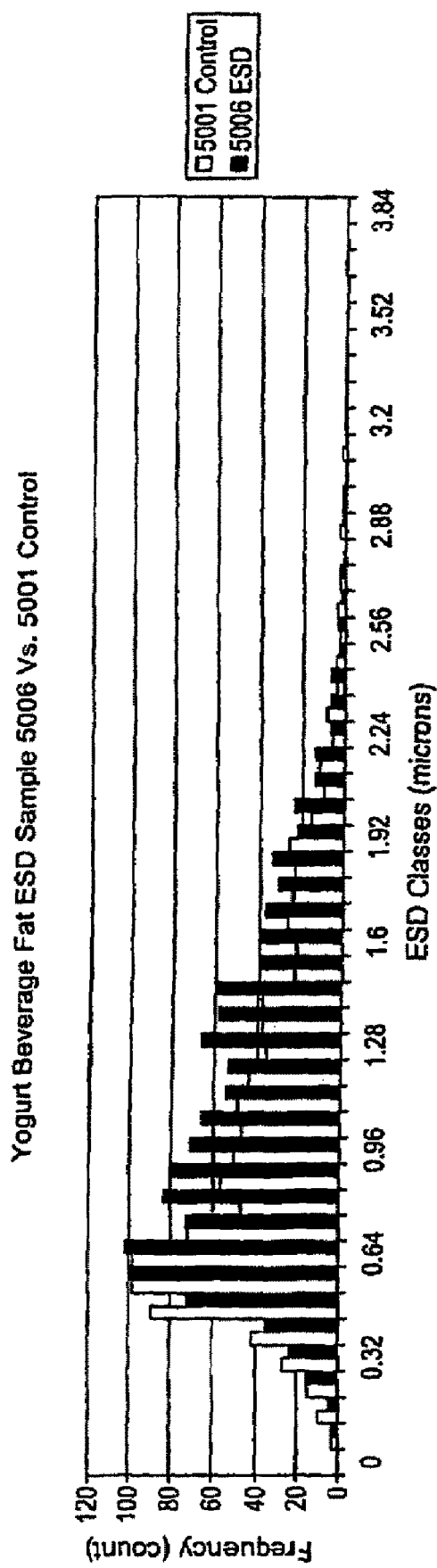
FIG. 24c presents the data for a yogurt beverage treated with ultrasound at 60° F., in a continuous system at 170 watts with no back pressure.
Figure 25A:
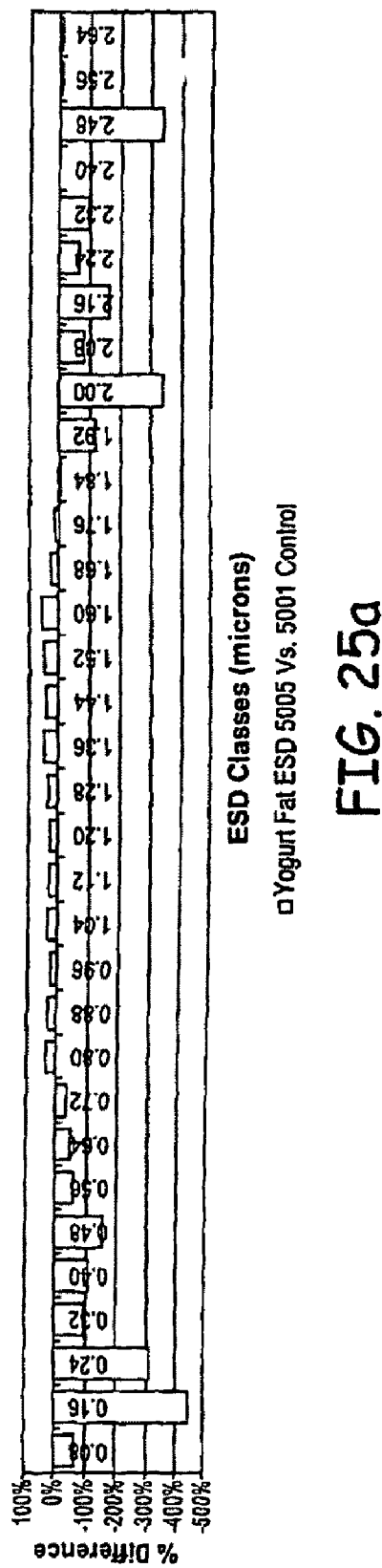
FIG. 25a presents the data for a yogurt beverage treated with ultrasound at 60° F., in a continuous system at 107 watts with no back pressure.
Figure 25B:
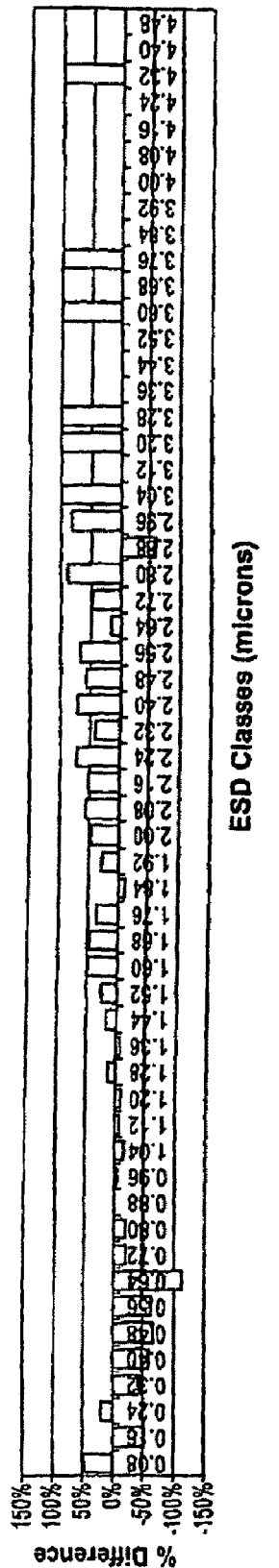
FIG. 25b presents the data for a yogurt beverage treated with ultrasound at 60° F., in a continuous system at 61 watts with no back pressure.
Figure 25C:
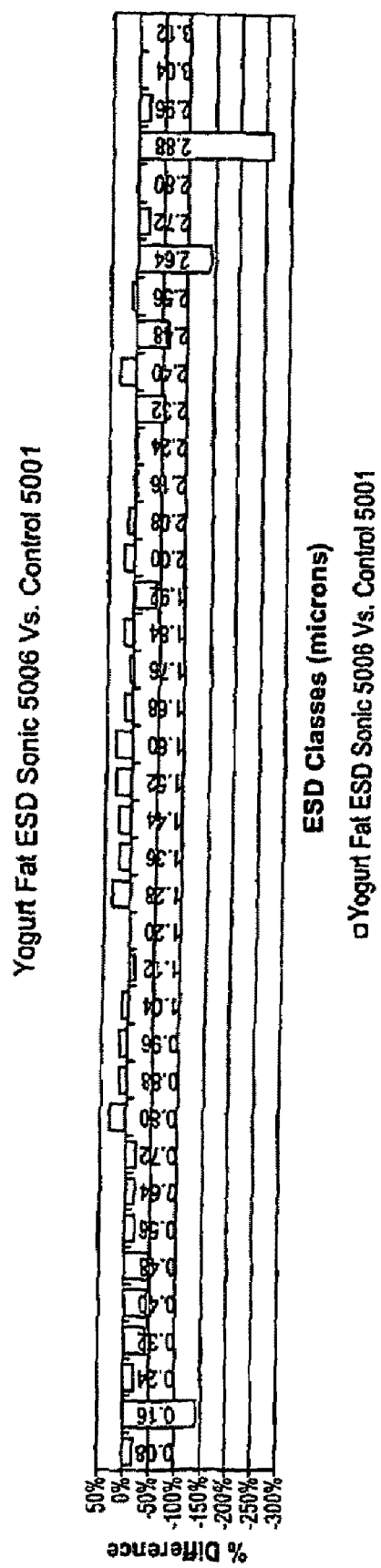
FIG. 25c presents the data for a yogurt beverage treated with ultrasound at 60° F., in a continuous system at 170 watts with no back pressure.
Figure 26A:
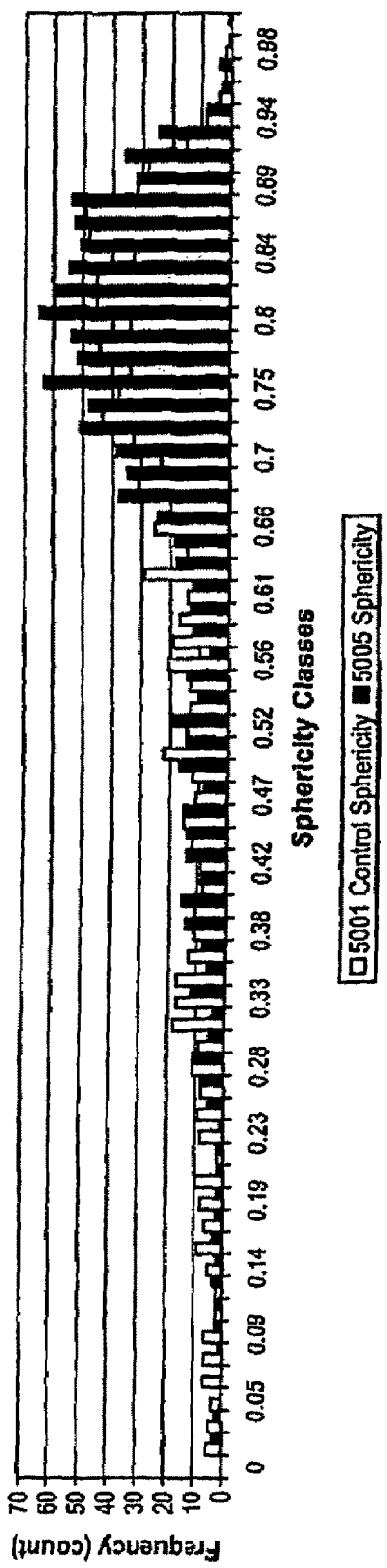
FIG. 26a presents the data for a yogurt beverage treated with ultrasound at 60° F., in a continuous system at 107 watts with no back pressure.
Figure 26B:
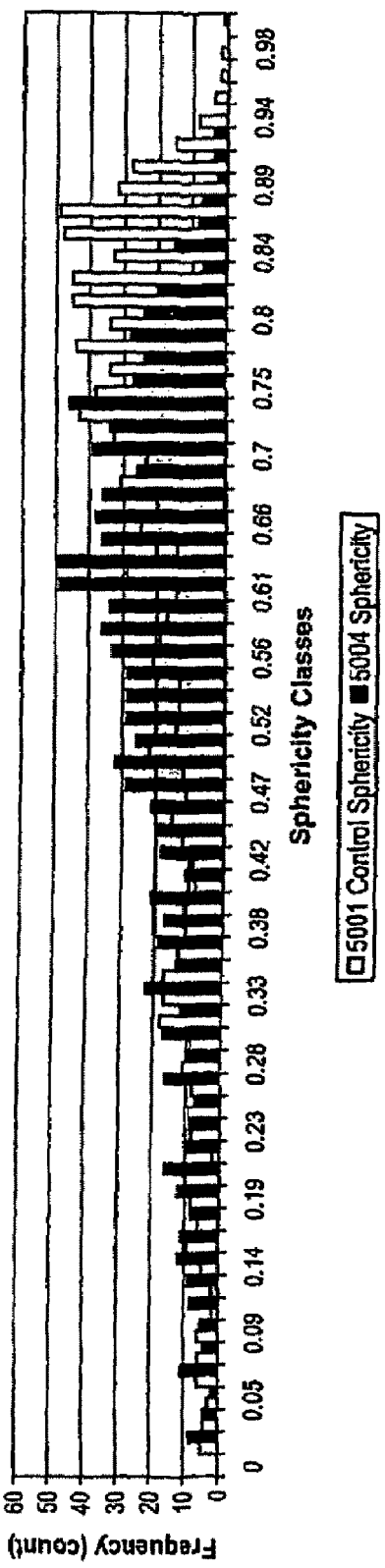
FIG. 26b presents the data for a yogurt beverage treated with ultrasound at 60° F., in a continuous system at 61 watts with no back pressure.
Figure 26C:
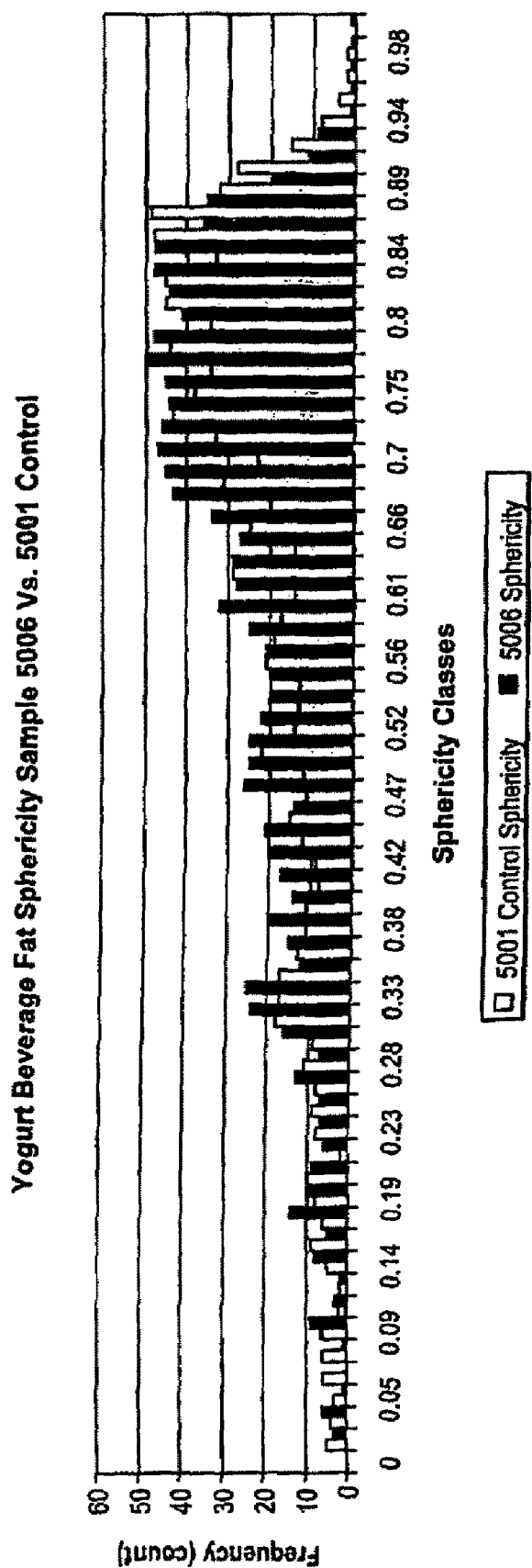
FIG. 26c presents the data for a yogurt beverage treated with ultrasound at 60° F., in a continuous system at 170 watts with no back pressure.
Figure 27A:
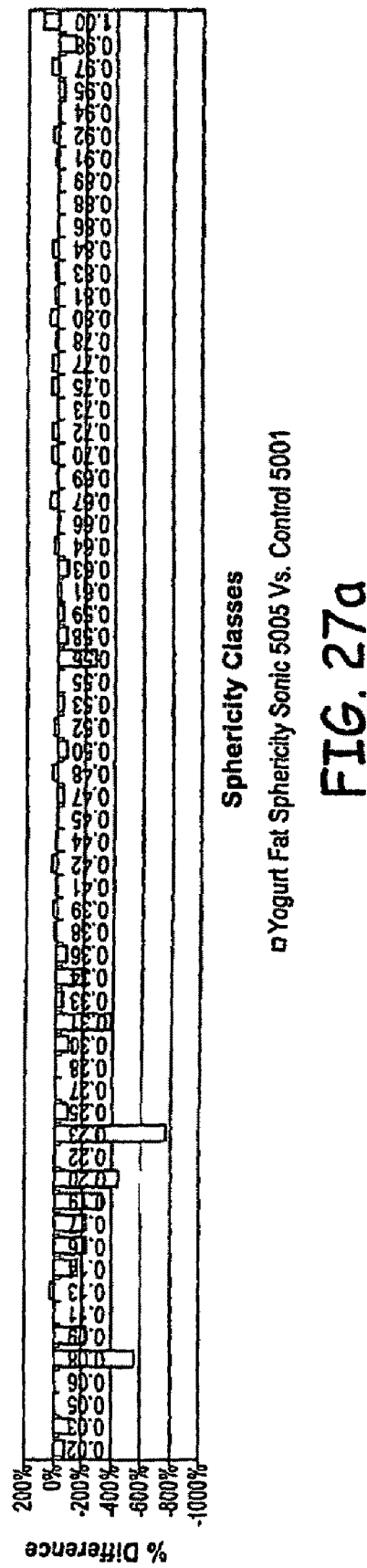
FIG. 27a presents the data for a yogurt beverage treated with ultrasound at 60° F., in a continuous system at 107 watts with no back pressure.
Figure 27B:
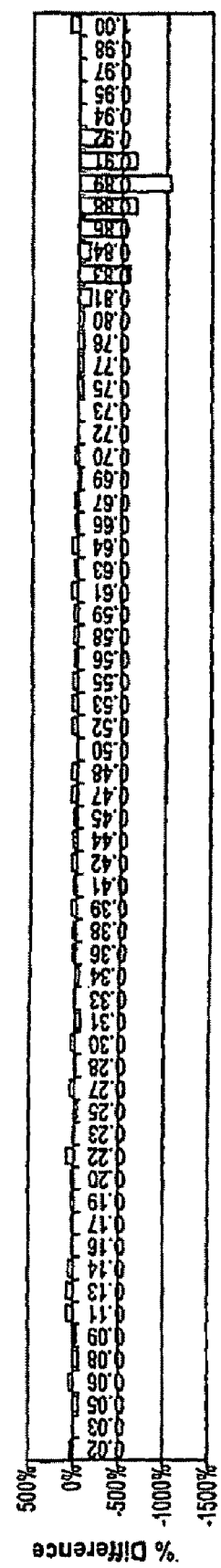
FIG. 27b presents the data for a yogurt beverage treated with ultrasound at 60° F., in a continuous system at 61 watts with no back pressure.
Figure 27C:
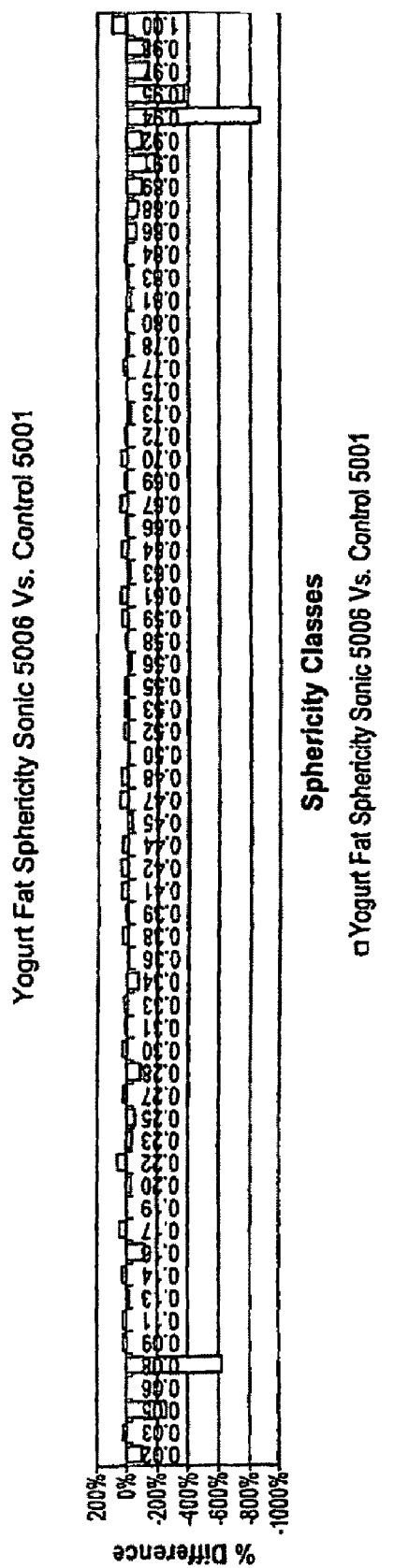
FIG. 27c presents the data for a yogurt beverage treated with ultrasound at 60° F., in a continuous system at 170 watts with no back pressure.
Figure 28A:
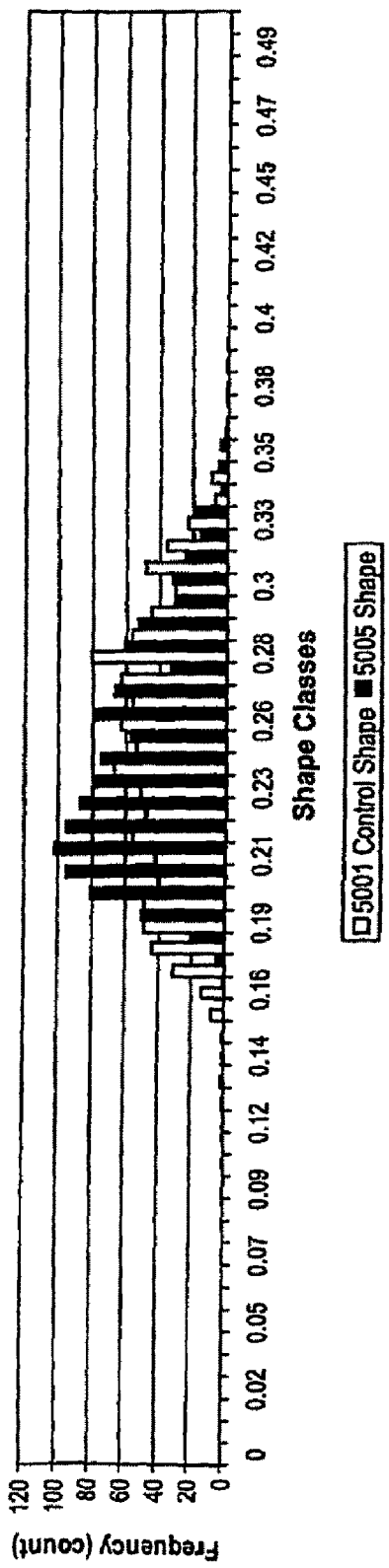
FIG. 28a presents the data for a yogurt beverage treated with ultrasound at 60° F., in a continuous system at 107 watts with no back pressure.
Figure 28B:
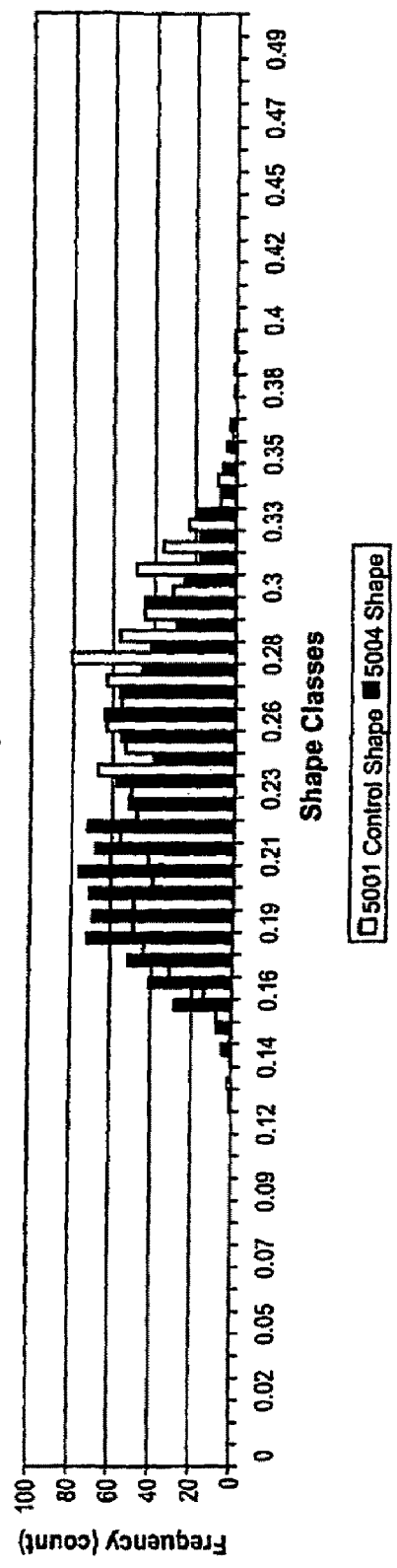
FIG. 28b presents the data for a yogurt beverage treated with ultrasound at 60° F., in a continuous system at 61 watts with no back pressure.
Figure 28C:
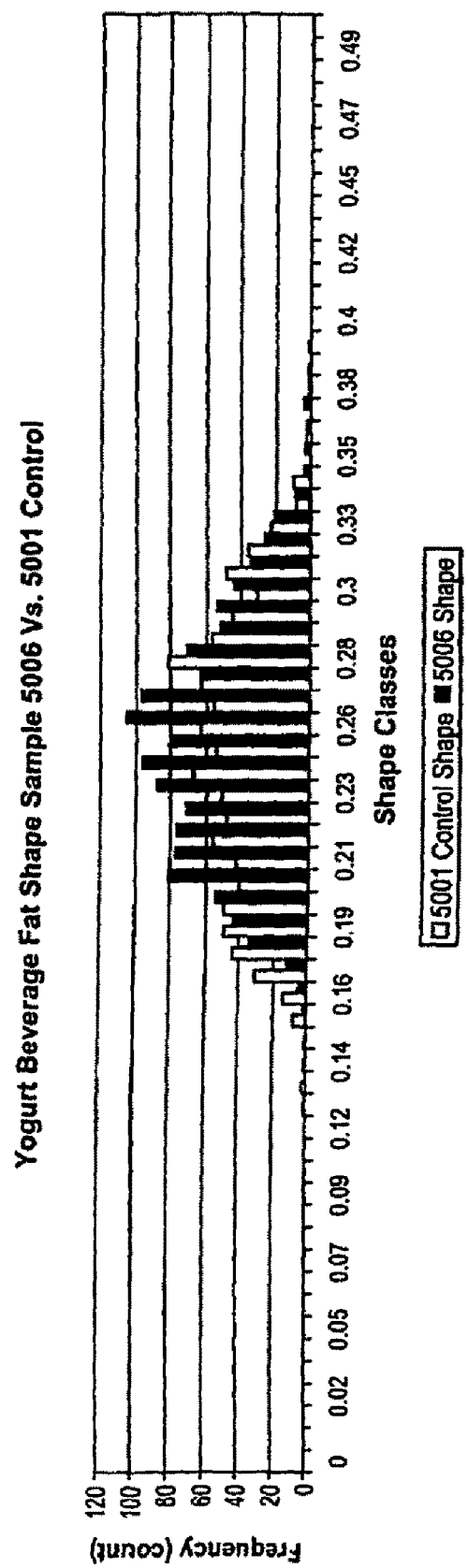
FIG. 28c presents the data for a yogurt beverage treated with ultrasound at 60° F., in a continuous system at 170 watts with no back pressure.
Figure 29C:
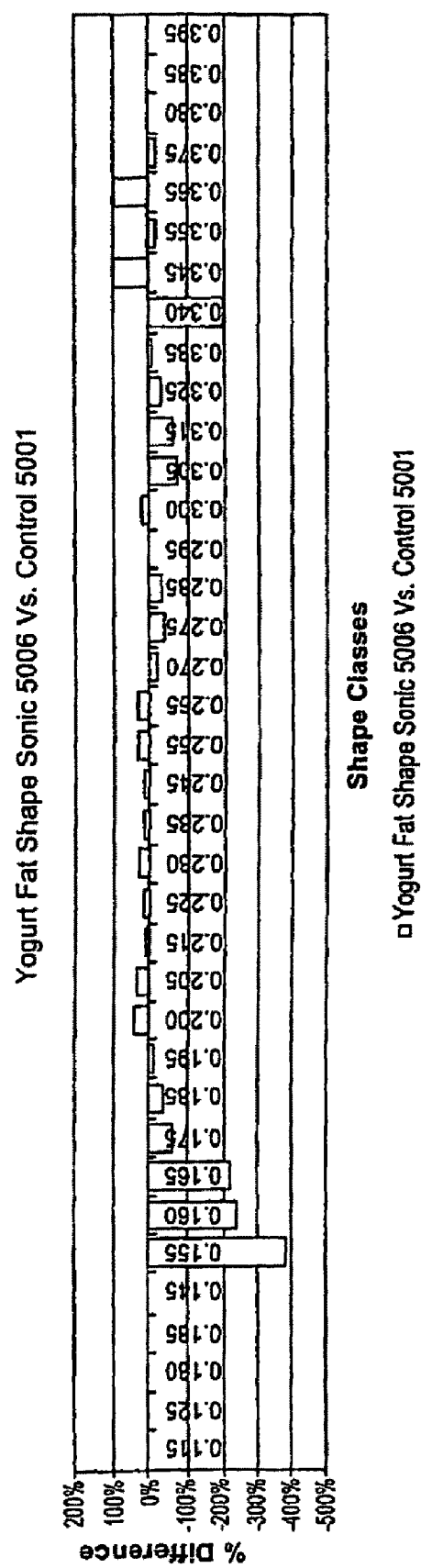
FIG. 29c presents the data for a yogurt beverage treated with ultrasound at 60° F., in a continuous system at 170 watts with no back pressure.
Figure 30A:
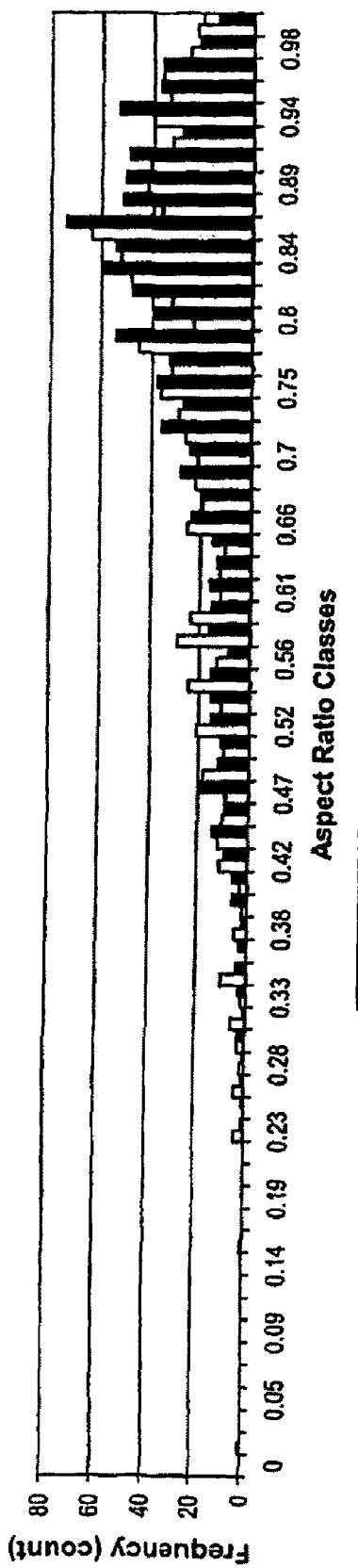
FIG. 30a presents the data for a yogurt beverage treated with ultrasound at 60° F., in a continuous system at 107 watts with no back pressure.
Figure 30B:
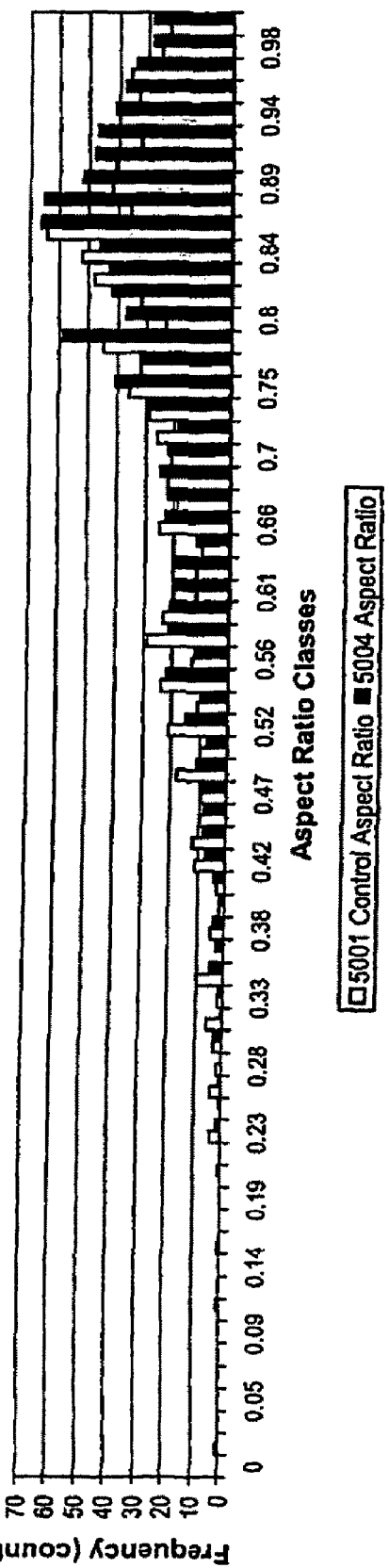
FIG. 30b presents the data for a yogurt beverage treated with ultrasound at 60° F., in a continuous system at 61 watts with no back pressure.
Figure 30C:
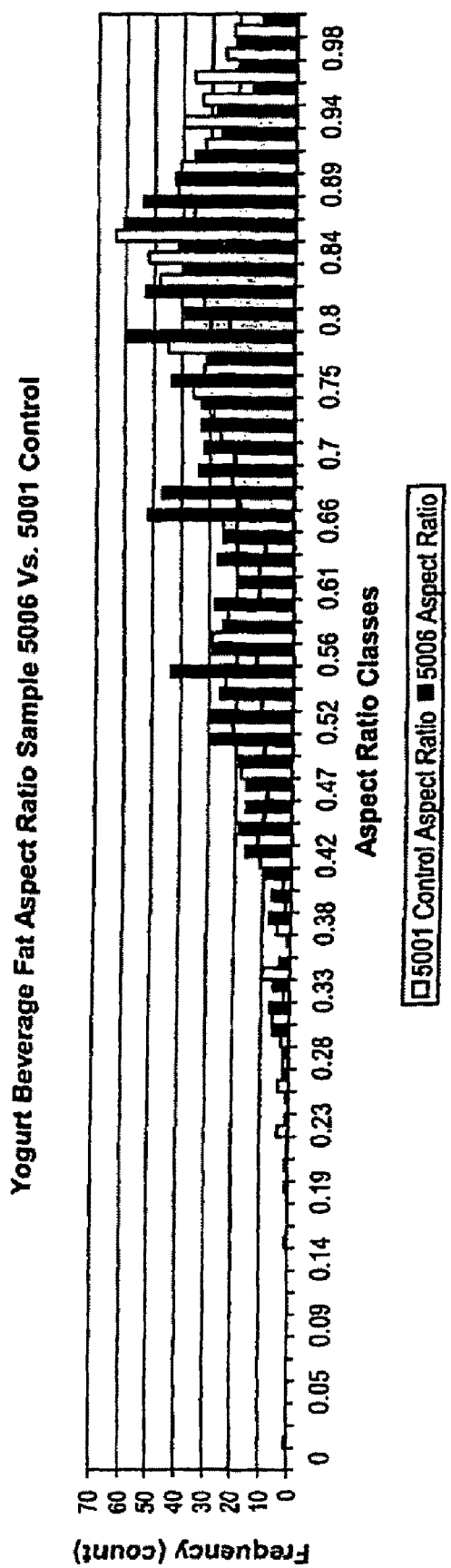
FIG. 30c presents the data for a yogurt beverage treated with ultrasound at 60° F., in a continuous system at 170 watts with no back pressure.
Figure 31A:
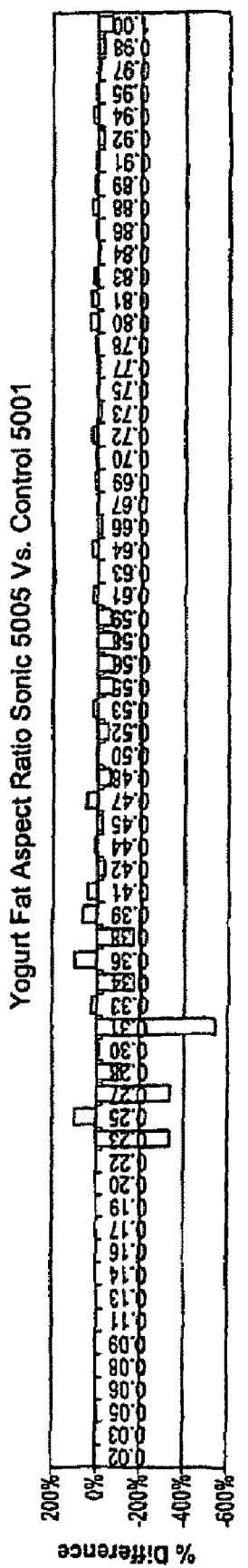
FIG. 31a presents the data for a yogurt beverage treated with ultrasound at 60° F., in a continuous system at 107 watts with no back pressure.
Figure 31B:
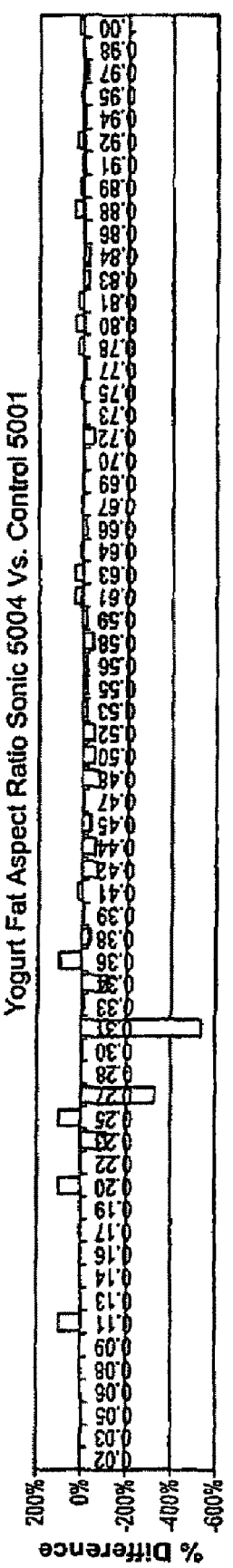
FIG. 31b presents the data for a yogurt beverage treated with ultrasound at 60° F., in a continuous system at 61 watts with no back pressure.
Figure 31C:
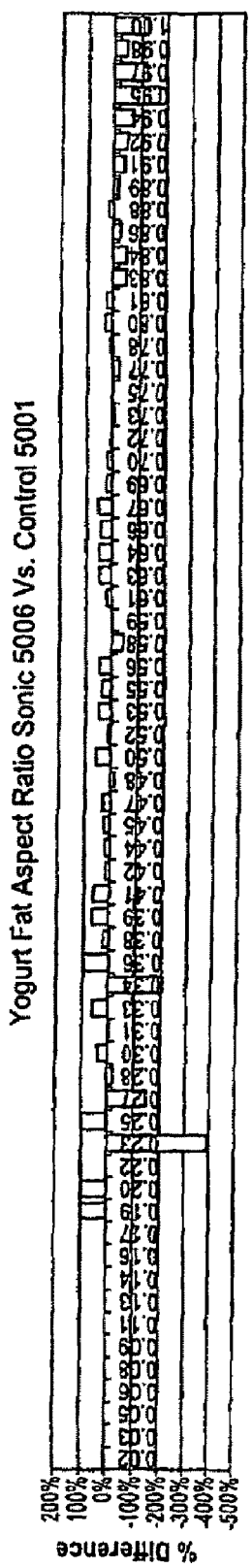
FIG. 31c presents the data for a yogurt beverage treated with ultrasound at 60° F., in a continuous system at 170 watts with no back pressure.

FIGS. 24 a-c and 25 a-c are graphical representations of the equivalent spherical diameter data for the yogurt beverages. As can been seen in FIGS. 25 a-c, within the specified range of equivalent spherical diameter classes, there is an increase and a more uniform distribution of fat particles in those products made in accordance with the present invention as compared to the control product. Similar effects are seen for sphericity, shape and aspect ratio. FIGS. 26 a-c and 27 a-c are graphical representations of the sphericity data, FIGS. 28 a-c and 29 a-c are graphical representations of the shape data, and FIGS. 30 a-c and 31 a-c are graphical representations of the aspect ratio data for the yogurt beverages. In each analysis of the particle morphology parameter, there is a definite optimum range of classes corresponding to that parameter, an increase in the number of particles within those classes, and a more uniform distribution of particles among the classes within that range in the products made in accordance with the present invention as compared to the control product.

In this embodiment of the present invention, the optimal ranges for classes of fat particle morphology parameters are summarized in the table below:

TABLE 5

Particle Morphology Parameter Ranges

| Morphology Parameter | Useful Range | Preferred Range |
|---|---|---|
| Equivalent Spherical Diameter | About 0.80 to about 1.76 microns | About 0.80 to about 1.04 microns |
| Sphericity | About 0.36 to about 0.88 | About 0.67 to about 0.88 |
| Shape | About 0.135 to about 0.265 | About 0.20 to about 0.265 |
| Aspect Ratio | About 0.59 to about 0.91 | About 0.59 to about 0.75 |

EXAMPLE 5

Using the techniques described above, a number of soy "milk" beverages were evaluated and treated in accordance with the present invention. The particle morphology of the fat component of these beverages was evaluated and modified to improve the functional and organoleptic properties of the beverages. Soy-based beverages made in accordance with the present invention had an improved creaminess, reduced grittiness, and a better mouthfeel than products made with conventional methods.

The resulting soy milk beverages were evaluated for particle morphology parameters as described above.

The data are summarized in the tables below and the percent differences at each interval between the homogenized control and the products made in accordance with the present invention are graphically represented in FIGS. 32 a-c to 39 a-c. As can been seen from this data, products made in accordance with the present invention have a significant increase in particles within the specified ranges for each morphological parameter, and the distribution of particles within the ranges is more uniform than the overall particle distribution of the control product.

In the tables below, 3440 refers to a soy milk beverage prepared with conventional homogenization methods. The soy milk beverage had a fat content of 1.5% to 2%. Samples 550, 640 and 660 are the same soy milk beverage product, which are prepared using the method of the present invention. Sample 550 was prepared by using the ultrasound device having a sonic area of 9 cm$^2$, set at 80% amplitude, applying 220 watts of power at an intensity of 24.44 watts/cm$^2$, under a system pressure of 4 pounds/in$^2$ (psi), with a flow rate of 1 liter per minute under zero back pressure. The temperature in the ultrasound unit was 174° F. Sample 640 was processed similar to Sample 550, but at 275 watts of power at an intensity of 31 watts/cm$^2$, and under 12 psi back pressure. Sample 660 was processed similar to Sample 640, but at 100% amplitude, with 315 watts of power at an intensity of 35 watts/cm$^2$.

TABLE 6

Soy "Milk" Fat Equivalent Spherical Diameter Analysis

| | Class | 3440 Soy Milk Fat Homogenized Control | 550 Soy Milk Fat Ultrasound | 640 Soy Milk Fat Ultrasound | 660 Soy Milk Fat Ultrasound | 550 vs. 3440 Percent Difference | 640 vs. 3440 Percent Difference | 660 vs. 3440 Percent Difference |
|---|---|---|---|---|---|---|---|---|
| | 0 | 0 | 0 | 0 | 0 | | | |
| 1 | 0.08 | 2 | 3 | 3 | 5 | 35% | 36% | 59% |
| 2 | 0.16 | 10 | 6 | 4 | 7 | −94% | −139% | −47% |
| 3 | 0.24 | 17 | 16 | 17 | 17 | −10% | 5% | −3% |
| 4 | 0.32 | 42 | 29 | 34 | 34 | −63% | −18% | −27% |
| 5 | 0.40 | 76 | 52 | 53 | 57 | −25% | −37% | −37% |
| 6 | 0.48 | 126 | 89 | 93 | 100 | −9% | −29% | −30% |
| 7 | 0.56 | 155 | 129 | 127 | 150 | 9% | −17% | −6% |
| 8 | 0.64 | 147 | 112 | 121 | 146 | −11% | −16% | −4% |
| 9 | 0.72 | 120 | 88 | 105 | 119 | −11% | −9% | −4% |
| 10 | 0.80 | 91 | 80 | 90 | 89 | 17% | 3% | −5% |
| 11 | 0.88 | 65 | 66 | 81 | 64 | 29% | 23% | −5% |
| 12 | 0.96 | 81 | 57 | 52 | 69 | −19% | −49% | −21% |
| 13 | 1.04 | 51 | 49 | 51 | 65 | −5% | 5% | 19% |
| 14 | 1.12 | 34 | 43 | 55 | 46 | 27% | 41% | 24% |
| 15 | 1.20 | 27 | 36 | 41 | 46 | 18% | 37% | 40% |
| 16 | 1.28 | 25 | 29 | 36 | 33 | 7% | 34% | 22% |
| 17 | 1.36 | 25 | 22 | 27 | 30 | −16% | 12% | 14% |
| 18 | 1.44 | 15 | 19 | 23 | 22 | 3% | 38% | 30% |
| 19 | 1.52 | 12 | 16 | 18 | 16 | 27% | 36% | 23% |
| 20 | 1.60 | 9 | 15 | 15 | 19 | 49% | 43% | 51% |
| 21 | 1.68 | 8 | 11 | 9 | 9 | 35% | 15% | 9% |
| 22 | 1.76 | 7 | 11 | 9 | 9 | 25% | 26% | 20% |
| 23 | 1.84 | 5 | 8 | 10 | 7 | −62% | 52% | 27% |
| 24 | 1.92 | 3 | 7 | 9 | 8 | 58% | 68% | 61% |
| 25 | 2.00 | 3 | 4 | 8 | 3 | −191% | 64% | −3% |
| 26 | 2.08 | 2 | 5 | 2 | 6 | −94% | 5% | 66% |
| 27 | 2.16 | 2 | 3 | 5 | 5 | −94% | 62% | 59% |
| 28 | 2.24 | 0 | 3 | 2 | 2 | 100% | 100% | 100% |
| 29 | 2.32 | 1 | 3 | 4 | 3 | 76% | 76% | 66% |
| 30 | 2.40 | 1 | 2 | 2 | 3 | 0% | 52% | 66% |
| 31 | 2.48 | 5 | 2 | 2 | 2 | 0% | −139% | −157% |
| 32 | 2.56 | 1 | 2 | 4 | 7 | 3% | 76% | 85% |
| 33 | 2.64 | 0 | 1 | 3 | 1 | 100% | 100% | 100% |
| 34 | 2.72 | 3 | 1 | 1 | 4 | −191% | −186% | 23% |
| 35 | 2.80 | 0 | 1 | 0 | 4 | 0% | 0% | 100% |
| 36 | 2.88 | 0 | 0 | 1 | 0 | 0% | 100% | 0% |
| 37 | 2.96 | 0 | 0 | 1 | 0 | 0% | 100% | 0% |
| 38 | 3.04 | 1 | 0 | 1 | 2 | −143% | 5% | 49% |
| 39 | 3.12 | 1 | 0 | 0 | 0 | −385% | 0% | 0% |
| 40 | 3.20 | 0 | 0 | 0 | 0 | 100% | 0% | 0% |
| 41 | 3.28 | 1 | 0 | 0 | 0 | 0% | 0% | 0% |
| 42 | 3.36 | 0 | 0 | 0 | 0 | 0% | 0% | 0% |
| 43 | 3.44 | 0 | 0 | 0 | 0 | 100% | 0% | 0% |
| 44 | 3.52 | 0 | 0 | 1 | 0 | 100% | 100% | 0% |
| 45 | 3.60 | 0 | 0 | 1 | 0 | 100% | 100% | 0% |
| 46 | 3.68 | 0 | 0 | 0 | 0 | 100% | 0% | 0% |
| 47 | 3.76 | 0 | 0 | 0 | 0 | 0% | 0% | 0% |
| 48 | 3.84 | 1 | 0 | 0 | 0 | −870% | 0% | 0% |
| 49 | 3.92 | 0 | 0 | 0 | 0 | 0% | 0% | 0% |
| 50 | 4.00 | 0 | 0 | 0 | 0 | 0% | 0% | 0% |

TABLE 6-continued

Soy "Milk" Fat Equivalent Spherical Diameter Analysis

| Class | | 3440 Soy Milk Fat Homogenized Control | 550 Soy Milk Fat Ultrasound | 640 Soy Milk Fat Ultrasound | 660 Soy Milk Fat Ultrasound | 550 vs. 3440 Percent Difference | 640 vs. 3440 Percent Difference | 660 vs. 3440 Percent Difference |
|---|---|---|---|---|---|---|---|---|
| 51 | 4.08 | 0 | 0 | 1 | 0 | 100% | 100% | 0% |
| 52 | 4.16 | 0 | 0 | 0 | 0 | 0% | 0% | 0% |
| 53 | 4.24 | 0 | 0 | 0 | 0 | 0% | 0% | 0% |
| 54 | 4.32 | 0 | 0 | 0 | 0 | 0% | 0% | 0% |
| 55 | 4.40 | 0 | 0 | 0 | 0 | 0% | 0% | 0% |
| 56 | 4.48 | 0 | 0 | 0 | 0 | 0% | 0% | 0% |
| 57 | 4.56 | 0 | 0 | 0 | 0 | 0% | 0% | 0% |
| 58 | 4.64 | 0 | 0 | 0 | 0 | 0% | 0% | 0% |
| 59 | 4.72 | 0 | 0 | 0 | 0 | 0% | 0% | 0% |
| 60 | 4.80 | 0 | 0 | 0 | 0 | 0% | 0% | 0% |
| 61 | 4.88 | 0 | 0 | 0 | 0 | 0% | 0% | 0% |
| 62 | 4.96 | 0 | 0 | 0 | 0 | 0% | 0% | 0% |
| 63 | 5.04 | 0 | 0 | 0 | 0 | 0% | 0% | 0% |
| 64 | 5.12 | 0 | 0 | 0 | 0 | 0% | 0% | 0% |
| 65 | 5.20 | 0 | 0 | 0 | 0 | 0% | 0% | 0% |
| 66 | 5.28 | 0 | 0 | 0 | 0 | 0% | 0% | 0% |
| 67 | 5.36 | 0 | 0 | 0 | 0 | 0% | 0% | 0% |
| 68 | 5.44 | 0 | 0 | 0 | 0 | 0% | 0% | 0% |
| 69 | 5.52 | 0 | 0 | 0 | 0 | 0% | 0% | 0% |
| 70 | 5.60 | 0 | 0 | 0 | 0 | 0% | 0% | 0% |
| 71 | 5.68 | 0 | 0 | 0 | 0 | 0% | 0% | 0% |
| 72 | 5.76 | 0 | 0 | 0 | 0 | 0% | 0% | 0% |
| 73 | 5.84 | 0 | 0 | 0 | 0 | 0% | 0% | 0% |
| 74 | 5.92 | 0 | 0 | 0 | 0 | 0% | 0% | 0% |
| 75 | 6.00 | 0 | 0 | 0 | 0 | 0% | 0% | 0% |
| 76 | 6.08 | 0 | 0 | 0 | 0 | 0% | 0% | 0% |
| 77 | 6.16 | 0 | 0 | 0 | 0 | 0% | 0% | 0% |
| 78 | 6.24 | 0 | 0 | 0 | 0 | 0% | 0% | 0% |
| 79 | 6.32 | 0 | 0 | 0 | 0 | 0% | 0% | 0% |
| 80 | 6.40 | 0 | 0 | 0 | 0 | 0% | 0% | 0% |
| 81 | 6.48 | 0 | 0 | 0 | 0 | 0% | 0% | 0% |
| 82 | 6.56 | 0 | 0 | 0 | 0 | 0% | 0% | 0% |
| 83 | 6.64 | 0 | 0 | 0 | 0 | 0% | 0% | 0% |
| 84 | 6.72 | 0 | 0 | 0 | 0 | 0% | 0% | 0% |
| 85 | 6.80 | 0 | 0 | 0 | 0 | 0% | 0% | 0% |
| 86 | 6.88 | 0 | 0 | 0 | 0 | 0% | 0% | 0% |
| 87 | 6.96 | 0 | 0 | 0 | 0 | 0% | 0% | 0% |
| 88 | 7.04 | 0 | 0 | 0 | 0 | 0% | 0% | 0% |
| 89 | 7.12 | 0 | 0 | 0 | 0 | 0% | 0% | 0% |
| 90 | 7.20 | 0 | 0 | 0 | 0 | 0% | 0% | 0% |
| 91 | 7.28 | 0 | 0 | 0 | 0 | 0% | 0% | 0% |
| 92 | 7.36 | 0 | 0 | 0 | 0 | 0% | 0% | 0% |
| 93 | 7.44 | 0 | 0 | 0 | 0 | 0% | 0% | 0% |
| 94 | 7.52 | 0 | 0 | 0 | 0 | 0% | 0% | 0% |
| 95 | 7.60 | 0 | 0 | 0 | 0 | 0% | 0% | 0% |
| 96 | 7.68 | 0 | 0 | 0 | 0 | 0% | 0% | 0% |
| 97 | 7.76 | 0 | 0 | 0 | 0 | 0% | 0% | 0% |
| 98 | 7.84 | 0 | 0 | 0 | 0 | 0% | 0% | 0% |
| 99 | 7.92 | 0 | 0 | 0 | 0 | 0% | 0% | 0% |
| 100 | 8.00 | 0 | 0 | 0 | 0 | 0% | 0% | 0% |
| | | 1175 | 1020 | 1122 | 1209 | | | |

TABLE 7

Soy "Milk" Fat Sphericity Analysis

| Class | | 3440 Soy Milk Fat Control | 550 Soy Milk Fat Ultrasound | 640 Soy Milk Fat Ultrasound | 660 Soy Milk Fat Ultrasound | 550 vs. 3440 Percent Difference | 640 vs. 3440 Percent Difference | 660 vs. 3440 Percent Difference |
|---|---|---|---|---|---|---|---|---|
| | 0 | 0 | 0 | 0 | 0 | | | |
| 1 | 0.02 | 3 | 4 | 5 | 5 | 27% | 43% | 38% |
| 2 | 0.03 | 5 | 2 | 2 | 4 | −142% | −139% | −29% |
| 3 | 0.05 | 6 | 5 | 5 | 4 | −16% | −15% | −54% |
| 4 | 0.06 | 6 | 2 | 2 | 3 | −191% | −186% | −106% |
| 5 | 0.08 | 6 | 3 | 7 | 4 | −94% | 18% | −54% |
| 6 | 0.09 | 12 | 6 | 12 | 13 | −94% | 5% | 5% |
| 7 | 0.11 | 6 | 4 | 3 | 5 | −45% | −91% | −23% |

TABLE 7-continued

Soy "Milk" Fat Sphericity Analysis

| Class | 3440 Soy Milk Fat Control | 550 Soy Milk Fat Ultra-sound | 640 Soy Milk Fat Ultra-sound | 660 Soy Milk Fat Ultra-sound | 550 vs. 3440 Percent Difference | 640 vs. 3440 Percent Difference | 660 vs. 3440 Percent Difference |
|---|---|---|---|---|---|---|---|
| 8 | 0.13 | 6 | 3 | 2 | 8 | −94% | −186% | 23% |
| 9 | 0.14 | 8 | 4 | 3 | 5 | −94% | −155% | −65% |
| 10 | 0.16 | 2 | 5 | 4 | 2 | 61% | 52% | −3% |
| 11 | 0.17 | 9 | 2 | 4 | 10 | −336% | −115% | 7% |
| 12 | 0.19 | 13 | 2 | 2 | 9 | −530% | −521% | −49% |
| 13 | 0.20 | 14 | 5 | 9 | 12 | −171% | −49% | −20% |
| 14 | 0.22 | 11 | 7 | 8 | 14 | −52% | −31% | 19% |
| 15 | 0.23 | 10 | 3 | 9 | 12 | −223% | −6% | 14% |
| 16 | 0.25 | 16 | 14 | 6 | 11 | −11% | −155% | −50% |
| 17 | 0.27 | 9 | 5 | 9 | 19 | −74% | 5% | 51% |
| 18 | 0.28 | 11 | 6 | 5 | 16 | −78% | −110% | 29% |
| 19 | 0.30 | 16 | 9 | 8 | 18 | −72% | −91% | 9% |
| 20 | 0.31 | 17 | 13 | 9 | 13 | −27% | −80% | −35% |
| 21 | 0.33 | 18 | 20 | 17 | 30 | 13% | −1% | 38% |
| 22 | 0.34 | 29 | 17 | 19 | 19 | −65% | −46% | −57% |
| 23 | 0.36 | 21 | 21 | 11 | 18 | 3% | −82% | −20% |
| 24 | 0.38 | 21 | 20 | 10 | 20 | −2% | −101% | −8% |
| 25 | 0.39 | 21 | 12 | 13 | 21 | −69% | −54% | −3% |
| 26 | 0.41 | 17 | 16 | 15 | 17 | −3% | −8% | −3% |
| 27 | 0.42 | 20 | 18 | 18 | 23 | −8% | −6% | 11% |
| 28 | 0.44 | 17 | 24 | 18 | 18 | 31% | 10% | 3% |
| 29 | 0.45 | 30 | 21 | 25 | 29 | −38% | −15% | −6% |
| 30 | 0.47 | 14 | 24 | 24 | 20 | 44% | 44% | 28% |
| 31 | 0.48 | 27 | 18 | 17 | 26 | −45% | −52% | −7% |
| 32 | 0.50 | 29 | 26 | 25 | 27 | −8% | −11% | −11% |
| 33 | 0.52 | 27 | 37 | 23 | 32 | 29% | −12% | 13% |
| 34 | 0.53 | 22 | 33 | 23 | 24 | 35% | 9% | 6% |
| 35 | 0.55 | 19 | 17 | 33 | 33 | −8% | 45% | 41% |
| 36 | 0.56 | 28 | 29 | 22 | 28 | 6% | −22% | −3% |
| 37 | 0.58 | 44 | 30 | 20 | 35 | −42% | −110% | −29% |
| 38 | 0.59 | 27 | 29 | 22 | 33 | 10% | −17% | 16% |
| 39 | 0.61 | 21 | 25 | 36 | 37 | 19% | 44% | 42% |
| 40 | 0.63 | 40 | 37 | 38 | 33 | −5% | −1% | −25% |
| 41 | 0.64 | 25 | 28 | 23 | 38 | 14% | −4% | 32% |
| 42 | 0.66 | 38 | 34 | 21 | 26 | −8% | −73% | −50% |
| 43 | 0.67 | 44 | 34 | 26 | 41 | −25% | −62% | −10% |
| 44 | 0.69 | 39 | 35 | 28 | 42 | −8% | −33% | 4% |
| 45 | 0.70 | 35 | 49 | 52 | 31 | 31% | 36% | −16% |
| 46 | 0.72 | 38 | 26 | 43 | 32 | −42% | 16% | −22% |
| 47 | 0.73 | 25 | 31 | 41 | 29 | 22% | 42% | 11% |
| 48 | 0.75 | 37 | 31 | 37 | 28 | −16% | 5% | −36% |
| 49 | 0.77 | 20 | 18 | 28 | 24 | −8% | 32% | 14% |
| 50 | 0.78 | 22 | 23 | 31 | 40 | 7% | 32% | 43% |
| 51 | 0.80 | 24 | 25 | 33 | 19 | 7% | 31% | −30% |
| 52 | 0.81 | 29 | 42 | 39 | 36 | 33% | 29% | 17% |
| 53 | 0.83 | 15 | 28 | 35 | 23 | 48% | 59% | 33% |
| 54 | 0.84 | 23 | 21 | 28 | 27 | −6% | 22% | 12% |
| 55 | 0.86 | 17 | 24 | 23 | 12 | 31% | 29% | −46% |
| 56 | 0.88 | 26 | 44 | 32 | 16 | 43% | 22% | −67% |
| 57 | 0.89 | 11 | 20 | 12 | 9 | 47% | 12% | −26% |
| 58 | 0.91 | 9 | 16 | 13 | 6 | 46% | 34% | −54% |
| 59 | 0.92 | 13 | 17 | 20 | 12 | 26% | 38% | −11% |
| 60 | 0.94 | 0 | 4 | 6 | 1 | 100% | 100% | 100% |
| 61 | 0.95 | 1 | 2 | 1 | 2 | 52% | 5% | 49% |
| 62 | 0.97 | 2 | 2 | 3 | 1 | 3% | 36% | −106% |
| 63 | 0.98 | 1 | 1 | 1 | 1 | 3% | 5% | −3% |
| 64 | 1.00 | 3 | 5 | 3 | 3 | 42% | 5% | −3% |
| | | 1175 | 1138 | 1122 | 1209 | | | |

TABLE 8

Soy "Milk" Fat Shape Analysis

| | Class | 3440 Soy Milk Fat Control | 550 Soy Milk Fat Ultra-sound | 640 Soy Milk Fat Ultra-sound | 660 Soy Milk Fat Ultra-sound | Class | 550 vs. 3440 Percent Difference | 640 vs. 3440 Percent Difference | 660 vs. 3440 Percent Difference |
|---|---|---|---|---|---|---|---|---|---|
| | 0 | 0 | 0 | 0 | 0 | 0 | | | |
| 1 | 0.008 | 0 | 0 | 0 | 0 | 0.008 | 0% | 0% | 0% |
| 2 | 0.016 | 0 | 0 | 0 | 0 | 0.016 | 0% | 0% | 0% |
| 3 | 0.023 | 0 | 0 | 0 | 0 | 0.023 | 0% | 0% | 0% |
| 4 | 0.031 | 0 | 0 | 0 | 0 | 0.031 | 0% | 0% | 0% |
| 5 | 0.039 | 0 | 0 | 0 | 0 | 0.039 | 0% | 0% | 0% |
| 6 | 0.047 | 0 | 0 | 0 | 0 | 0.047 | 0% | 0% | 0% |
| 7 | 0.055 | 0 | 0 | 0 | 0 | 0.055 | 0% | 0% | 0% |
| 8 | 0.063 | 0 | 0 | 0 | 0 | 0.063 | 0% | 0% | 0% |
| 9 | 0.070 | 0 | 0 | 0 | 0 | 0.070 | 0% | 0% | 0% |
| 10 | 0.078 | 0 | 0 | 0 | 0 | 0.078 | 0% | 0% | 0% |
| 11 | 0.086 | 0 | 0 | 0 | 0 | 0.086 | 0% | 0% | 0% |
| 12 | 0.094 | 0 | 0 | 0 | 0 | 0.094 | 0% | 0% | 0% |
| 13 | 0.102 | 0 | 0 | 0 | 0 | 0.102 | 0% | 0% | 0% |
| 14 | 0.109 | 0 | 0 | 0 | 0 | 0.109 | 0% | 0% | 0% |
| 15 | 0.117 | 0 | 0 | 0 | 0 | 0.117 | 0% | 0% | 0% |
| 16 | 0.125 | 0 | 0 | 0 | 0 | 0.125 | 0% | 0% | 0% |
| 17 | 0.133 | 0 | 0 | 0 | 0 | 0.133 | 0% | 0% | 0% |
| 18 | 0.141 | 0 | 0 | 1 | 1 | 0.141 | 0% | 100% | 0% |
| 19 | 0.148 | 1 | 0 | 3 | 1 | 0.148 | 0% | 68% | −3% |
| 20 | 0.156 | 1 | 0 | 3 | 6 | 0.156 | 0% | 68% | −3% |
| 21 | 0.164 | 1 | 3 | 1 | 7 | 0.164 | 68% | 5% | 83% |
| 22 | 0.172 | 4 | 3 | 16 | 11 | 0.172 | −29% | 76% | 41% |
| 23 | 0.180 | 7 | 3 | 10 | 18 | 0.180 | −126% | 33% | 35% |
| 24 | 0.188 | 9 | 9 | 16 | 23 | 0.188 | 3% | 46% | 49% |
| 25 | 0.195 | 15 | 13 | 13 | 21 | 0.195 | −12% | −10% | 33% |
| 26 | 0.203 | 18 | 19 | 39 | 39 | 0.203 | 8% | 56% | 12% |

TABLE 8-continued

Soy "Milk" Fat Shape Analysis

| Class | 3440 Soy Milk Fat Control | 550 Soy Milk Fat Ultra-sound | 640 Soy Milk Fat Ultra-sound | 660 Soy Milk Fat Ultra-sound | Class | 550 vs. 3440 Percent Difference | 640 vs. 3440 Percent Difference | 660 vs. 3440 Percent Difference |
|---|---|---|---|---|---|---|---|---|
| 27 | 0.211 | 22 | 29 | 50 | 37 | 0.211 | 26% | 58% | 42% |
| 28 | 0.219 | 40 | 32 | 51 | 61 | 0.219 | −21% | 25% | −11% |
| 29 | 0.227 | 52 | 43 | 47 | 74 | 0.227 | −17% | −6% | 12% |
| 30 | 0.234 | 71 | 66 | 56 | 84 | 0.234 | −4% | −21% | 1% |
| 31 | 0.242 | 63 | 65 | 69 | 77 | 0.242 | 6% | 13% | 23% |
| 32 | 0.250 | 57 | 67 | 63 | 90 | 0.250 | 18% | 14% | 24% |
| 33 | 0.258 | 91 | 111 | 120 | 92 | 0.258 | 21% | 28% | −4% |
| 34 | 0.266 | 117 | 100 | 73 | 82 | 0.266 | −13% | −53% | −31% |
| 35 | 0.273 | 81 | 85 | 69 | 113 | 0.273 | 8% | −12% | −2% |
| 36 | 0.281 | 102 | 100 | 94 | 81 | 0.281 | 1% | −4% | 7% |
| 37 | 0.289 | 107 | 101 | 77 | 60 | 0.289 | −3% | −33% | −36% |
| 38 | 0.297 | 77 | 65 | 59 | 62 | 0.297 | −15% | −25% | −32% |
| 39 | 0.305 | 65 | 55 | 49 | 50 | 0.305 | −15% | −27% | −8% |
| 40 | 0.313 | 50 | 46 | 40 | 45 | 0.313 | −5% | −19% | −3% |
| 41 | 0.320 | 45 | 52 | 38 | 43 | 0.320 | 16% | −13% | −3% |
| 42 | 0.328 | 29 | 36 | 36 | 17 | 0.328 | 22% | 23% | 31% |
| 43 | 0.336 | 28 | 14 | 12 | 4 | 0.336 | −94% | −123% | −69% |
| 44 | 0.344 | 13 | 14 | 9 | 4 | 0.344 | 10% | −38% | −234% |
| 45 | 0.352 | 3 | 5 | 4 | 4 | 0.352 | 42% | 28% | 23% |
| 46 | 0.359 | 4 | 2 | 2 | 1 | 0.359 | −94% | −91% | −3% |
| 47 | 0.367 | 0 | 0 | 1 | 0 | 0.367 | 0% | 100% | 100% |
| 48 | 0.375 | 0 | 0 | 1 | 0 | 0.375 | 0% | 100% | 0% |
| 49 | 0.383 | 1 | 0 | 0 | 0 | 0.383 | 0% | 0% | 0% |
| 50 | 0.391 | 0 | 0 | 0 | 1 | 0.391 | 0% | 0% | 0% |
| 51 | 0.398 | 0 | 1 | 0 | 0 | 0.398 | 100% | 0% | 100% |
| 52 | 0.406 | 0 | 0 | 0 | 0 | 0.406 | 0% | 0% | 0% |
| 53 | 0.414 | 1 | 0 | 0 | 0 | 0.414 | 0% | 0% | 0% |
| 54 | 0.422 | 0 | 0 | 0 | 0 | 0.422 | 0% | 0% | 0% |
| 55 | 0.430 | 0 | 0 | 0 | 0 | 0.430 | 0% | 0% | 0% |
| 56 | 0.438 | 0 | 0 | 0 | 0 | 0.438 | 0% | 0% | 0% |
| 57 | 0.445 | 0 | 0 | 0 | 0 | 0.445 | 0% | 0% | 0% |
| 58 | 0.453 | 0 | 0 | 0 | 0 | 0.453 | 0% | 0% | 0% |
| 59 | 0.461 | 0 | 0 | 0 | 0 | 0.461 | 0% | 0% | 0% |
| 60 | 0.469 | 0 | 0 | 0 | 0 | 0.469 | 0% | 0% | 0% |
| 61 | 0.477 | 0 | 0 | 0 | 0 | 0.477 | 0% | 0% | 0% |
| 62 | 0.484 | 0 | 0 | 0 | 0 | 0.484 | 0% | 0% | 0% |
| 63 | 0.492 | 0 | 0 | 0 | 0 | 0.492 | 0% | 0% | 0% |
| 64 | 0.500 | 0 | 0 | 0 | 0 | 0.500 | 0% | 0% | 0% |
|  |  | 1175 | 1139 | 1122 | 1209 |  |  |  |  |

TABLE 9

Soy "Milk" Fat Aspect Ratio Analysis

| Class | 3440 Soy Milk Fat Control | 550 Soy Milk Fat Ultra-sound | 640 Soy Milk Fat Ultra-sound | 660 Soy Milk Fat Ultra-sound | Class | 550 vs. 3440 Percent Difference | 640 vs. 3440 Percent Difference | 660 vs. 3440 Percent Difference |
|---|---|---|---|---|---|---|---|---|
|  | 0 | 0 | 0 | 0 | 0 | 0 |  |  |  |
| 1 | 0.02 | 0 | 0 | 0 | 0 | 0.02 | 0% | 0% | 0% |
| 2 | 0.03 | 0 | 0 | 0 | 0 | 0.03 | 0% | 0% | 0% |
| 3 | 0.05 | 0 | 0 | 0 | 0 | 0.05 | 0% | 0% | 0% |
| 4 | 0.06 | 0 | 0 | 0 | 0 | 0.06 | 0% | 0% | 0% |
| 5 | 0.08 | 0 | 0 | 0 | 0 | 0.08 | 0% | 0% | 0% |
| 6 | 0.09 | 0 | 0 | 0 | 0 | 0.09 | 0% | 0% | 0% |
| 7 | 0.11 | 0 | 0 | 0 | 0 | 0.11 | 0% | 0% | 0% |
| 8 | 0.13 | 0 | 0 | 0 | 1 | 0.13 | 0% | 0% | 100% |
| 9 | 0.14 | 0 | 0 | 0 | 0 | 0.14 | 0% | 0% | 0% |
| 10 | 0.16 | 0 | 0 | 0 | 1 | 0.16 | 0% | 0% | 100% |
| 11 | 0.17 | 2 | 1 | 0 | 1 | 0.17 | −91% | 0% | −104% |
| 12 | 0.19 | 0 | 0 | 1 | 1 | 0.19 | 0% | 100% | 100% |
| 13 | 0.20 | 1 | 0 | 0 | 0 | 0.20 | 0% | 0% | 0% |
| 14 | 0.22 | 1 | 2 | 0 | 0 | 0.22 | 52% | 0% | 0% |
| 15 | 0.23 | 3 | 0 | 2 | 1 | 0.23 | 0% | −45% | −207% |

TABLE 9-continued

Soy "Milk" Fat Aspect Ratio Analysis

| Class | 3440 Soy Milk Fat Control | 550 Soy Milk Fat Ultra-sound | 640 Soy Milk Fat Ultra-sound | 660 Soy Milk Fat Ultra-sound | Class | 550 vs. 3440 Percent Difference | 640 vs. 3440 Percent Difference | 660 vs. 3440 Percent Difference |
|---|---|---|---|---|---|---|---|---|
| 16 | 0.25 | 1 | 1 | 0 | 2 | 0.25 | 5% | 0% | 49% |
| 17 | 0.27 | 1 | 2 | 1 | 0 | 0.27 | 52% | 3% | 0% |
| 18 | 0.28 | 4 | 2 | 2 | 1 | 0.28 | −91% | −94% | −309% |
| 19 | 0.30 | 3 | 2 | 0 | 3 | 0.30 | −43% | 0% | −2% |
| 20 | 0.31 | 9 | 7 | 3 | 5 | 0.31 | −23% | −191% | −84% |
| 21 | 0.33 | 3 | 2 | 2 | 5 | 0.33 | −43% | −45% | 39% |
| 22 | 0.34 | 13 | 8 | 3 | 11 | 0.34 | −55% | −320% | −21% |
| 23 | 0.36 | 4 | 5 | 2 | 6 | 0.36 | 24% | −94% | 32% |
| 24 | 0.38 | 8 | 13 | 6 | 7 | 0.38 | 41% | −29% | −17% |
| 25 | 0.39 | 8 | 9 | 4 | 8 | 0.39 | 15% | −94% | −2% |
| 26 | 0.41 | 9 | 13 | 8 | 10 | 0.41 | 34% | −9% | 8% |
| 27 | 0.42 | 22 | 17 | 13 | 16 | 0.42 | −23% | −64% | −41% |
| 28 | 0.44 | 25 | 11 | 9 | 10 | 0.44 | −117% | −169% | −156% |
| 29 | 0.45 | 12 | 17 | 9 | 16 | 0.45 | 33% | −29% | 23% |
| 30 | 0.47 | 13 | 12 | 13 | 17 | 0.47 | −3% | 3% | 22% |
| 31 | 0.48 | 29 | 26 | 26 | 26 | 0.48 | −6% | −8% | −14% |
| 32 | 0.50 | 25 | 18 | 14 | 21 | 0.50 | −33% | −73% | −22% |
| 33 | 0.52 | 22 | 36 | 29 | 30 | 0.52 | 42% | 26% | 25% |
| 34 | 0.53 | 20 | 31 | 10 | 24 | 0.53 | 38% | −94% | 15% |
| 35 | 0.55 | 39 | 31 | 36 | 46 | 0.55 | −20% | −5% | 13% |
| 36 | 0.56 | 24 | 36 | 29 | 31 | 0.56 | 36% | 20% | 21% |
| 37 | 0.58 | 37 | 29 | 30 | 31 | 0.58 | −22% | −20% | −22% |
| 38 | 0.59 | 32 | 29 | 27 | 33 | 0.59 | −5% | −15% | 1% |
| 39 | 0.61 | 32 | 35 | 18 | 34 | 0.61 | 13% | −72% | 4% |
| 40 | 0.63 | 26 | 25 | 20 | 27 | 0.63 | 1% | −26% | 2% |
| 41 | 0.64 | 22 | 21 | 12 | 26 | 0.64 | 0% | −78% | 13% |
| 42 | 0.66 | 26 | 25 | 28 | 43 | 0.66 | 1% | 10% | 38% |
| 43 | 0.67 | 52 | 33 | 31 | 39 | 0.67 | −50% | −63% | −36% |
| 44 | 0.69 | 37 | 21 | 37 | 33 | 0.69 | −68% | 3% | −15% |
| 45 | 0.70 | 38 | 28 | 28 | 39 | 0.70 | −29% | −32% | 0% |
| 46 | 0.72 | 35 | 28 | 50 | 39 | 0.72 | −19% | 32% | 8% |
| 47 | 0.73 | 44 | 29 | 39 | 33 | 0.73 | −45% | −9% | −36% |
| 48 | 0.75 | 59 | 44 | 43 | 31 | 0.75 | −28% | −33% | −95% |
| 49 | 0.77 | 33 | 28 | 29 | 47 | 0.77 | −12% | −10% | 28% |
| 50 | 0.78 | 41 | 46 | 42 | 50 | 0.78 | 15% | 5% | 16% |
| 51 | 0.80 | 28 | 24 | 33 | 31 | 0.80 | −11% | 18% | 8% |
| 52 | 0.81 | 36 | 26 | 34 | 36 | 0.81 | −32% | −3% | −2% |
| 53 | 0.83 | 38 | 35 | 40 | 37 | 0.83 | −4% | 8% | −5% |
| 54 | 0.84 | 49 | 48 | 54 | 44 | 0.84 | 3% | 12% | −14% |
| 55 | 0.86 | 53 | 65 | 65 | 57 | 0.86 | 22% | 21% | 5% |
| 56 | 0.88 | 43 | 31 | 19 | 24 | 0.88 | −32% | −119% | −83% |
| 57 | 0.89 | 15 | 22 | 27 | 26 | 0.89 | 35% | 46% | 41% |
| 58 | 0.91 | 14 | 25 | 30 | 22 | 0.91 | 47% | 55% | 35% |
| 59 | 0.92 | 9 | 17 | 28 | 18 | 0.92 | 49% | 69% | 49% |
| 60 | 0.94 | 9 | 18 | 36 | 23 | 0.94 | 52% | 76% | 60% |
| 61 | 0.95 | 13 | 20 | 27 | 19 | 0.95 | 38% | 53% | 30% |
| 62 | 0.97 | 21 | 29 | 31 | 20 | 0.97 | 31% | 34% | −7% |
| 63 | 0.98 | 9 | 13 | 7 | 13 | 0.98 | 34% | −25% | 29% |
| 64 | 1.00 | 5 | 8 | 6 | 8 | 1.00 | 40% | 19% | 36% |
|  |  | 1157 | 1104 | 1093 | 1183 |  |  |  |  |

Figure 32A:
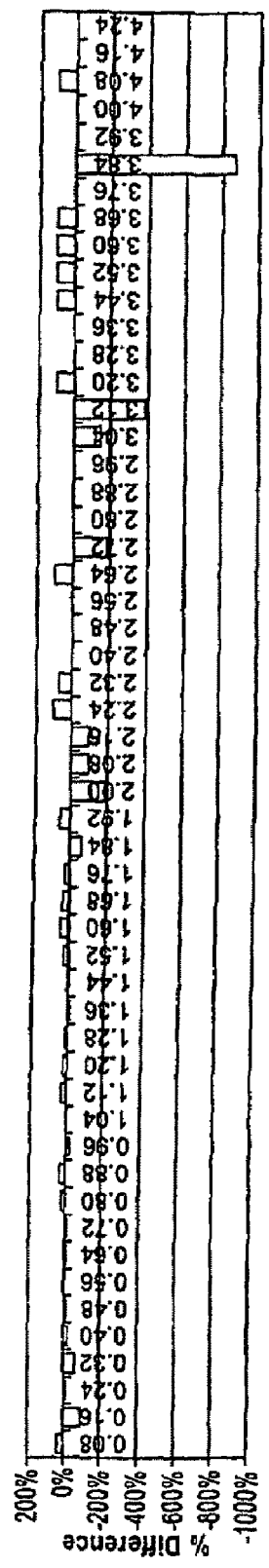
FIG. 32a presents the data for a soy milk beverage treated with ultrasound, with an ultrasound device set at 80% amplitude, applying 220 watts of power at an intensity of 24.44 watts/cm$^2$.
Figure 33A:
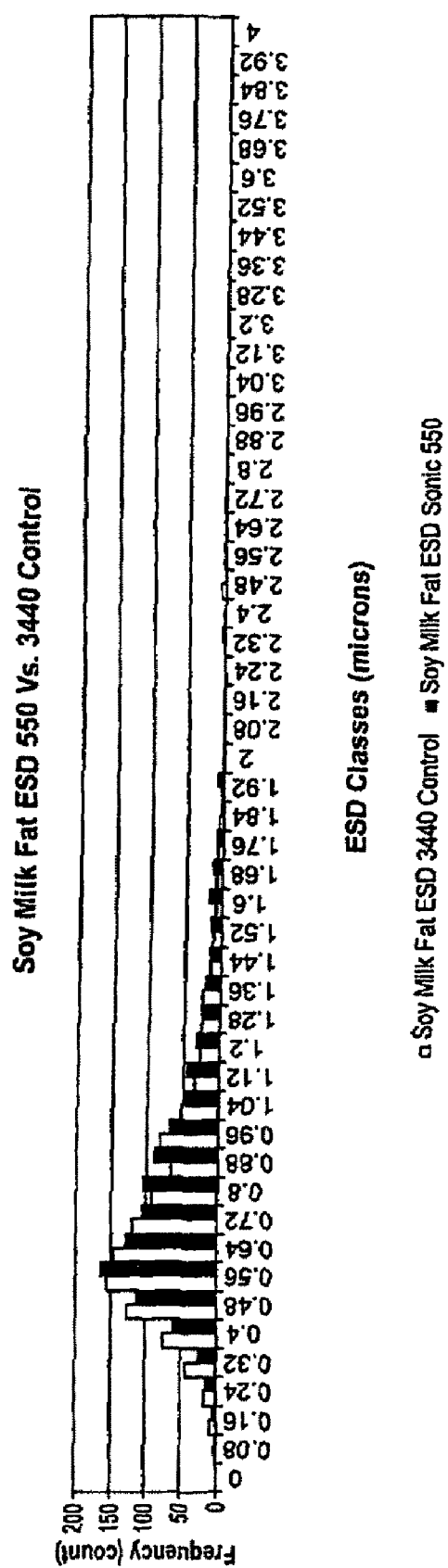
FIG. 33a presents the data for a soy milk beverage treated with ultrasound, with an ultrasound device set at 80% amplitude, applying 220 watts of power at an intensity of 24.44 watts/cm$^2$.
Figure 33B:
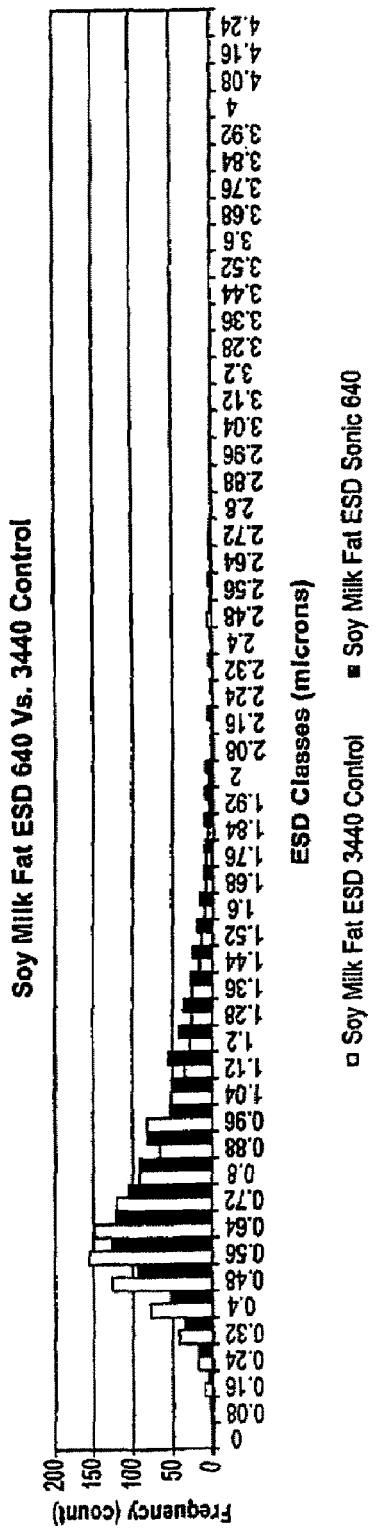
FIG. 33b presents the data for a soy milk beverage treated with ultrasound, with an ultrasound device set at 80% amplitude, applying 275 watts of power at an intensity of 31 watts/cm$^2$.
Figure 33C:
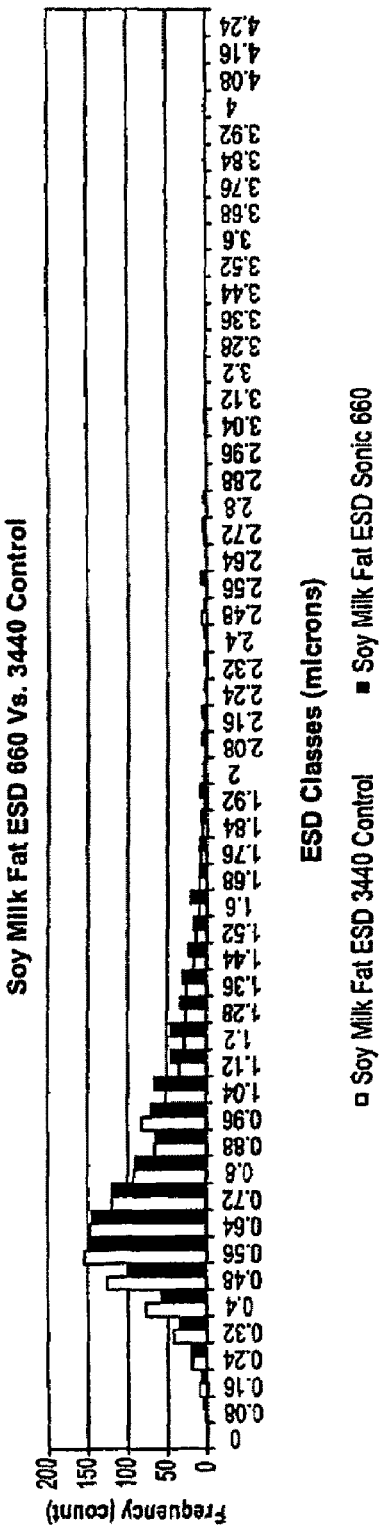
FIG. 33c presents the data for a soy milk beverage treated with ultrasound, with an ultrasound device set at 100% amplitude, applying 315 watts of power at an intensity of 35 watts/cm$^2$.
Figure 34A:
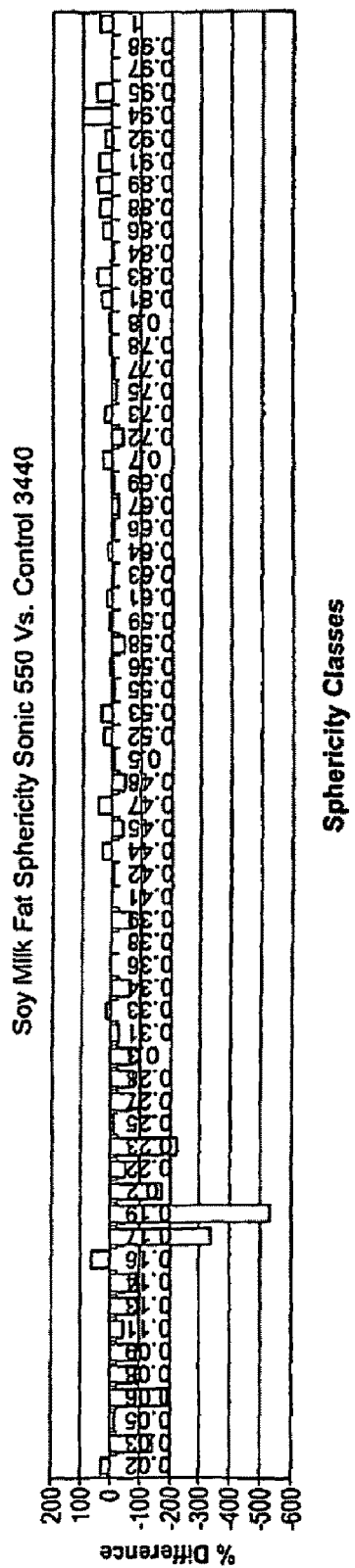
FIG. 34a presents the data for a soy milk beverage treated with ultrasound, with an ultrasound device set at 80% amplitude, applying 220 watts of power at an intensity of 24.44 watts/cm$^2$.
Figure 34B:
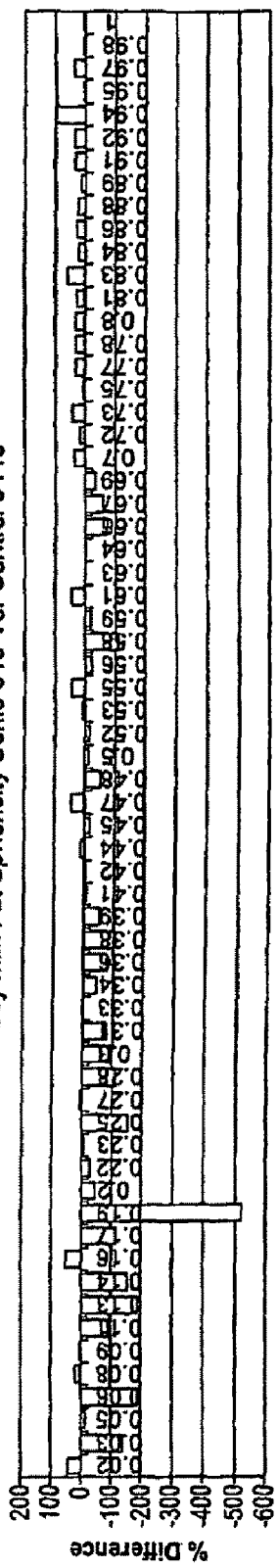
FIG. 34b presents the data for a soy milk beverage treated with ultrasound, with an ultrasound device set at 80% amplitude, applying 275 watts of power at an intensity of 31 watts/cm$^2$.
Figure 34C:
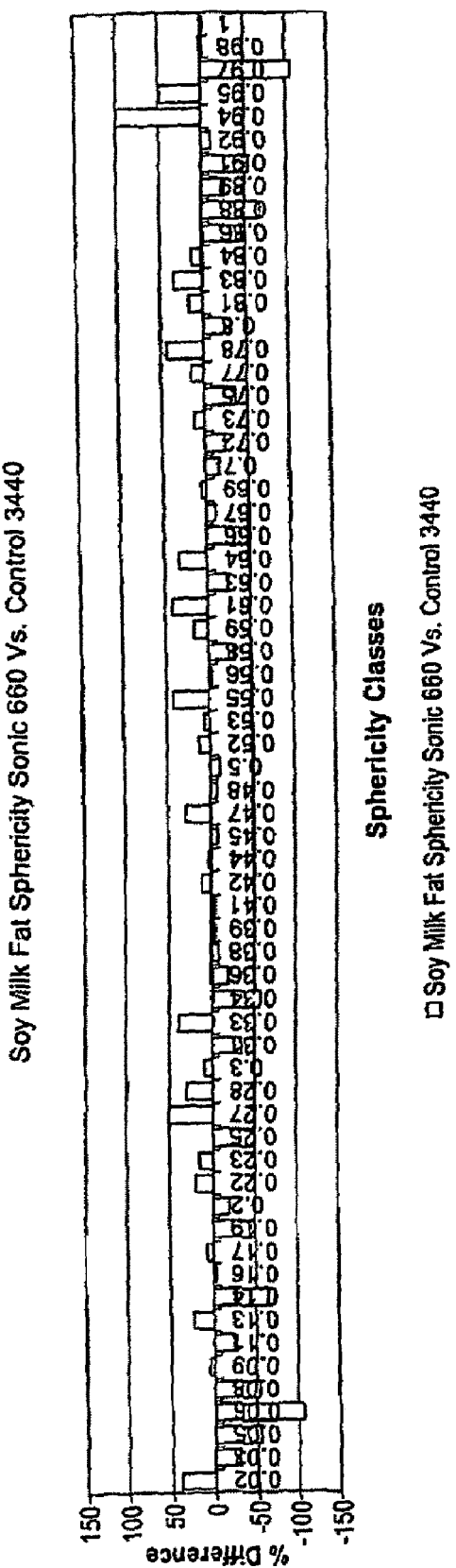
FIG. 34c presents the data for a soy milk beverage treated with ultrasound, with an ultrasound device set at 100% amplitude, applying 315 watts of power at an intensity of 35 watts/cm$^2$.
Figure 35A:
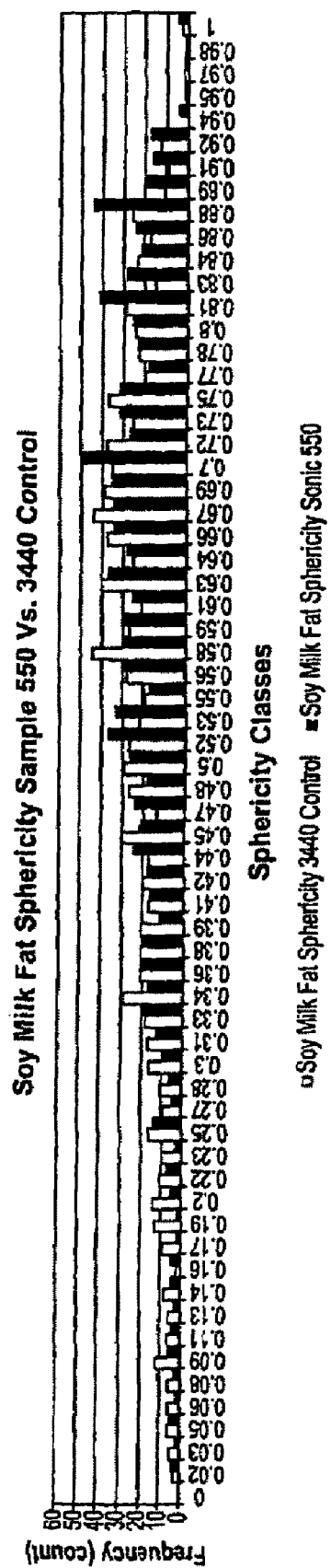
FIG. 35a presents the data for a soy milk beverage treated with ultrasound, with an ultrasound device set at 80% amplitude, applying 220 watts of power at an intensity of 24.44 watts/cm$^2$.
Figure 35B:
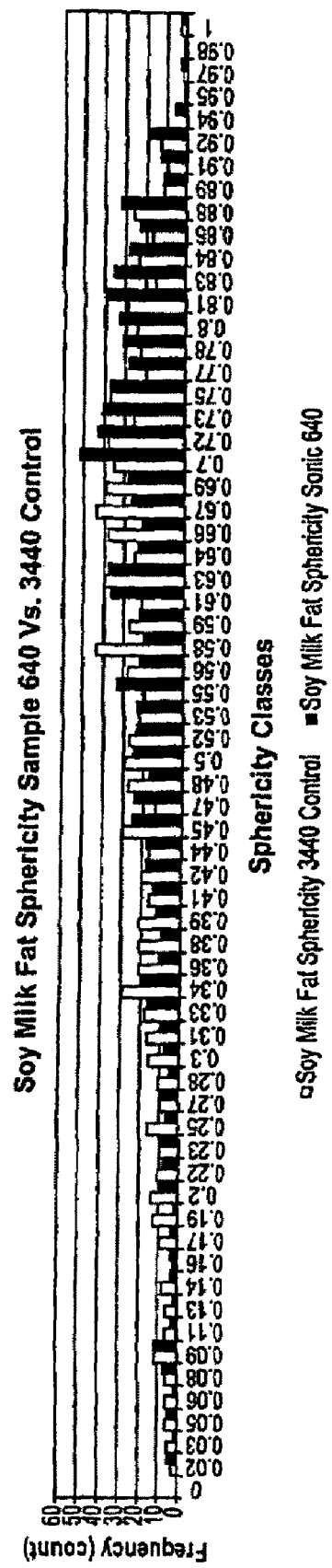
FIG. 35b presents the data for a soy milk beverage treated with ultrasound, with an ultrasound device set at 80% amplitude, applying 275 watts of power at an intensity of 31 watts/cm$^2$.
Figure 35C:
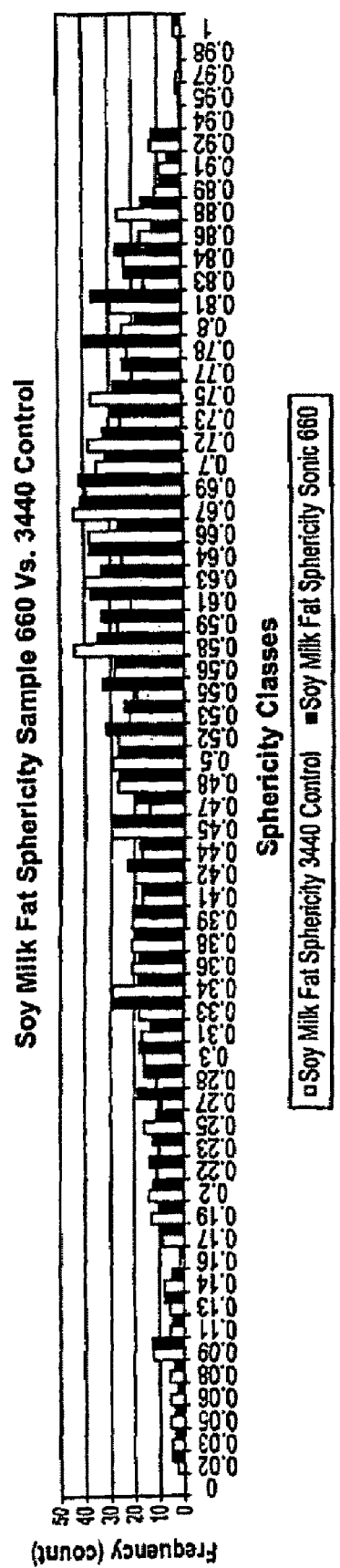
FIG. 35c presents the data for a soy milk beverage treated with ultrasound, with an ultrasound device set at 100% amplitude, applying 315 watts of power at an intensity of 35 watts/cm$^2$.
Figure 36A:
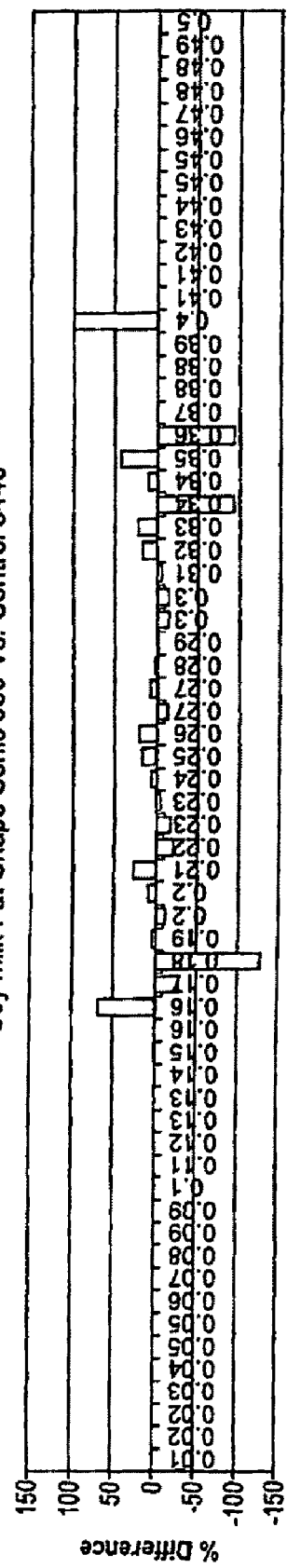
FIG. 36a presents the data for a soy milk beverage treated with ultrasound, with an ultrasound device set at 80% amplitude, applying 220 watts of power at an intensity of 24.44 watts/cm$^2$.
Figure 36B:
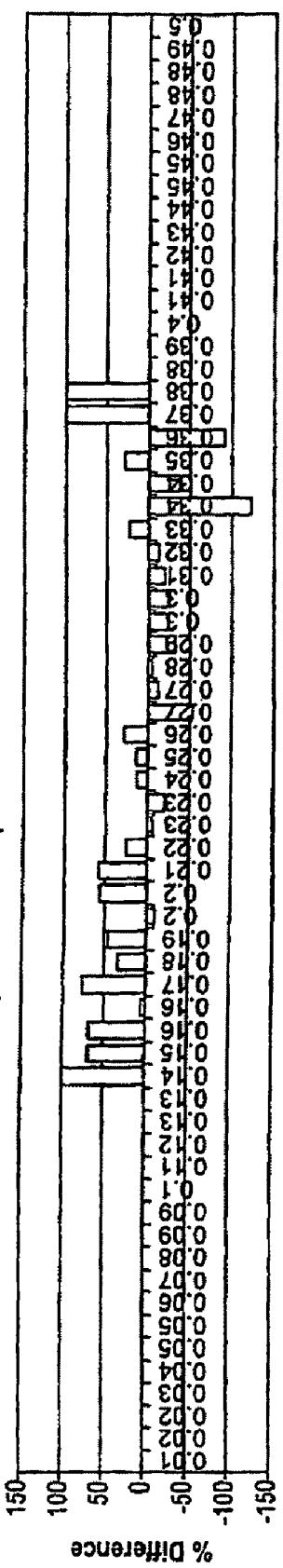
FIG. 36b presents the data for a soy milk beverage treated with ultrasound, with an ultrasound device set at 80% amplitude, applying 275 watts of power at an intensity of 31 watts/cm$^2$.
Figure 36C:
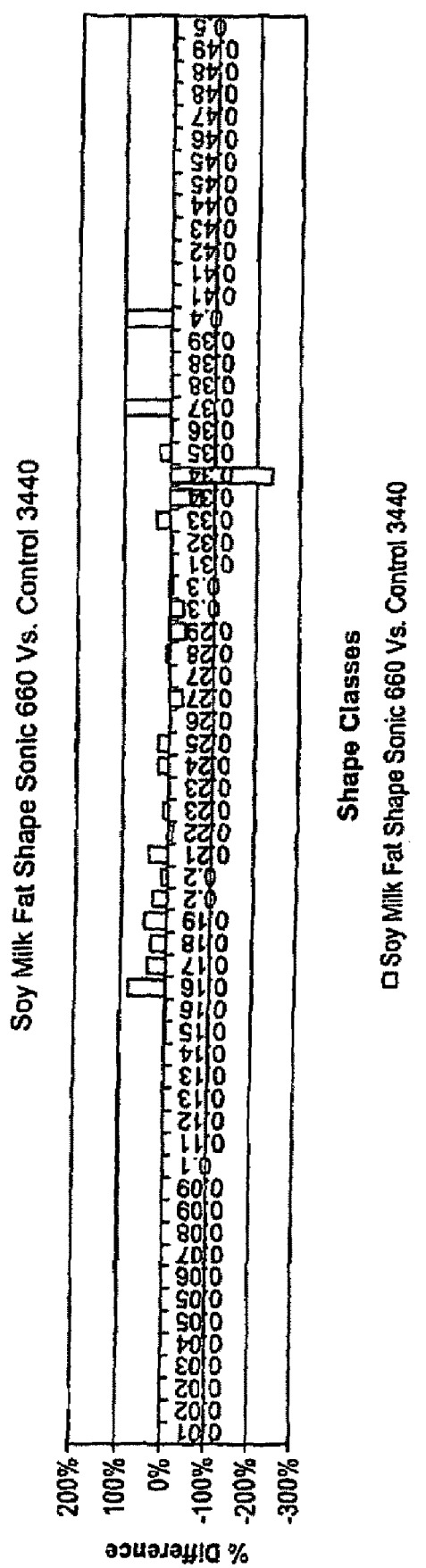
FIG. 36c presents the data for a soy milk beverage treated with ultrasound, with an ultrasound device set at 100% amplitude, applying 315 watts of power at an intensity of 35 watts/cm$^2$.
Figure 37A:
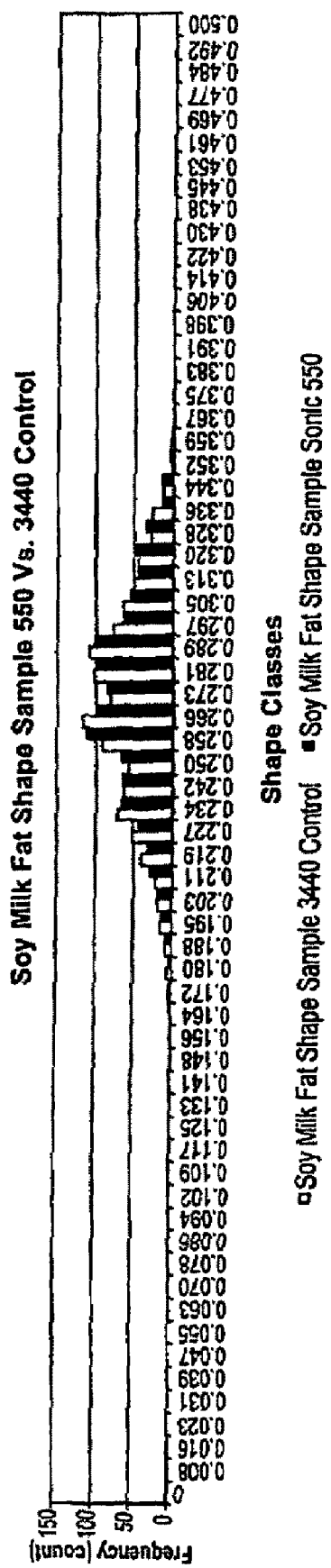
FIG. 37a presents the data for a soy milk beverage treated with ultrasound, with an ultrasound device set at 80% amplitude, applying 220 watts of power at an intensity of 24.44 watts/cm$^2$.
Figure 37B:
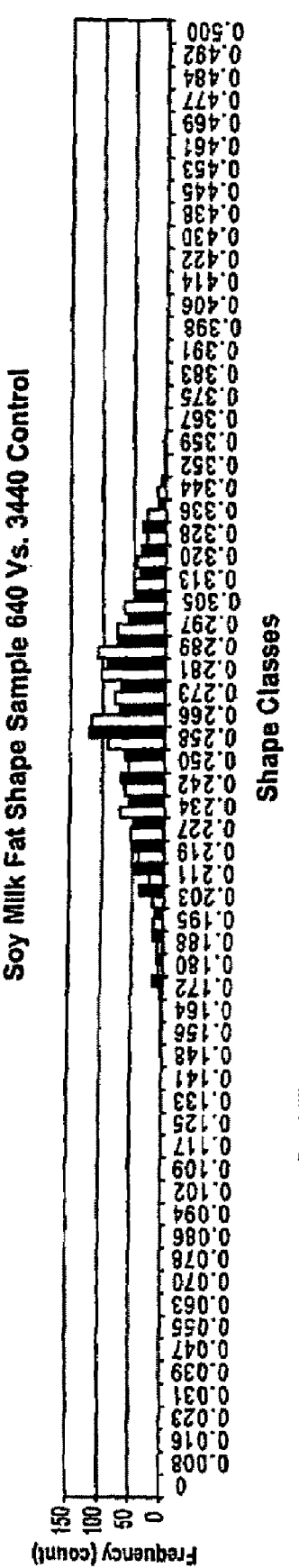
FIG. 37b presents the data for a soy milk beverage treated with ultrasound, with an ultrasound device set at 80% amplitude, applying 275 watts of power at an intensity of 31 watts/cm$^2$.
Figure 37C:
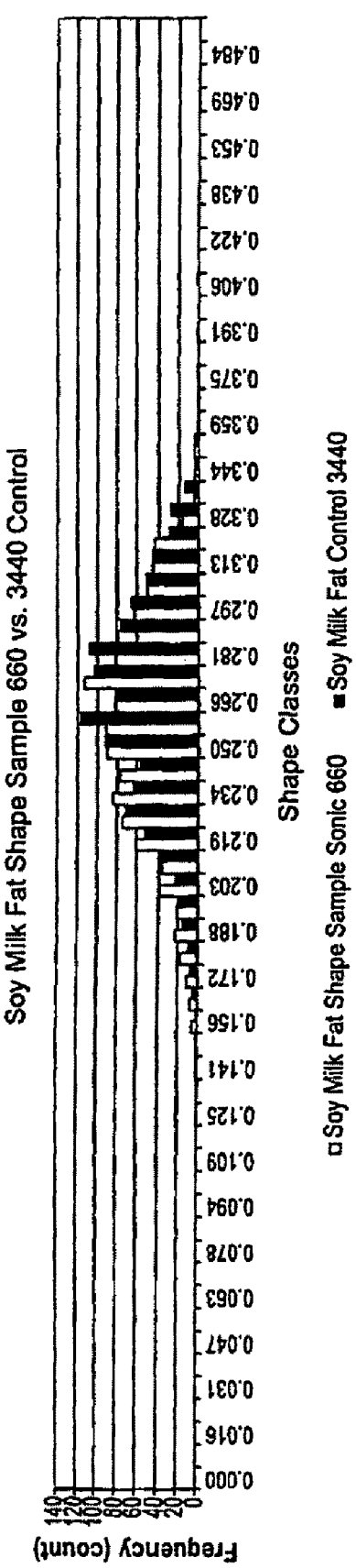
FIG. 37c presents the data for a soy milk beverage treated with ultrasound, with an ultrasound device set at 100% amplitude, applying 315 watts of power at an intensity of 35 watts/cm$^2$.
Figure 38A:
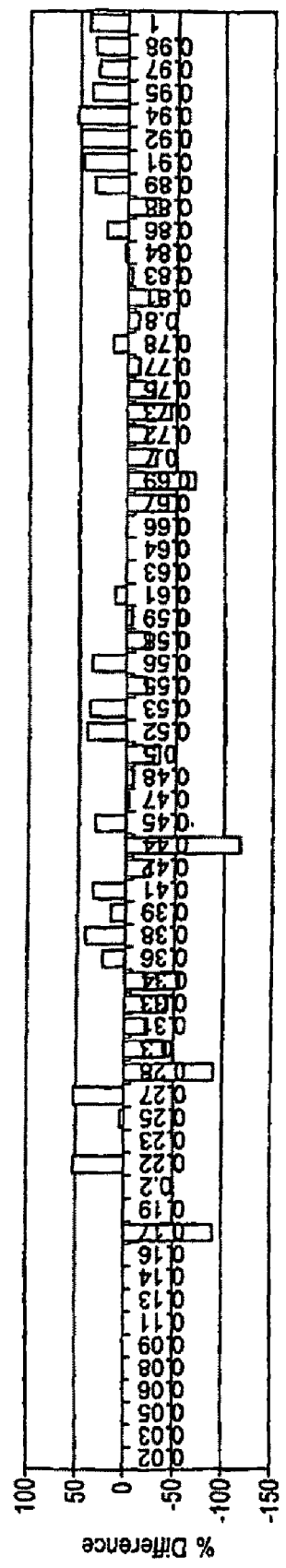
FIG. 38a presents the data for a soy milk beverage treated with ultrasound, with an ultrasound device set at 80% amplitude, applying 220 watts of power at an intensity of 24.44 watts/cm$^2$.
Figure 38B:
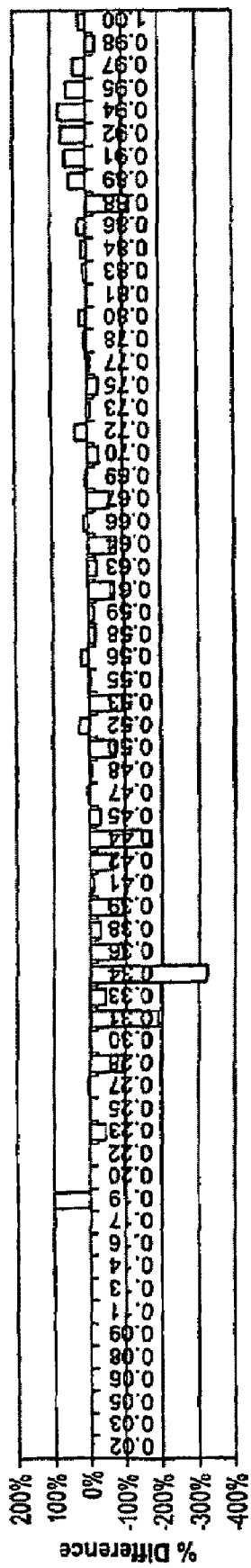
FIG. 38b presents the data for a soy milk beverage treated with ultrasound, with an ultrasound device set at 80% amplitude, applying 275 watts of power at an intensity of 31 watts/cm$^2$.
Figure 38C:
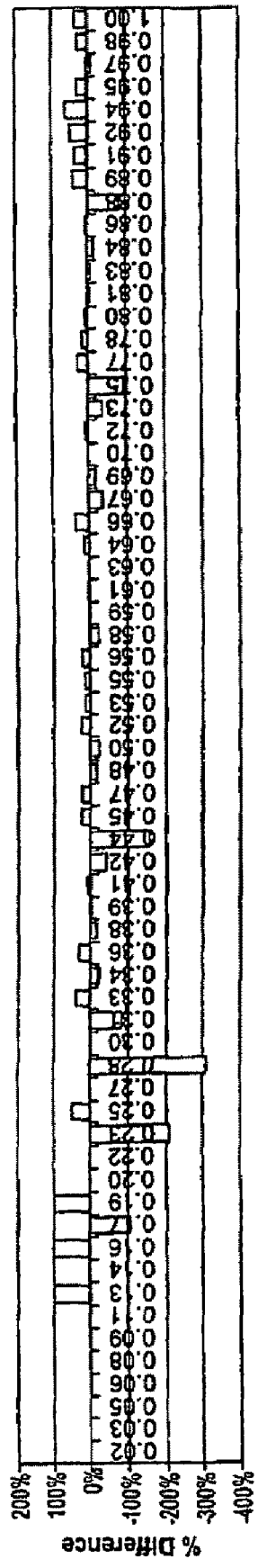
FIG. 38c presents the data for a soy milk beverage treated with ultrasound, with an ultrasound device set at 100% amplitude, applying 315 watts of power at an intensity of 35 watts/cm$^2$.
Figure 39A:
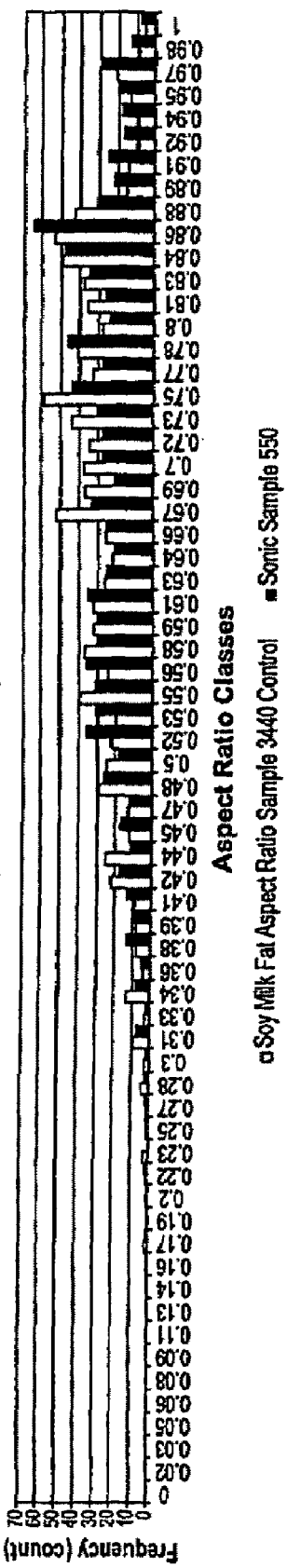
FIG. 39a presents the data for a soy milk beverage treated with ultrasound, with an ultrasound device set at 80% amplitude, applying 220 watts of power at an intensity of 24.44 watts/cm$^2$.
Figure 39B:
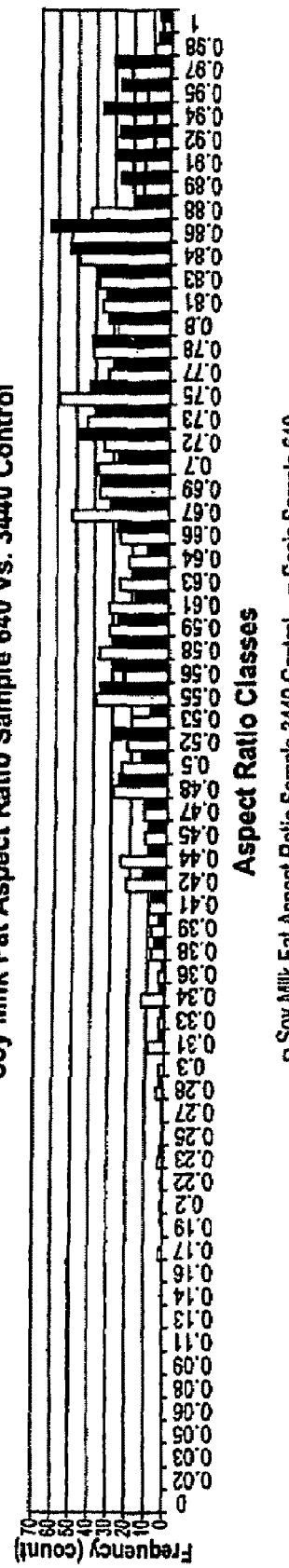
FIG. 39b presents the data for a soy milk beverage treated with ultrasound, with an ultrasound device set at 80% amplitude, applying 275 watts of power at an intensity of 31 watts/cm$^2$.
Figure 39C:
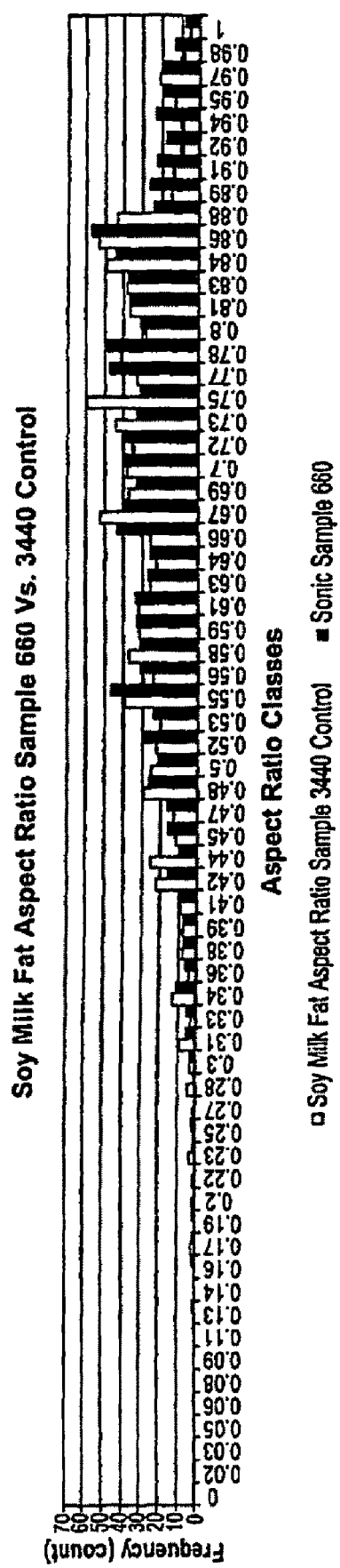
FIG. 39c presents the data for a soy milk beverage treated with ultrasound, with an ultrasound device set at 100% amplitude, applying 315 watts of power at an intensity of 35 watts/cm$^2$.

FIGS. 32 a-c and 33 a-c are graphical representations of the equivalent spherical diameter data for the soy beverages. As can been seen in FIGS. 33 a-c, within the specified range of equivalent spherical diameter classes, there is an increase and a more uniform distribution of fat particles in those products made in accordance with the present invention than in the control product. Similar effects are seen for sphericity, shape and aspect ratio. FIGS. 34 a-c and 35 a-c are graphical representations of the sphericity data, FIGS. 36 a-c and 37 a-c are graphical representations of the shape data, and FIGS. 38 a-c and 39 a-c are graphical representations of the aspect ratio data for the soy beverages. In each analysis of the particle morphology parameter, there is a definite optimum range of classes corresponding to that parameter, an increase in the number of particles within those classes, and a more uniform distribution of particles within the classes of that range in the products made in accordance with the present invention, as compared to the control product.

In this embodiment of the present invention, the optimal ranges for classes of fat particle morphology parameters are summarized in the table below:

TABLE 10

Particle Morphology Parameter Ranges

| Morphology Parameter | Useful Range | Preferred Range |
|---|---|---|
| Equivalent Spherical Diameter | About 1.04-About 2.4 microns | About 1.04-About 1.92 microns |

TABLE 10-continued

Particle Morphology Parameter Ranges

| Morphology Parameter | Useful Range | Preferred Range |
|---|---|---|
| Sphericity | About .70-About 1.0 | About .86-About 1.0 |
| Shape | About .14-About .25 | About .172-About .25 |
| Aspect Ratio | About .89-About 1.0 | |

EXAMPLE 6

A soy base product was processed using the method of the present invention. The particle morphology of the fat component of the soy base was evaluated and modified to improve the functional and organoleptic properties of the soy base. Soy base products made in accordance with the present invention had an improved creaminess, reduced grittiness, and a better mouthfeel than products made with conventional methods.

The samples of soy base were treated as in the previous examples, under the following conditions.

Sample 3430 was the control soy base product treated using conventional homogenization techniques. The fat content of the soy base product was 3% to 4%. Samples 1940 and 1960 were the same soy base product, but were treated with ultrasound.

Sample 1940 was treated with 255 watts of ultrasound energy at an amplitude of 80%, with an intensity of 28 watts/cm$^2$, under a system pressure of 4 psi, with 24 psi of back pressure, at a flow rate of 1 liter per minute, at a temperature of about 174° F. The sonic area was about 9 cm$^2$. Sample 1960 was treated similar to sample 1940, but with 318 watts of ultrasound energy at an amplitude of 100%, with an intensity of 35 watts/cm$^2$.

The data are summarized in the tables below and the percent differences at each interval between the homogenized control and the products made in accordance with the present invention are graphically represented in FIGS. 40 *a-b* to 47 *a-b*. As can been seen from this data, products made in accordance with the present invention have a significant increase in particles within the specified ranges for each morphological parameter, and the distribution of particles within the ranges is more uniform than the overall particle distribution of the control product.

TABLE 11

Soy Base Fat Equivalent Spherical Diameter Analysis

| Class | 3430 Soy Base Fat Control | 1940 Soy Base Fat Sonic | 1960 Soy Base Fat Sonic | Class | | 1940 vs. 3430 Percent Difference | 1960 vs. 3430 Percent Difference |
|---|---|---|---|---|---|---|---|
| 0 | 0 | 0 | 0 | | 0 | | |
| 1 | 0.08 | 6 | 1 | 0 | 1 | 0.08 | −517% | 0% |
| 2 | 0.16 | 11 | 5 | 2 | 2 | 0.16 | −126% | −455% |
| 3 | 0.24 | 30 | 11 | 10 | 3 | 0.24 | −180% | −203% |
| 4 | 0.32 | 49 | 27 | 23 | 4 | 0.32 | −86% | −115% |
| 5 | 0.40 | 71 | 45 | 46 | 5 | 0.40 | −62% | −56% |
| 6 | 0.48 | 130 | 92 | 78 | 6 | 0.48 | −45% | −68% |
| 7 | 0.56 | 161 | 145 | 104 | 7 | 0.56 | −14% | −56% |
| 8 | 0.64 | 144 | 116 | 140 | 8 | 0.64 | −28% | −4% |
| 9 | 0.72 | 76 | 100 | 102 | 9 | 0.72 | 22% | 25% |
| 10 | 0.80 | 86 | 84 | 111 | 10 | 0.80 | −5% | 22% |
| 11 | 0.88 | 68 | 56 | 109 | 11 | 0.88 | −25% | 37% |
| 12 | 0.96 | 60 | 58 | 74 | 12 | 0.96 | −6% | 18% |
| 13 | 1.04 | 56 | 58 | 58 | 13 | 1.04 | 1% | 3% |
| 14 | 1.12 | 32 | 61 | 48 | 14 | 1.12 | 46% | 33% |
| 15 | 1.20 | 30 | 55 | 42 | 15 | 1.20 | 44% | 28% |
| 16 | 1.28 | 20 | 34 | 35 | 16 | 1.28 | 40% | 42% |
| 17 | 1.36 | 28 | 18 | 30 | 17 | 1.36 | −60% | 6% |
| 18 | 1.44 | 14 | 29 | 25 | 18 | 1.44 | 50% | 43% |
| 19 | 1.52 | 13 | 30 | 14 | 19 | 1.52 | 55% | 6% |
| 20 | 1.60 | 8 | 22 | 14 | 20 | 1.60 | 63% | 42% |
| 21 | 1.68 | 5 | 14 | 19 | 21 | 1.68 | 63% | 73% |
| 22 | 1.76 | 3 | 15 | 15 | 22 | 1.76 | 79% | 80% |
| 23 | 1.84 | 3 | 14 | 9 | 23 | 1.84 | 78% | 66% |
| 24 | 1.92 | 4 | 10 | 7 | 24 | 1.92 | 59% | 42% |
| 25 | 2.00 | 4 | 8 | 6 | 25 | 2.00 | 49% | 33% |
| 26 | 2.08 | 0 | 13 | 5 | 26 | 2.08 | 100% | 100% |
| 27 | 2.16 | 1 | 11 | 2 | 27 | 2.16 | 91% | 50% |
| 28 | 2.24 | 2 | 5 | 1 | 28 | 2.24 | 59% | −102% |
| 29 | 2.32 | 0 | 6 | 2 | 29 | 2.32 | 100% | 100% |
| 30 | 2.40 | 0 | 3 | 0 | 30 | 2.40 | 100% | 0% |
| 31 | 2.48 | 0 | 1 | 2 | 31 | 2.48 | 100% | 100% |
| 32 | 2.56 | 1 | 0 | 0 | 32 | 2.56 | 0% | 0% |
| 33 | 2.64 | 1 | 3 | 0 | 33 | 2.64 | 66% | 0% |
| 34 | 2.72 | 2 | 1 | 0 | 34 | 2.72 | −106% | 0% |
| 35 | 2.80 | 1 | 2 | 0 | 35 | 2.80 | 49% | 0% |
| 36 | 2.88 | 1 | 0 | 0 | 36 | 2.88 | 0% | 0% |
| 37 | 2.96 | 0 | 1 | 0 | 37 | 2.96 | 100% | 0% |
| 38 | 3.04 | 0 | 0 | 1 | 38 | 3.04 | 0% | 100% |
| 39 | 3.12 | 0 | 0 | 0 | 39 | 3.12 | 0% | 0% |
| 40 | 3.20 | 1 | 0 | 0 | 40 | 3.20 | 0% | 0% |
| 41 | 3.28 | 0 | 0 | 0 | 41 | 3.28 | | |
| 42 | 3.36 | 0 | 0 | 0 | 42 | 3.36 | | |
| 43 | 3.44 | 0 | 0 | 0 | 43 | 3.44 | | |
| 44 | 3.52 | 0 | 0 | 0 | 44 | 3.52 | | |
| 45 | 3.60 | 0 | 0 | 0 | 45 | 3.60 | | |
| 46 | 3.68 | 1 | 0 | 0 | 46 | 3.68 | | |
| 47 | 3.76 | 0 | 0 | 0 | 47 | 3.76 | | |
| 48 | 3.84 | 0 | 0 | 0 | 48 | 3.84 | | |
| 49 | 3.92 | 0 | 0 | 0 | 49 | 3.92 | | |
| 50 | 4.00 | 0 | 0 | 0 | 50 | 4.00 | | |
| 51 | 4.08 | 0 | 0 | 0 | 51 | 4.08 | | |
| 52 | 4.16 | 0 | 0 | 0 | 52 | 4.16 | | |
| 53 | 4.24 | 0 | 0 | 0 | 53 | 4.24 | | |
| 54 | 4.32 | 0 | 0 | 0 | 54 | 4.32 | | |
| 55 | 4.40 | 0 | 0 | 0 | 55 | 4.40 | | |
| 56 | 4.48 | 0 | 0 | 0 | 56 | 4.48 | | |
| 57 | 4.56 | 0 | 0 | 0 | 57 | 4.56 | | |
| 58 | 4.64 | 0 | 0 | 0 | 58 | 4.64 | | |
| 59 | 4.72 | 0 | 0 | 0 | 59 | 4.72 | | |
| 60 | 4.80 | 0 | 0 | 0 | 60 | 4.80 | | |
| 61 | 4.88 | 0 | 0 | 0 | 61 | 4.88 | | |
| 62 | 4.96 | 0 | 0 | 0 | 62 | 4.96 | | |
| 63 | 5.04 | 0 | 0 | 0 | 63 | 5.04 | | |
| 64 | 5.12 | 0 | 0 | 0 | 64 | 5.12 | | |
| 65 | 5.20 | 0 | 0 | 0 | 65 | 5.20 | | |
| 66 | 5.28 | 0 | 0 | 0 | 66 | 5.28 | | |
| 67 | 5.36 | 0 | 0 | 0 | 67 | 5.36 | | |
| 68 | 5.44 | 0 | 0 | 0 | 68 | 5.44 | | |
| 69 | 5.52 | 0 | 0 | 0 | 69 | 5.52 | | |
| 70 | 5.60 | 0 | 0 | 0 | 70 | 5.60 | | |
| 71 | 5.68 | 0 | 0 | 0 | 71 | 5.68 | | |
| 72 | 5.76 | 0 | 0 | 0 | 72 | 5.76 | | |
| 73 | 5.84 | 0 | 0 | 0 | 73 | 5.84 | | |
| 74 | 5.92 | 0 | 0 | 0 | 74 | 5.92 | | |
| 75 | 6.00 | 0 | 0 | 0 | 75 | 6.00 | | |
| 76 | 6.08 | 0 | 0 | 0 | 76 | 6.08 | | |
| 77 | 6.16 | 0 | 0 | 0 | 77 | 6.16 | | |
| 78 | 6.24 | 0 | 0 | 0 | 78 | 6.24 | | |
| 79 | 6.32 | 0 | 0 | 0 | 79 | 6.32 | | |
| 80 | 6.40 | 0 | 0 | 0 | 80 | 6.40 | | |
| 81 | 6.48 | 0 | 0 | 0 | 81 | 6.48 | | |
| 82 | 6.56 | 0 | 0 | 0 | 82 | 6.56 | | |
| 83 | 6.64 | 0 | 0 | 0 | 83 | 6.64 | | |
| 84 | 6.72 | 0 | 0 | 0 | 84 | 6.72 | | |

TABLE 11-continued

Soy Base Fat Equivalent Spherical Diameter Analysis

| Class | 3430 Soy Base Fat Control | 1940 Soy Base Fat Sonic | 1960 Soy Base Fat Sonic | Class | | 1940 vs. 3430 Percent Difference | 1960 vs. 3430 Percent Difference |
|---|---|---|---|---|---|---|---|
| 85 | 6.80 | 0 | 0 | 0 | 85 | 6.80 | |
| 86 | 6.88 | 0 | 0 | 0 | 86 | 6.88 | |
| 87 | 6.96 | 0 | 0 | 0 | 87 | 6.96 | |
| 88 | 7.04 | 0 | 0 | 0 | 88 | 7.04 | |
| 89 | 7.12 | 0 | 0 | 0 | 89 | 7.12 | |
| 90 | 7.20 | 0 | 0 | 0 | 90 | 7.20 | |
| 91 | 7.28 | 0 | 0 | 0 | 91 | 7.28 | |
| 92 | 7.36 | 0 | 0 | 0 | 92 | 7.36 | |
| 93 | 7.44 | 0 | 0 | 0 | 93 | 7.44 | |
| 94 | 7.52 | 0 | 0 | 0 | 94 | 7.52 | |
| 95 | 7.60 | 0 | 0 | 0 | 95 | 7.60 | |
| 96 | 7.68 | 0 | 0 | 0 | 96 | 7.68 | |
| 97 | 7.76 | 0 | 0 | 0 | 97 | 7.76 | |
| 98 | 7.84 | 0 | 0 | 0 | 98 | 7.84 | |
| 99 | 7.92 | 0 | 0 | 0 | 99 | 7.92 | |
| 100 | 8.00 | 0 | 0 | 0 | 100 | 8.00 | |
| | | 1123 | 1154 | 1134 | | | |

TABLE 12

Soy Base Fat Sphericity Analysis

| Class | 3430 Soy Base Fat Control | 1940 Soy Base Fat Sonic | 1960 Soy Base Fat Sonic | Class | | 1940 vs. 3430 Percent Difference | 1960 vs. 3430 Percent Difference |
|---|---|---|---|---|---|---|---|
| 0 | 0 | 0 | 0 | 0 | | | |
| 1 | 0.02 | 7 | 2 | 2 | 1 | 0.02 | −260% | −253% |
| 2 | 0.03 | 9 | 0 | 5 | 2 | 0.03 | 0% | −82% |
| 3 | 0.05 | 9 | 4 | 5 | 3 | 0.05 | −131% | −82% |
| 4 | 0.06 | 11 | 3 | 4 | 4 | 0.06 | −277% | −178% |
| 5 | 0.08 | 6 | 2 | 8 | 5 | 0.08 | −208% | 24% |
| 6 | 0.09 | 14 | 2 | 12 | 6 | 0.09 | −619% | −18% |
| 7 | 0.11 | 10 | 2 | 7 | 7 | 0.11 | −414% | −44% |
| 8 | 0.13 | 17 | 6 | 6 | 8 | 0.13 | −191% | −186% |
| 9 | 0.14 | 9 | 1 | 12 | 9 | 0.14 | −825% | 24% |
| 10 | 0.16 | 11 | 2 | 7 | 10 | 0.16 | −465% | −59% |
| 11 | 0.17 | 11 | 2 | 10 | 11 | 0.17 | −465% | −11% |
| 12 | 0.19 | 15 | 8 | 12 | 12 | 0.19 | −93% | −26% |
| 13 | 0.20 | 15 | 7 | 14 | 13 | 0.20 | −120% | −8% |
| 14 | 0.22 | 15 | 5 | 16 | 14 | 0.22 | −208% | 5% |
| 15 | 0.23 | 19 | 9 | 17 | 15 | 0.23 | −117% | −13% |
| 16 | 0.25 | 26 | 6 | 17 | 16 | 0.25 | −345% | −54% |
| 17 | 0.27 | 19 | 11 | 13 | 17 | 0.27 | −77% | −48% |
| 18 | 0.28 | 19 | 10 | 20 | 18 | 0.28 | −95% | 4% |
| 19 | 0.30 | 20 | 11 | 13 | 19 | 0.30 | −87% | −55% |
| 20 | 0.31 | 19 | 6 | 19 | 20 | 0.31 | −225% | −1% |
| 21 | 0.33 | 28 | 7 | 27 | 21 | 0.33 | −311% | −5% |
| 22 | 0.34 | 28 | 12 | 26 | 22 | 0.34 | −140% | −9% |
| 23 | 0.36 | 26 | 7 | 23 | 23 | 0.36 | −282% | −14% |
| 24 | 0.38 | 39 | 8 | 27 | 24 | 0.38 | −401% | −46% |
| 25 | 0.39 | 33 | 8 | 19 | 25 | 0.39 | −324% | −75% |
| 26 | 0.41 | 24 | 9 | 18 | 26 | 0.41 | −174% | −35% |
| 27 | 0.42 | 29 | 10 | 23 | 27 | 0.42 | −198% | −27% |
| 28 | 0.44 | 24 | 19 | 30 | 28 | 0.44 | −30% | 19% |
| 29 | 0.45 | 22 | 15 | 28 | 29 | 0.45 | −51% | 21% |
| 30 | 0.47 | 21 | 9 | 20 | 30 | 0.47 | −140% | −6% |
| 31 | 0.48 | 24 | 21 | 26 | 31 | 0.48 | −17% | 7% |
| 32 | 0.50 | 29 | 19 | 24 | 32 | 0.50 | −57% | −22% |
| 33 | 0.52 | 37 | 17 | 23 | 33 | 0.52 | −124% | −62% |
| 34 | 0.53 | 18 | 9 | 23 | 34 | 0.53 | −106% | 21% |
| 35 | 0.55 | 30 | 21 | 14 | 35 | 0.55 | −47% | −116% |
| 36 | 0.56 | 26 | 22 | 29 | 36 | 0.56 | −21% | 9% |
| 37 | 0.58 | 20 | 22 | 32 | 37 | 0.58 | 7% | 37% |
| 38 | 0.59 | 18 | 21 | 29 | 38 | 0.59 | 12% | 37% |
| 39 | 0.61 | 14 | 16 | 26 | 39 | 0.61 | 10% | 46% |
| 40 | 0.63 | 28 | 36 | 31 | 40 | 0.63 | 20% | 9% |
| 41 | 0.64 | 29 | 17 | 26 | 41 | 0.64 | −75% | −13% |
| 42 | 0.66 | 19 | 21 | 17 | 42 | 0.66 | 7% | −13% |
| 43 | 0.67 | 27 | 25 | 25 | 43 | 0.67 | −11% | −9% |
| 44 | 0.69 | 29 | 51 | 32 | 44 | 0.69 | 42% | 8% |
| 45 | 0.70 | 20 | 41 | 35 | 45 | 0.70 | 50% | 42% |
| 46 | 0.72 | 21 | 36 | 29 | 46 | 0.72 | 40% | 27% |
| 47 | 0.73 | 17 | 32 | 19 | 47 | 0.73 | 45% | 10% |
| 48 | 0.75 | 28 | 49 | 35 | 48 | 0.75 | 41% | 19% |
| 49 | 0.77 | 11 | 41 | 21 | 49 | 0.77 | 72% | 47% |
| 50 | 0.78 | 12 | 42 | 16 | 50 | 0.78 | 71% | 24% |
| 51 | 0.80 | 14 | 41 | 20 | 51 | 0.80 | 65% | 29% |
| 52 | 0.81 | 15 | 47 | 27 | 52 | 0.81 | 67% | 44% |
| 53 | 0.83 | 16 | 46 | 17 | 53 | 0.83 | 64% | 5% |
| 54 | 0.84 | 13 | 56 | 32 | 54 | 0.84 | 76% | 59% |
| 55 | 0.86 | 11 | 58 | 16 | 55 | 0.86 | 81% | 31% |
| 56 | 0.88 | 18 | 46 | 24 | 56 | 0.88 | 60% | 24% |
| 57 | 0.89 | 5 | 30 | 7 | 57 | 0.89 | 83% | 28% |
| 58 | 0.91 | 3 | 25 | 7 | 58 | 0.91 | 88% | 57% |
| 59 | 0.92 | 12 | 18 | 8 | 59 | 0.92 | 31% | −51% |
| 60 | 0.94 | 1 | 12 | 1 | 60 | 0.94 | 91% | −1% |
| 61 | 0.95 | 0 | 3 | 1 | 61 | 0.95 | 100% | 100% |
| 62 | 0.97 | 1 | 2 | 0 | 62 | 0.97 | 49% | 0% |
| 63 | 0.98 | 0 | 3 | 1 | 63 | 0.98 | 100% | 100% |
| 64 | 1.00 | 2 | 5 | 1 | 64 | 1.00 | 59% | −102% |
| | | 1123 | 1154 | 1134 | | | |

TABLE 13

Soy Base Fat Shape Analysis

| Class | 3430 Soy Base Fat Control | 1940 Soy Base Fat Sonic | 1960 Soy Base Fat Sonic | Class | | 1940 vs. 3430 Percent Difference | 1960 vs. 3430 Percent Difference |
|---|---|---|---|---|---|---|---|
| 0 | 0 | 0 | 0 | 0 | | | |
| 1 | 0.008 | 0 | 0 | 0 | 1 | 0.008 | 0% | 0% |
| 2 | 0.016 | 0 | 0 | 0 | 2 | 0.016 | 0% | 0% |
| 3 | 0.023 | 0 | 0 | 0 | 3 | 0.023 | 0% | 0% |
| 4 | 0.031 | 0 | 0 | 0 | 4 | 0.031 | 0% | 0% |
| 5 | 0.039 | 0 | 0 | 0 | 5 | 0.039 | 0% | 0% |
| 6 | 0.047 | 0 | 0 | 0 | 6 | 0.047 | 0% | 0% |
| 7 | 0.055 | 0 | 0 | 0 | 7 | 0.055 | 0% | 0% |
| 8 | 0.063 | 0 | 0 | 0 | 8 | 0.063 | 0% | 0% |
| 9 | 0.070 | 0 | 0 | 0 | 9 | 0.070 | 0% | 0% |
| 10 | 0.078 | 0 | 0 | 0 | 10 | 0.078 | 0% | 0% |
| 11 | 0.086 | 0 | 0 | 0 | 11 | 0.086 | 0% | 0% |
| 12 | 0.094 | 0 | 0 | 0 | 12 | 0.094 | 0% | 0% |
| 13 | 0.102 | 0 | 0 | 0 | 13 | 0.102 | 0% | 0% |
| 14 | 0.109 | 0 | 0 | 0 | 14 | 0.109 | 0% | 0% |
| 15 | 0.117 | 0 | 0 | 0 | 15 | 0.117 | 0% | 0% |
| 16 | 0.125 | 0 | 0 | 0 | 16 | 0.125 | 0% | 0% |
| 17 | 0.133 | 0 | 0 | 0 | 17 | 0.133 | 0% | 0% |
| 18 | 0.141 | 0 | 0 | 0 | 18 | 0.141 | 0% | 0% |
| 19 | 0.148 | 0 | 3 | 0 | 19 | 0.148 | 100% | 0% |
| 20 | 0.156 | 0 | 3 | 0 | 20 | 0.156 | 100% | 0% |
| 21 | 0.164 | 0 | 10 | 1 | 21 | 0.164 | 100% | 100% |
| 22 | 0.172 | 0 | 18 | 2 | 22 | 0.172 | 100% | 100% |
| 23 | 0.180 | 1 | 22 | 4 | 23 | 0.180 | 95% | 75% |
| 24 | 0.188 | 5 | 25 | 13 | 24 | 0.188 | 79% | 61% |
| 25 | 0.195 | 6 | 44 | 11 | 25 | 0.195 | 86% | 45% |
| 26 | 0.203 | 19 | 50 | 22 | 26 | 0.203 | 61% | 13% |
| 27 | 0.211 | 27 | 40 | 30 | 27 | 0.211 | 31% | 9% |
| 28 | 0.219 | 33 | 56 | 36 | 28 | 0.219 | 39% | 7% |
| 29 | 0.227 | 39 | 61 | 42 | 29 | 0.227 | 34% | 6% |

TABLE 13-continued

Soy Base Fat Shape Analysis

| Class | 3430 Soy Base Fat Control | 1940 Soy Base Fat Sonic | 1960 Soy Base Fat Sonic | Class | 1940 vs. 3430 Percent Difference | 1960 vs. 3430 Percent Difference |
| --- | --- | --- | --- | --- | --- | --- |
| 30 | 0.234 | 44 | 77 | 60 | 30 | 0.234 | 41% | 26% |
| 31 | 0.242 | 73 | 56 | 53 | 31 | 0.242 | −34% | −39% |
| 32 | 0.250 | 61 | 66 | 81 | 32 | 0.250 | 5% | 24% |
| 33 | 0.258 | 99 | 71 | 98 | 33 | 0.258 | −43% | −2% |
| 34 | 0.266 | 89 | 82 | 110 | 34 | 0.266 | −12% | 18% |
| 35 | 0.273 | 99 | 62 | 81 | 35 | 0.273 | −64% | −23% |
| 36 | 0.281 | 118 | 81 | 99 | 36 | 0.281 | −50% | −20% |
| 37 | 0.289 | 77 | 74 | 87 | 37 | 0.289 | −7% | 11% |
| 38 | 0.297 | 86 | 60 | 84 | 38 | 0.297 | −47% | −3% |
| 39 | 0.305 | 62 | 37 | 68 | 39 | 0.305 | −72% | 8% |
| 40 | 0.313 | 59 | 52 | 45 | 40 | 0.313 | −17% | −32% |
| 41 | 0.320 | 47 | 41 | 40 | 41 | 0.320 | −18% | −19% |
| 42 | 0.328 | 36 | 34 | 33 | 42 | 0.328 | −9% | −10% |
| 43 | 0.336 | 15 | 12 | 13 | 43 | 0.336 | −28% | −17% |
| 44 | 0.344 | 17 | 9 | 6 | 44 | 0.344 | −94% | −186% |
| 45 | 0.352 | 6 | 1 | 5 | 45 | 0.352 | −517% | −21% |
| 46 | 0.359 | 2 | 3 | 5 | 46 | 0.359 | 31% | 60% |
| 47 | 0.367 | 1 | 1 | 2 | 47 | 0.367 | −3% | 50% |
| 48 | 0.375 | 0 | 0 | 1 | 48 | 0.375 | 0% | 100% |
| 49 | 0.383 | 0 | 2 | 1 | 49 | 0.383 | 100% | 100% |
| 50 | 0.391 | 1 | 1 | 0 | 50 | 0.391 | −3% | 0% |
| 51 | 0.398 | 0 | 0 | 1 | 51 | 0.398 | 0% | 100% |
| 52 | 0.406 | 0 | 0 | 0 | 52 | 0.406 | 0% | 0% |
| 53 | 0.414 | 0 | 0 | 0 | 53 | 0.414 | 0% | 0% |
| 54 | 0.422 | 1 | 0 | 0 | 54 | 0.422 | 0% | 0% |
| 55 | 0.430 | 0 | 0 | 0 | 55 | 0.430 | 0% | 0% |
| 56 | 0.438 | 0 | 0 | 0 | 56 | 0.438 | 0% | 0% |
| 57 | 0.445 | 0 | 0 | 0 | 57 | 0.445 | 0% | 0% |
| 58 | 0.453 | 0 | 0 | 0 | 58 | 0.453 | 0% | 0% |
| 59 | 0.461 | 0 | 0 | 0 | 59 | 0.461 | 0% | 0% |
| 60 | 0.469 | 0 | 0 | 0 | 60 | 0.469 | 0% | 0% |
| 61 | 0.477 | 0 | 0 | 0 | 61 | 0.477 | 0% | 0% |
| 62 | 0.484 | 0 | 0 | 0 | 62 | 0.484 | 0% | 0% |
| 63 | 0.492 | 0 | 0 | 0 | 63 | 0.492 | 0% | 0% |
| 64 | 0.500 | 0 | 0 | 0 | 64 | 0.500 | 0% | 0% |
|  |  | 1123 | 1154 | 1134 |  |  |  |  |

TABLE 14

Soy Base Fat Aspect Ratio Analysis

| Class | 3430 Soy Base Fat Control | 1940 Soy Base Fat Sonic | 1960 Soy Base Fat Sonic | Class | 1940 vs. 3430 Percent Difference | 1960 vs. 3430 Percent Difference |
| --- | --- | --- | --- | --- | --- | --- |
| 0 | 0 | 0 | 0 | 0 |  |  |
| 1 | 0.02 | 0 | 0 | 0 | 1 | 0.02 | 0% | 0% |
| 2 | 0.03 | 0 | 0 | 0 | 2 | 0.03 | 0% | 0% |
| 3 | 0.05 | 0 | 0 | 0 | 3 | 0.05 | 0% | 0% |
| 4 | 0.06 | 0 | 0 | 0 | 4 | 0.06 | 0% | 0% |
| 5 | 0.08 | 0 | 0 | 0 | 5 | 0.08 | 0% | 0% |
| 6 | 0.09 | 0 | 0 | 0 | 6 | 0.09 | 0% | 0% |
| 7 | 0.11 | 0 | 0 | 0 | 7 | 0.11 | 0% | 0% |
| 8 | 0.13 | 0 | 0 | 1 | 8 | 0.13 | 0% | 100% |
| 9 | 0.14 | 0 | 0 | 0 | 9 | 0.14 | 0% | 0% |
| 10 | 0.16 | 0 | 0 | 0 | 10 | 0.16 | 0% | 0% |
| 11 | 0.17 | 0 | 0 | 0 | 11 | 0.17 | 0% | 0% |
| 12 | 0.19 | 2 | 0 | 0 | 12 | 0.19 | 0% | 0% |
| 13 | 0.20 | 1 | 1 | 0 | 13 | 0.20 | 0% | 0% |
| 14 | 0.22 | 3 | 0 | 1 | 14 | 0.22 | 0% | −199% |
| 15 | 0.23 | 2 | 2 | 3 | 15 | 0.23 | 0% | 33% |
| 16 | 0.25 | 3 | 0 | 4 | 16 | 0.25 | 0% | 25% |
| 17 | 0.27 | 4 | 0 | 3 | 17 | 0.27 | 0% | −33% |
| 18 | 0.28 | 4 | 1 | 4 | 18 | 0.28 | −299% | 0% |
| 19 | 0.30 | 9 | 2 | 8 | 19 | 0.30 | −349% | −12% |
| 20 | 0.31 | 5 | 3 | 6 | 20 | 0.31 | −66% | 17% |
| 21 | 0.33 | 9 | 1 | 5 | 21 | 0.33 | −798% | −80% |
| 22 | 0.34 | 16 | 5 | 16 | 22 | 0.34 | −219% | 0% |
| 23 | 0.36 | 14 | 6 | 10 | 23 | 0.36 | −133% | −40% |
| 24 | 0.38 | 8 | 2 | 11 | 24 | 0.38 | −299% | 27% |
| 25 | 0.39 | 14 | 4 | 10 | 25 | 0.39 | −249% | −40% |
| 26 | 0.41 | 20 | 8 | 16 | 26 | 0.41 | −149% | −25% |
| 27 | 0.42 | 16 | 5 | 20 | 27 | 0.42 | −219% | 20% |
| 28 | 0.44 | 13 | 7 | 22 | 28 | 0.44 | −85% | 41% |
| 29 | 0.45 | 13 | 3 | 18 | 29 | 0.45 | −332% | 28% |
| 30 | 0.47 | 22 | 11 | 25 | 30 | 0.47 | −99% | 12% |
| 31 | 0.48 | 21 | 12 | 38 | 31 | 0.48 | −75% | 45% |
| 32 | 0.50 | 36 | 11 | 39 | 32 | 0.50 | −226% | 8% |
| 33 | 0.52 | 23 | 26 | 31 | 33 | 0.52 | 12% | 26% |
| 34 | 0.53 | 22 | 11 | 23 | 34 | 0.53 | −99% | 5% |
| 35 | 0.55 | 40 | 20 | 40 | 35 | 0.55 | −99% | 0% |
| 36 | 0.56 | 34 | 19 | 33 | 36 | 0.56 | −78% | −3% |
| 37 | 0.58 | 39 | 13 | 24 | 37 | 0.58 | −199% | −62% |
| 38 | 0.59 | 39 | 20 | 35 | 38 | 0.59 | −94% | −11% |
| 39 | 0.61 | 45 | 10 | 24 | 39 | 0.61 | −349% | −87% |
| 40 | 0.63 | 25 | 14 | 23 | 40 | 0.63 | −78% | −8% |
| 41 | 0.64 | 32 | 16 | 29 | 41 | 0.64 | −99% | −10% |
| 42 | 0.66 | 44 | 31 | 40 | 42 | 0.66 | −42% | −10% |
| 43 | 0.67 | 38 | 27 | 38 | 43 | 0.67 | −40% | 0% |
| 44 | 0.69 | 45 | 30 | 40 | 44 | 0.69 | −50% | −12% |
| 45 | 0.70 | 34 | 24 | 30 | 45 | 0.70 | −41% | −13% |
| 46 | 0.72 | 31 | 15 | 31 | 46 | 0.72 | −106% | 0% |
| 47 | 0.73 | 45 | 33 | 43 | 47 | 0.73 | −36% | −4% |
| 48 | 0.75 | 37 | 36 | 41 | 48 | 0.75 | −2% | 10% |
| 49 | 0.77 | 36 | 25 | 22 | 49 | 0.77 | −44% | −63% |
| 50 | 0.78 | 31 | 56 | 53 | 50 | 0.78 | 45% | 42% |
| 51 | 0.80 | 24 | 25 | 25 | 51 | 0.80 | 4% | 4% |
| 52 | 0.81 | 28 | 50 | 28 | 52 | 0.81 | 44% | 0% |
| 53 | 0.83 | 21 | 42 | 35 | 53 | 0.83 | 50% | 40% |
| 54 | 0.84 | 24 | 54 | 27 | 54 | 0.84 | 56% | 11% |
| 55 | 0.86 | 37 | 80 | 37 | 55 | 0.86 | 54% | 0% |
| 56 | 0.88 | 20 | 37 | 16 | 56 | 0.88 | 46% | −25% |
| 57 | 0.89 | 16 | 41 | 16 | 57 | 0.89 | 61% | 0% |
| 58 | 0.91 | 13 | 57 | 8 | 58 | 0.91 | 77% | −62% |
| 59 | 0.92 | 11 | 41 | 8 | 59 | 0.92 | 73% | −37% |
| 60 | 0.94 | 8 | 38 | 10 | 60 | 0.94 | 79% | 20% |
| 61 | 0.95 | 13 | 49 | 12 | 61 | 0.95 | 74% | −8% |
| 62 | 0.97 | 6 | 45 | 13 | 62 | 0.97 | 87% | 54% |
| 63 | 0.98 | 11 | 22 | 10 | 63 | 0.98 | 50% | −10% |
| 64 | 1.00 | 3 | 16 | 3 | 64 | 1.00 | 81% | 0% |
|  |  | 1110 | 1107 | 1108 |  |  |  |  |

Figure 40A:
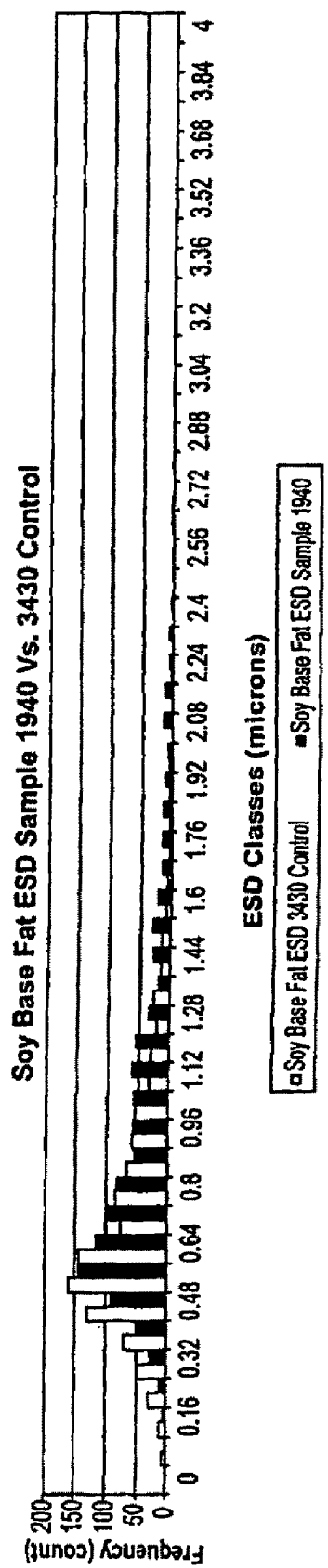
FIG. 40a presents the data for a soy base product treated with ultrasound, with an ultrasound device set at 80% amplitude, applying 255 watts of power at an intensity of 28 watts/cm$^2$.
Figure 40B:
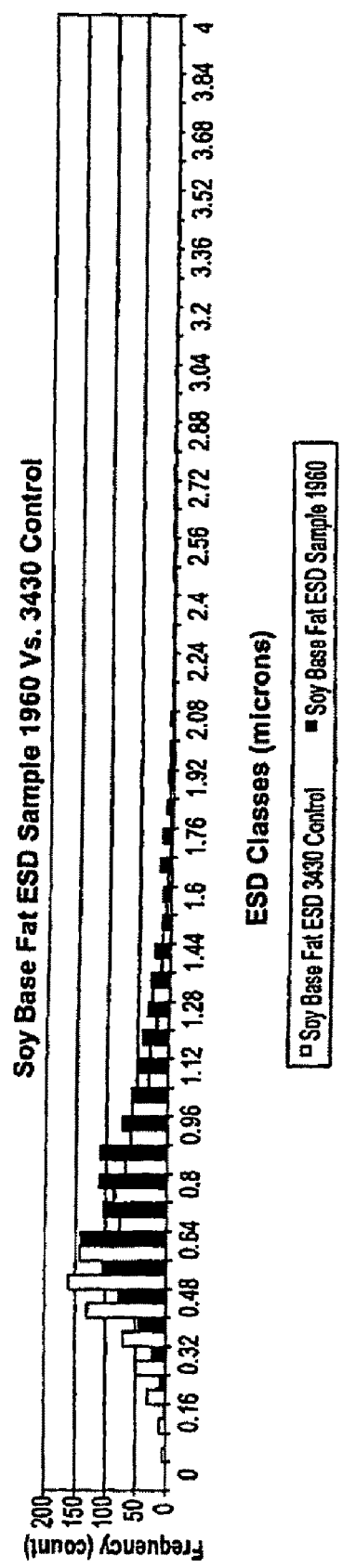
FIG. 40b presents the data for a soy base product treated with ultrasound, with an ultrasound device set at 100% amplitude, applying 318 watts of power at an intensity of 35 watts/cm$^2$.
Figure 42A:
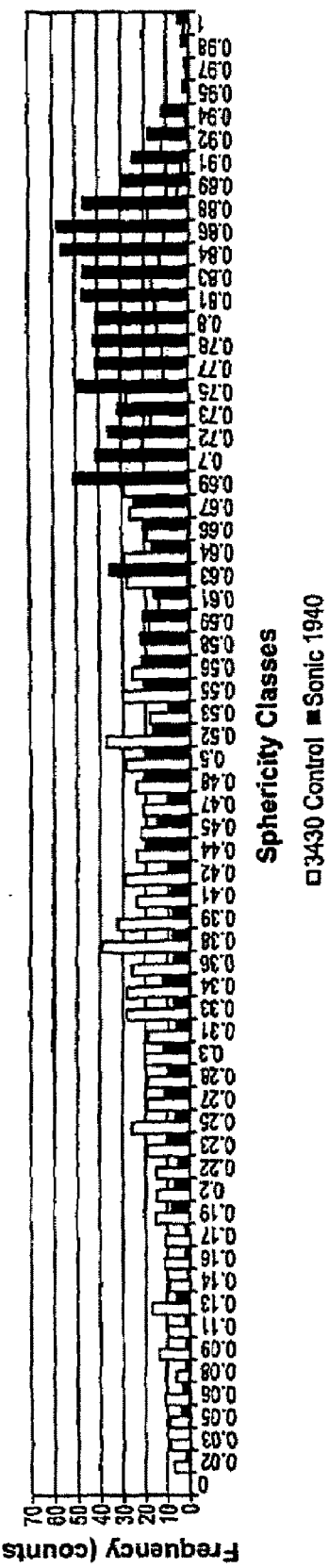
FIG. 42a presents the data for a soy base product treated with ultrasound, with an ultrasound device set at 80% amplitude, applying 255 watts of power at an intensity of 28 watts/cm$^2$.
Figure 42B:
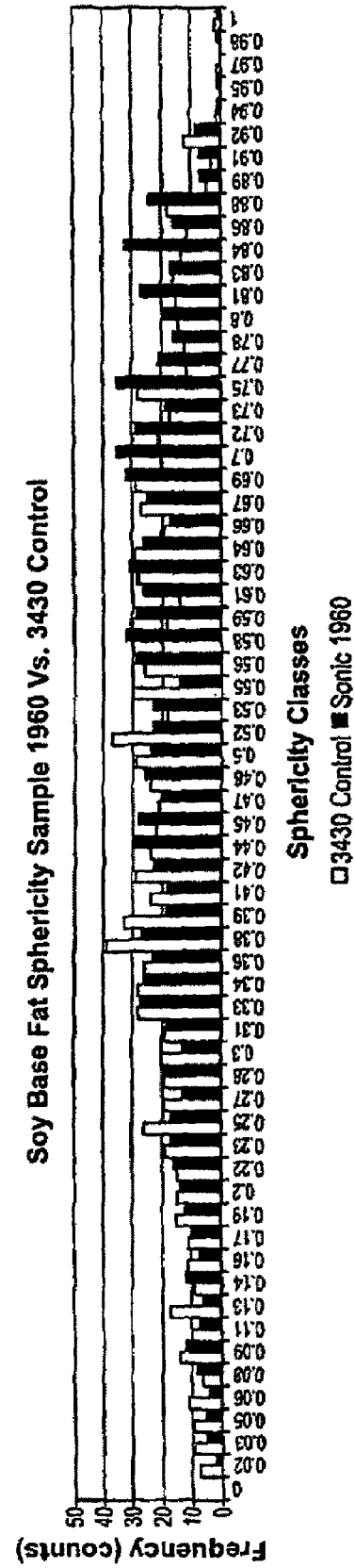
FIG. 42b presents the data for a soy base product treated with ultrasound, with an ultrasound device set at 100% amplitude, applying 318 watts of power at an intensity of 35 watts/cm$^2$.
Figure 43A:
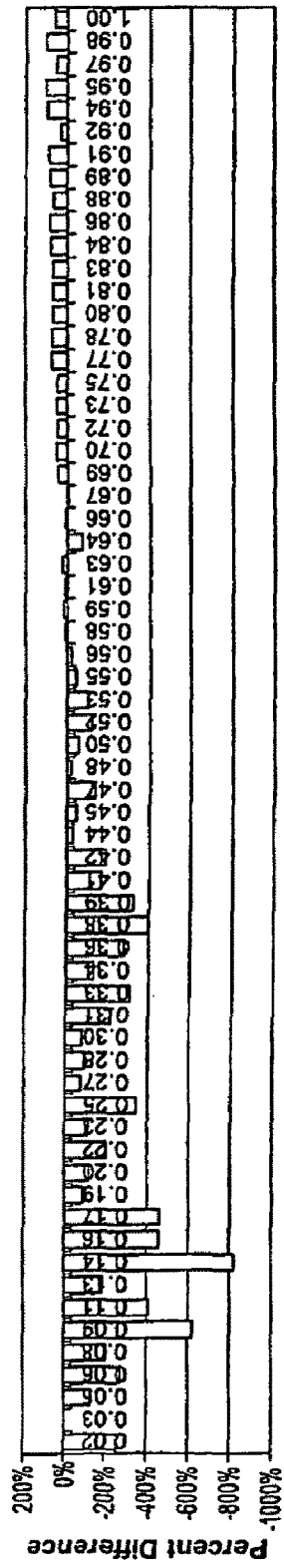
FIG. 43a presents the data for a soy base product treated with ultrasound, with an ultrasound device set at 80% amplitude, applying 255 watts of power at an intensity of 28 watts/cm$^2$.
Figure 43B:
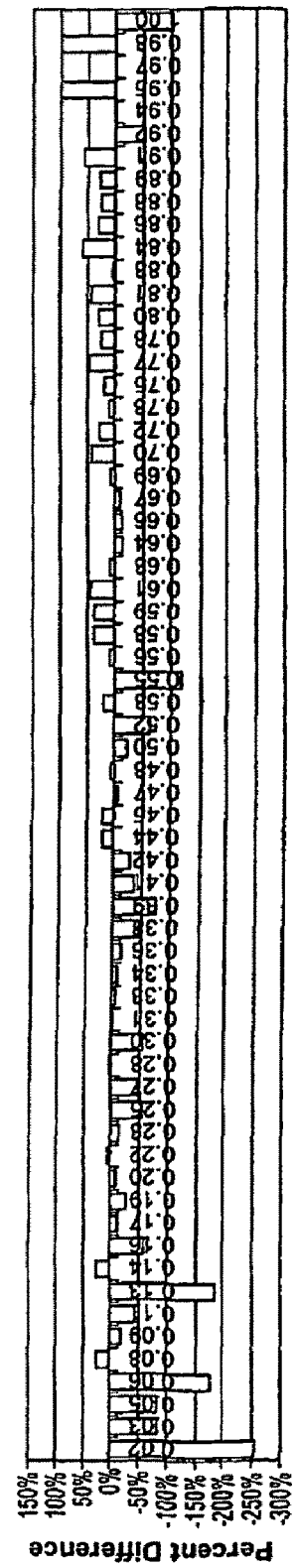
FIG. 43b presents the data for a soy base product treated with ultrasound, with an ultrasound device set at 100% amplitude, applying 318 watts of power at an intensity of 35 watts/cm$^2$.
Figure 44A:
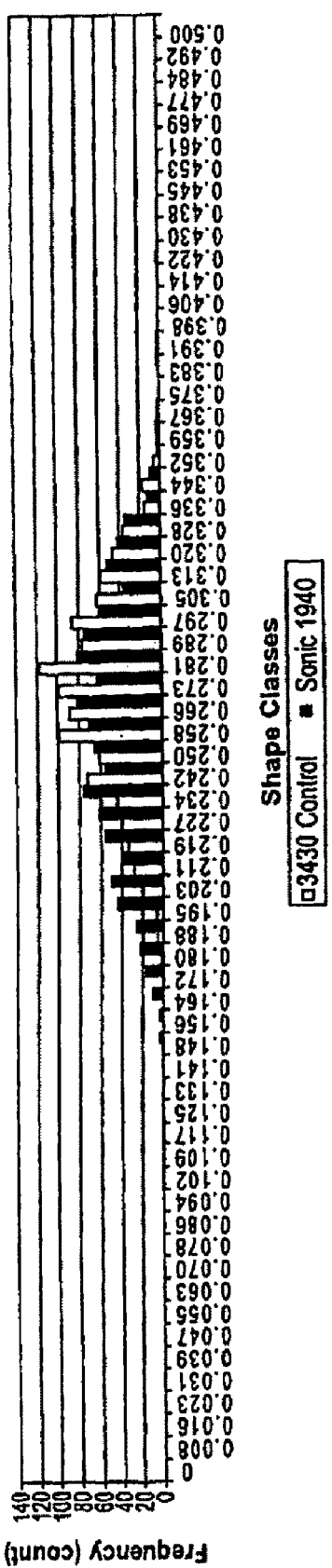
FIG. 44a presents the data for a soy base product treated with ultrasound, with an ultrasound device set at 80% amplitude, applying 255 watts of power at an intensity of 28 watts/cm$^2$.
Figure 44B:
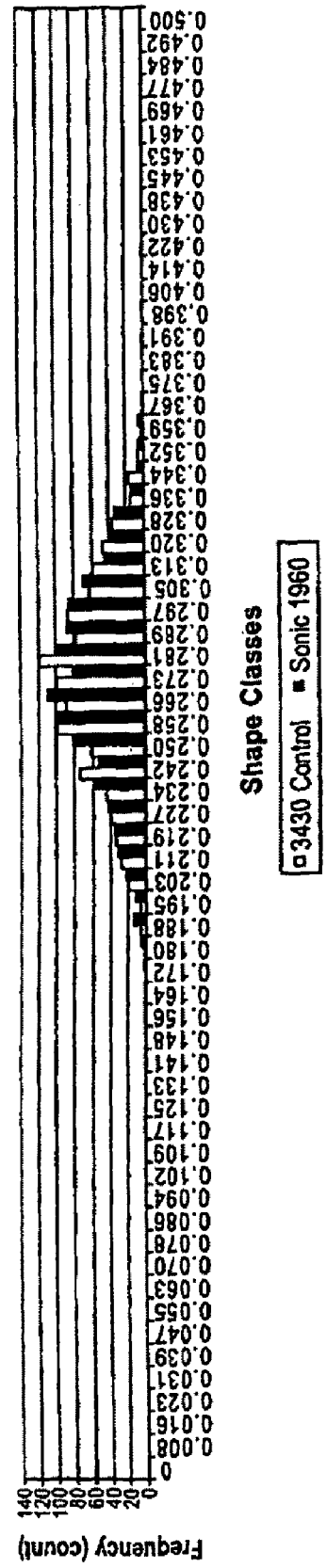
FIG. 44b presents the data for a soy base product treated with ultrasound, with an ultrasound device set at 100% amplitude, applying 318 watts of power at an intensity of 35 watts/cm$^2$.
Figure 45A:
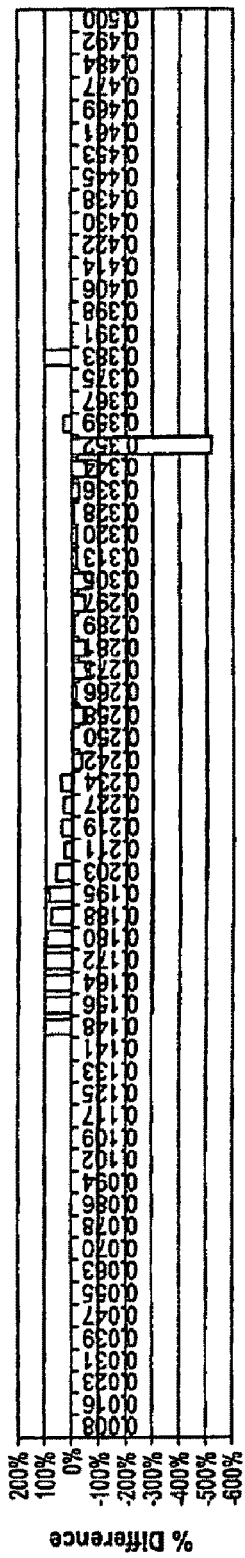
FIG. 45a presents the data for a soy base product treated with ultrasound, with an ultrasound device set at 80% amplitude, applying 255 watts of power at an intensity of 28 watts/cm$^2$.
Figure 45B:
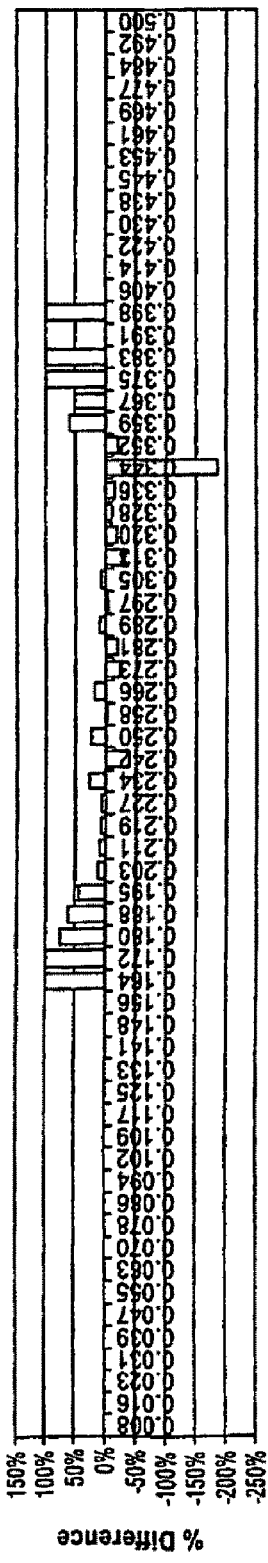
FIG. 45b presents the data for a soy base product treated with ultrasound, with an ultrasound device set at 100% amplitude, applying 318 watts of power at an intensity of 35 watts/cm$^2$.
Figure 46A:
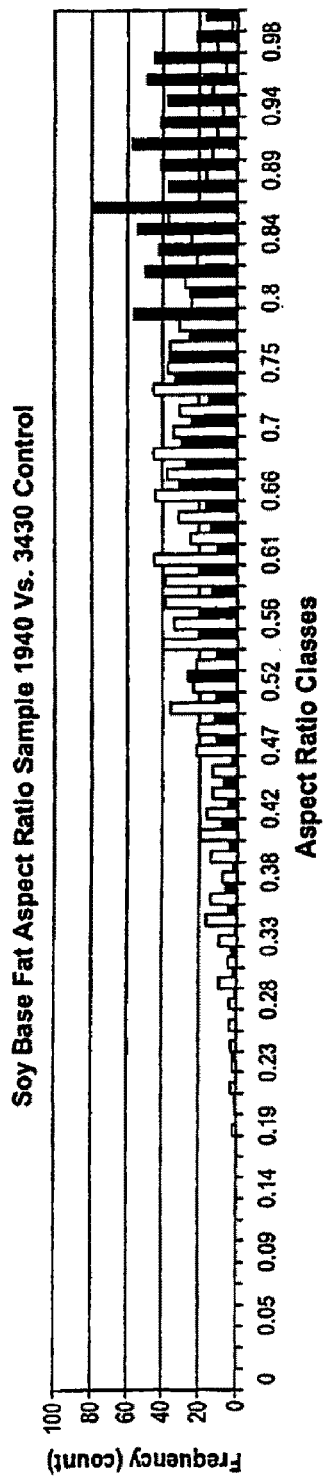
FIG. 46a presents the data for a soy base product treated with ultrasound, with an ultrasound device set at 80% amplitude, applying 255 watts of power at an intensity of 28 watts/cm$^2$.
Figure 46B:
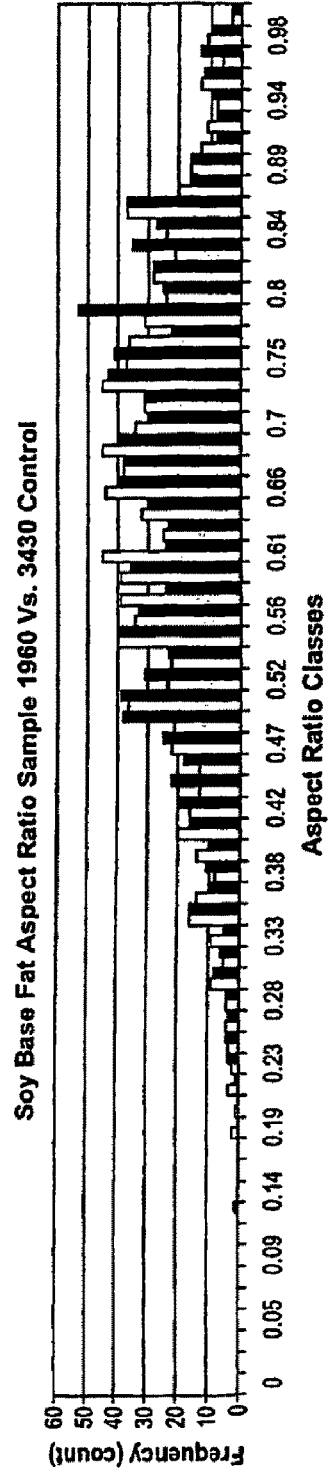
FIG. 46b presents the data for a soy base product treated with ultrasound, with an ultrasound device set at 100% amplitude, applying 318 watts of power at an intensity of 35 watts/cm$^2$.

FIGS. 40 *a-b* and 41 *a-b* are graphical representations of the equivalent spherical diameter data for the soy base. As can been seen in FIGS. 40 *a-b*, within the specified range of equivalent spherical diameter classes, there is an increase and a more uniform distribution of fat particles in those products made in accordance with the present invention than in the control product. Similar effects are seen for sphericity, shape and aspect ratio. FIGS. 42 *a-b* and 43 *a-b* are graphical representations of the sphericity data, FIGS. 44 *a-b* and 45 *a-b* are graphical representations of the shape data, and FIGS. 46 *a-b* and 47 *a-b* are graphical representations of the aspect ratio data for the soy base products. In each analysis of the particle morphology parameter, there is a definite optimum range of classes corresponding to that parameter, an increase in the number of particles within those classes, and a more uniform distribution of particles within the classes of that range in the products made in accordance with the present invention, as compared to the control product.

In this embodiment of the present invention, the optimal ranges for classes of fat particle morphology parameters are summarized in the table below:

TABLE 15

Particle Morphology Parameter Ranges

| Morphology Parameter | Useful Range | Preferred Range |
| --- | --- | --- |
| Equivalent Spherical Diameter | About .72-About 2.16 microns | About .72-About 1.28 microns |
| Sphericity | About .69-About 1.0 | About .69-About .91 |
| Shape | About .148-About .234 | About .164-About .234 |
| Aspect Ratio | About .78-About 1.0 | |

The present invention includes the manipulation of particle morphology to improve the functional and organoleptic properties of the product. Although the foregoing examples have demonstrated the present invention, they are not intended to limit or define the scope of the invention, which is defined by the following claims.

What is claimed is:

1. A yogurt dairy product comprising yogurt that contains dairy fat particles, said product, as compared to a control yogurt base product produced by conventional shear-based homogenization methods, having an increased number of dairy fat particles that are within a range of values of a plurality of morphological properties of the dairy fat particles, wherein the morphological properties are sphericity, equivalent spherical diameter, shape, and aspect ratio;
   the range of values for said sphericity is between about 0.36 to about 0.88;
   the range of values for said equivalent spherical diameter is between about 0.80 microns to about 1.76 microns;
   the range of values for said shape is between about 0.135 to about 0.265; and
   the range of values for said aspect ratio is between about 0.59 to about 0.91.

2. The product of claim 1, wherein the particles are more uniformly distributed within the range of values as compared to the control product.

3. The product of claim 1, wherein the range of values of at least one of the morphological properties comprises a number of classes, and the percentage of particles in each class within the range is at least about 1% greater than the percentage of particles in each class for the control product.

4. The product of claim 3, wherein said percentage of particles in each class within the range is between about 5% to about 75% greater than the control product.

5. The product of claim 3, wherein said percentage of particles in each class within the range is between about 10% to about 60% greater than the control product.

6. The product of claim 3, wherein said percentage of particles in each class within the range is between about 20% to about 50% greater than the control product.

7. The product of claim 1, wherein the range of values for said sphericity is between about 0.67 to about 0.88, the range of values for said equivalent spherical diameter is between about 0.8 microns to about 1.04 microns, the range of values for said shape is between about 0.20 to about 0.265, and the range of values for said aspect ratio is between about 0.59 to about 0.75.

8. A yogurt dairy product containing dairy fat particles with improved physical and functional properties made by a method comprising:
   treating the yogurt dairy fat particles with ultrasonic energy or with cavitation to increase, as compared to dairy fat particles of a control yogurt base product which was produced using conventional shear-based homogenization methods, a number of the dairy fat particles being within a range of values of at least one morphological property of the dairy fat particles, wherein the morphological property is selected from the group comprising sphericity, equivalent spherical diameter, shape, aspect ratio, or a combination thereof, and
   wherein the range of values for said sphericity is between about 0.36 to about 0.88, the range of values for said equivalent spherical diameter is between about 0.80 microns to about 1.76 microns, the range of values for said shape is between about 0.135 to about 0.265, and the range of values for said aspect ratio is between about 0.59 to about 0.91.

9. A yogurt dairy product containing dairy fat particles with improved physical and functional properties made by a method comprising:
   treating the yogurt dairy fat particles with ultrasonic energy or with cavitation to increase, as compared to dairy fat particles of a control yogurt base product which was produced using conventional shear-based homogenization methods, a number of the dairy fat particles being within a range of values of at least one morphological property of the dairy fat particles, wherein the morphological property is selected from the group comprising sphericity, equivalent spherical diameter, shape, aspect ratio, or a combination thereof, and
   wherein the range of values for said sphericity is between about 0.67 to about 0.88, the range of values for said equivalent spherical diameter is between about 0.80 microns to about 1.04 microns, the range of values for said shape is between about 0.20 to about 0.265, and the range of values for said aspect ratio is between about 0.59 to about 0.75.

* * * * *